(12) United States Patent
Acatrinei

(10) Patent No.: US 9,295,117 B2
(45) Date of Patent: Mar. 22, 2016

(54) NEAR UNITY POWER FACTOR LONG LIFE LOW COST LED LAMP RETROFIT SYSTEM AND METHOD

(71) Applicants: Beniamin Acatrinei, Sunnyvale, CA (US); Alternative Lighting Technologies, Inc., Santa Clara, CA (US)

(72) Inventor: Beniamin Acatrinei, Sunnyvale, CA (US)

(73) Assignee: ALTERNATIVE LIGHTING TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 14/306,108

(22) Filed: Jun. 16, 2014

(65) Prior Publication Data

US 2014/0300274 A1    Oct. 9, 2014

Related U.S. Application Data

(63) Continuation-in-part of application No. PCT/US2012/070212, filed on Dec. 17, 2012.

(60) Provisional application No. 61/710,286, filed on Oct. 5, 2012, provisional application No. 61/576,604, filed on Dec. 16, 2011.

(51) Int. Cl.
| | | |
|---|---|---|
| *G05F 1/00* | (2006.01) | |
| *H05B 33/08* | (2006.01) | |
| *F21K 99/00* | (2010.01) | |

(52) U.S. Cl.
CPC ............ *H05B 33/0815* (2013.01); *F21K 9/135* (2013.01); *H05B 33/083* (2013.01); *H05B 33/089* (2013.01); *H05B 33/0818* (2013.01); *H05B 33/0824* (2013.01); *H05B 33/0827* (2013.01); *H05B 33/0887* (2013.01); *H05B 33/0812* (2013.01); *Y02B 20/383* (2013.01); *Y02B 20/386* (2013.01)

(58) Field of Classification Search
USPC ........... 315/291, 307, 308, 312, 200 R, 185 R
See application file for complete search history.

(56) References Cited

U.S. PATENT DOCUMENTS

| | | | |
|---|---|---|---|
| 2004/0080273 A1 | 4/2004 | Ito | |
| 2008/0088248 A1* | 4/2008 | Myers | H02M 3/335 315/210 |
| 2008/0197817 A1* | 8/2008 | Colbeck | H02M 1/4225 323/205 |
| 2011/0149613 A1 | 6/2011 | Lanni | |

FOREIGN PATENT DOCUMENTS

EP    2385747 A2    11/2011

OTHER PUBLICATIONS

Feb. 13, 2013, PCT International Search Report, WO 2013/090945 (PCT/US2012/070212), 6 pages.

* cited by examiner

Primary Examiner — Minh D A

(57) ABSTRACT

Disclosed are various embodiments of low cost high quality LED (Light Emitting Diode) retrofit lamp devices capable of operating in a wide range of power and to supersede conventional lighting devices such as incandescent, halogen, sodium or fluorescent lamps. The disclosed embodiments include various LED lamp retrofit apparatuses that maximize the electro-mechanical-optical compatibility of seven interactive systems, such as: LEDs, LED Panel, Supply Adaptor, Housing, Lens/diffuser Shield, In/Out Electrical Wiring an LED driver. LED lamp retrofit apparatuses include incandescent, halogen, fluorescent, and sodium lamps.

12 Claims, 43 Drawing Sheets

Double Stage Boost - Isolated Flyback Multi-Columns LED Driver Embodiment

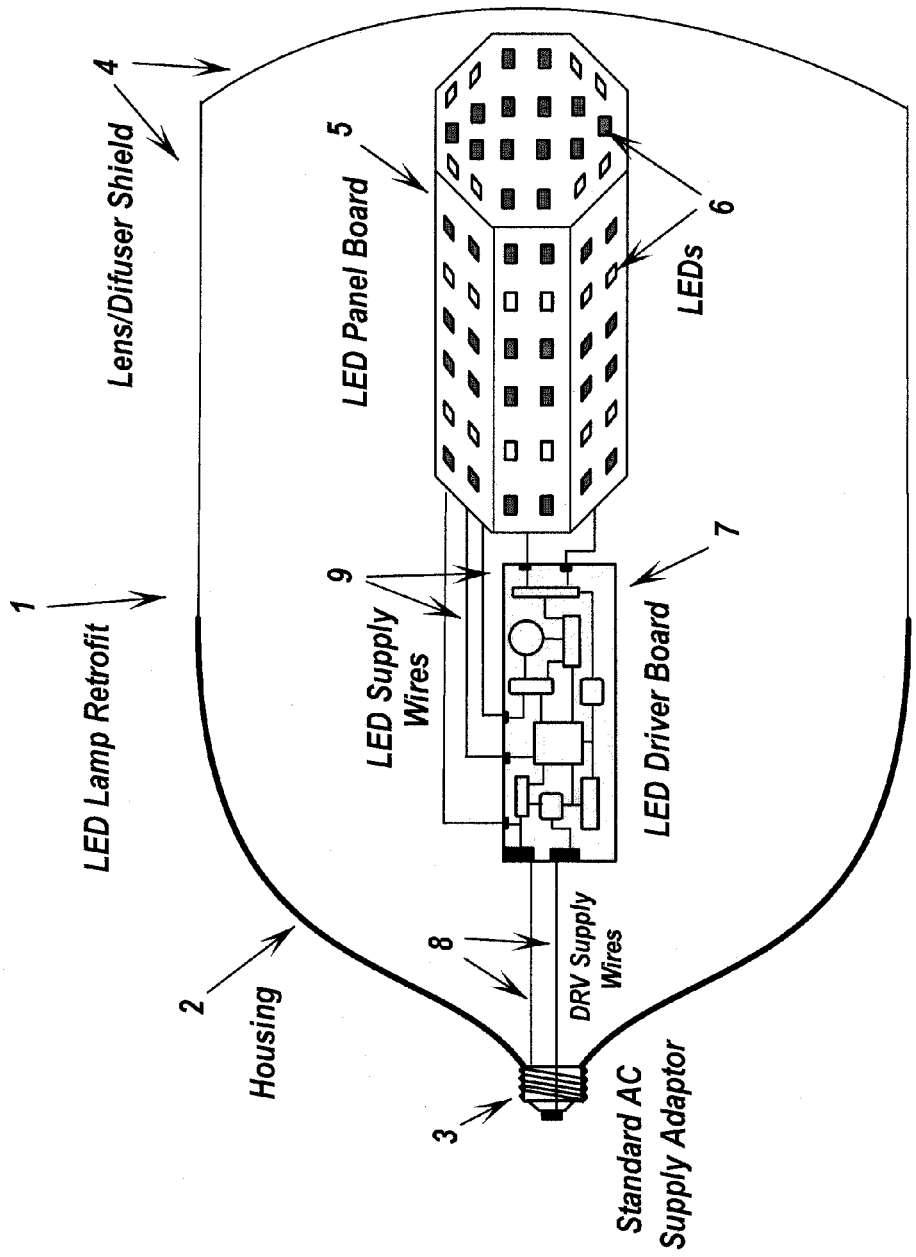
Fig. 1: Dimmable LED Lamp Retrofit For Classic Incandescent Lamps

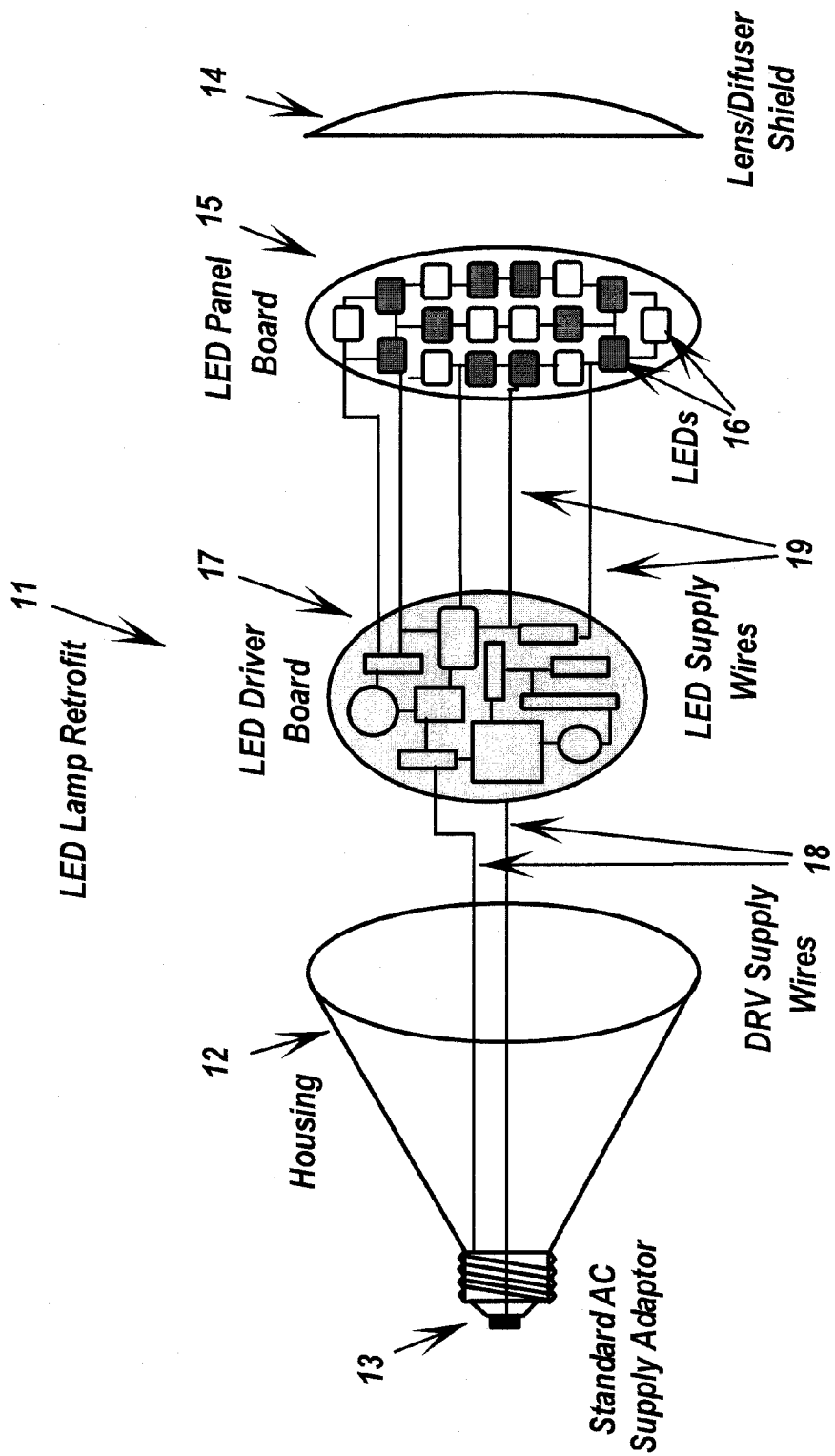
Fig. 2: Dimmable LED Lamp Retrofit For Classic Flood/Halogen Lamps

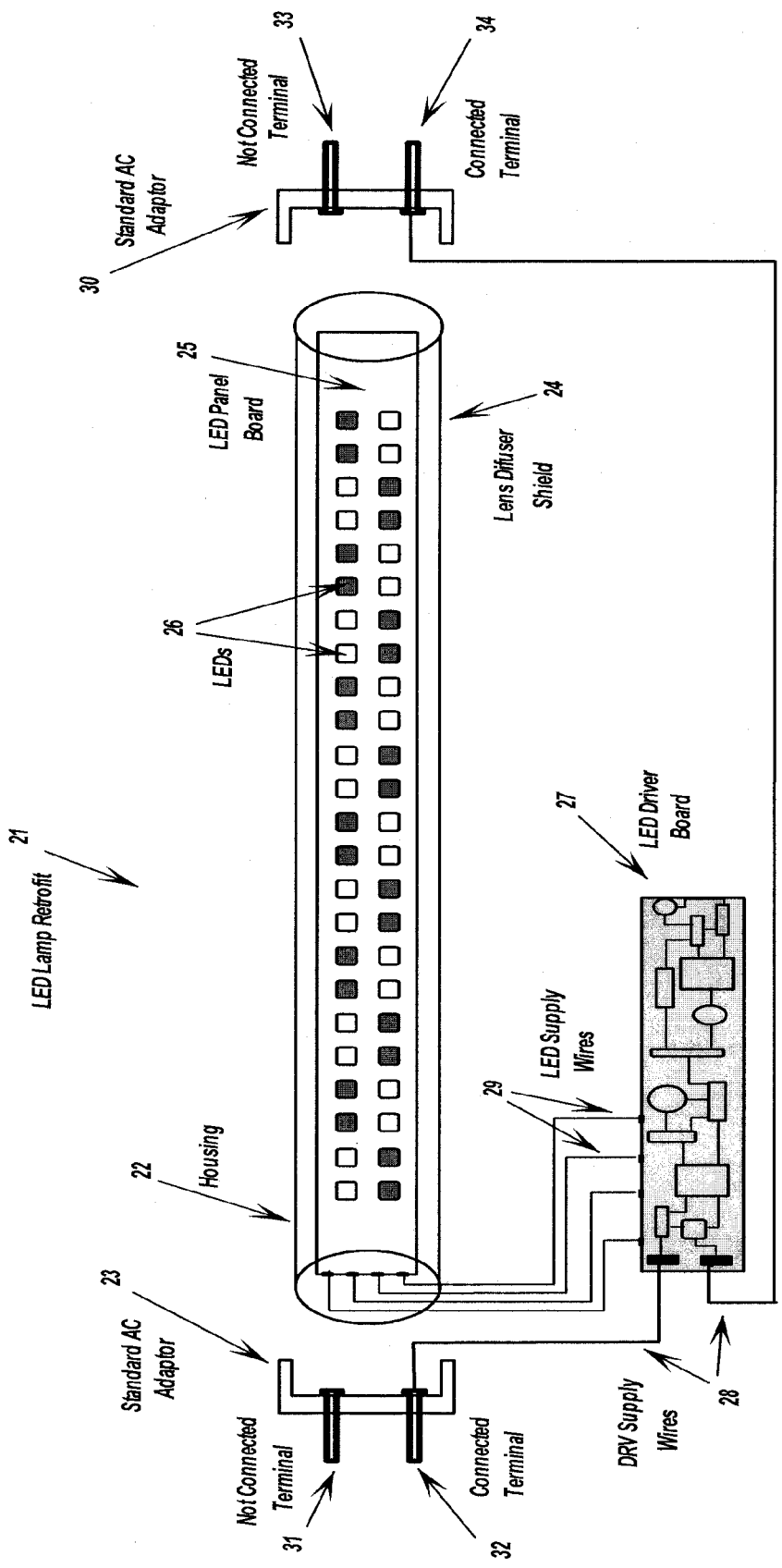
Fig. 3: Dimmable LED Lamp Retrofit For Classic Fluorescent Lamps

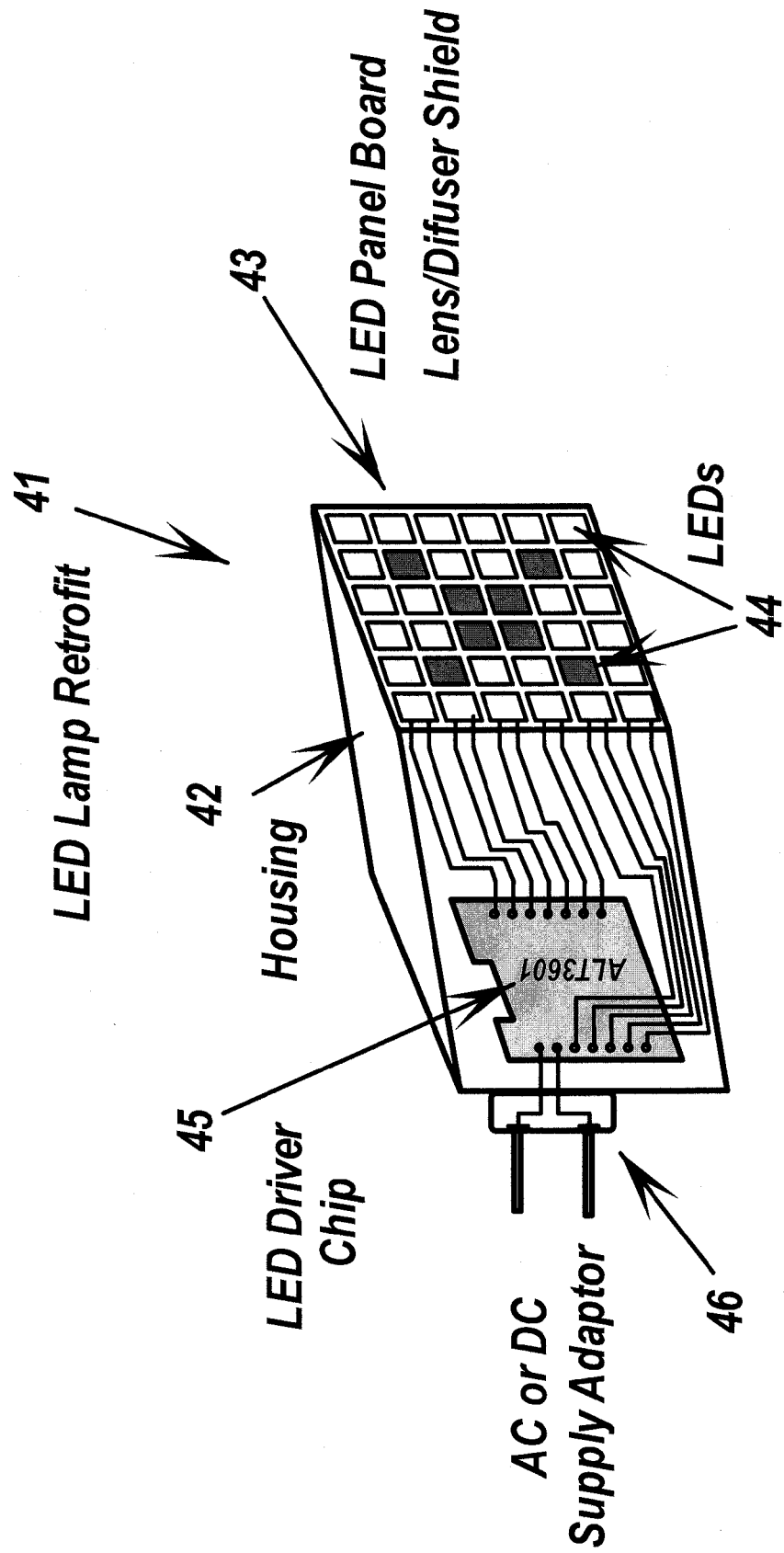
Fig. 4: Dimmable Monolithic LED Lamp Retrofit

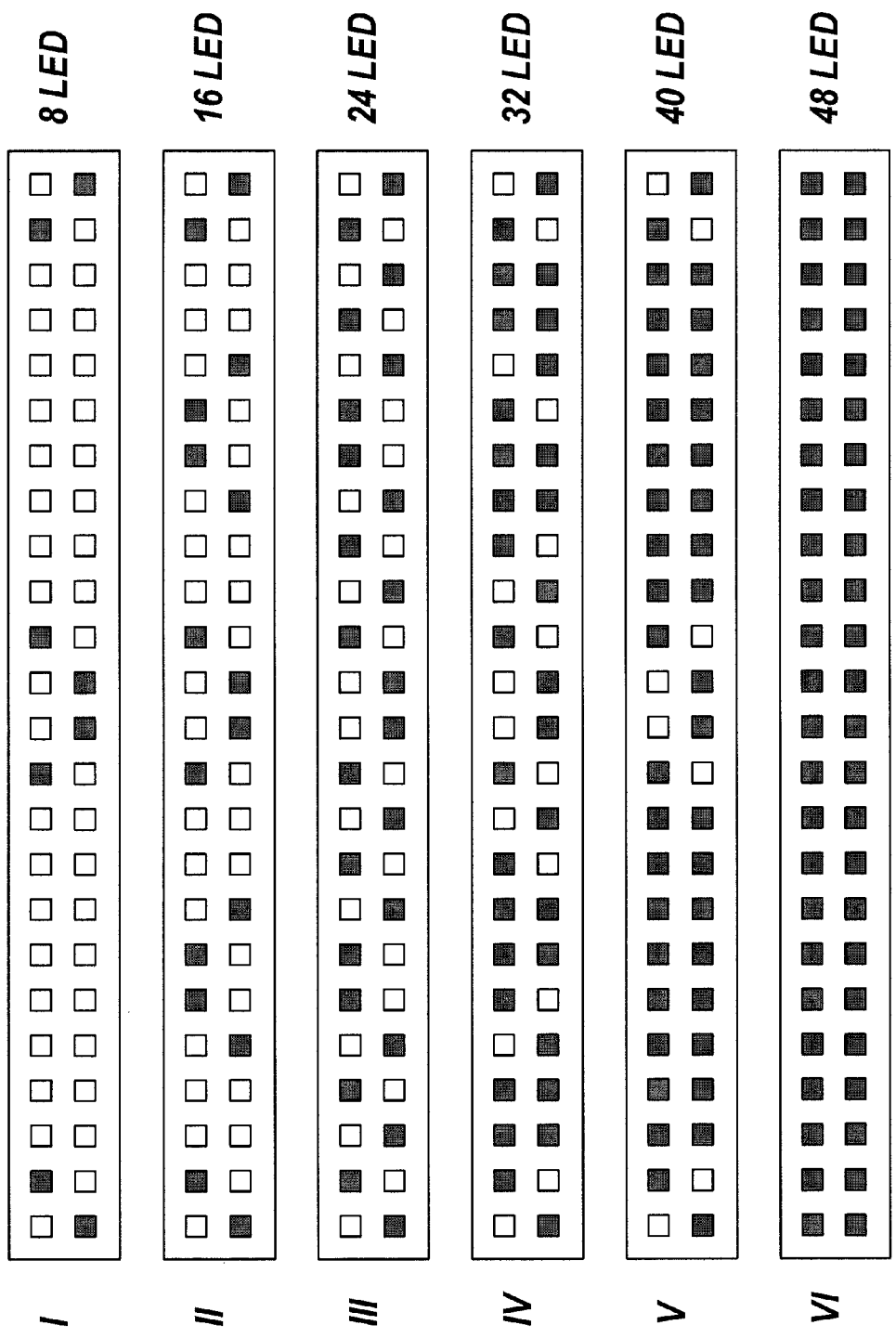

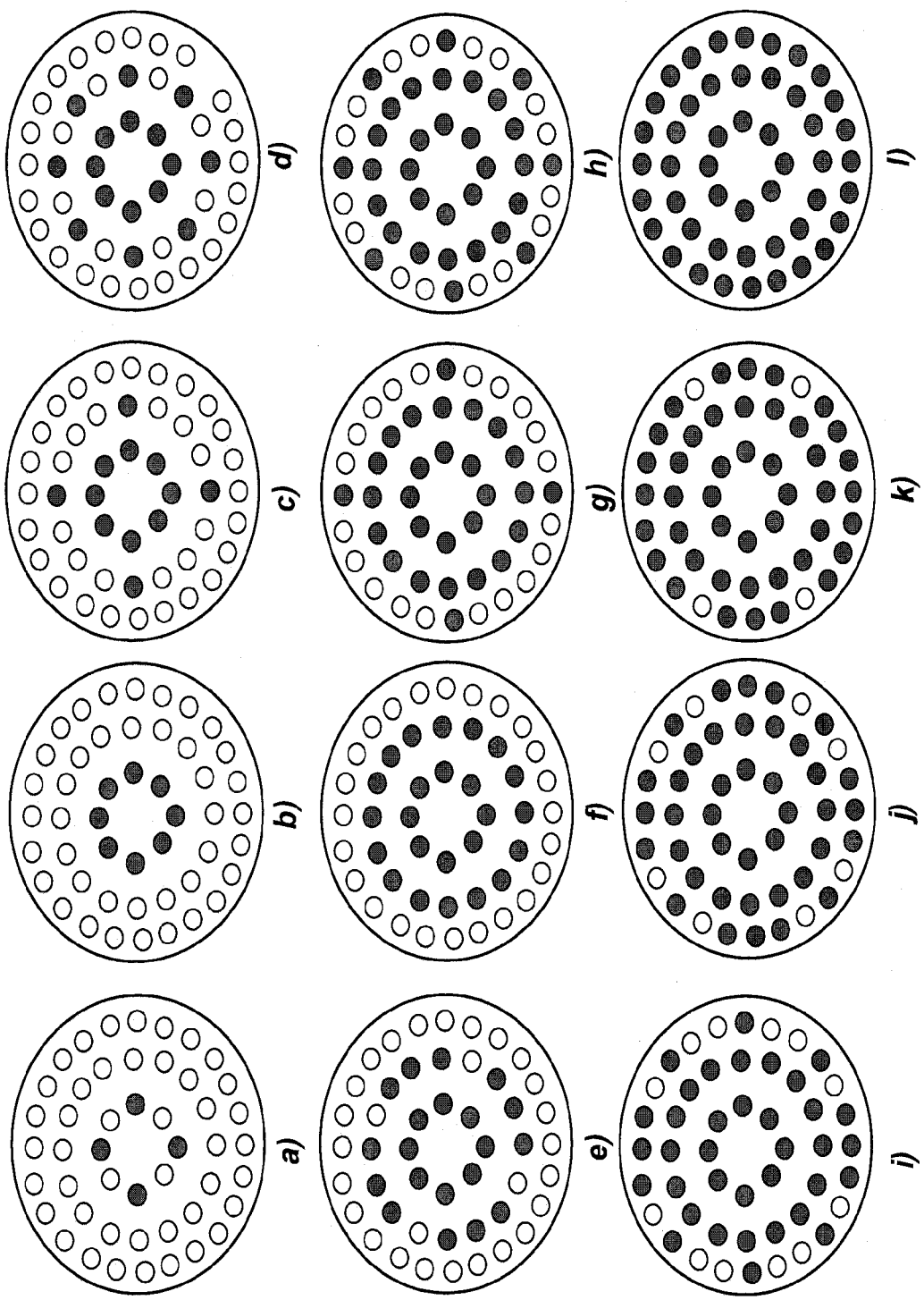

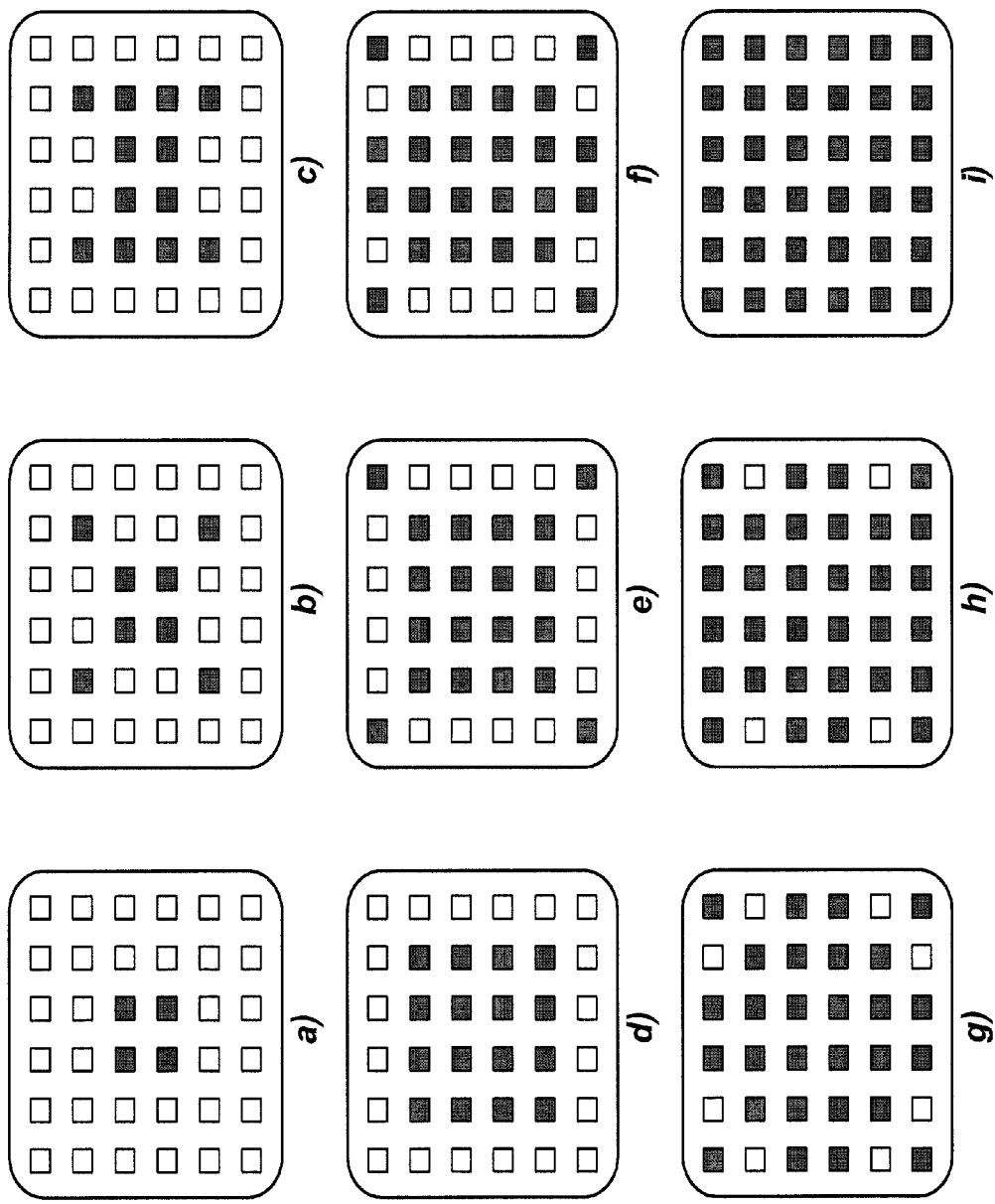
Fig. 7: Dimmable LED Array Display

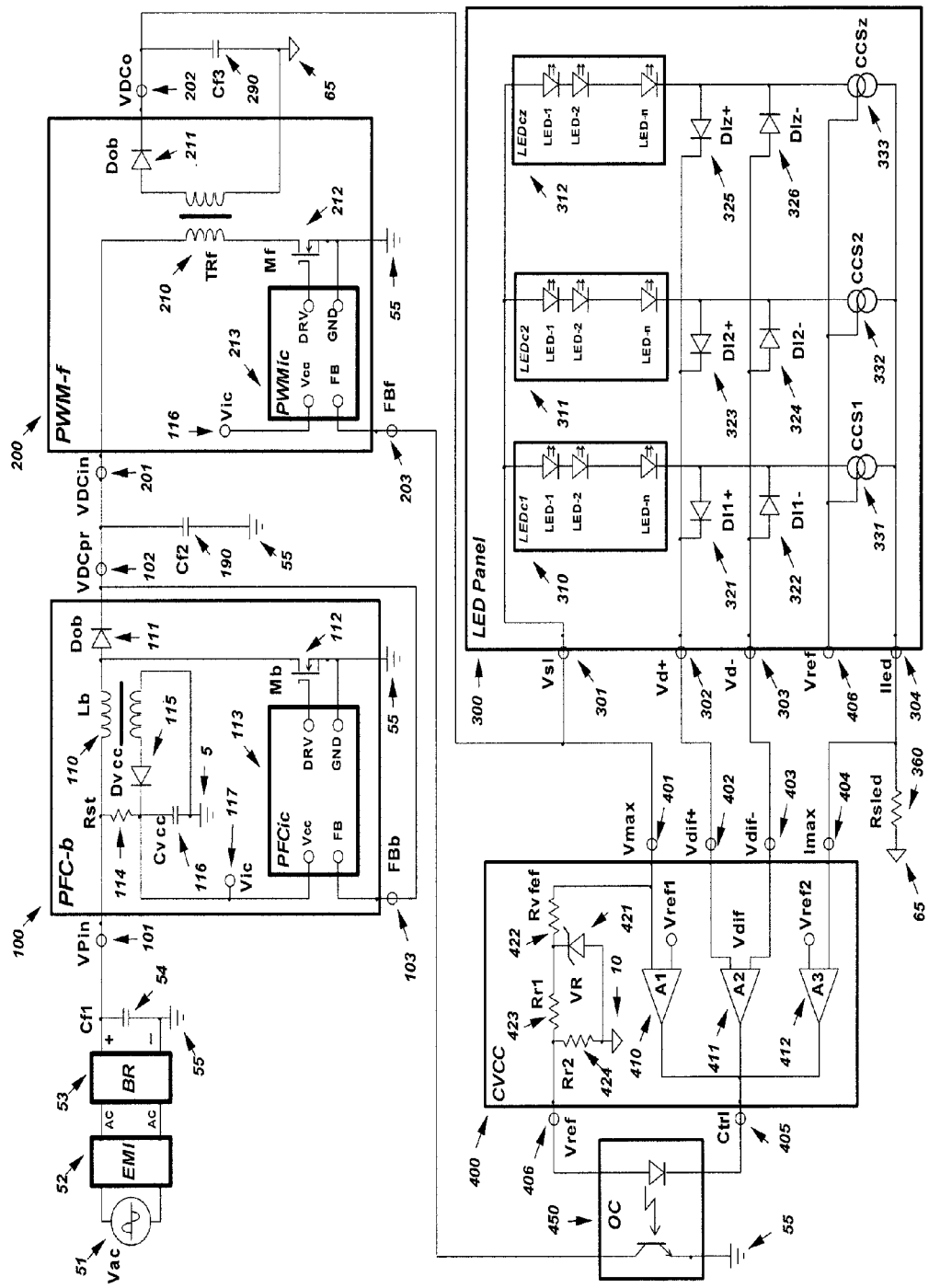
Fig. 8: Double Stage Boost - Isolated Flyback Multi-Columns LED Driver Embodiment

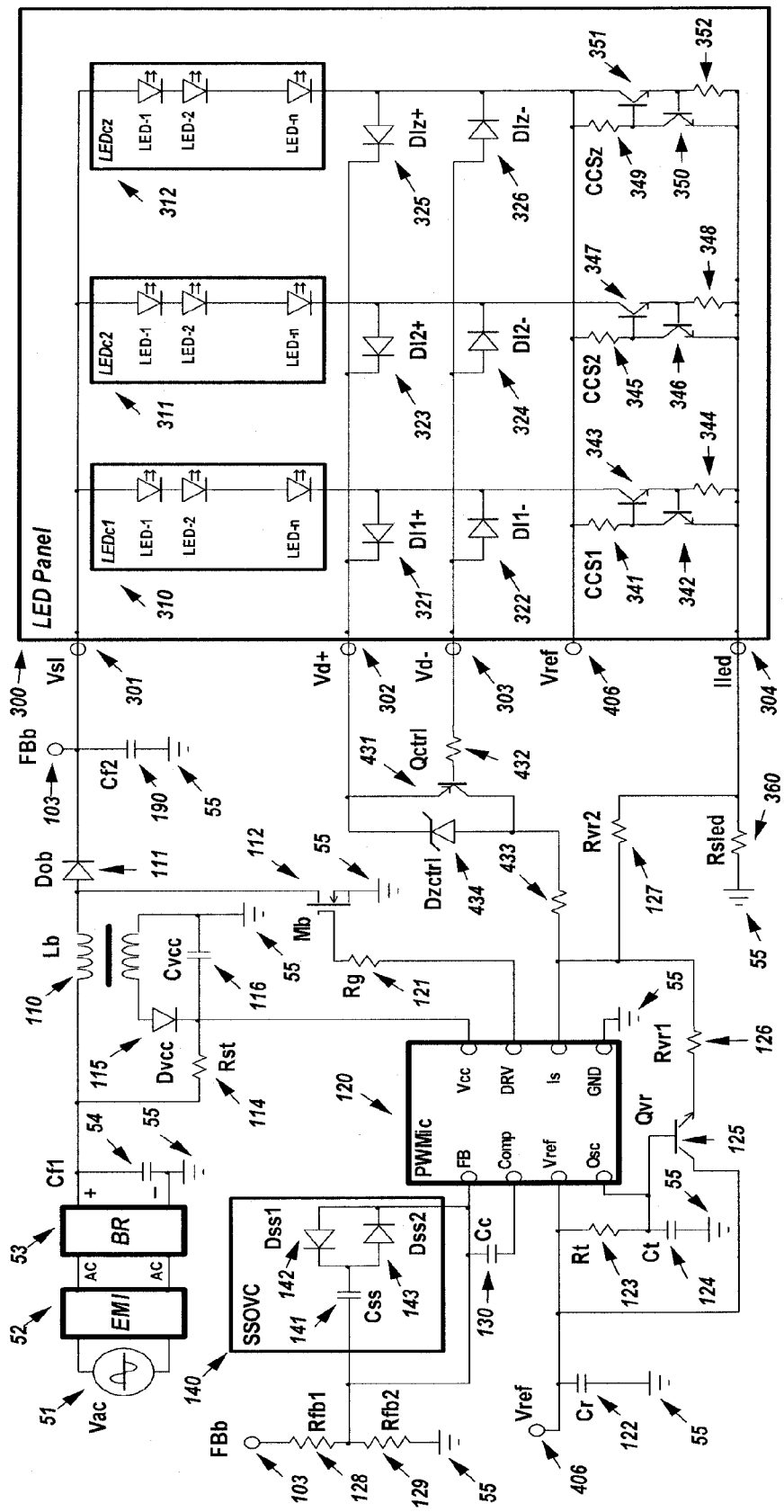
Fig. 9: Single Stage Boost Multi-Columns LED Driver Embodiment

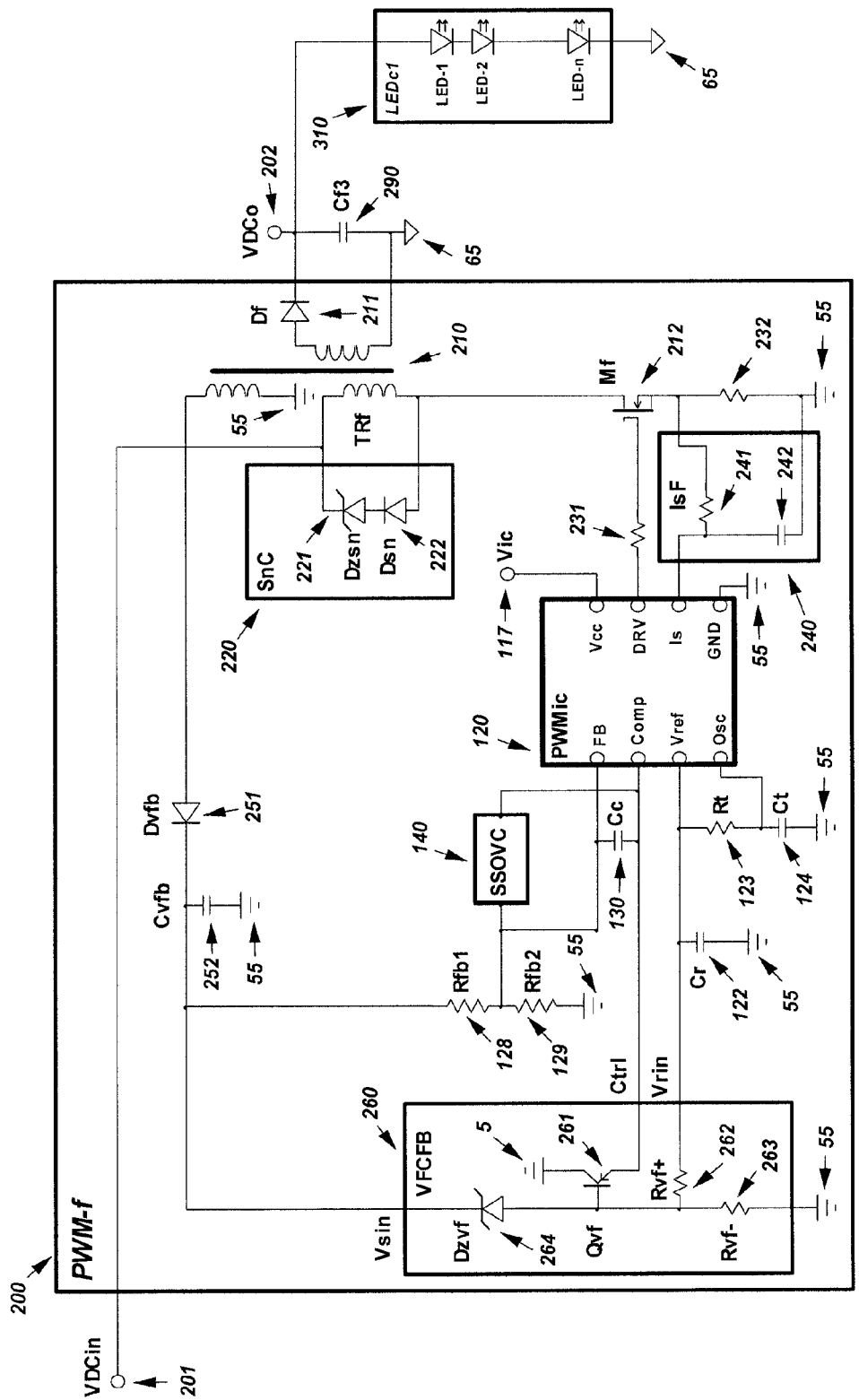
Fig. 10: No Opto-Coupler Isolated Flyback LED Driver Embodiment

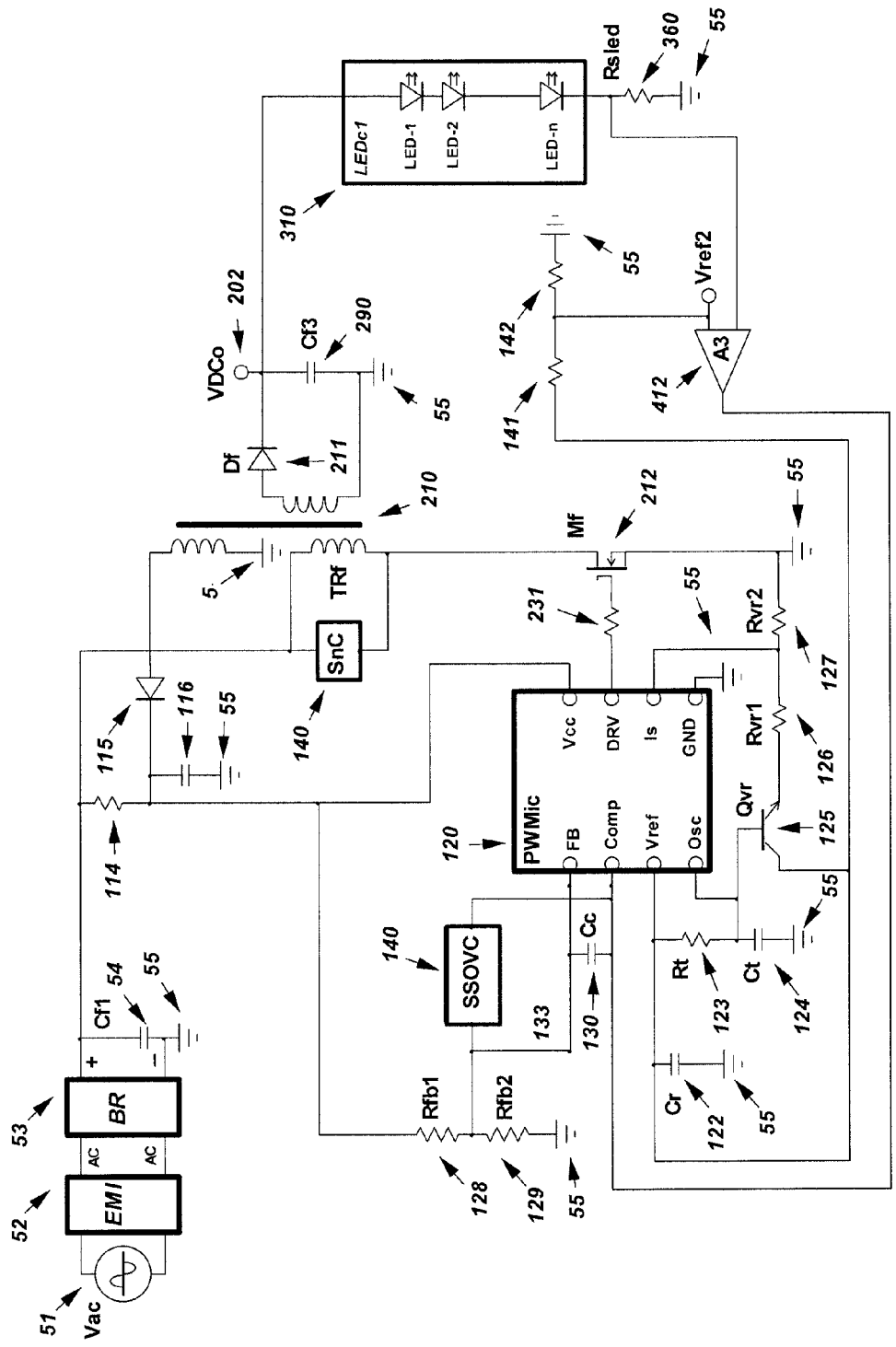
Fig. 11: Single Stage Single Ground Flyback LED Driver Embodiment

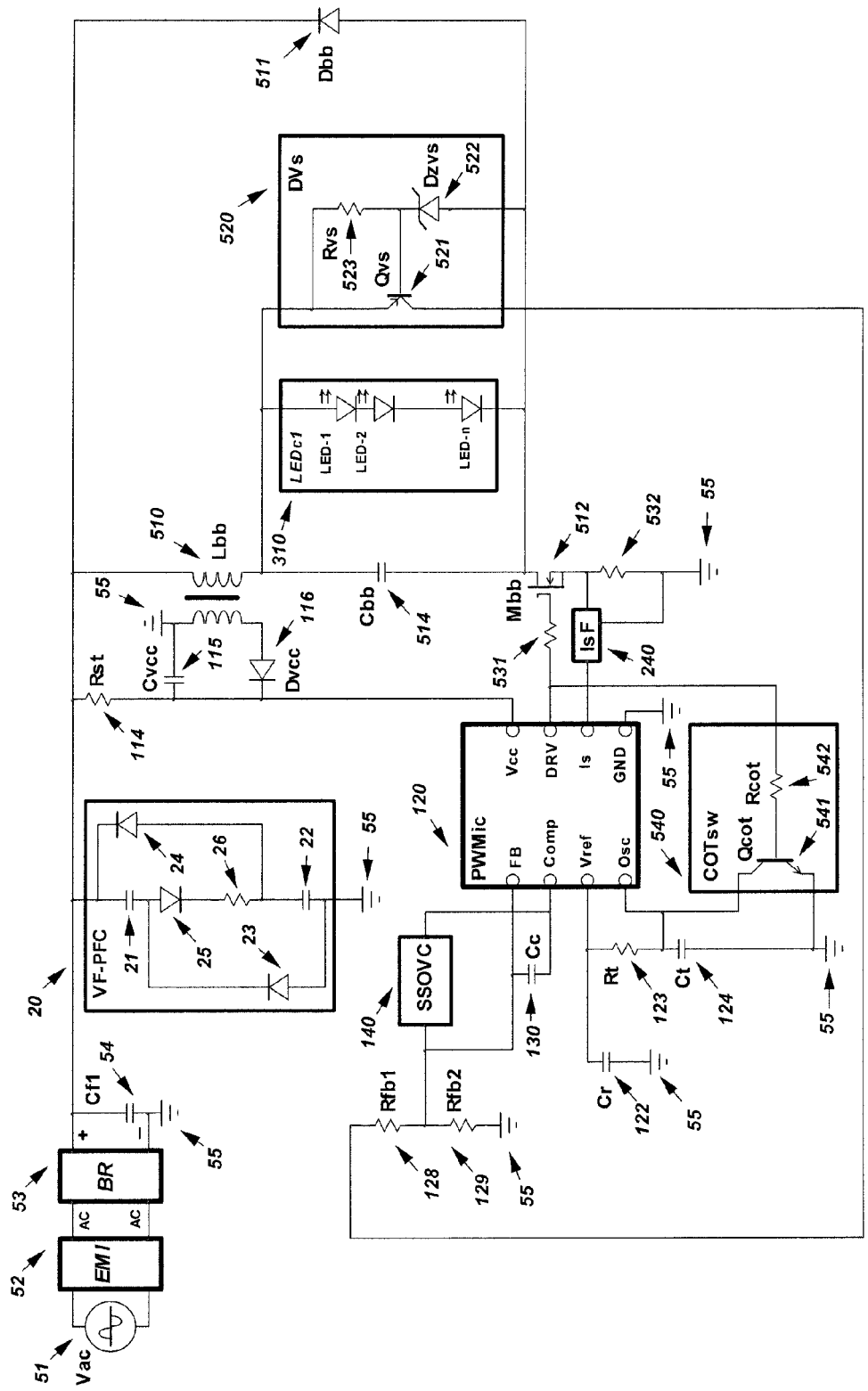
Fig. 12: Single Stage Constant Off Time Buck LED Driver Embodiment

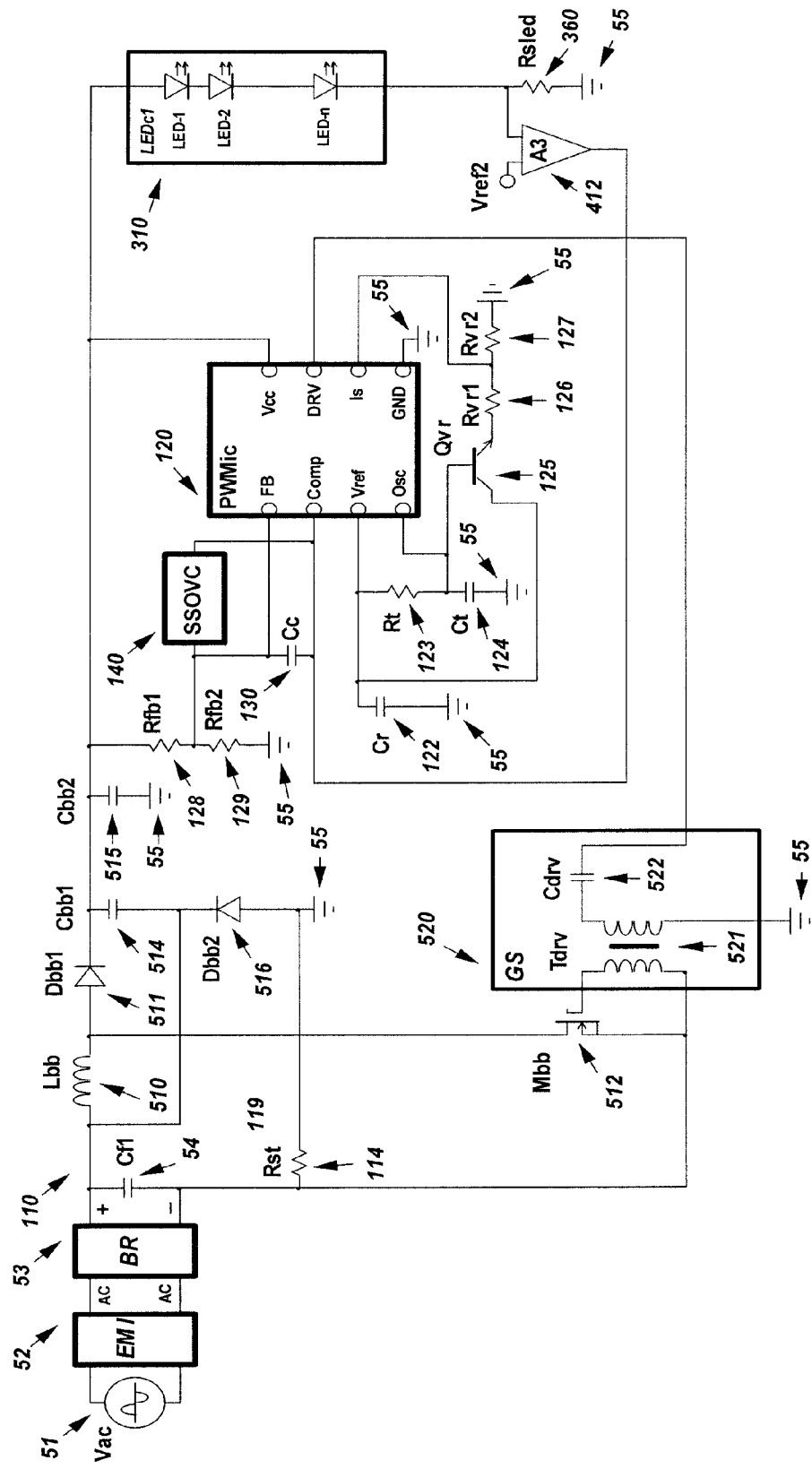
Fig. 13: Single Stage Single Ground Self-Supply Buck-Boost LED Driver Embodiment

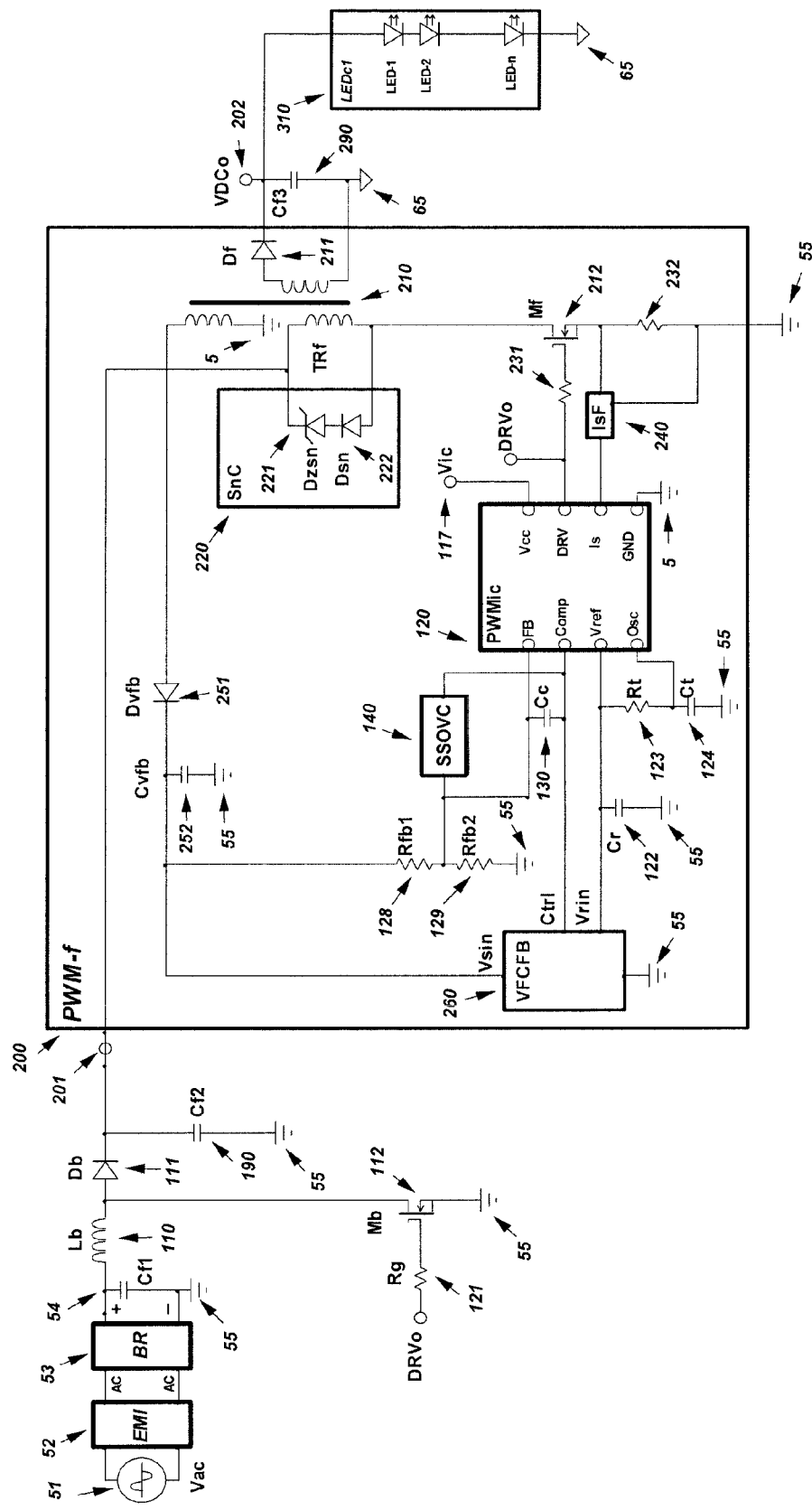
Fig. 14: Pseudo Double Stage Boost-Isolated Flyback LED Driver Embodiment

Fig. 15: Pseudo Double Stage Boost - Non Isolated Flyback LED Driver Embodiment
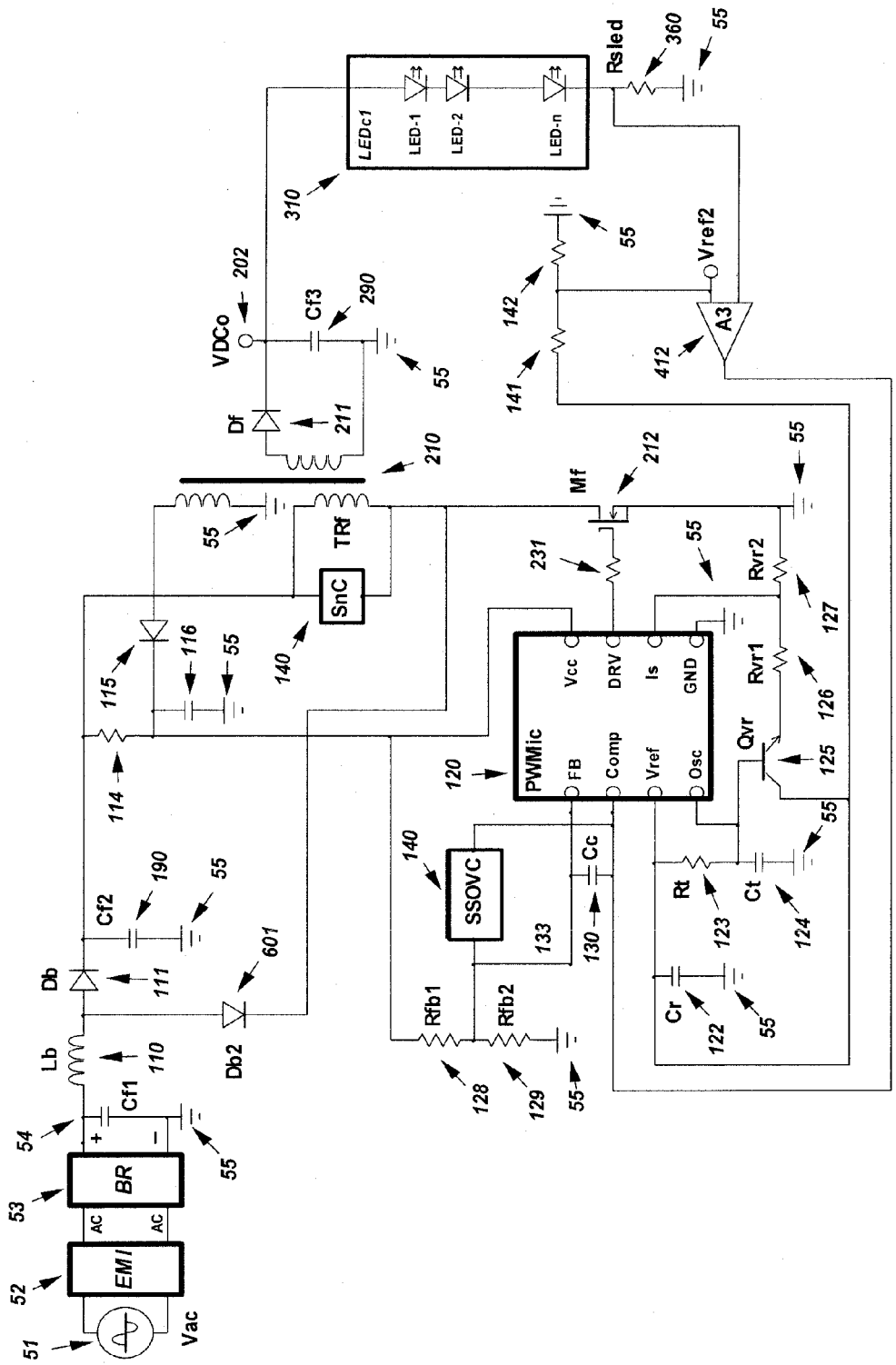

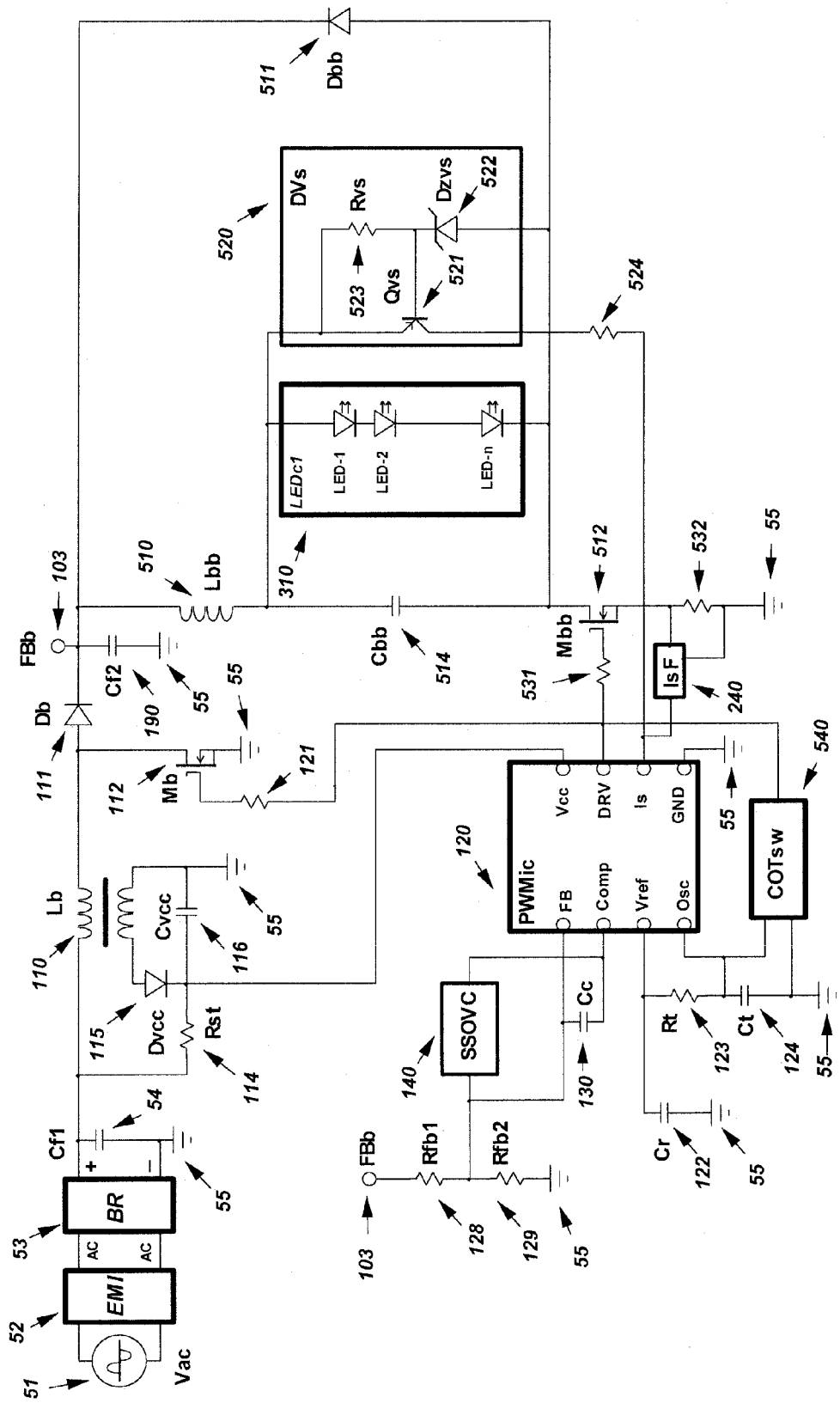
Fig. 16: Pseudo Double Stage Boost – COT Buck-Boost LED Driver Embodiment

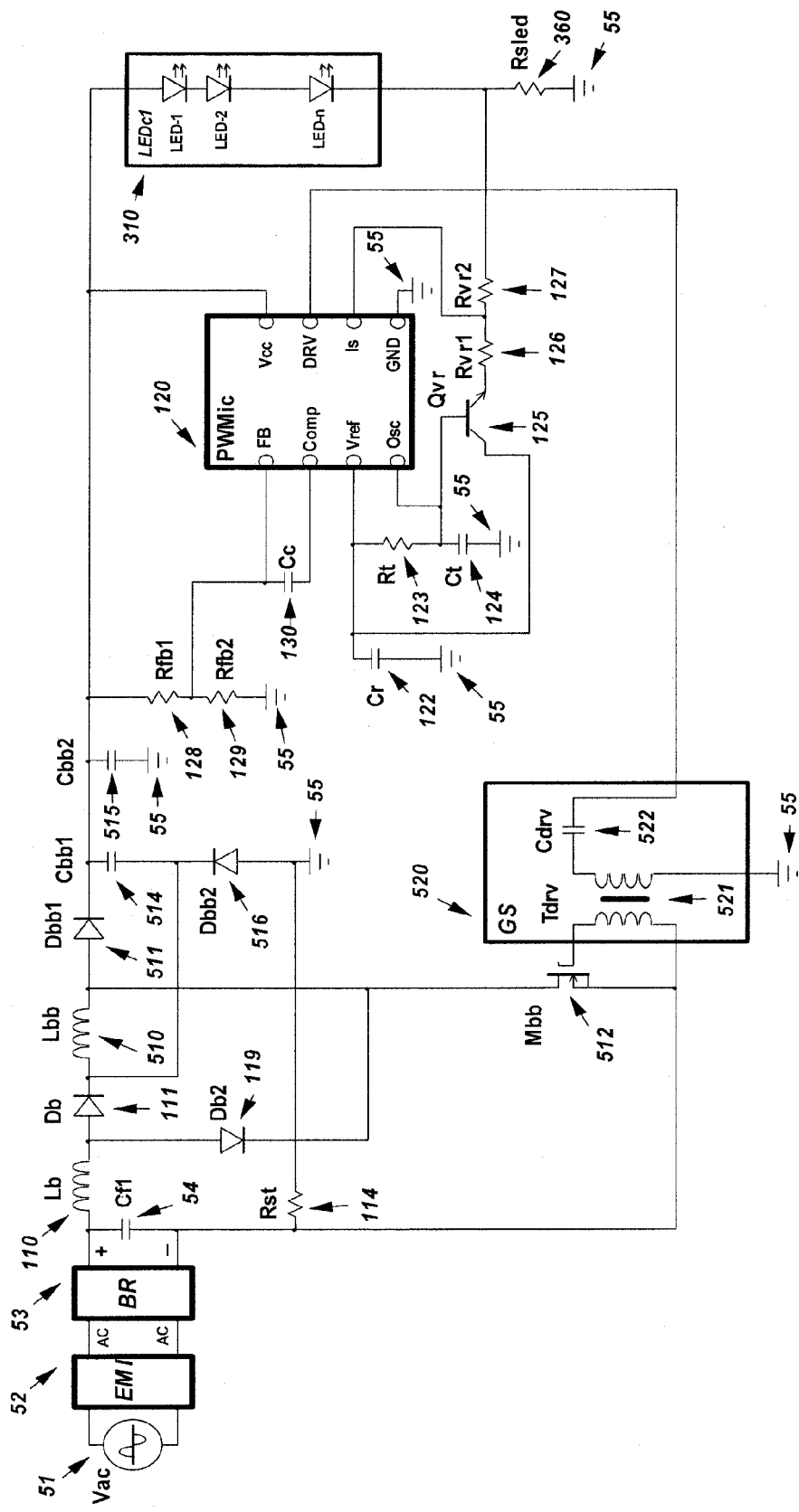
Fig. 17: Pseudo Double Stage Boost – SG Buck-Boost LED Driver Embodiment

Fig. 18: Monolithic LED Driver – The Series Circuit Method Embodiment
a) *Block Schematic Diagram*
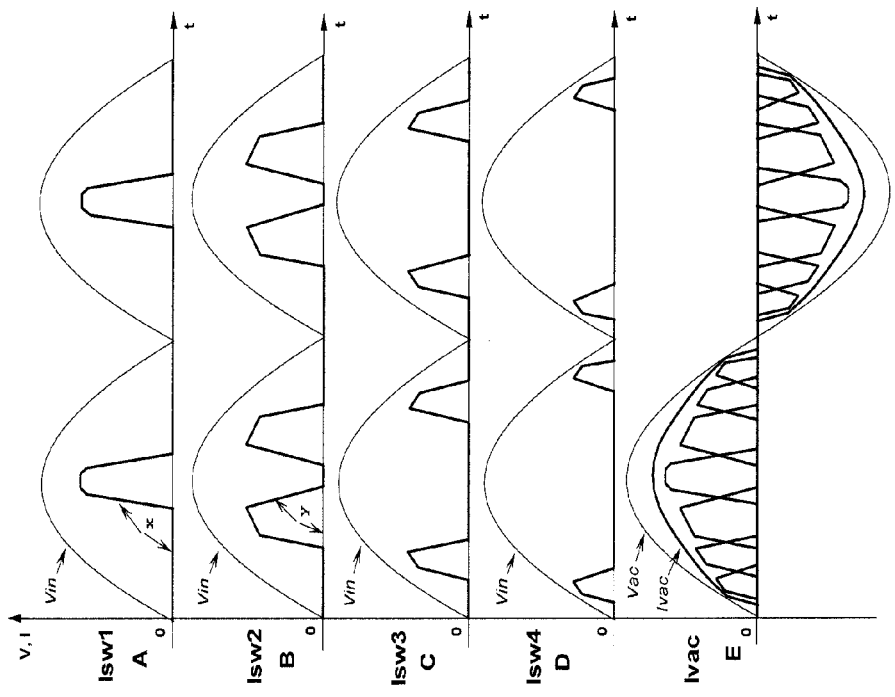
b) *Current/Voltage Graphs*
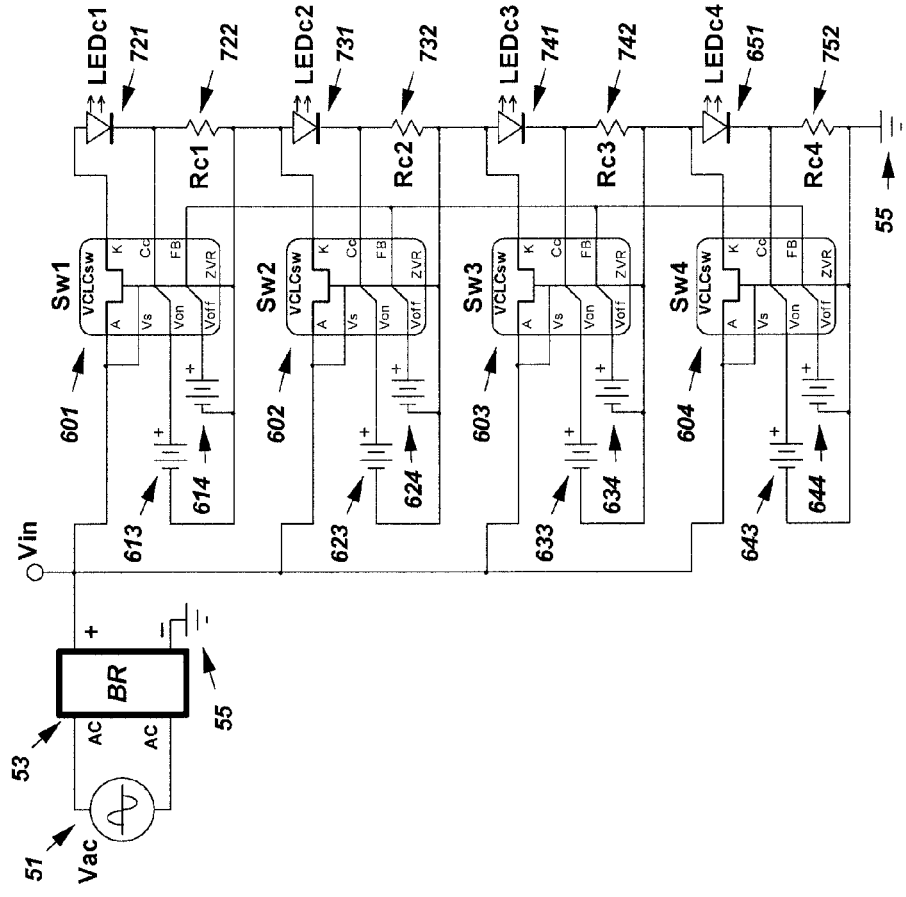

Fig. 19: Monolithic LED Driver – The Parallel Circuit Method Embodiment
a) *Block Schematic Diagram*
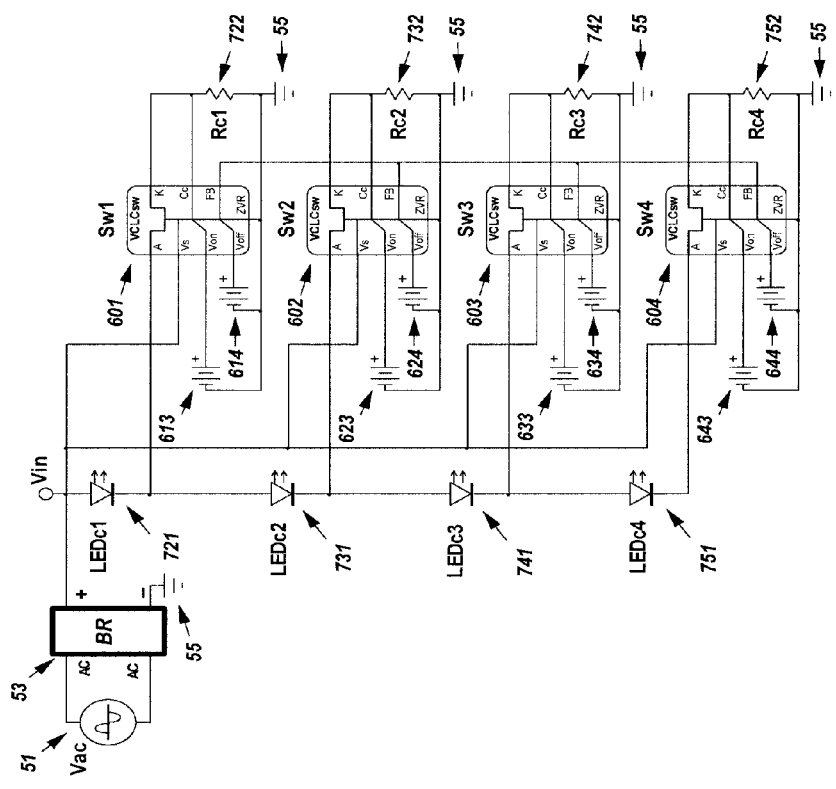
b) *Current/Voltage Graphs*
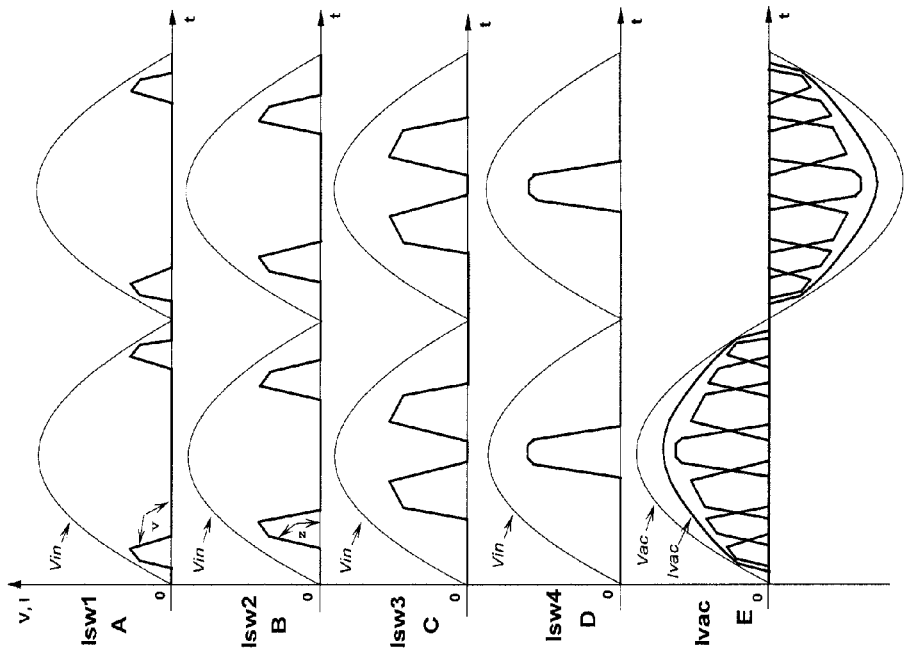

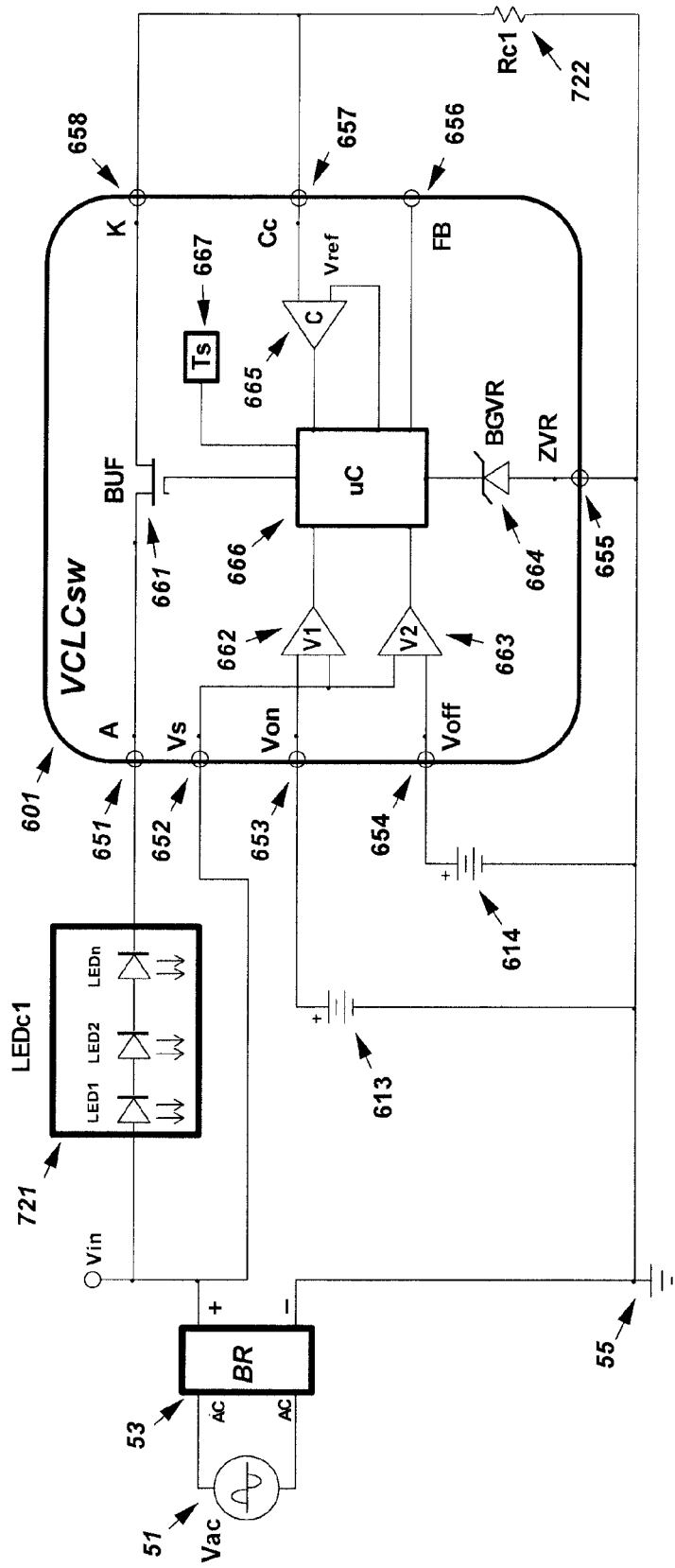
Fig. 20: Single Cell Anode Loaded VCLC Switch LED Driver Circuit Embodiment

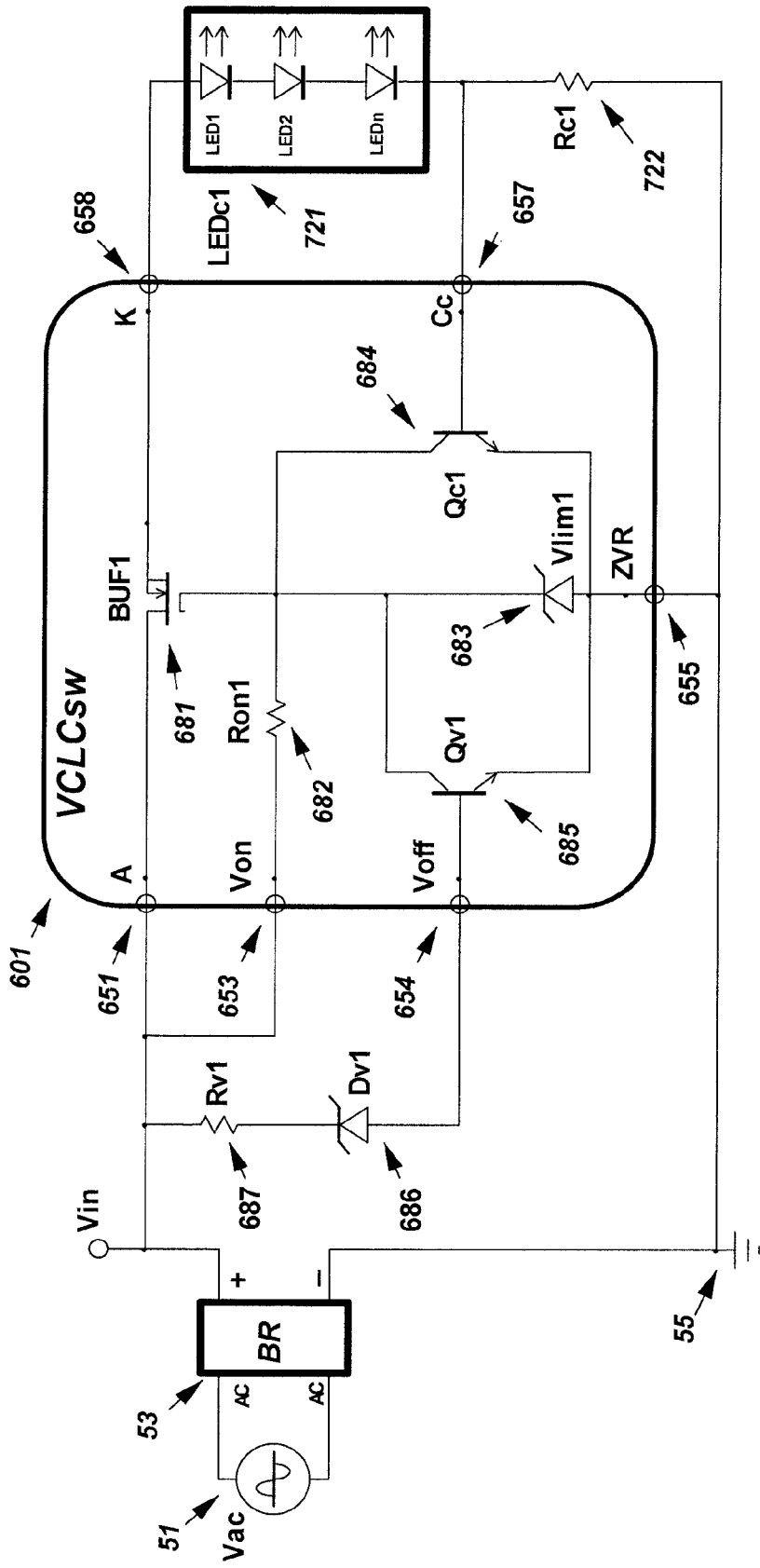
Fig. 21: Single Cell Cathode Loaded VCLC Switch LED Driver Circuit Embodiment

Fig. 22: Monolithic LED Driver – Overall Feedback Series Circuit Method Embodiment
a) Simplified Schematic Diagram
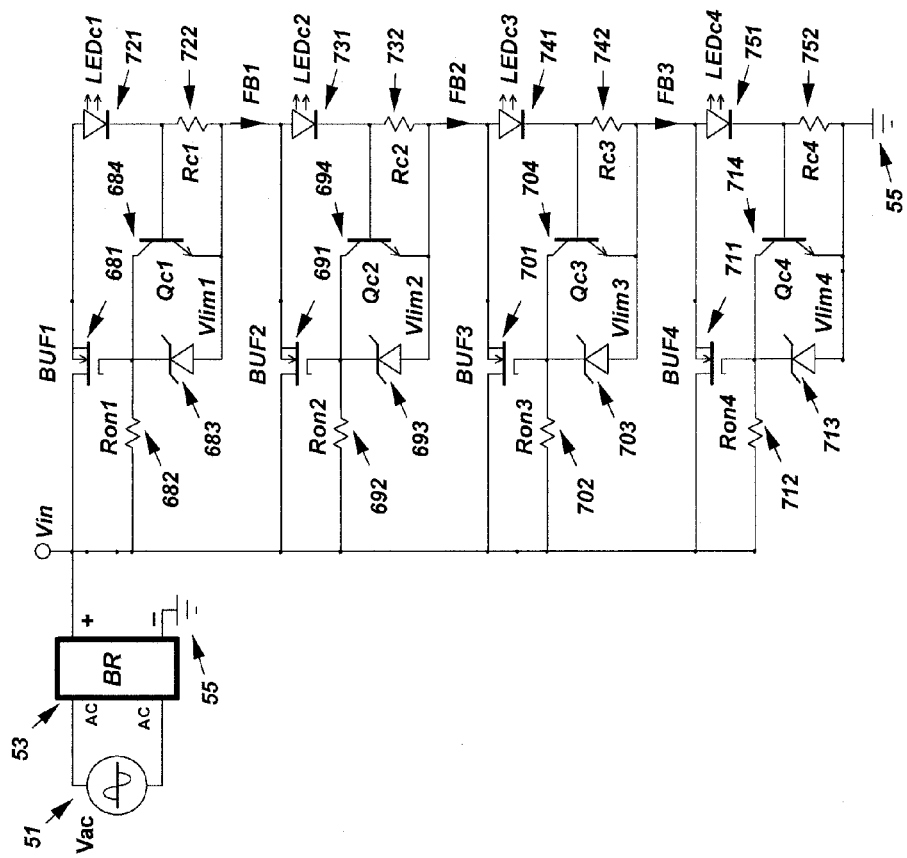
b) Current/Voltage Graphs
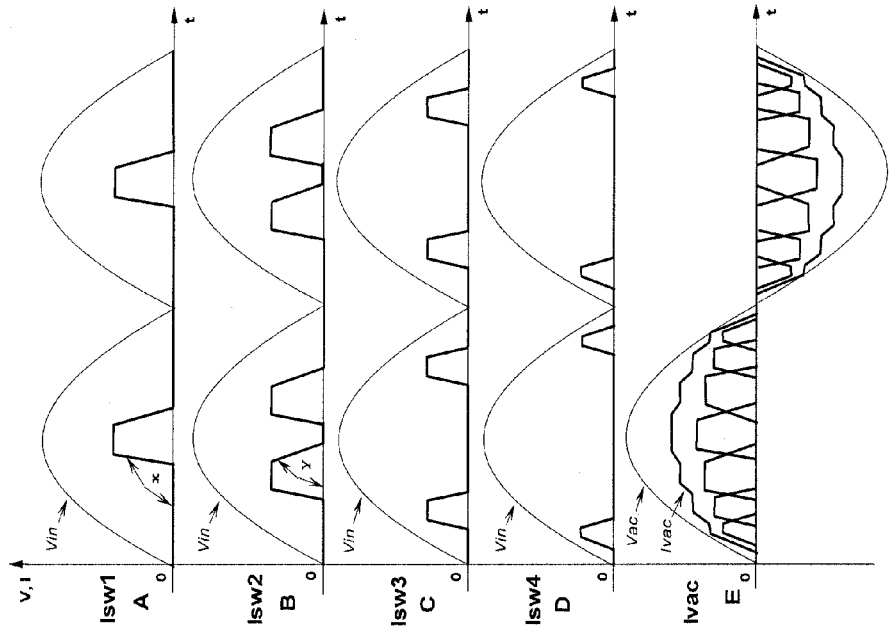

Fig. 23: Monolithic LED Driver – Overall Feedback Parallel Circuit Method Embodiment
*a) Simplified Schematic Diagram*
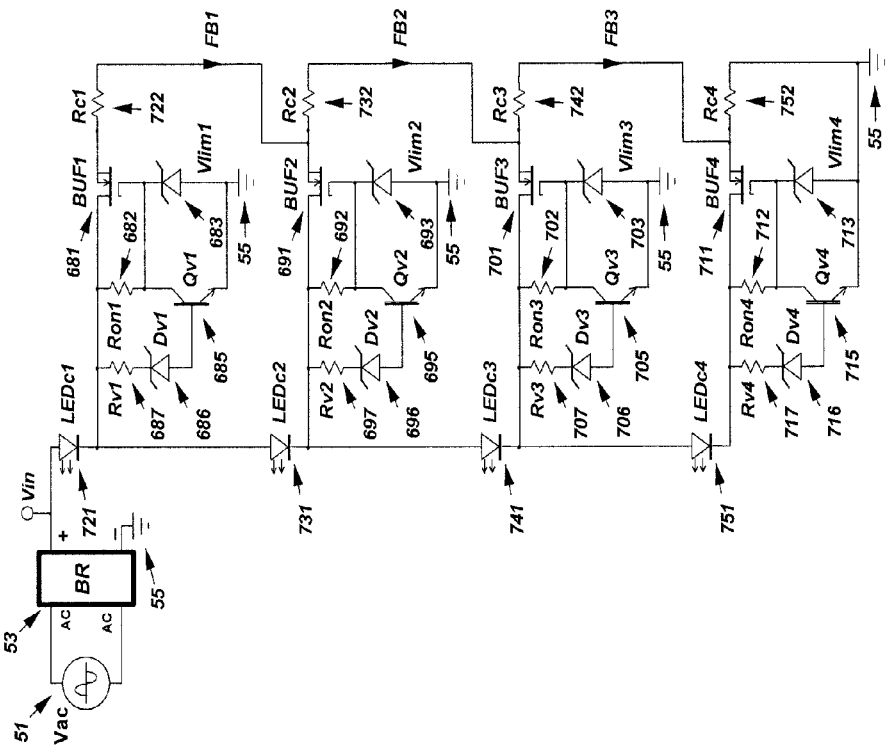
*b) Current/Voltage Graphs*
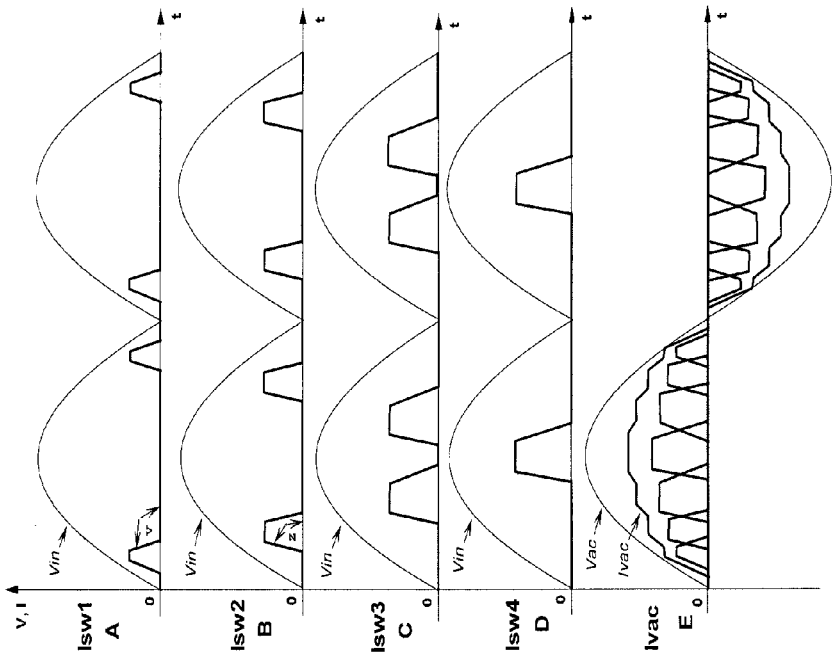

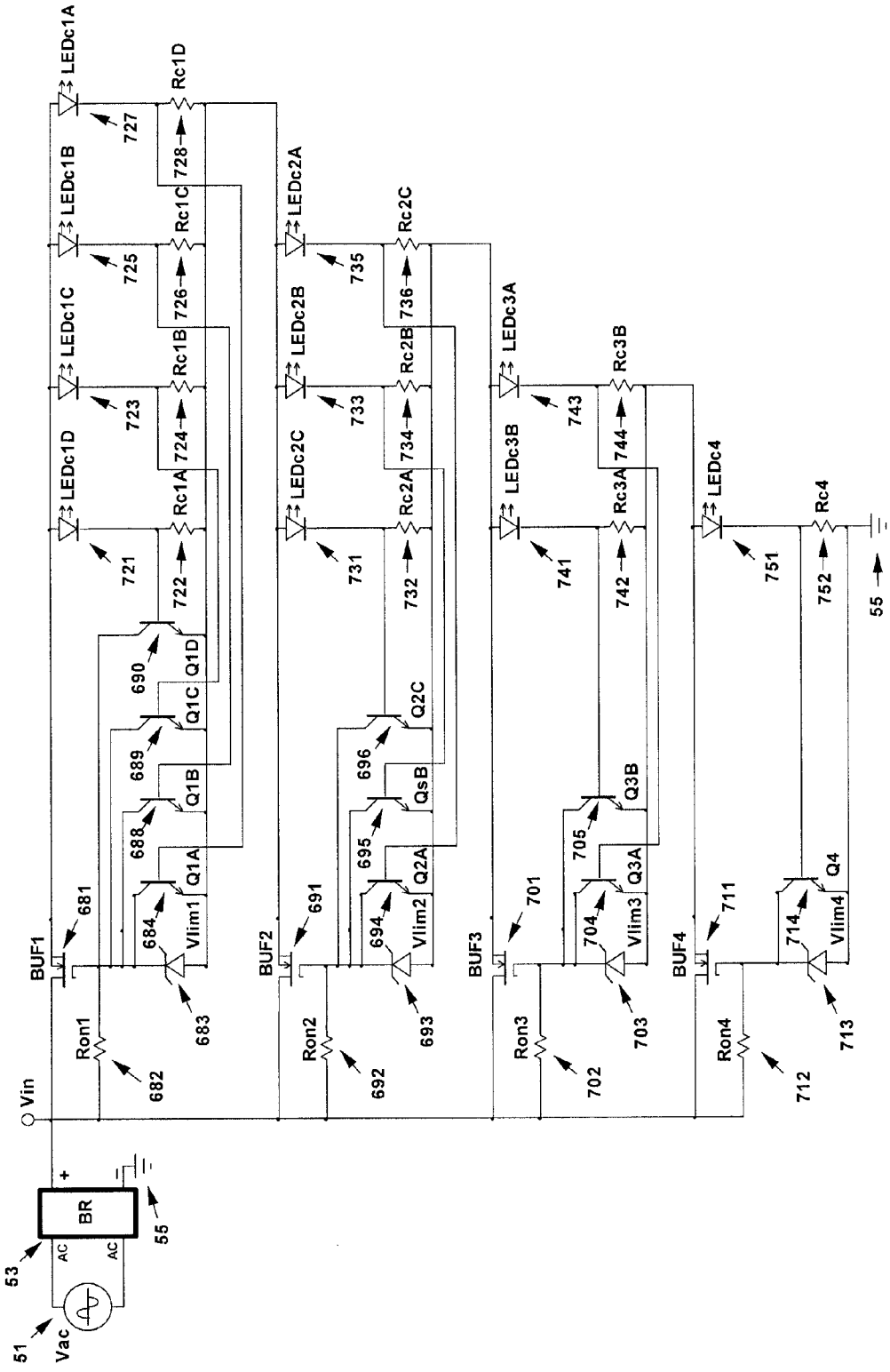
Fig. 24: Monolithic Multi Strips LED Driver – Series Circuit Embodiment

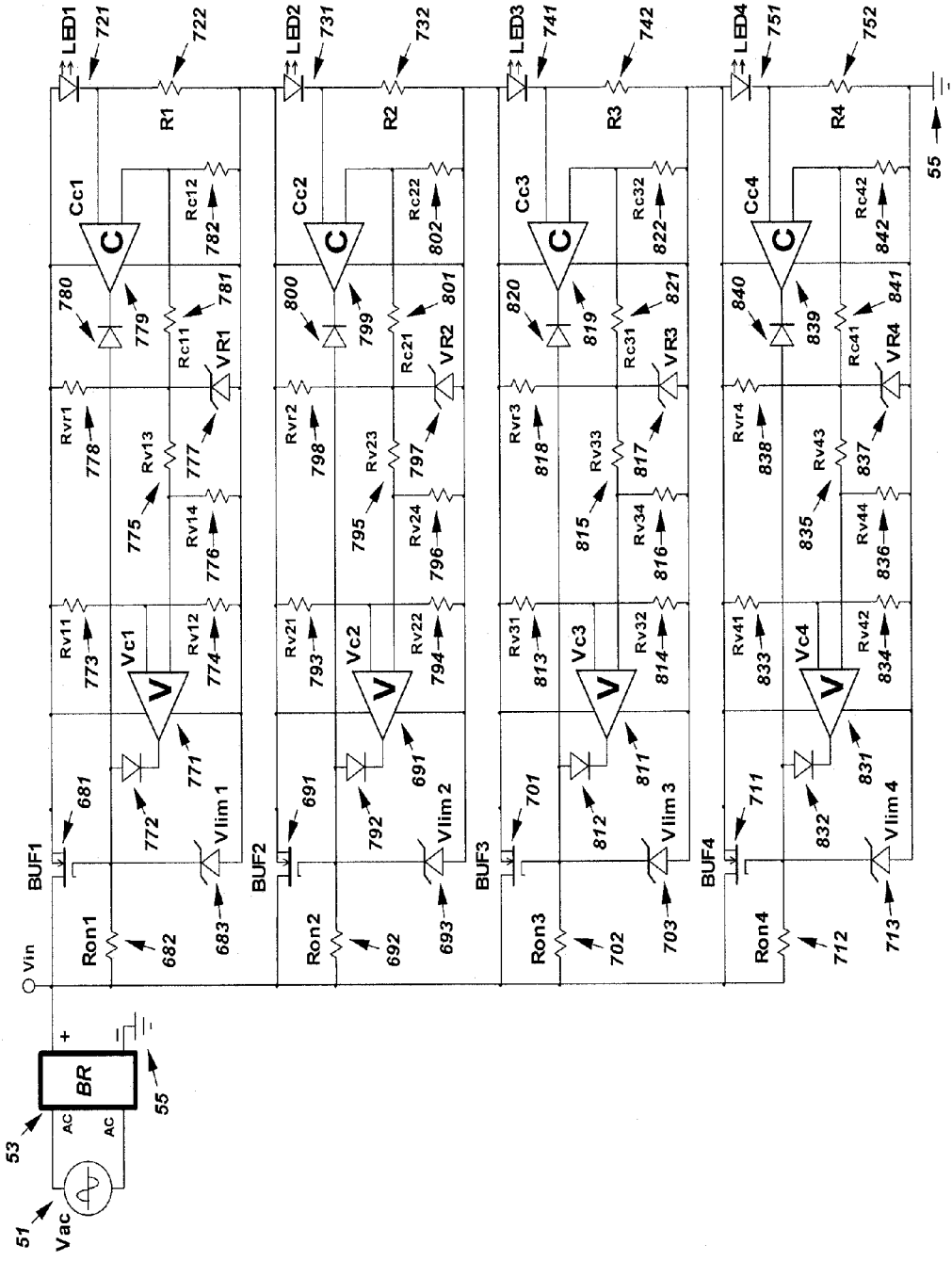
Fig. 25: Monolithic LED Driver – High Reliability Series Circuit Embodiment

Fig. 26: Monolithic LED Driver – Minimum Parts Series Circuit Embodiment
a) Schematic Diagram
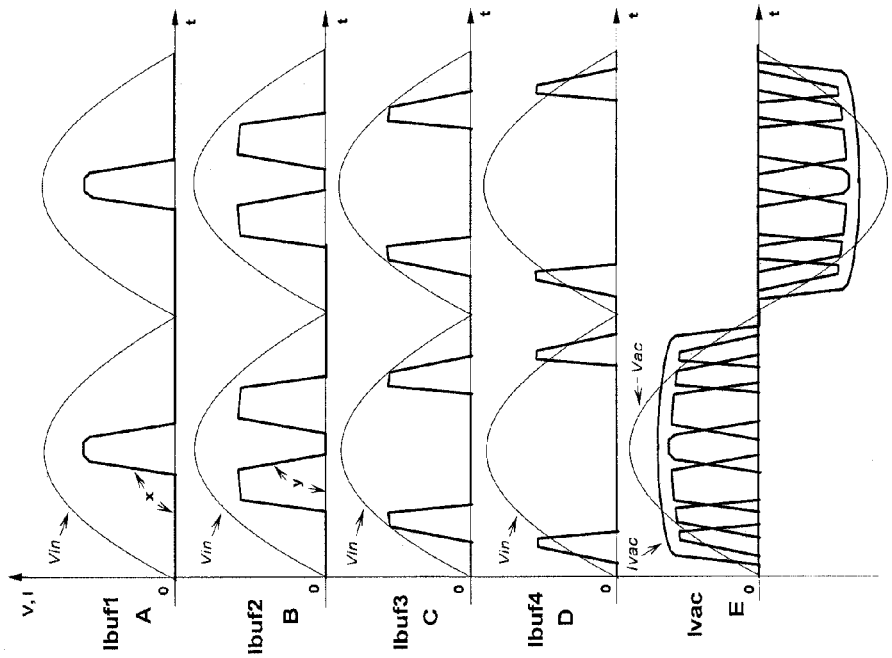
b) Current/Voltage Graphs
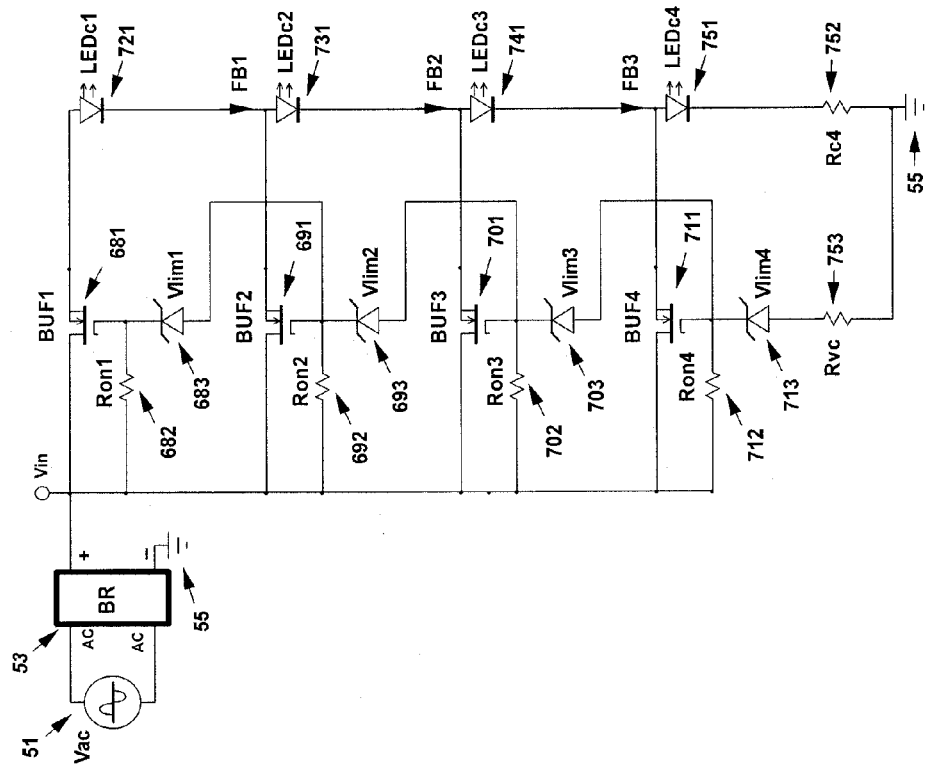

Fig. 27: Monolithic LED Driver – Minimum Parts Parallel Circuit Embodiment
*a) Schematic Diagram*
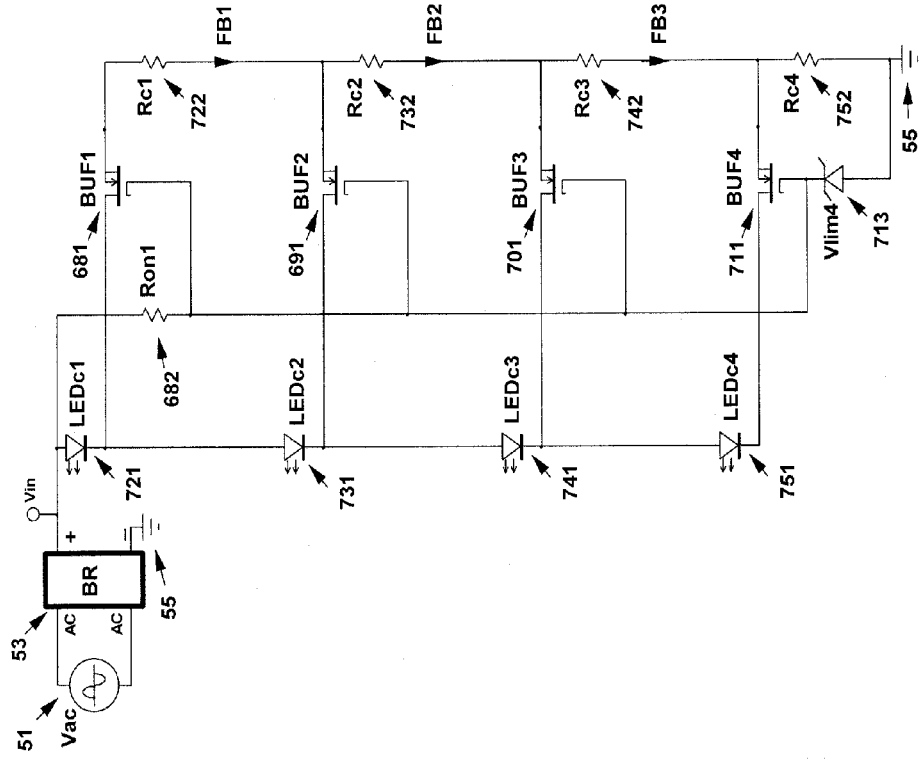
*b) Current/Voltage Graphs*
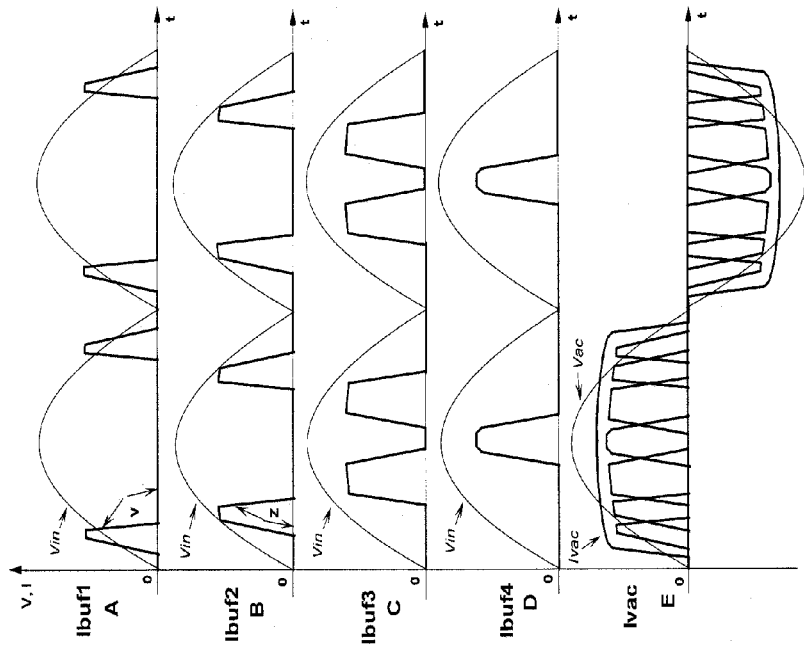

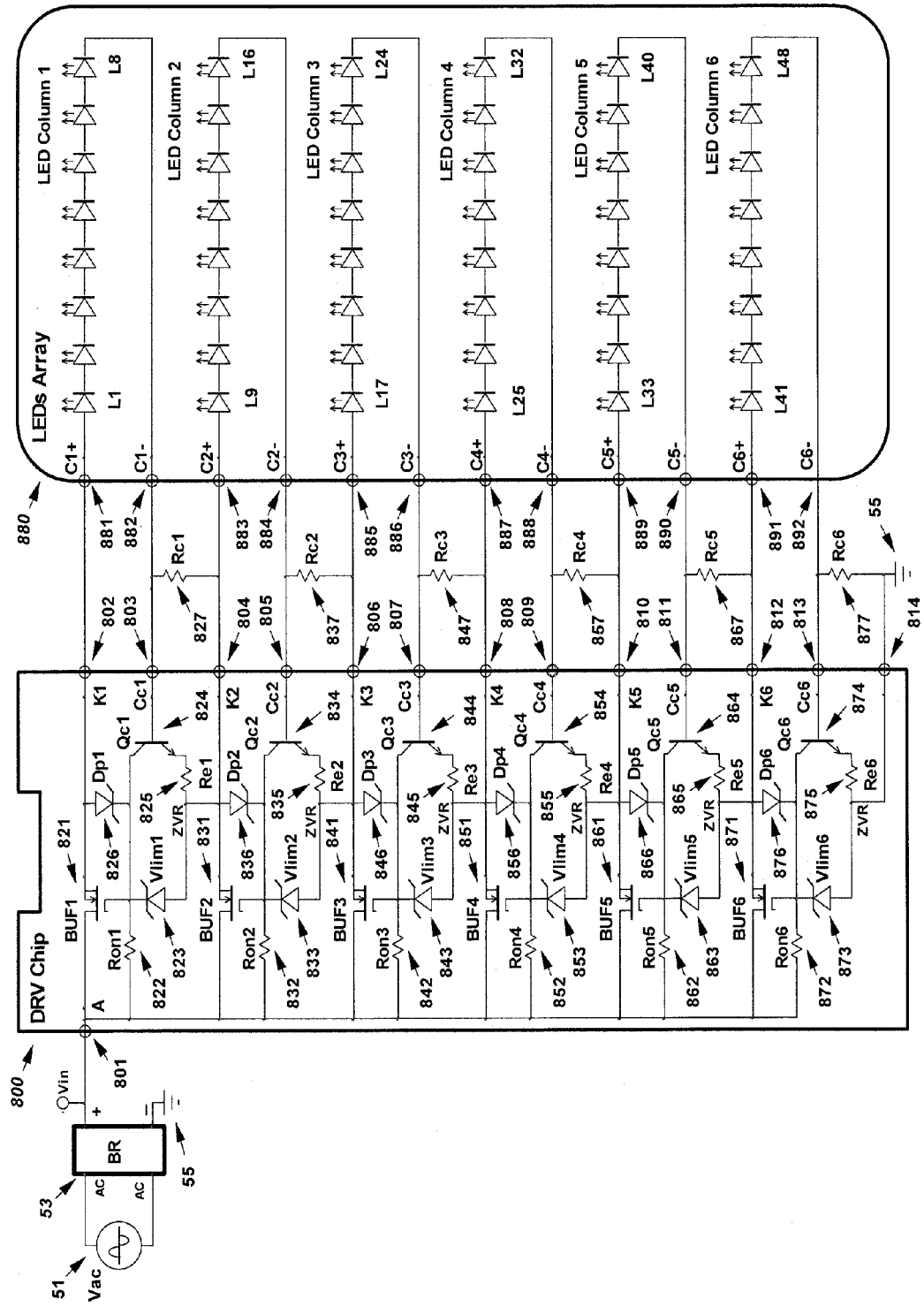
Fig. 28: 120Vac Series Circuit Monolithic LED Driver

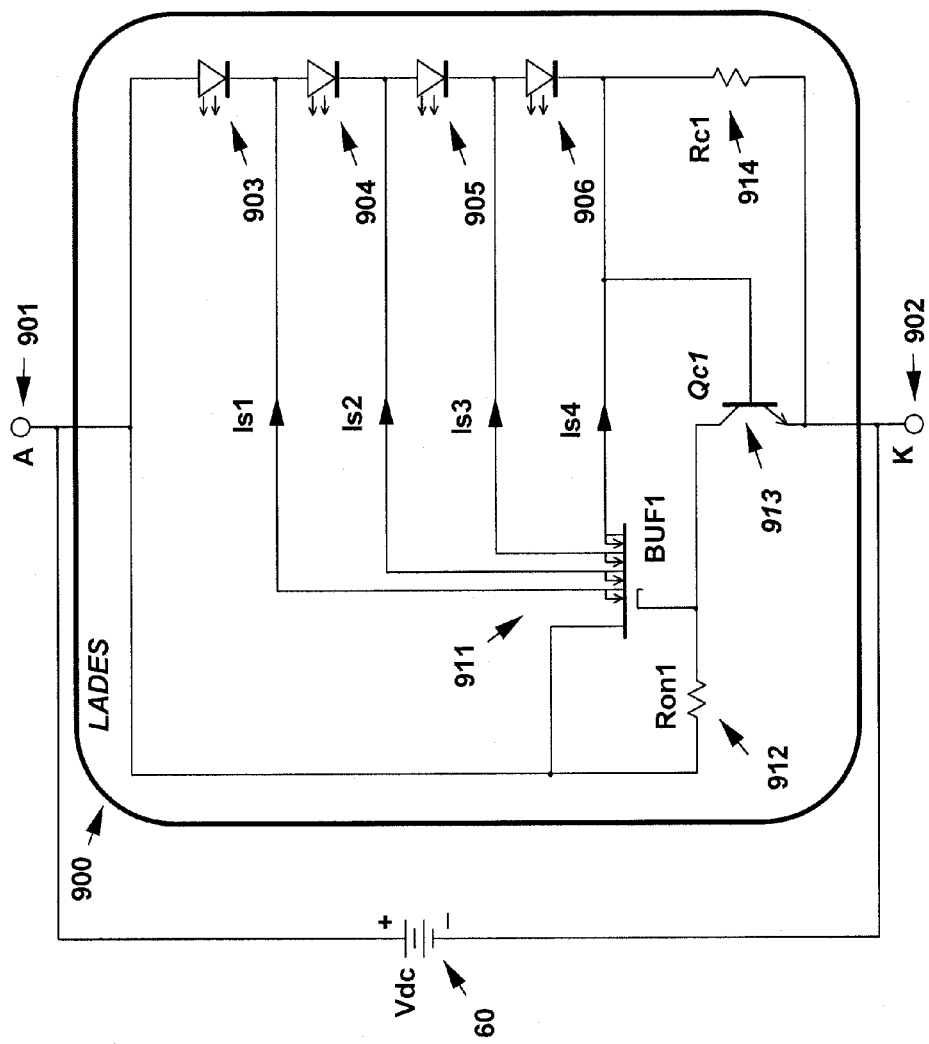
Fig. 29: LED Array & Driver Chip Embedded System – Simplified Series Circuit Embodiment

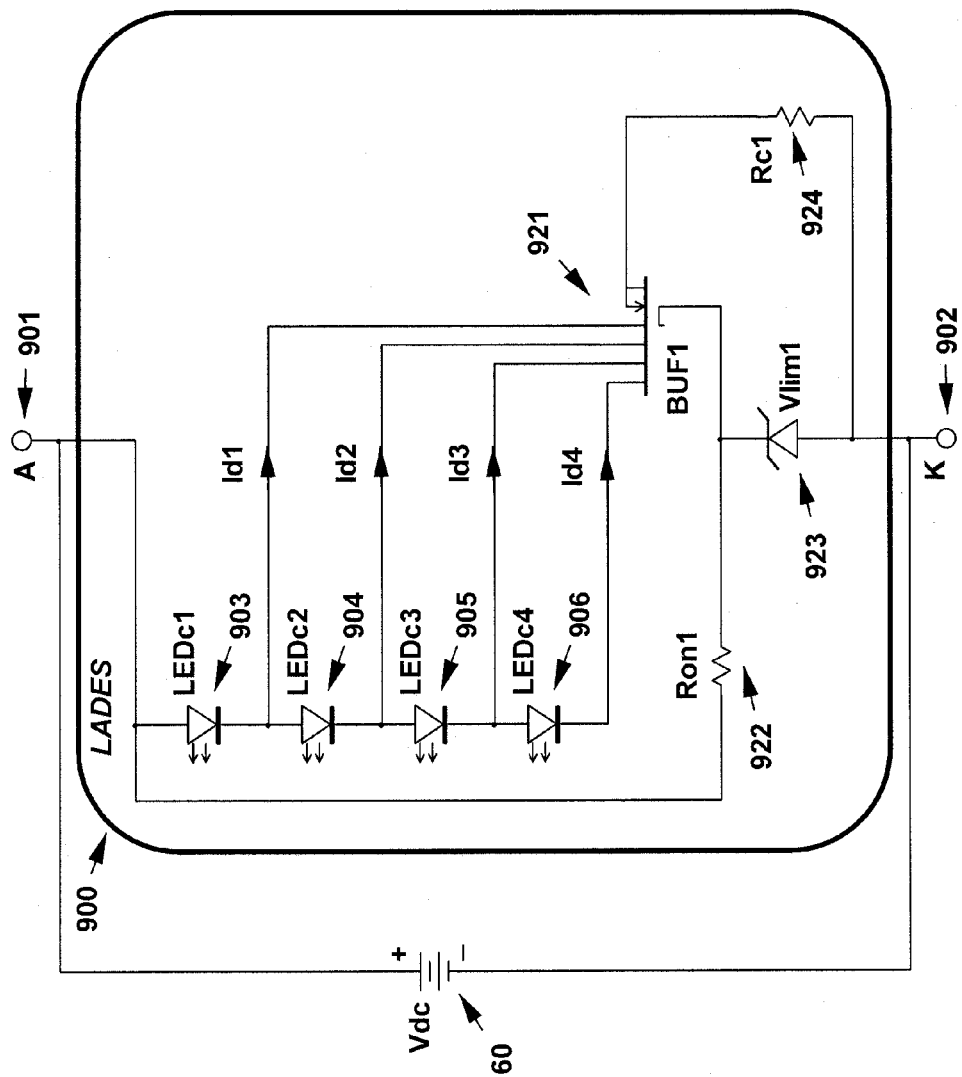
Fig. 30: LED Array & Driver Chip Embedded System – Simplified Parallel Circuit Embodiment

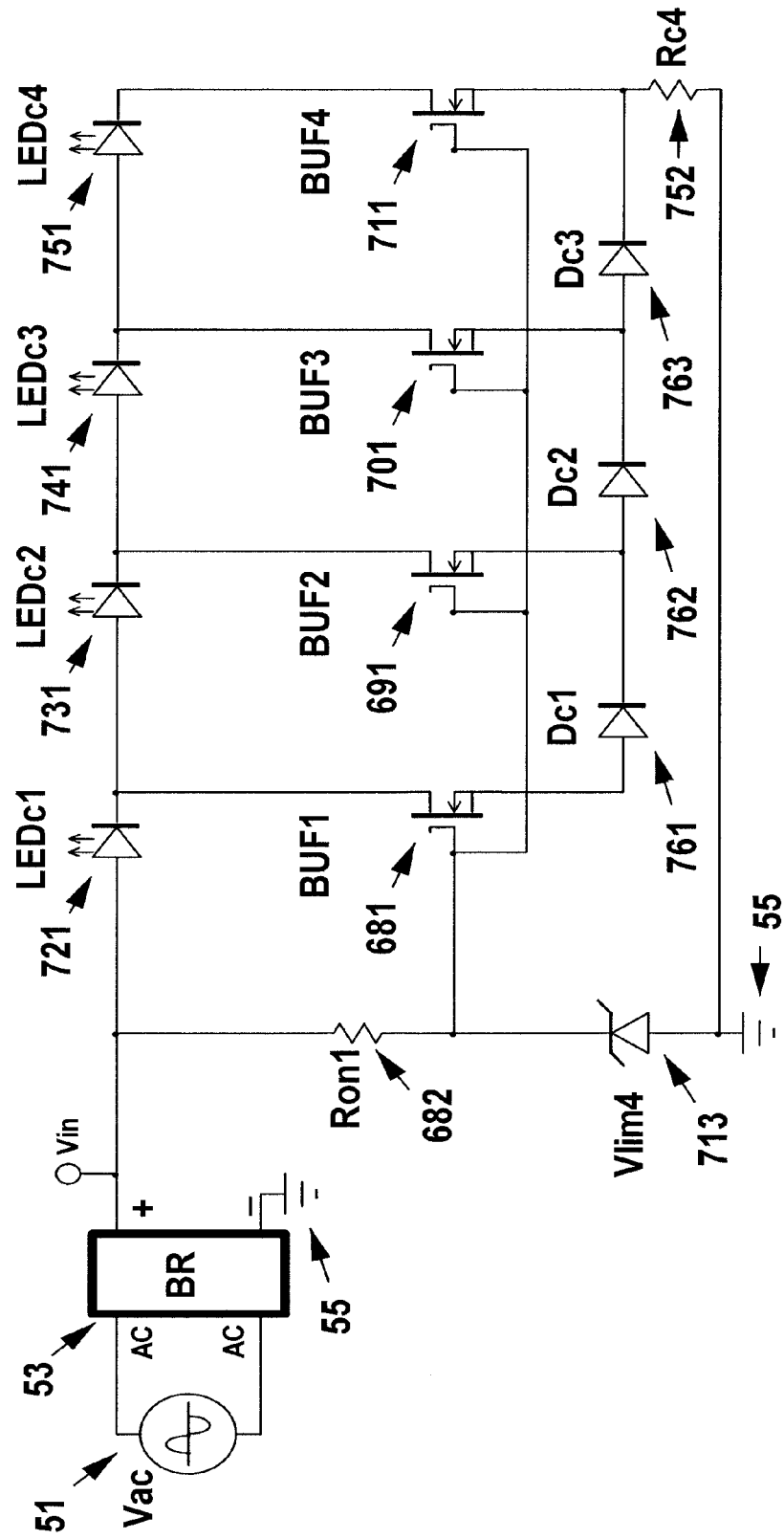
Fig. 31: Monolithic LED Driver – Diodes Source Feedback Parallel Circuit Embodiment

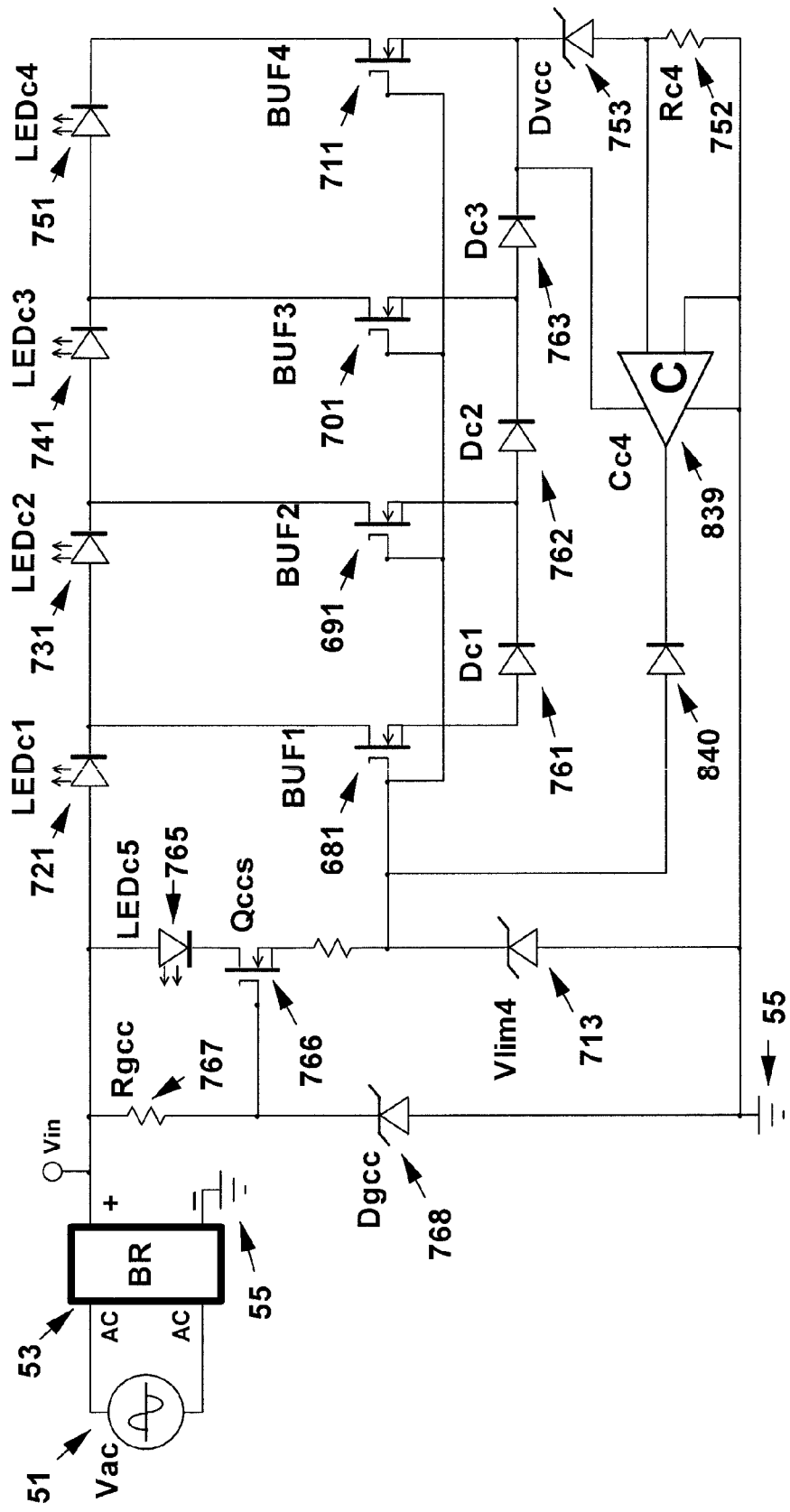
Fig. 32: Monolithic LED Driver – OPAM Current Feedback Parallel Circuit Embodiment

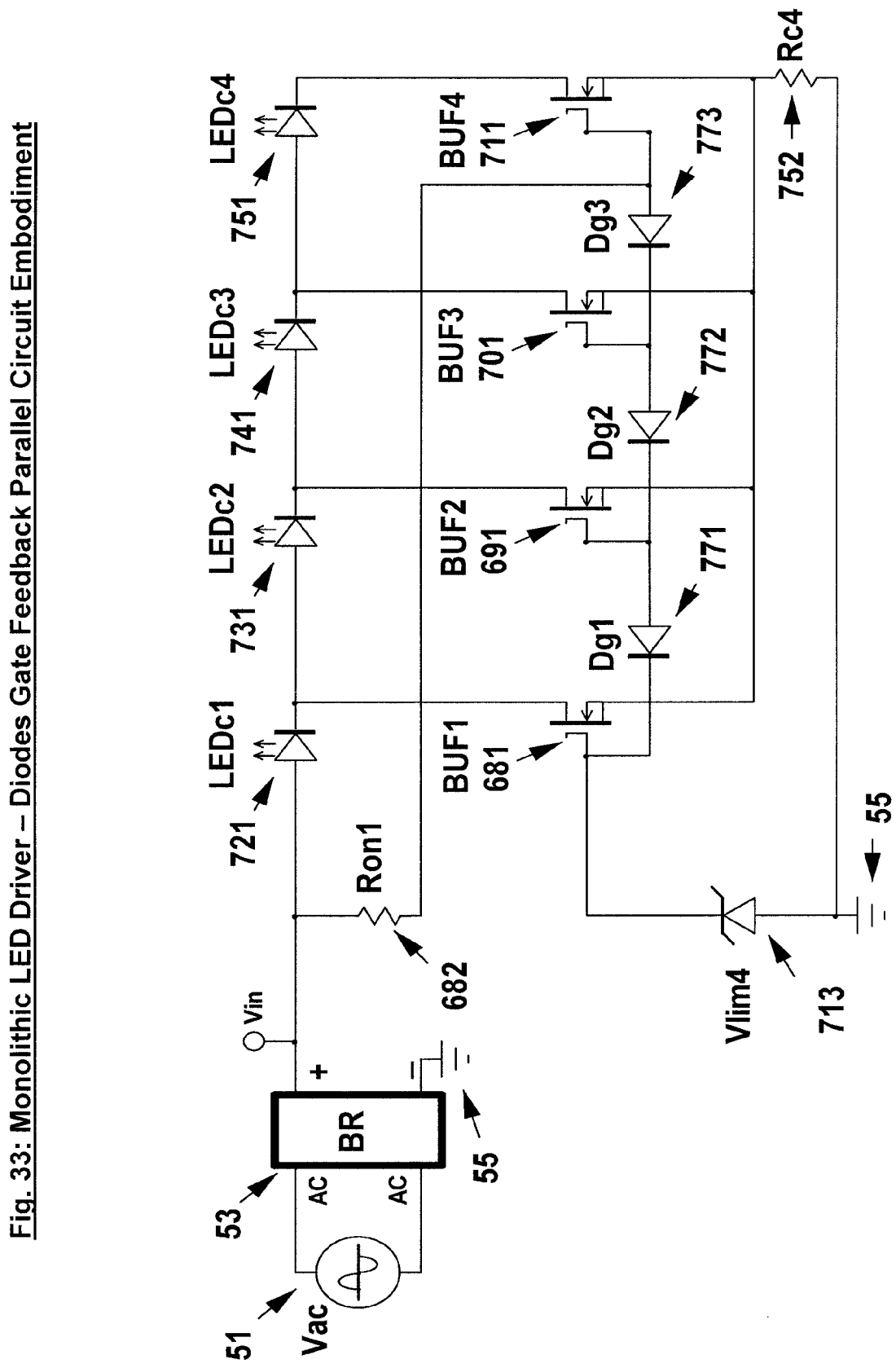
Fig. 33: Monolithic LED Driver – Diodes Gate Feedback Parallel Circuit Embodiment

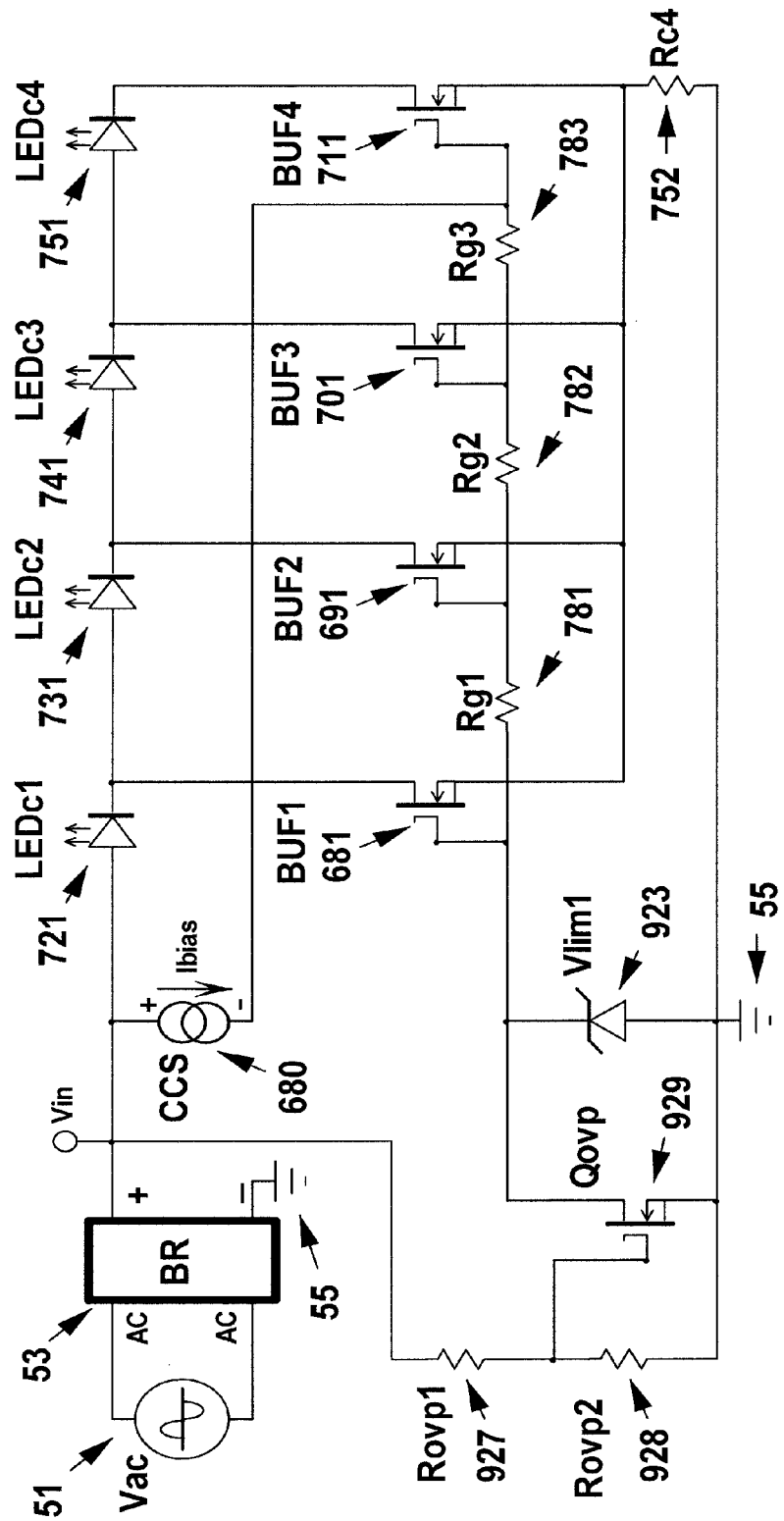
Fig. 34: Monolithic LED Driver – Resistor Gate Feedback Parallel Circuit Embodiment

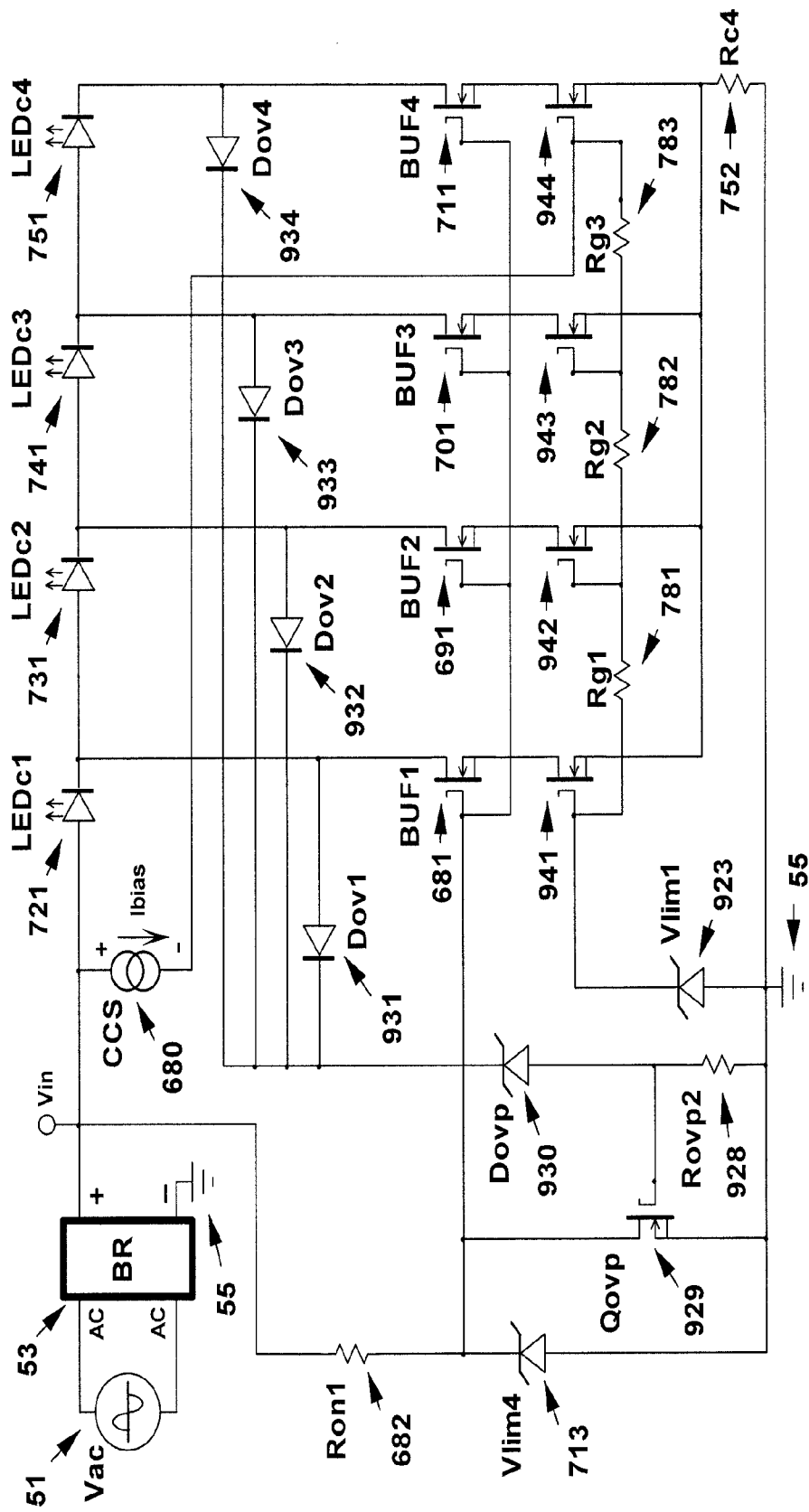
Fig. 35: Monolithic LED Driver – Totem Pole Gate Feedback Parallel Circuit Embodiment

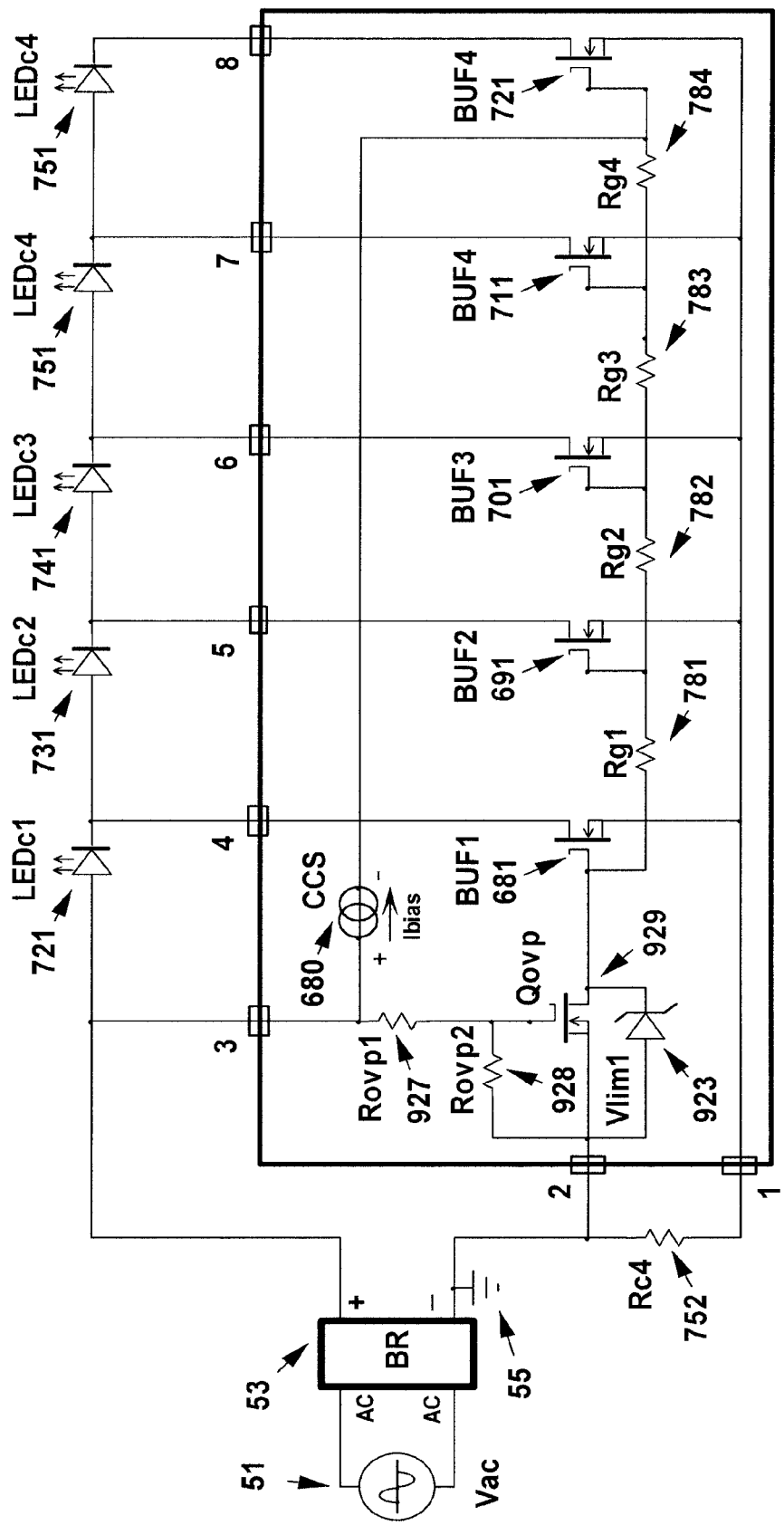
Fig. 36: Monolithic LED Driver – 8 PIN DC Chip Embodiment

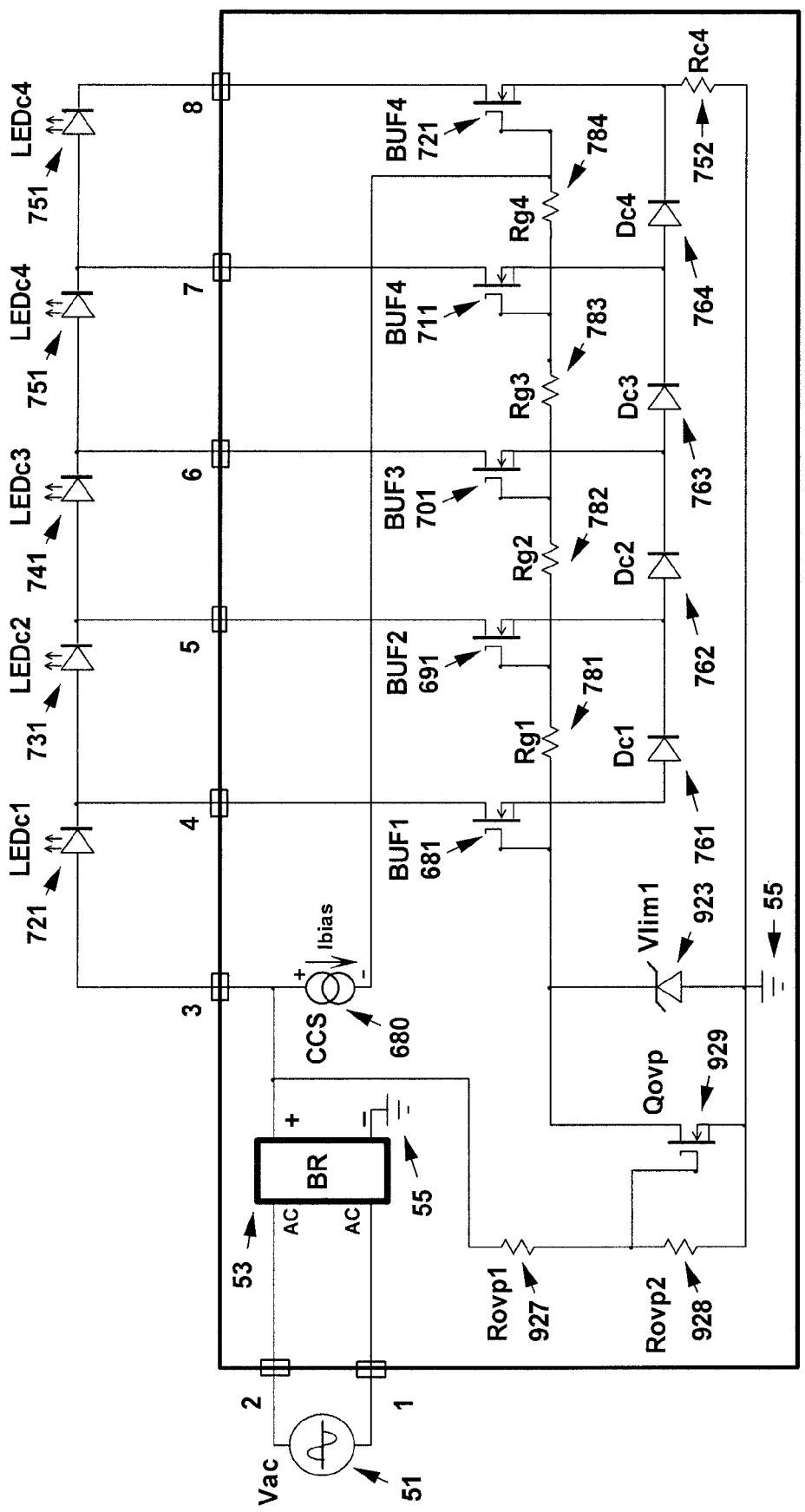
Fig. 37: Monolithic LED Driver – 8 PIN AC Chip Embodiment

THE BLOCK SCHEMATIC DIAGRAM FOR THE CLASSIC BENISTOR

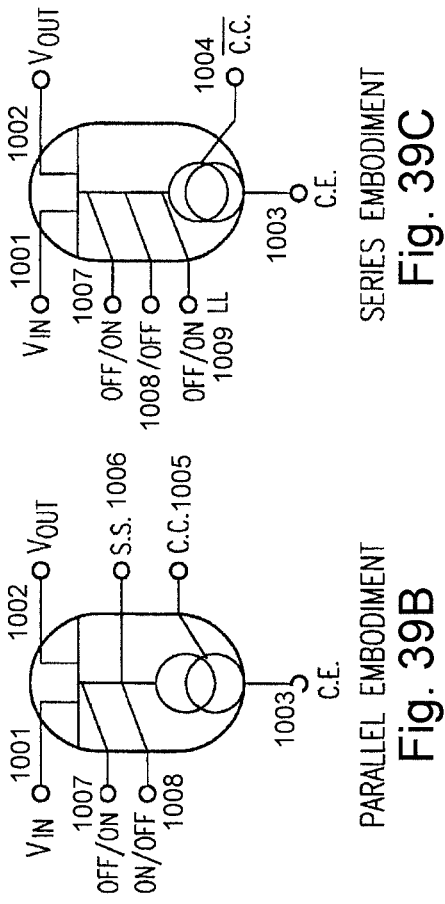
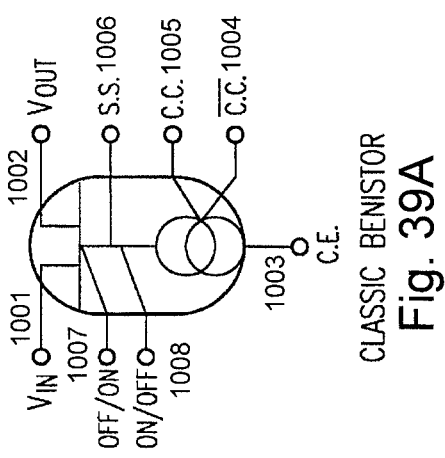
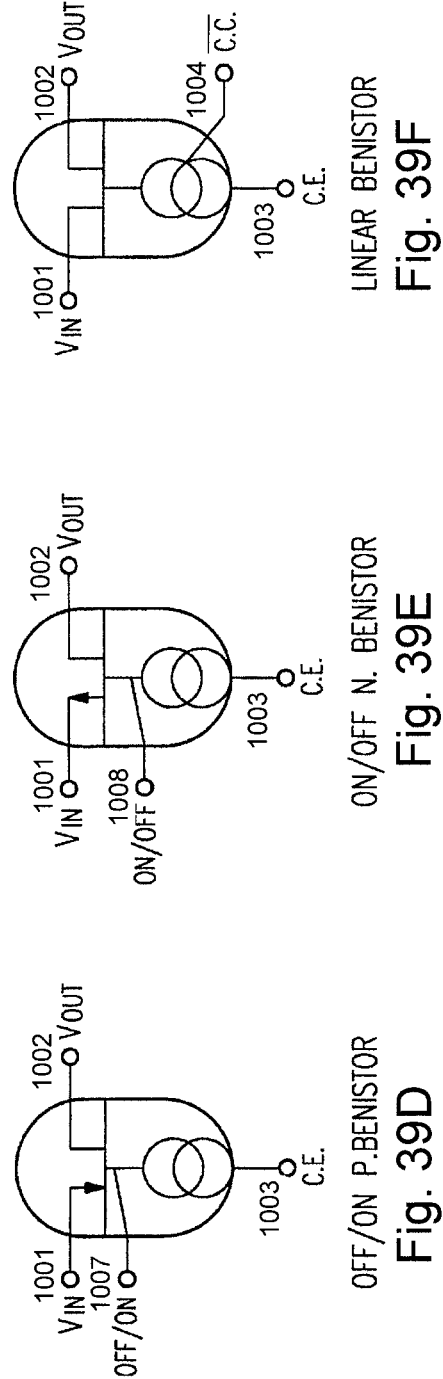

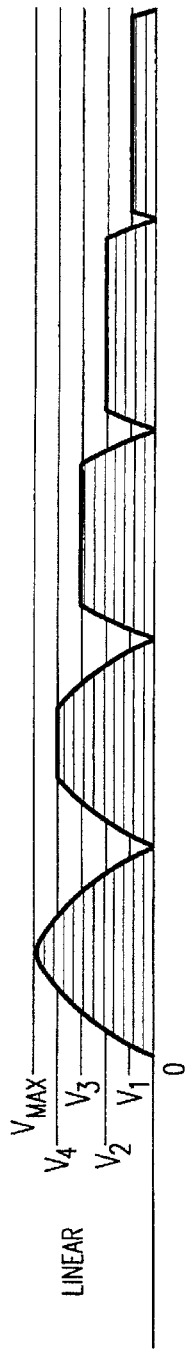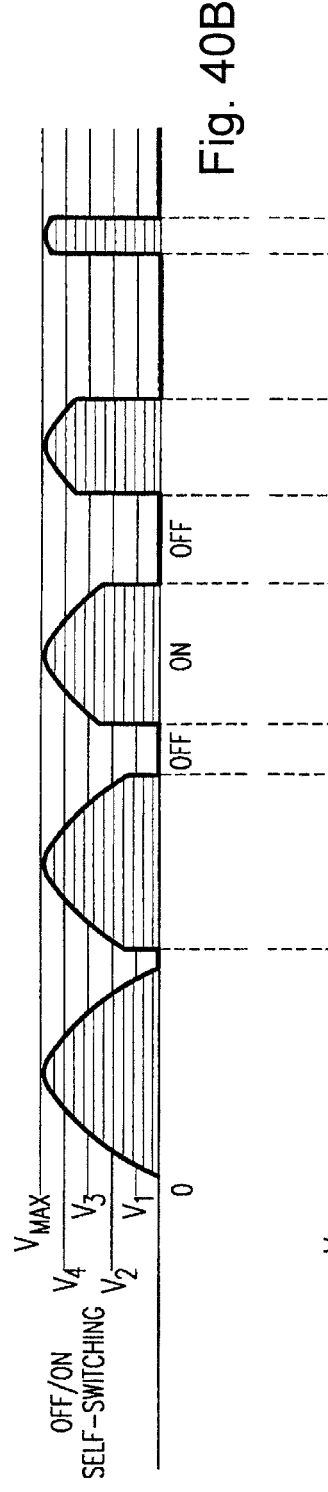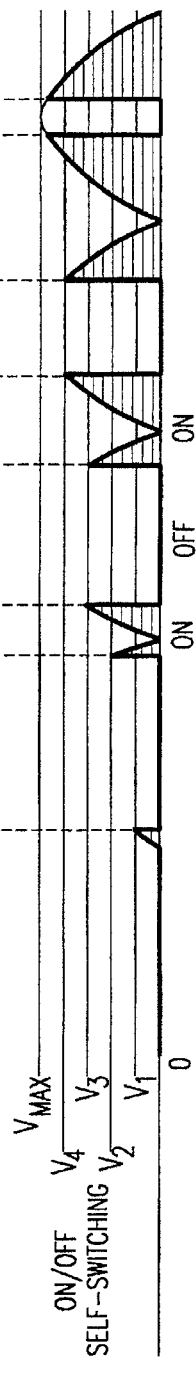

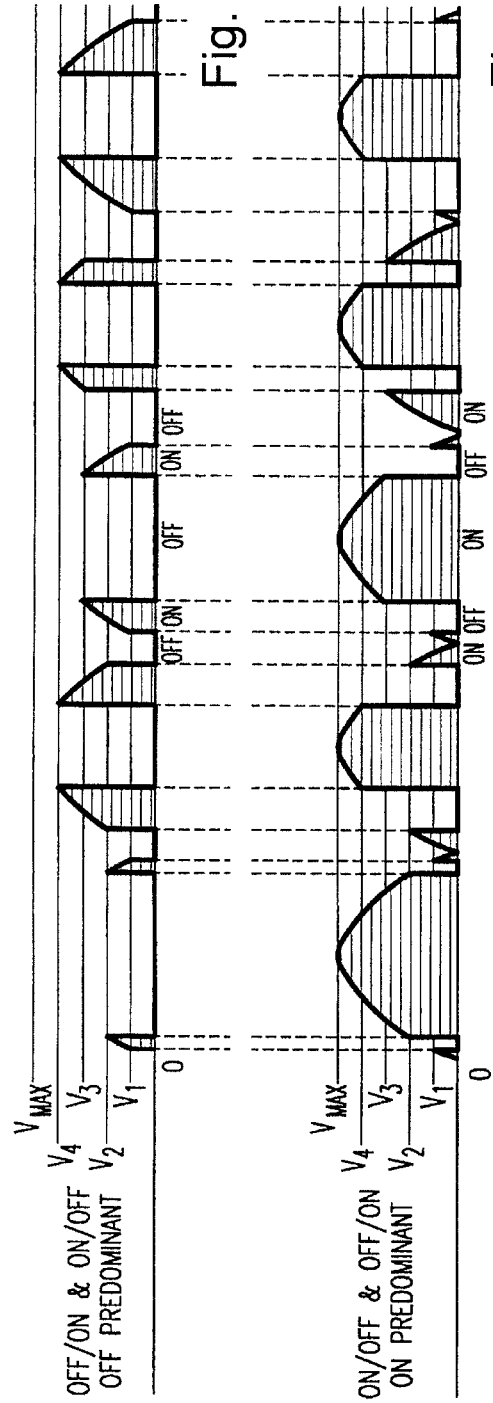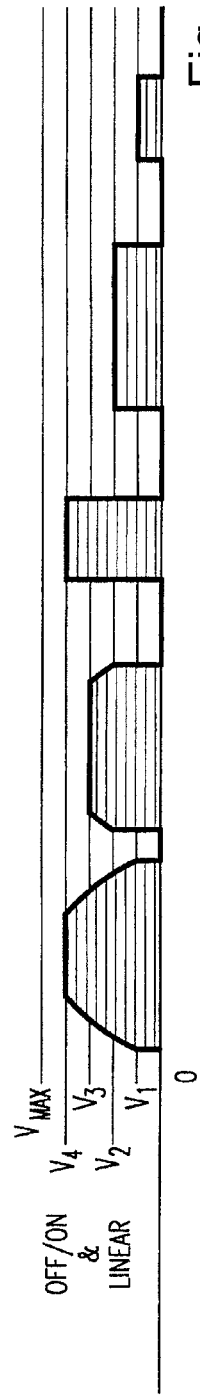

NEAR UNITY POWER FACTOR LONG LIFE LOW COST LED LAMP RETROFIT SYSTEM AND METHOD

CROSS-REFERENCE TO RELATED APPLICATIONS

This application is a continuation-in-part of PCT/US2012/070212, filed on Dec. 17, 2012, entitled "NEAR UNITY POWER FACTOR LONG LIFE LOW COST LED LAMP RETROFIT SYSTEM AND METHOD," which claims the benefit of U.S. Provisional Patent Application No. 61/710,286 filed Oct. 5, 2012, entitled "NEAR UNITY POWER FACTOR LONG LIFE LOW COST LED LAMP RETROFIT SYSTEM AND METHOD," and U.S. Provisional Patent Application No. 61/576,604 filed Dec. 16, 2011, entitled "NEAR UNITY POWER FACTOR LONG LIFE LOW COST LED LAMP RETROFIT SYSTEM AND METHOD," each of which is incorporated herein by reference in its entirety.

BACKGROUND

1. Technical Field

The various embodiments disclosed herein relate to low cost high quality LED (Light Emitting Diode) retrofit lamp devices capable to operate in a wide range of power and to supersede conventional lighting devices such as incandescent, halogen, sodium or fluorescent lamps.

More particularly, the disclosed embodiments relate to a LED lamp retrofit apparatus that maximizes the electro-mechanical-optical compatibility of seven interactive systems, such as: 1) Housing, 2) LEDs, 3) LED Panel, 4) Lens/diffuser Shield, 5) LED driver, 6) Supply Adaptor and 7) In/Out Electrical Wiring.

2. Introduction 2.1 Lighting Needs Versus Electrical Energy Resources

According to the data provided by the Energy Information Association (2003, *Commercial Buildings Energy consumption Survey*, Table E3, FIG. 4), with respect to the commercial buildings in the USA, the ratio of the total electrical energy used for Lighting is 38%, respectively about 3 times larger than the electrical energy used, in the same sector, for the next three large consumers, such as Cooling (13%), Ventilation (13%) and Refrigeration (12%).

Several hundred million dollars and tons of combustive resources are exhausted, yearly, for producing this energy, while experts in ecology warn of global warming and the need for green energy, green products, and energy consumption reduction.

By reducing 4 to 10 times the amount and cost of the energy spent for lighting, the lighting industry may become a minor consumer, even at the country level, while the saved electrical energy could be used more efficiently or more economically, for fulfilling the urgent needs solicited by many other branches of industry.

The solution to achieve this goal already exists: the immediate replacement of all the existing conventional lamps with LED Lamp Retrofits, since the latest developed LED devices have proved to be 5 to 10 times more efficient than the incandescent and halogen bulbs, and more reliable, compact and less polluting light sources than the fluorescent and sodium lamps.

However, the right and complete implementation of these new LED devices will take some time, because of several issues that will be presented below, especially, the particularly issues associated to a potentially possible "Low Cost High Quality LED Lamp Retrofit" ideal device.

The main purpose of all novel solutions disclosed herein is to show that, by maximizing the attributes of each component included in a LED lamp retrofit, while optimizing their each-other compatibility, a heat dissipation and manufacturing cost reduction of 30-60% per unit could be obtained for a high quality device, featuring top specs that none of the conventional lighting device could provide, such as: Efficiency Eff>90%, Power Factor PF>0.99, Harmonic Distortions A.THD<10%, less parts count, low size and weight, high reliability, and minimum five years lifespan.

2.2 Conventional Lamps

The main conventional electrical lighting sources existing in the worldwide market are the incandescent, halogen, sodium, fluorescent and the new introduced LED lamps, each of them having advantages and disadvantages with respect to the others.

A brief functionality study shows that each conventional lamp's physical configuration, operations and performances rely on the interaction and compatibility of seven distinct components, and/or interactive systems, such as: 1) Housing system, 2) Lighting Source system, 3) Mechanical Support system, 4) Lens/diffuser Shield system, 5) Electrical Parameters Control system, 6) Supply Adaptor system and 7) In/Out Electrical Wiring system.

Apparently, some of the conventional electrical lamps existing in the market comprise less than the seven interactive systems mentioned above, because a few of them could be overlapped by the designers for reducing the manufacturing cost and/or for building the lighting device in a more compact fashion.

Nevertheless, by presenting all the lamps existing in the market in the light of the same "seven interactive systems" which are, actually, the main and indispensable components of all conventional lamps, a more accurate and fair comparison could be done in order to reveal properly, the significant advantages provided by the novel LED Lamp Retrofit devices representing the main subjects of this invention.

2.3 Incandescent Lamps

An incandescent lamp or classic Edison bulb represents the first invented electrical device which produces light via a filament heated to a sufficiently high temperature by an electric current passing through it, until it glows.

A conventional incandescent lamp comprises:

A housing system represented by a transparent or translucent balloon made of glass which secures the internal vacuum (no air inside), the lamp internal components' physical integrity versus external corrosive/damaging agents and the electrical shock hazard for the end users.

A lighting source system represented by a filament consisting in a tungsten curly wire which is heated with electrical current up to its incandescence limit (near melting point), for allowing emission of photons (light) omni-directionally (360 degrees angle), outside of the lamp's housing.

A mechanical support system represented by a separate piece of glass or ceramic material supporting the filament via two rigid wires made of still or other electrically conductive material capable to resist at high temperature.

A lens/diffuser shield system represented frequently by the glass balloon housing and for projectors, flash-lighters and other applications, by convergent and/or divergent lens systems incorporated in the glass housing.

An electrical parameters control system represented by an optimized combination of the "internal vacuum" which prevents fast oxidation, the specific recipe of materials included in the composition of the filament, as well as specific dimensions of the curly filament wire's diameter, length or number of turns, which are sized in such a manner to provide maximum light, but simultaneously, to control/limit the lamp's supply current in such a manner for keeping the lighting device's power in the precise range it is designated to operate, despite the anticipated variations of the ambient temperature.

An electrical supply adaptor system represented frequently by a standard "Edison Screw" made of a temperature resistant conductive material which allows the lamp to be easily and safely (i.e. preventing electrical shock hazard) connected to the standard 120 Vac or 240 Vac AC supply fixture.

A two wires in/out electrical wiring system represented by the two rigid wires included in the Lighting Source Mechanical Support system or, by additional flexible wires covered with copper or silver, for achieving an improved conductivity and/or an easier soldering process of connecting the wires with the supply adaptor.

Particularly in/out wiring system may include three or more feed-through terminals or wires embedded in glass. Some devices such as the "three-way light bulbs" have two filaments and three conducting contacts in their bases. The filaments share a common ground, and can be lit separately or together. Common powers include 30-70-100 w, 50-100-150 w, and 100-200-300 w, with the first two numbers referring to the individual filaments, and the third giving the combined wattage.

The incandescent lamp main advantages are: low manufacturing cost, allowance for many different physical shapes, size and AC or DC supply voltage range (1.5 v-300 v), ideal power factor (PF=1), less harmonic distortion (A.THD<5%), natural (similar to the sun's) light emitted Omni-directionally (360°), negligible ultraviolet light exposure, compatibility with triac dimmer control devices and no risk of contaminating the environment with hazardous waste materials such as lead, mercury, or cadmium.

These advantages kept this "Edison bulb" as the #1 source of electrical light, worldwide for over 100 years.

The incandescent lamp's main disadvantages are: low efficiency (1.9-2.6%, typically), low efficacy (12-17 lumens per watt, typically), fragile when mechanical shocks or vibrations occur and very hot (over 100° C. at 100 w), with respect to other lighting devices.

Because of these limitations and/or inconveniences, the incandescent lamps have been replaced in many applications by other types of electric lights, such as halogen, sodium, fluorescent lamps, compact fluorescent lamps (CFL), and recently by light-emitting diodes (LEDs).

"Some jurisdictions, such as the European Union, are in the process of phasing out the use of incandescent light bulbs by banning them with laws to force them being replaced with more energy-efficient lighting." (Source: Wikipedia—"Incandescent light bulb".)

2.4 Halogen Lamps

A halogen lamp, also known as a tungsten halogen lamp or quartz iodine lamp is also an incandescent lamp which does not use vacuum for delaying the filament oxidation, but a small amount of a halogen such as iodine or bromine added which, combined with the tungsten filament produces a halogen cycle chemical reaction that re-deposits evaporated tungsten back on the filament, prolonging its lifespan and keeping the envelope clear.

This process allows the halogen lamp to operate at a higher temperature than a standard gas-filled lamp of similar power and lifespan, generating more light in the visible spectrum.

The halogen lamp comprises the same "seven components and/or interactive systems" as the incandescent lamp with the difference that the "vacuum" is replaced with a "halogen gas" inserted in the glass housing, for increasing the light intensity and the filament's lifespan.

A particularly case is the flood halogen lamp which has the housing covered, internally, with a silvery coating (mirror), focusing the light in only one direction, in an angle of about 120 degrees, via a transparent or milky frontal lens/diffuser.

The advantages of the halogen lamps are similar to those of the incandescent lamp, featuring a higher efficiency (2.6-3.5%) and efficacy (18-24 lumens/watt) than the incandescent lamp and additionally, their smaller size at higher power range, permits their use in more compact optical systems for high brightness projectors and illumination, which make them to be a preferred lighting sources at hotels, theaters, casinos, aircraft, watercrafts, and automobiles.

The main disadvantages of the halogen lamp are also similar to those of the incandescent lamp and, in addition, the halogen lamps generate more heat and ultraviolet radiation, requiring some specialized coating of the glass housing for decreasing the level of this radiation down to a non-dangerous level, for the end user.

"Halogen lamps were used on the Times Square Ball from 1999 to 2006. However, from 2007 onwards, the halogen lamps were replaced with LED lights. The year numerals that light up when the ball reaches the bottom used halogen lighting for the last time for the 2009 ball drop. It was announced on the Times Square website that the year numerals for the 2010 ball drop would use LED lights." (Source: Wikipedia—Halogen lamp.)

2.5 Sodium-Vapor Lamps

A sodium-vapor lamp is a gas-discharge lamp that uses low pressure sodium (LPS) or high pleasure sodium (HPS) techniques to generate light.

LPS are the most efficient light sources so far, having an outer glass vacuum envelope around the inner discharge tube for thermal insulation, but their specific yellow light appearance limits their application to outdoor lighting such as street lamps and parking lots.

HPS have a larger light spectrum but lower efficiency and poorer depiction than other lamps.

The main advantages of the sodium-vapor lamps are: very high efficiency (22-30%) and efficacy (150-200 lumens/watt), as well as the ability to work at very high power range (400 W-1 kW).

The main disadvantages of the sodium-vapor lamps are: the yellow light limiting their use only to outdoor applications, long warm-up/start-up time (several minutes), need of a ballast device (some bulb types), large size, large heat dissipation, fragility versus mechanical shocks or vibrations, and higher manufacturing cost.

The sodium lamps "yellow light" change, noticeably, the original color of objects around (i.e. a red car appears orange, under this light), however, for cities having astronomical observatories around (such as San Jose, Calif.), this light is the ideal one, because it could be easily blocked by selected filters matched with the halogen lamps yellowish light spectrum, with the purpose of getting a darker sky and, implicitly, a brighter stars view.

Nevertheless, now the ultra bright LEDs can do the same job, if necessary, featuring a more accurate control of their light emission spectrum (or color temperature) for increasing the astronomical observatories filters' efficiency, and not necessarily just in the yellow light spectrum but in a different one, offering a more natural light.

At this time the LPS are still the most efficient sources of light existing in the market, since the LEDs typical efficacy is about 100 lumens per watt.

However, besides the fact that the research for ultra bright LEDs just started a few years ago, and new improvements are announced, worldwide, almost on monthly basis (at the "experimental level there are already LEDs exciding 220 lumens per watt), all the other features of the LEDs, such as: longer lifetime, lower manufacturing cost, more compact and robustness versus vibrations, lower size and heat dissipation, no need of ballast, instant start-up, accurate control of the light spectrum, and possibility to reach 2-3 kW power without increasing the device temperature, are sufficient advantages of the LED lamps retrofit for making the sodium ones obsolete. (Source: Wikipedia—Sodium-vapor lamp.)

The sodium-vapor lamp comprises the same "seven components and/or interactive systems" as the previously described lamps, where:

a) the Housing and the Lens/diffuser Shield system could be overlapped in a large and oval glass balloon, b) the balloon is filled not with halogen but sodium-vapor, component which represents the lighting source system of this lamp, c) the supply adaptor system and the mechanical support system (3) have different configurations, suitable for the high power street or parking lot lighting d) the in/out electrical wiring system comprises more than two wires, since this lighting device operations requires a relatively complex external circuit.

e) the electrical parameters control system is located outside of the lamp's housing, consisting in a sophisticated "transformer-ballast" circuitry that provides the long warm-up/start-up time in order to control/limit the lamp's supply current in such a manner for keeping the lighting device's power in the precise range it is designated to operate, despite the anticipated variations of the ambient temperature in winter or summer time.

2.6 Fluorescent Lamps

A fluorescent lamp or fluorescent tube is a gas-discharge lamp that uses electricity to excite mercury vapors in the presence of an inert gas, for producing ultraviolet light which causes the fluorescence of a phosphor coating placed internally, and implicitly, light in the visible spectrum.

The fluorescent lamp comprises the same "seven components and/or interactive systems" as the previously described lamps, where:

a) the housing and the Lens/diffuser Shield system are overlapped in a long glass tube internally coated with a translucent phosphorous substance, b) the tube is filled not with halogen but neon, gas which represents the Lighting Source system similar to the sodium-vapor lamp, c) the filament used only for the ignition (start lighting) of the gas is split in two sections (ignition filaments) connected separately with a supply adaptor system comprising two plastic caps covering each end of the glass tube and acting also as a mechanical support system (3) for the two ignition filaments, d) the In/Out Electrical Wiring system comprises four wires coupling each ignition filament with two metallic connectors located on each plastic cap, which are built positioned and sized in such a manner to be operatively connected with a standard (Philips) AC supply fixture, mechanically and electrically.

e) the electrical parameters control system is also located outside of the lamp's housing, consisting in two extra devices:

a "starter", which is typically a passive components voltage controlled switch, which automatically turns "ON" when the voltage across its terminals is higher than a pre-established threshold amount, and "OFF" when the voltage across its terminals is lower than another pre-established threshold amount, and a "ballast" which is typically a large impedance coil used for securing the lamp's supply current parameter limitation in a precise range suitable to the specific power the lamp has been designated to operate.

The standard (Philips) fixture supplies the florescent lighting system with 120 Vac or 240 Vac via two separate circuits: a first circuit including one terminal of the first filament, the ballast, the starter and one terminal of the second filament, coupled in series, and a second circuit including the starter, coupled in series with the two remained terminals of the filaments.

Simply presented, when a high AC voltage (100-240 Vac) source is applied to the fluorescent lamp four terminals, the starter switch is turned "ON" for a short time, closing the two filaments AC circuit, the filaments get warm providing the necessary means to trigger the "ignition", for the gas inside the lamp to become conductive and to absorb from the AC voltage source as much current as the ballast, coupled in series with the other two terminals of the filaments, would allow. For example, if the AC voltage is 120V and the fluorescent lamp power is 60 W, the ballast impedance must be calculated to limit the current at $I=P/V=60/120=0.5$ A.

Immediately after the lamp's ignition is established, the voltage across the starter decreases, and the starter switch turns "OFF", disconnecting the filaments circuit from the AC voltage source. As soon as the neon gas is "conductive", absorbing a limited current from the AC source, there is no more need for the starter's switch to be "ON".

In other words, for producing the ignition, the starter may switch ON-OFF for several times, closing and interrupting the ballast AC circuit, via the two filaments, the ballast (inductor) will generate very high voltage auto-induction spikes (over 1 kV, with no "load") at each time when the starter's switches "OFF" (current interruptions) and the lamp does not absorb any current from the AC source. Eventually, after several ON-OFF cycles, the neon gas in the lamp reaches its ignition, and a 0.5 A current is crossing the lamp, with no more interruptions, so the ballast does not generates any more high voltage spikes (the lamp becomes a 60 W "load"), and the starter remains in its OFF state until the next time when the lamp is disconnected and re-connected to the AC voltage source.

Since over 30 years, many companies around the world, including Philips, General Electric, and Osram-Sylvania have been supplying fluorescent lamps and their adequate fixtures having standard sizes, AC supply adaptors sockets, and complete wiring circuits for allowing easy interchangeability of lamps, ballasts, and starters, for several different power ranges.

A particular florescent lamp is the CFL (Compact Fluorescent Lamp) which uses a smaller diameter glass tube housing, following a spiral shaped (known as the "curly bulb") which, being designed to replace conventional incandescent lamps, is connected to the power line via a standard Edison screw AC supply adaptor.

The fluorescent lamps main advantages over the incandescent and halogen lamps are: higher efficiency (9-11%), higher efficacy (50-100 lumens/watt) and implicitly, less heat dissipation.

These advantages were sufficient to have made the fluorescent lamps the most used source of light for indoor applications such as commercial buildings, business offices and industrial workplaces.

The fluorescent lamp has many disadvantages, such as: higher cost for the entire lighting system (including the lamp, ballast, starter, and the AC supply fixture), low power factor (0.5-0.7) which requires power factor correction circuits, high level of harmonic distortions (A.THD 60-120%), causing unpleasant radio interference, shorter lifespan if there are switched ON-OFF frequently, longer start-up time (1-3 seconds), ultraviolet emission, lower efficiency or malfunction if the ambient temperature is too high (35-60° C.) or too low (below 0*C) with respect to the standard room temperature (24° C.), relatively large size or complex shape, flickering (stroboscopic effect), incompatibility with triac dimmers and disposal/recycling problems, due to the toxic substances, such as phosphor and mercury, used in their ignition and light emission process.

Because of these inconveniences, the fluorescent lamps are gradually being replaced with more reliable, efficient, compact and less polluting devices, such as LED Lamps. (Source: Wikipedia—"Fluorescent Lamp", "Compact Fluorescent Lamp".)

2.7 LED Lamps

An LED lamp (or LED light bulb) is a solid-state (semiconductor) lamp that uses light-emitting diodes (LEDs) as light sources.

The LEDs are small, compact and very efficient lighting devices which, connected in series or parallel circuits (stripes or columns), can provide visible light in a wide range of power, from 50 mW to over 1 kW.

The LED lamps are complex devices capable of reaching higher performances than all the conventional lamps if each of their main components, especially the LED driver circuit, is properly chosen and specifically designed to solve the main inconveniences of only one specific conventional lamp, existing currently in the market.

The most crucial parameters such as: lifespan, efficiency, power factor, harmonic distortions, dimming factor, utilization factor and flickering depend, almost exclusively, on the LED driver circuit's configuration and electrical performances. In various embodiments, the present specification provides "LED Drivers" in an "LED Lamp Retrofit", for example.

Because, the LED lamp retrofits and implicitly, their LED driver circuit represent the main subjects of this specification, and a fair comparative presentation of a specific LED lamp advantages, versus conventional lamps and/or other LED lamps, requires a very complex market analysis study, a detailed description of several conventional "LED lamp retrofits" and "LED Lamp Drivers" will be presented hereinbelow.

3. LED Lamp Retrofits

By definition, a "lamp retrofit", device must have similar physical aspect, light distribution, brightness, size and supply adaptor connections as each specific conventional lamp subject of replacement.

Since in the worldwide market there are already hundred kinds of different incandescent, halogen, sodium and fluorescent lamps operating in a 1 W-1 kW power range having different size and shape, from a few feet long tube fluorescent lamp down to a quarter of an inch diameter spherical flash lighter's bulb, obviously it cannot be only "one LED lamp retrofit" replacing, alone, all the existing conventional lamps.

Therefore the LED lamp retrofit, subject of this invention, comprises the same "seven components and/or interactive systems" as all the other previously described lamps, however, having enough versatility to be able to follow each conventional lamp particularities, as follows:

A housing system which, from case to case, it could be a transparent or translucent balloon or tube made of glass or plastic, for securing the lamp internal components' physical integrity versus external corrosive/damaging agents and for preventing potential electrical shock hazard of the end users.

A lighting source system represented by one or more LEDs for converting the electrical energy in photons (light).

A mechanical support system represented by an LED panel which, from case to case may have a disc, square or rectangular configuration when the light has to be dispersed in an angle no larger than 180 degrees, or a tri-dimensional prism shape when the light has to be dispersed omni-directionally (360 degrees angle), outside of the lamp's housing.

A lens/diffuser shield system which, from case to case, it could be overlapped with the housing, it could be discretely attached to each LED device, or it could be represented by a separate convergent and/or divergent optical system attached to the housing and appearing as a transparent, translucent or monochromatic lens.

An electrical parameters control system represented by an SMPS (switching mode power supply) or monolithic (solid states) LED driver circuit which, from case to case, it could be operatively connected to each LED device, or to a LED stripe circuit, or to a LED array circuit, or to all LEDs of the lamp retrofit connected operatively, in series and/or parallel sub-circuits (stripes).

An electrical supply adaptor system which, from case to case, it could be a two connections standard "Edison screw" adaptor, or a four connections standard (Philips) AC fixture adaptor, or any other adaptor which allows the lamp to be easily and safely (i.e. preventing electrical shock hazard) connected to the standard 120 Vac-240 Vac supply line, or to any other higher or lower AC/DC power sources.

An in/out electrical wiring system which, from case to case, it can be represented by just two or more supply wires, or it could be an "intelligent in/out wiring system" comprising temperature or motion sensors and/or any other device capable to improve the lamp retrofit operations' performance and safety.

Over the last five years, the LED lamp retrofits are successfully replacing almost all the conventional lighting devices and governments of developed countries are encouraging and supporting this action.

The main issue associated to these LED lamp retrofits immediate replacement of the conventional lamps is the higher cost per unit, an inconvenience which could be compensated if the retrofits' lifetime can be sufficiently extended (5-10 years) for end users to be able to recover the extra cost from the monthly savings in the electrical utility bill.

Unfortunately, because the LED lamp retrofits comprise LED driver circuits, which include unreliable and bulky parts such as high voltage electrolytic capacitors and oscillating coils, the lifetime of these retrofits could be estimated, conservatively, up to about two years, a fact which forces the manufacturers to guarantee 5 years lifetime of their product only if the product is not used more than 4-8 hours a day.

Therefore now, most of the worldwide power management companies are doing their best efforts to solve these issues, either by decreasing the retrofits cost per unit down to the same cost as the conventional lamp replaced, which could be considered "the economical marketing strategy", or by prolonging, sufficiently, the lifespan of the LED lamp retrofits, for justifying their extra cost, which cold be considered "the high tech marketing strategy".

3.1 Implementation

A good quality LED lamp retrofit should replace, easily and operatively, each conventional lamp, matching, as closed as possible the physical dimensions, electrical supply adaptor, light intensity and light quality of the conventional lamp it is designed to replace.

Additionally, the recently introduced "smart control systems" require, or will require, more complex lighting systems having the capability to allow control via computers, in a "remote feedback" manner, in which each Lamp retrofit provides data (obtained via sensors) about its momentarily status in its particularly environment, for parameters such as temperature, humidity, outdoor light, motion in vicinity, current consumption versus light intensity, than the computer controls each node or lamp, accordingly, in an "ON-OFF Mode", for a better distribution of light and for avoiding "overheating" in some areas, or in a "Dimming Mode" for adjusting, properly, the light intensity and/or color, in other areas.

Such a smart control system implementation is possible and not to difficult to be achieved now, more than ever before, since all LED lamp retrofits include electronic driver boards, for controlling the LED current despite large variations of the supply voltage and ambient temperature, and since the cost of the digital parts used in I/O data communications have decreased dramatically, over the last ten years, the upgraded lamp retrofits cost per unit will not increase, significantly, if a "remote feedback" circuit will be included in a "smart LED driver" board and an "I/O data wiring connectors system", or "wireless communication system" would be added to a "smart LED lamp retrofit" device, for "remote feedback" purposes. In various embodiments, for example, the present specification provides remote control and feedback in an LED lamp retrofit as described in connection with FIG. 20, which includes a micro-controller and temperature sensor.

Since the low cost per unit is a mandatory demand of the large volume markets and an important subject of this specification as well, the following description of each LED Lamp retrofit will include references related to the cost associated to the manufacture and/or operations process of each particularly lamp retrofit.

In this light, features such High Efficiency, High Efficacy and High Power Factor represent not just "state of the art" attributes, but also economic advantages associated to each particularly LED lamp retrofit, since a "Near Unity Power Factor Long Life Low Cost LED Lamp Retrofit" could save an amount of money equivalent to more than times its total cost, by considering the 50-90% of electrical energy saved over ten years (or over 100,000 hours non-stop operation), versus the $0.15 cost per kilowatt, saved for each hour of operation.

In other words, over at least five years time period, an end user will get full return and additional cash profit for each LED lamp retrofit purchased, even the retrofit's costs is now 3-5 times more expensive than the conventional lamps, operating in the same power range.

With respect to the electrical energy utility bill, everybody know that a highly efficient lamp saves money, because as long as the electricity meter (counter) shows less amount of kWh (kilo-watt-hours), for the same light quality and period of time, obviously the utility (PG&E) bill will be less expensive. However, not too many end users know that, since a few years ago when PG&E has introduced its "smart meters", the electrical utility bill has been substantially increased (up to 40% for consumers having PF=0.6) for "Low Power Factor Electrical Devices" so from now on, only the "Near Unity Power Factor" devices will have the benefit of "no extra charge", in the monthly electrical utility bill.

This new way of billing the consumers of electricity in California has been already confirmed by the Pacific Gas & Electric (PG&E) in an internet educational publication:

"Power factor adjustment is calculated for larger customers, over 400 kW, to appropriately charge for the larger percentage of reactive power used. At PG&E we average the power factor over the entire monthly billing period." (http://www.pge.com/includes/docs/pdfs/mybusiness/customerservice/energystatus/powerquality/understanding.pdf)

This apparent "overcharge" is totally fair, since for each electrical device absorbing 60 W power, under a power factor coefficient of 0.6, the utility (PG&E) has to deliver 100 VA "reactive power", even the difference of 40 VA is not used by the end user, but is converted in "overheat" by the utility provider's high power transformers, relays and wiring systems.

The best solution to solve these issues is to include a PFC sub-circuit in each LED lamp retrofit's driver circuit, in such a manner for the size and cost of the upgraded driver to not increase considerably.

Accordingly, all the LED driver novel solutions presented in this patent application allow for near unity (0.95-0.99) power factor LED lamp retrofits, in which the PFC sub-circuit's cost is less than 5% of the entire lamp's cost, featuring less parts count and size, as well.

3.2 Incandescent Lamp Retrofit

An incandescent lamp retrofit, as discussed hereinbelow in connection with the embodiment shown in FIG. 1, for example, should provide its light omni-directionally (360 degrees angle) in a range of power from 2 W (5-10 W conventional luminaries replacement) to 10 watts (40-100 W conventional Edison bulb replacement), it is supposed to have the same supply socket or the same size "Edison Screw" AC supply adaptor and the same physical shape a for being able to replace, easily and operatively, any conventional incandescent bulb.

The US Department Of Energy (DOE) recommended a minimum power factor of 0.7 for the lamp retrofits used in residential areas and a minimum 0.9 power factor for the business and industrial lighting section.

However since, on one hand, the low power LED lamp retrofits' parts total cost is more expensive than the cost of a "tungsten filament" and, on the other hand the internal space available in this low size bulb is too small for allowing the use of high quality LED driver circuits, most of the large volume manufacturers, such as Phillips, GE, Lights of America and others have already introduced in the market thousands of LED lamp retrofits having a very poor power factor (0.5-0.75).

Good reputation semiconductor companies, such as TI, Philips, Power Integrations, Linear Technology, iWatt, ONSEMI, Fairchild are advertising new LED driver circuit solutions featuring a power factor over 0.9 on monthly basis, since over three years ago, however, either because this solution is still too expensive at this time and/or because the size of the driver circuits is too large to fit in the limited available space inside of the lamp, none of these solutions are used currently, by the large volume LED lamp retrofit manufacturers.

3.3 Halogen (Flood) Lamp Retrofit

A halogen flood lamp retrofit, as discussed hereinbelow in connection with the embodiment shown in FIG. 2, for example, should be larger in size for operating in a 10-14 Watts power range, having the same "Edison Screw" AC supply adaptor and it is supposed to focus its light in only one direction (flood), under an angle of about 120 degrees.

The LED lamp retrofits for larger power halogen bulbs have sufficient internal available space for adding a PFC board, however, by considering the low cost of the existing halogen bulbs, it is almost impossible for the large volume manufacturers to build high quality lamp retrofits, at a competitive cost per unit, unless the LEDs and/or the LED driver boards cost decreases, considerably.

3.4 Fluorescent Lamp Retrofit

A fluorescent lamp retrofit, as discussed hereinbelow in connection with the embodiment shown in FIG. 3, for example, should follow a tube shape having, precisely, the size as and the same conventional two connectors AC supply adaptor coupled, symmetrically, at both ends of the lamp, in order to match with the Phillips, GE and Sylvania standard supply fixture and to operate in a 16-24 watts power range for reaching at least the same light intensity as a 60-80 watts fluorescent lamps.

For this particular retrofit, the LED lamp has significant advantages, consisting in the fact that the fluorescent lamp light angle is 360°, however, these lamps' fixtures are mounted against the wall, so almost 50% of its lighting capacity is wasted, unless good quality mirrors (reflectors) are included in the fixture, for guiding the light back, in the right direction. The LEDs 120 degrees light angle allows this kind of retrofit to reach the same light intensity and better quality (sun light), guided on the right direction, and with just 15 W power consumption to replace a 60 W conventional fluorescent lamp, without using large and expensive bright white fixtures or reflectors, as discussed hereinbelow in connection with the LED lamp retrofit embodiment associated with an LED panel for a T8 retrofit.

An additional advantage of this particular retrofit consists in the fact that the size and cost of the replaced lamp (including its large and expensive fixture, ballast and starter) allow for a "higher performance higher cost" LED lamp, but unfortunately, still most of the new T8 fluorescent LED lamp retrofits, existing in the market, have the power factor less than 0.9 (some of them even less than 0.7), because of the extra cost and extra size of the driver board, required by a PFC circuit comprising 15-30 parts, typically.

3.5 Other Lamps Retrofits

Other LED lamp retrofits, as discussed hereinbelow in connection with the embodiment shown in FIG. 4, for example, could be designated to replace very small bulbs, large street lighting sodium lamps or huge lighting panels, accordingly in such applications it is recommendable for the LED lamp retrofit to be designed as a "compact light engine" unit, respectively, to have a spherical or cubical monolithic configuration which allows for many units to be connected next to each other, in series and/or parallel circuits, similar to the conventional lighting panels using hundreds of incandescent bulbs.

Ideally, a "compact light engine" should include only two parts, respectively an LED Array module and a silicon microchip, coupled directly to the LEDs.

Some "pioneers" in the worldwide industry, such as Exclara, Supertex, Seoul Semiconductor and a few others have introduced a new technology that eliminates the need for capacitors and coils used in the "conventional LED drivers" and allows for "Monolithic LED Driver" (fully integrated) solutions, near unity power factor and over 90% efficiency.

This new technology could be the key to "the right solution" for a very low cost, but also very high quality, LED lamp retrofit.

Accordingly, the present specification provides several novel solutions for upgrading incandescent, halogen, sodium and fluorescent LED lamp retrofits, comprising conventional LED drivers, as well as monolithic LED drivers.

4. LED Lamps Retrofits Main Components

For a fair and easier quality versus cost comparison between all lighting devices presented in the present specification it would be considered that, similar to the embodiments presented herein, all LED lamp retrofits existing in the market comprise the same seven main components, such as: LEDs, LED Panel, Supply Adaptor System, Housing, Lens/diffuser Shield, LED Driver, and LED driver's In/Out Electrical Wiring System, regardless of the fact that some of the lamps may appear to have fewer components, because two or more parts are integrated into one component capable of performing, simultaneously, 2-3 functions required by a particular LED lamp retrofit's lighting operations.

The LED lamp retrofits performances quality and operation lifetime depend on the physical configuration, electrical characteristics, reliability and lifespan of each of its components, as well as on the capability of these components to match each other, for optimizing the quality versus cost feature of each particularly lamp retrofit.

4.1 LEDs and LED Arrays

The LEDs are basically mono-chromatic Light Emitting Diodes or nonlinear semiconductor devices introduced in the industry since over thirty years ago as "tiny monochromatic lighting sources" capable of generating just a few colors, such as Red (or Infrared), Green, Yellow and Orange used, mostly, in display panels for electronic equipment, stereos, toys, infrared remote control and other low power lighting applications.

Because of their small power consumption (20-100 mW) and low cost, there was no need for a "high efficiency high power factor LED drivers", at that time, since even a low power/low cost operational amplifier could supply an LED in a "constant voltage constant current" manner, securing the circuit lifespan for a period of 10-20 years.

During the last decade, shortly after the blue LED was finally created, the applications field of these devices has increased dramatically, because by combining, in whatever ratio, the Red, Green and Blue ("RGB") colors, any other "specific color" of the visible spectrum (from Infrared to Ultraviolet, including "White") could be easily obtained, offering the necessary means for the high efficiency "color video display" used now in small and ultra large TV/Monitors/Advertising video screens, as discussed hereinbelow in connection with the embodiments for RGB type LED lamp retrofits, for example.

Over the last five years, the "Ultra Bright White LED" technology, developed from the blue LED technology, has been rapidly developed by high volume manufacturers such as CREE, Lumileds, Nichia, and many others, offering a large diversity of LED devices operating in a range of power from 50 mW to over 5 W per unit, which can be easily connected in series and/or parallel circuits (similar to the conventional diodes matrix circuits) and used in low power (1-50 W), as well as in high power (100 W-1 kW) LED lamp retrofits, absorbing 5-10 W less electrical energy than incandescent or halogen lamps, from the AC power grid, for similar lighting power.

At this range of power and especially, for such serious applications such as aircrafts, watercrafts, street and commercial lighting systems, obviously a low power and cost operational amplifier cannot secure the job, so there is an urgent need for more complex "high reliability, high performance, long lifetime LED lamp" driver circuits, capable to operate in a range of power from 1 W to 1 kW.

The 50 mW LEDs require a constant current of maximum 20 mA and their cost per unit is very low now, after the apparition of the higher current (100 mA to 5 A) LEDs which offer the advantage of using less number of LEDs for any given power of a LED lamp retrofit. In the same range of power, the cost of 100 LEDs of 50 mW power each is now lower than 5 LEDs of 1 W power each, but because five LEDs could be connected in only one stripe having its current secured by only one constant current sink device, while the 100 small power LEDs may need 20 constant current sink devices (in the same configuration of 5 LEDs per stripe), most of designers prefer to use the more expensive higher power five LEDs. South Asian manufacturers prefer the low cost low power LEDs, using hundreds of them in only one T8 fluorescent retrofit lamp, connected in 20-30 stripes and using low cost ballast resistors, per each stripe, instead of constant current sink devices. This solution is good only for reducing the retrofit cost per unit, however, the chances for these kind of lamps to last more than two years are very low, as discussed hereinbelow in connection with the embodiment shown in FIG. 24, for example.

Many LEDs manufacturers now offer the so called "LED Array", "6V LED", "20V LED" or "50V LED" which are, actually, two, six, fifteen or more LEDs mounted, very close to each other on a thin aluminum board, then connected to each other in series and/or parallel circuits using a very productive and cost effective technology that allows printed circuits deposited on an "aluminum oxide" substrate which solved, simultaneously, the heat transfer and the electrical isolation issues associated to the manufacturing process of LED lamp retrofits using more than one LED, as discussed, for example, hereinbelow in connection with the embodiments shown in FIGS. 4 and 20.

The LEDs main advantages over the conventional lamps are: more compact, smaller size and weight, higher efficiency, higher efficacy, less heat dissipation, highly resistant to mechanical shocks and vibrations, longer lifespan, precisely controlled light spectrum, no ultraviolet or x-Ray radiations and no disposal/recycling problems.

The main inconvenience associated to the LED's behavior is the nonlinearity aspect, associated to the fact that typically, an LED absorbs almost no current when the voltage across its terminals increases from 0V up to about 2.8V, than it starts absorbing rapidly, more and more current when the voltage increases between 2.8V and 3.3V supply and finally, the LED may me be exposed to irreversible damages (or simply it may "blow up") if the LED's current increases above its recommended limit, even by increasing the voltage (and not limiting, somehow, the LED's current) with just 0.1-0.2 volts.

Additional inconveniences consists of the fact that the LEDs require rectified AC current which calls for a relatively sophisticated and expensive power factor correction circuit, the LEDs current amount changes, considerably, with ambient temperature variations, when coupled in parallel stripes the LEDs need a ballast resistor or a constant current sink for balancing the current per each stripe, they lose completely the light at any time when the voltage across a LED stripe is only a few fractions of a volt lower than the typical multiple of 2.8V-3.3V threshold, creating an irritating "flickering" effect, especially when dimmers are used.

In conclusion, the LEDs have a strong potential to be the future ideal lighting source which will replace, eventually, all the conventional lamps existing around, however, because of several inconveniences, these amazingly compact and efficient devices cannot perform as well as expected from an efficient and reliable lamp retrofit without having "full match" with each and all the other six components, discussed hereinbelow, in various example combinations and permutationsf.

4.2 LED Panels

The LED panels are, basically, the mechanical support for one or more LEDs connected in any series or parallel circuit combination offering the optimum implementation or maximum brightness with respect to the lamp's physical configuration, available internal space, light direction, dimming capability and uniform light distribution of each specific LED panel included in a specific LED lamp retrofit.

The LED panel configuration and the electrical connection between the LEDs have to be designed in such a manner for providing maximum brightness by using or not using a reflecting mirror and, also, the light has to be symmetrically distributed on the entire LED panel surface, even a dimmer reduces the maxim supply voltage, switching "off", one after the other, all the LEDs stripes, as the maximum supply voltage decreases.

Four main LED panel configurations are currently used, or could be used, such as:

a) a three dimensional LED panels for incandescent LED lamp retrofits, which has to secure an Omni-directional light and a symmetrically distributed light in case the amplitude of the supply peak decreases, as discussed hereinbelow in connection with the embodiments shown in FIGS. 5 and 6, for example, b) a flat disk LED panels for halogen (flood) LED Lamp retrofits, as discussed hereinbelow in connection with the embodiment shown in FIG. 2, for example, which provides a spot light and a symmetrically distributed light in case the amplitude of the peak input voltage decreases, as discussed hereinbelow in connection with the embodiment shown in FIG. 6, for example, c) a flat rectangular LED panels for fluorescent LED Lamp retrofits, as discussed hereinbelow in connection with the embodiment shown in FIG. 3, for example, which provides uniform light over a several feet long transparent tube and where the light has to remain symmetrically distributed in case the amplitude of the supply peak voltage decreases, as discussed hereinbelow in connection with the embodiment shown in FIG. 5, for example, and d) a flat miniature LED Array for monolithic light engine LED lamp retrofits, as discussed hereinbelow in connection with the embodiment shown in FIG. 4, for example, which provides a uniform and symmetrically distributed light in case the amplitude of the supply voltage decreases, as discussed hereinbelow in connection with the embodiment shown in FIG. 7, for example.

4.3 Supply Adaptors

For any lamp retrofit, the supply adaptor is a component, which allows the end user to replace, shortly and operatively, the obsolete conventional lamp used until the day of replacement, without any need to employ an authorized electrician and/or to take the risk of doing "improvisation" in order to connect the new lamp to the dangerous high voltage electrical power grid's standard terminal.

Therefore, most of the LED lamp retrofits are equipped with exactly the same supply adaptor, described above, for each standard power and size incandescent, halogen, sodium, and fluorescent lamp, subject of the replacement.

4.4 Housings

The LED lamps retrofits' housings have significant economical advantages, with respect to the conventional lamps' housing, because since the LEDs do not need vacuum or rare gases for producing light, there is also no need for the housing to be made from glass, which is heavier, more fragile and more expensive than plastic or aluminum.

The housing provides mechanical support and environmental protection (against raining, humidity or dust) for all the other components of the retrofit lamp, and it could appear as a transparent plastic globe which replace also the lens/diffuser shield, or it could be made from aluminum and used also as LED panel and as heat sink for cooling down the LEDs operation temperature and keeping them highly efficient.

In case the housing is made from aluminum, or any other metal, serious precautions have to be taken, making sure there is a 2 kV-4 kV isolator material between the housing and any electrical component (LEDs, LED panel, LED driver, supply adaptor, wiring supply circuit) coupled, directly, to the AC power grid, for protecting the end users against electrical shock hazard, as discussed hereinbelow in connection with the embodiments of non-isolated drivers, such as a monolithic driver, for example.

4.5 Lens/Diffuser Shields

The lens/diffuser shields of the existing LED lamp retrofits have different size, shape and transparence grade (transparent, translucent, milky, color filter, magnifying glass stripes, etc.) following, as close as possible, the exact appearance of the conventional lamp subject of replacement, in order to provide at least the same intensity, quality and spectrum of light to many end users which, for different reasons, may have strong preference for a specific lamp type.

Some of the LEDs, existing in the market, come with a small magnifying lens incorporated into their plastic package, which increase their brightness but decrease their light cone's angle, down to about 90°.

For outdoor applications, the lens/diffuser shield device has to be hermetically (water proof) coupled to the housing of a LED lamp retrofit, for securing the lamp's high reliability versus rain, dust or any other adverse factor able to damage the LED lamp retrofit's circuit.

4.6 In/Out Electrical Wiring System.

The LED driver's in/out electrical wiring system comprise three main circuits, such as:

a driver supply circuit, which consists of two or more wires coupled with a DC source such as a car battery, a high voltage AC source such as the 120V-240V power grid, or to a 50-60 Hz power transformer.

a LED supply circuit, which may also include two or more wires, in accordance with the configuration of the LED driver and the LED panel circuits.

a remote feedback wiring circuit, comprising two or more wires coupled between the LED driver circuit, which should include sensors and a microcontroller system capable of exchanging in/out data, and an "in/out data connector" which connects the LED lamp retrofit with an external computer system or directly to the internet.

Currently, there are already available "smart remote control circuits" via which end users can switch on/off or even dim all lights in their apartment, via internet, even during a trip out of the country.

4.7 LED Drivers

Currently, there are hundreds of different LED driver circuit configurations available on the worldwide market, each of them following different circuit topologies and offering different advantages, such as: lower cost, smaller size, less parts count, higher efficiency, higher power factor, less harmonics (noise), off line (90-240 Vac supply range) capabilities, wide range dimming capabilities, however, each of them having some limitations or inconveniences, as well.

Very generically, these devices could be separated in two main groups such as: a) ballast LED drivers, b) Switching Mode Power Supply (SMPS) LED drivers, and c) Monolithic LED Drivers, all of them being capable to operate as DC/DC or AC/DC LED diver circuits, if a bridge rectifier is performing the AC/DC conversion.

The ballast LED drivers are the most simple and cost effective ones, consisting of just a resistor or a simple constant current sink (CCS) circuit coupled in series with one or more LEDs.

The SMPS LED drivers are now the most used devices in the LED lighting industry, following the conventional (over 30 years old) Pulse Width Modulation (PWM) converter control method, based on the coils and capacitors capability of storing electrical energy, being currently promoted in the worldwide market by all major power management companies, such as TI, Phillips, Maxim, ST Micro, Toshiba, Fairchild, ONSEMI, Power Integrations, Semtech, Linear Technology, and many others.

The Monolithic LED drivers provide a unique controlling method which eliminates the need for coils and capacitor and allows for a very compact and cost effective fully integrated driver circuit solution, being introduced in the market recently, by several "pioneers" in the industry, such as Exclara, Seul Semiconductor, Samsung, Supertex and a few other companies.

Since each of the three controlling methods mentioned above allows for many different circuit topology applications having advantages, but also inconveniences with respect to each-other and the SMPS LED drivers, as well as the Monolithic LED drivers are, both, important subjects of the present specification, detailed description of several LED driver circuit solutions, promoted in the market by very good reputation power management companies, will be presented hereinbelow.

5. Simple Ballast LED Driver Circuits 5.1 Resistor Ballast LED Driver

In low power range and regulated (constant) voltage DC/DC applications, a LED Driver circuit working at room temperature (23°-25° C.) could be extremely simple and cost effective, consisting of just "one resistor" (costing less than $0.01) coupled in series with a LED, or a LEDs stripe, as a "ballast circuit", for limiting the LED's current down to a safe amount, representing typically, no more than 80% of the LED's maximum ratings specs, for securing "safe margins" versus the LEDs current/voltage specs variation, from unit to unit (LED's specs tolerance), and versus small variations of the ambient temperature and/or supply voltage ripples.

As a simple example, in an applications where the supply voltage is obtained from a 12V DC car battery, the voltage per each LED is required to be 3.2V and the maximum average current, Imax, is 20 mA (16 mA as 80% of Imax), the most "simple driver" is a resistor coupled in series with a "stripe" (column of devices coupled in series) of three LEDs requiring 3.2V×3=9.6V where the resistor's value is 12V-9.6V=2.4V/0.016 A=150 Ohms, and the system efficiency is Eff=9.6/12=80%.

For getting "more light", many stripes of three LEDs having a ballast resistor of about 150 Ohms could be connected in parallel and, in ideal and stable environmental conditions, if the substantially low efficiency of this particular system is ignored, a resistor could be the most simple and low cost driver included in a LED lamp retrofit, designated to replace the conventional incandescent or halogen bulbs used in the automotive industry.

However, in real world situations, the simple solution described above has many disadvantages since it does not protect the LEDs against large variations of the supply voltage (a car battery voltage may vary from 9V to 15V) or ambient temperature (summer vs. winter seasons) and additionally, a significant percent of the supply electrical energy is lost in heat, on the ballast resistors, decreasing the entire LED Lamp retrofit efficiency down to 80%, or less.

Therefore, in order to overcome these shortcomings, there is a need for more complex LED driver circuits capable of maintaining the LED current and voltage within precise pre-established limits, despite large variations of supply voltage and/or ambient temperature, in such a manner for the conversion of the electrical energy in light to reach maximum efficiency.

5.2 Constant Current Sink LED Drivers

The constant Current Sink ("CCS") drivers, are capable of securing a safe current trough the LED stripe, despite large variation of ambient temperature, however, when the supply voltage increase to an amount significantly higher than the LED stripe's threshold voltage, the difference in the voltage will increase the heat dissipation of the CCS device and implicitly will decrease the driver's efficiency. On the other hand, when the system supply voltage goes lower than the LED stripe's threshold voltage, even for a short period of time (ripples), the entire LED stripe will shut off its light, for that period of time, creating an irritating flickering (stroboscopic) effect.

In conclusion, the CCS devices are useful and strongly recommended only in DC circuits where the supply voltage is reasonably constant (small ripples) and close to the LED stripe's threshold voltage.

Nevertheless, there are already on the market very low cost CCS LED drivers used even in AC circuits (via a bridge rectifier), but their poor efficiency, power factor and A.THD parameters represent a strong barrier for this kind of driver to become the ideal "low cost high performances" LED drivers, on the worldwide market.

6. Switching Mode Power Supply (SMPS) LED Driver

The SMPS LED driver circuits follow conventional Pulse Width Modulation (PWM) boost, buck, buck-boost or flyback transformer converter circuit topologies which include reactive components, capable of storing and converting the electrical energy, such as inductors and capacitors as well as integrated circuits, transistors, diodes and resistors.

The main inconvenience of the SMPS drivers consists of their dependence on bulky and unreliable reactive components, such as oscillating coils and electrolytic capacitors in order to convert and store the electrical energy, as well as filtering coils and high voltage capacitors for their EMI (low pass) filters, which stop the high frequency noise, generated by the SMPS converters, to penetrate the electrical power grid.

At relatively high temperatures, which are expected inside of LED lamp retrofits, the electrolytic capacitors lifespan is relatively short (about 2 years) and also, the high frequency coils or transformers (flyback) isolation and/or magnetic core characteristics could change, dramatically, with the ambient temperature and humidity factors, limiting the lifetime of the entire LED lamp retrofit device down to 2-3 years.

6.1 DC/DC SMPS LED drivers

The DC/DC SMPS LED drivers are capable of overcoming the shortfalls in all the ballast LED drivers, in a conventional manner, by using a PWM converter comprising a controlling circuit (semiconductors), an oscillating inductor (coil) capable to, periodically store and deliver electrical energy, in high frequency constant output voltage pulses, to a load (LEDs), across which there is a capacitor that storage the electrical energy, for keeping the LEDs lighting, without flickering. The modern PWM controller integrated circuits (ICs) can control their output voltage, in such a manner, that even if the system supply voltage goes lower, or ten times higher than the LEDs stripe's threshold voltage, the voltage across the LEDs stripe remains constant, and just a little higher than the LEDs stripe's threshold voltage, for avoiding flicker and maximizing the system's efficiency.

6.2 Constant Voltage Constant Current LED Drivers

The constant Voltage Constant Current ("CVCC") LED Drivers use both, a PWM converter and a CCS device for securing, at the highest degree, the stability of the LEDs voltage and current parameters and prolonging the LED lamp retrofit's lifespan to the maximum period of time allowed by each component, especially by the unreliable high voltage electrolytic capacitors, included in most of the SMPD LED drivers.

For achieving ultra-reliable CVCC LED driver solutions, a conventional CCS circuit including a MOSFET buffer transistor in feedback with an operational amplifier (OPAM) is recommended to be inserted in series with each LED stripe for securing long term lifespan to the LED lamp retrofit. As good examples both, the MAX16834 LED driver chip provided by Maxim and the LT3756 LED driver chip provided by Linear Technology are capable of offering this state of the art CVCC circuit implementation, by using an additional external MOSFET buffer as CCS, controlled by an internal OPAM, however, this protection is used for only one LED stripe. For more than three stripes, this very reliable OPAM-MOSFET-CCS circuit becomes too expensive and therefore designers prefer to use only one stripe of higher power and more expensive LEDs, rather than cheaper LEDs coupled in more stripes. Accordingly, in various embodiments, the present specification provides a CVCC LED driver as described hereinbelow in connection with FIGS. 8 and 9, for example.

The maximum efficiency of a DC/DC SMPS LED Lamp retrofit depends of the number of LEDs per stripe and the PWM circuit topology used for the LED driver. As more LEDs are connected in series on one stripe, the higher the voltage threshold and, implicitly, the lower the entire circuit's current will be, for the same power range. Lower current means lower heat, which means lower dissipation and higher efficiency. However, the four conventional PWM circuit topologies mentioned above have their own particular advantages and shortcomings, such as:

6.3 Boost Topology

The boost circuit topology allows for the simplest (less parts count), most efficient (Eff=90-95%, typically) and low cost PFC or PWM LED driver implementations, with two main shortcomings:

a) it does not offer isolation between the input and output circuits and b) its output voltage is always higher than its maximum input voltage.

In relation to the LED driver's case designated for automotive battery LED lamp retrofits supplied with 10-15V as mentioned above, a safe constant output of minimum 17 Vdc of a boost circuit will supply a stripe of 5 LEDs (assuming a 3.2V/LED, 16V/5 LEDs) coupled in series, with only 1V remaining across the driver's buffer. Since the LED current is equal with the CCS buffer current, the "output circuit efficiency" (LEDs—CCS) is, briefly: Eff=16/17=0.94. In case a higher output voltage is chosen, it has to be increased in increments of 3.2V, for adding one, two more LEDs, and keeping the "extra voltage" not higher than 1V with respect to the LED stripe maxim voltage, for maintaining a good efficiency of the system. In high power/high efficiency boost driver systems, that "extra voltage" has to be dropped down to 0.1V (using low value sense resistors techniques), for the entire boost system's efficiency to be around 0.94, since about 5% of the supply energy is dissipated in heat by the boost inductor (coil), the MOSFET switch, the controller IC and the other 15-20 components included in the circuit.

6.4 Buck Topology

The buck circuit topology, which also allows for circuits with fewer component counts, is reasonably efficient (Eff=85-90%, typically) and cost effective, having two main shortcomings:

a) it does not offer isolation between the input and output circuits, but even more, there is a direct current from the high voltage DC source trough the LED stripe to ground which could damage the LEDs if the converter's buffer fails in a "short circuit" fashion and, b) its output voltage is always lower than its minimum input voltage.

In relation to the LED driver's case designated for automotive battery LED lamp retrofits supplied with 10-15V mentioned above, a safe constant output of maximum 9 Vdc of a buck circuit is too low to supply a 3 LEDs stripe (3×3.2V=9.6V so no LED will light), so in case that a stripe of only 2 LEDs (3.2V×2=6.4 V) is used, the voltage difference will be 9V-6.4V=2.6 V which means a "LED Stripe—CCS output circuit" with an efficiency of just 71%, which is unacceptable.

Therefore in any design, the buck output voltage has to be set as closed as possible to the two LEDs stripe threshold voltage (6.4 V) and, for the same total numbers of LEDs and lighting power of a LED Lamp retrofit, more LED stripes have to be added, fact which will increase the circuit total current and implicitly, the entire system efficiency will decrease.

6.5 Buck-boost Topology

The buck-boost circuit topology overcomes some of the above mentioned shortcomings by allowing higher, equal or lower output voltage with respect to its input supply voltage amount, operating with good efficiency (85-90, typically) and less parts count.

The SEPIC (Single-Ended Primary-Inductor) converter is a particular buck-boost circuit having non-inverted output coupling energy from the input to the output via a series capacitor to a second SEPIC inductor, fact which increase the complexity of the circuit but allows for a "single ground" configuration which eliminate the need for differential or opto-coupler sensing of the current or voltage across the load.

The three main shortcomings of the buck-boost topology are:

a) it does not offer isolation between the input and output circuits, b) it requires sophisticated differential voltage sensing method of the output V/I parameters (not for SEPIC) because its output circuit has a different zero volts reference with respect to the input circuit, c) it requires a special "constant Off time" controller IC when it is working in CCM (Continuous Conduction Mode) and an additional power factor correction circuit in AC applications.

6.6 Flyback Topology

The flyback circuit topology is the only circuit which, via its two coils flyback transformer, provides complete isolation between its input and output circuits and allows for higher, equal or lower output voltage with respect to its supply voltage amount.

The flyback circuit shortcomings are: more expensive, more parts count, larger size, lower efficiency (75-85%, typically, 90% using expensive parts), two separate grounds which require a sophisticated differential current/voltage sensing circuit and an additional opto-coupler circuit, in order to control the momentary value of the LED's current and voltage parameters with respect to isolated ground, and to secure the circuit's long term lifespan.

In conclusion, the flyback circuit main advantage is the "full isolation between the input (AC power grid) and the output (LEDs) circuit, fact which make this circuit the most preferred one in situations when a LED lamp retrofit has a "metallic housing" and a risk of electrical shock hazard may exist for the end users.

Nevertheless, most of the worldwide providers of LED lamp retrofits solved this problem by using plastic or glass housing and/or by using a 2 kV-4 kV isolated material inserted between the LEDs (output) and the LED panel (or the aluminum heat sink), solution which allows the use of more efficient and cost effectively LED drivers, following boost or buck-boost topologies.

6.7 AC/DC SMPS LED Drivers

The AC/DC SMPS LED drivers follow the same three main circuit topologies described above, but they are more expensive and sophisticated than the DC/DC ones because, in the AC-to-DC conversion systems, an additional PFC (Power Factor Correction) sub-circuit is required, which increases by 30-50% the number of components and implicitly, the size and cost of the AC/DC LED driver, function of the block schematic topology chosen, respectively, "double stage" or "single stage".

6.8 Double Stage LED Drivers

The Double Stage SMPS LED driver systems are the "state of the art topologies" in which a first stage AC/DC PFC sub-circuit (boost, typically) converts, under near unity power factor, the inputted unregulated AC Voltage into a pre-regulated outputted DC voltage, and a following second stage DC/DC PWM sub-circuit (buck, buck-boost or flyback) converts the inputted pre-regulated DC voltage into an outputted Regulated DC Voltage, while controlling, precisely, the LED stripes current amount, as well. The double stage system uses two integrated circuits (one PFC and one PWM) controllers, two MOSFET buffers and two oscillating inductors, besides 40-60 other lower cost parts, fact which increase, substantially its cost and size, with respect to the single stage solution.

6.9 Single Stage SMPS LED Drivers

The Single Stage SMPS LED driver systems are the "cost effective topologies" in which only one sub-circuit performs both, the PFC and the PWM functions, using only one integrated circuit, one MOSFET buffer transistor and one oscillating inductor, saving 20-50% of the circuit parts count, size and cost, with respect to the Double Stage topology, under lower performance.

More details related to the SMPS LED Drivers advantages and shortcomings will be presented hereinbelow.

7. Monolithic LED Driver Circuits

It will be appreciated that the monolithic LED drivers could be considered "the ideal LED drivers of the future", because they are capable of reducing a 30-100 components SMPS LED driver circuit, down to only "one solid state component", respectively down to just one microchip capable of driving LED stripes in a very safe and reliable CVCC manner, featuring top performance in AC circuits, as well, such as Eff>95%, PF>0.99 and A.THD<5%.

Additional grounds for designers to do their best to develop and promote, shortly, this very new technology into the worldwide market, consist in their amazingly small size (miniature surface mount chip which can fit in any small lamp or even inside of a LED or LED Array's package) and their "virtually unlimited life time" which will solve, at last, the main issue the SMPS drivers are facing right now.

The main shortcomings of conventional monolithic LED drivers are lower utilization factor, higher flickering coefficient and dependence on a specific number of LEDs per stripe, for any given supply voltage amount.

Nevertheless by considering on one hand, the very short time that has passed since this new technology has left the pioneer designers R&D bench and on the other hand, the endless potential advantage offered by these devices, chances are for the monolithic LED driver to become "the monolithic LED lamp retrofit" of the future, reaching top performances and a manufacturing cost lower than the manufacture cost of our conventional Edison bulb, today.

Therefore, the present specification provides only ten SMPS LED driver embodiments and twenty Monolithic LED embodiments.

More details related to the Monolithic LED Drivers advantages and shortcomings will be presented hereinbelow.

8. LED Drivers Comparison Criteria

For a fair evaluation with respect to the quality versus cost feature of each particular LED driver, versus other drivers provided by hundreds of power management product manufacturers, worldwide, first it is recommended to separate them in "similar drivers groups" and after that to set up suitable criteria of comparison.

Besides the very conventional boost, buck, buck-boost and isolated non isolated (single ground) flyback topologies mentioned above, there are many other options available for designers, for improving or optimizing a driver's performance, size and cost, by choosing the Continuous Mode, the Discontinuous Mode or the Critical Conduction Mode of operations, executed in a Fixed Frequency, Constant ON Time Variable Frequency, or Constant Off Time Variable Frequency manner, and therefore, it is not easy to make a direct comparison in such a hot market where, "revolutionary innovations" are advertised, worldwide, almost on a monthly basis.

The complexity of choices a circuit designer faces is endless and by considering the fact that the high power LED drivers industry has only about five years of competitive history, the common sense conclusions are:

a) there is no proven "ideal LED lamp retrofit" in the existing market, at this time.

b) there could be many other ways to design a LED driver circuit and sufficient room for improvements.

c) the only way to evaluate, fairly, the quality of a new LED driver circuit, is to compare it with several existing solutions operating in the same range of power and following the same (or similar) topology provided by the top experts of the power management industry.

An evenhanded comparison is supposed to be based on at least 14 key data arranged in a "Parts and Performance Chart" approach, providing sufficient information about the size, quality and cost features of each LED driver, such as:

1) Parts Count section, including the expensive parts amount (in parenthesis) shows the system complexity and provides indications of the circuit's size and cost.

2) Integrated Circuits section, including expensive optocouplers (in parenthesis), shows the number of controller chips required by a particularly design.

3) Transistors section, including expensive FET transistors (in parenthesis), shows the number of transistors required by a particularly design.

4) Diodes section, including the more expensive bridge, Schottky and fast recovery (in parenthesis) shows the number of diodes required by a particularly design.

5) Capacitors section, including unreliable, bulky and expensive electrolytic capacitors (in parenthesis) shows the number of capacitors required by a particularly design.

6) Inductors section, including unreliable, bulky and expensive transformers (in parenthesis) shows the number of coils required by a particularly design.

7) Resistors section, including more expensive larger size high power current sense resistors (in parenthesis) shows the number of resistors required by a particularly design.

8) Efficiency section shows the driver's quality to put money back in its end user's pocket, offering more light but lower monthly electricity bill, than other drivers.

9) Power Factor showing the amount of overheat eliminated from the national power grid and environment.

10) A.THD showing the degree of pollution saved from the national power grid and environment (radio noise).

11) LED Stripes CCS section shows how many LED stripes a particularly LED driver can control in a very safe CVCC (constant voltage constant current) mode of operations.

12) Board Size section shows if the driver can fit or not in small or flat bulb retrofits, and could be Extra Large (EL), Large (L), Medium (M), Small (S) and Very Small (VS).

13) Total Cost section indicate the relative cost of the driver's parts and labor, estimated as Very High (VH), High (H), Medium (M), Low (L) and Very Low (VL).

14) Lifetime section shows the pre-estimated lifetime of a driver, function of the lifespan of its components, measures in years (yrs) of operations at 24 hours a day use, showing also the degree of hope the end user may have to recover partially, or in full, the much higher cost price he had to pay for this amazingly efficient but still fragile LED lamp retrofit (i.e., important feature and sales point).

Accordingly, the present specification provides a detailed description of the related art, created over the years by leading LED Driver designers.

Since the LED driver is a vital component of all LED lamp retrofits and therefore, in various embodiments, the present specification provides novel LED driver systems featuring low component count, smaller size, lower cost, longer lifetime and higher electrical performances than most of the high quality LED drivers, existing in the worldwide market.

In order to achieve this goal for each kind of LED lamp retrofit required by the existing market, the LED driver embodiments described herein provides one specific topology, such as boost, buck-boost or flyback, applied in a double stage or single stage manner and of course, using fixed or variable frequency techniques approach, for optimizing all the parameters involved in a high quality/low cost LED driver's design.

In the same light, several novel circuit embodiments are provided targeting high quality low cost monolithic LED drivers, have been included in this specification.

For a fair appreciation of the value, importance and/or immediate need of each improvement or novel system presented herein, each embodiment will be fully described and presented, comparatively, in accordance with the same 14 key factors mentioned above, with a very similar high quality LED driver solution, published in Datasheets, Application Notes or technical Magazines by companies having very good reputation in the worldwide power management industry, such as: Texas Instruments, Fairchild, Power Integrations, Maxim, Seoul Semiconductor, Linear Technology, Intersil, Exclara, Supertex, and others.

9. Related Art—SMPS LED Drivers 9.1 Double Stage Off-line Boost-Flyback Isolated SMPS—TI A double stage off-line boost-flyback circuit example, suitable to the context of the present specification, is revealed in the Texas Instruments (TI) publication "SLUU341B" entitled "*PR883: A300-W, Universal Input, Isolated PFC Power Supply for LCD TV Applications*", published in December 2008, capable of providing a constant output voltage of 24 V for loads up to 12 A at high performance complying with the power quality meeting the Energy Star requirements and the IEC standards. It achieves state of the art double stage circuit control methods including, as a first stage, a boost pre-regulator securing a near unity power factor in an off-line (85-265 Vrms) range of input voltage and, as second stage, an LLC resonant DC-DC isolated flyback converter. The control system design requires five integrated circuits, such as the UCC28061 for the first stage, the UCC25600 as well as two opto-couplers H11AV1A-M using the TL431AIDBV voltage reference for the second stage, and the UCC2813D-4 for an extra flyback converter, providing bias supplies to the entire system.

The most significant data of the SMPS circuit described above, collected from Table 1 (page 2) and Table 4 (pages 19, 20, 31) of the above-referenced TI publication are provided in the parts and performance chart shown below.

The SMPS circuit's performances specifications collected from Table 1 (page 2) and the components amount of each category, collected from Table 4 (pages 19, 20, 31) of the above-referenced TI publication, are summarized in Table 1, below.

TABLE 1

Double Stage Off Line Isolated Boost-Flyback Driver-Texas Instruments

| | | | |
|---|---|---|---|
| 1 | Parts Count (expensive) | 136 | (32) |
| 2 | Integrated Circuits-(opto-couplers) | 5 | (2) |
| 3 | Transistors-(FETs) | 8 | (5) |
| 4 | Diodes-(bridge & fast recovery) | 14 | (9) |
| 5 | Capacitors-(electrolytic) | 50 | (11) |
| 6 | Inductors-(Transformers) | 3 | (3) |
| 7 | Resistors-(high power) | 56 | (2) |
| 8. | Efficiency (typ.) | 87% | |
| 9 | Power Factor (typ.) | 0.95 | |
| 10 | A. THD (typ.) | <10% | |
| 11 | LED Stripes CCS | 1 | |
| 12 | Board Size | VL | |
| 13 | Cost (total) | VH | |
| 14 | Lifetime (years) | 3 | |

The main advantage of this double stage SMPS circuit consist in the fact that provides I/O circuits isolation and the first stage (boost) converts the unregulated AC input voltage into a regulated (390V) DC voltage, so the second stage (flyback) will always have sufficiently high supply voltage amount for delivering to its load a precisely regulated DC voltage having very small ripples.

The main shortcomings of this circuit are:
Too many parts count.
Too many and expensive integrate circuits.
Too many expensive UIF diodes.
Too many bulky and unreliable electrolytic capacitors.
Too many bulky, unreliable and expensive inductors.
Very Large size of the driver board which does not allow its use in small size devices.
Very high cost solution, incompatible to the excepted cost of LED lamp retrofits operating in small and medium power range.

In contrast, the various embodiments disclosed provide several solutions to solve all the above mentioned inconveniences, including a novel double stage system embodiment and four "pseudo double stage" system embodiments capable to reach similar performances (Eff>87%, PF>0.99%, A.THD<10%) while reducing the parts count, size and cost in a ratio of 40-60% with respect to this particularly LED driver solution.

9.2 Double Stage SEPIC/Buck LED Driver—Supertex

A double stage SEPIC/buck LED Driver circuit example, suitable to the context of the disclosed embodiments, is shown in the Supertex, Inc. "HV9931DB2v1" chip presentation folder regarding a "LED Driver Demo Board Input 230 VAC//Output 350 mA, 40V" capable of providing a constant output voltage up to 40V to a 14 W load at very good performance. It achieves decent quality double stage circuit control methods including, as a first stage, a buck-boost (SEPIC) pre-regulator securing a near unity power factor in a range of 200-265 Vrms input voltage and, as second stage, a non isolated pack current limited Constant Off Time (COT) buck converter operating in a continuous conduction mode (CCM). The control system design requires only one MOSFET transistor and controller IC, the HV9931LG for both, first and second stages, having up 30% inductor current ripple.

The most significant data of the LED driver circuit described above, collected from the HV9931LG chip presentation folders are provided in the parts and performance chart shown below in Table 2.

TABLE 2

Double Stage Non-Isolated Off Line SEPIC/Buck LED Driver-Supertex

| | | | |
|---|---|---|---|
| 1 | Parts Count | 63 | (9) |
| 2 | Integrated Circuits-(opto-couplers) | 1 | (0) |
| 3 | Transistors-(FETs) | 5 | (1) |
| 4 | Diodes-(bridge & fast recovery) | 13 | (6) |
| 5 | Capacitors-(electrolytic) | 15 | (0) |
| 6 | Inductors-(Transformers) | 4 | (0) |
| 7 | Resistors-(high power) | 25 | (2) |
| 8 | Efficiency (typ.) | 87% | |
| 9 | Power Factor (typ.) | 0.95 | |
| 10 | A. THD (typ.) | <10% | |
| 11 | LED Stripes CCS | 1 | |
| 12 | Board Size | M | |
| 13 | Cost (total) | M | |
| 14 | Lifetime (years) | 3 | |

The main advantages of this particular converter circuit is that it uses only one MOSFET transistor and one integrated circuit to control both stages, does not use electrolytic capacitors and eliminates the need for opto-couplers or differential sensing voltage amplifiers by using the SEPIC buck-boost configuration which allows the controller IC to sense the LEDs current with respect to a common ground.

The main shortcomings of this circuit are:
No Isolation between the input and the output circuits.
Too many parts count.
Too many and bulky coils
Too many and expensive UIF diodes.
High current ripples of the inductor.
Medium size of driver board which does not allow its use in very small size LED lamp retrofits.
Relatively high cost for small range power retrofits.
The SEPIC capacitor (E31) is bulky, expensive and it may lead to instability, in time, at high frequency AC current, shortening the retrofit's lifespan.

The present specification provides several embodiments to overcome the above mentioned shortcomings, including a novel double stage system embodiment and four "pseudo double stage" system embodiments capable to reach similar performances (Eff>87%, PF>0.99%, A.THD<10%) while reducing the parts count, size and cost in a ratio of 25-30% with respect to this particularly LED driver solution.

9.3 Boost Single Stage Off Line LED Driver—Intersil

A boost single stage LED Driver circuit example, suitable to the context of the present specification, is illustrated and described in the Intersil application note AN1387.0 entitled "*White LED Driver Circuits for Off-Line Applications using Standard PWM Controllers*", published on Feb. 12, 2009 for the use of its proprietary ISL6445IAZ-TK integrated circuit (IC), which is a capable of operating in three different topologies, such as Single Stage Boost, Single Stage (SEPIC) Buck-boost and Single Stage Flyback LED driver circuits. This single stage boost LED driver application illustrated in FIG. 12 of the above-reference Intefrsil publication. Detailed Boost Converter Schematic (page 11), of the publication, is a very conventional one, using the ISL6445IAZ-TK chip as a PWM/PFC controller and a second dual operational amplifier LM358 (Texas Instruments) chip for controlling, differentially, the voltage and current across the LEDs, with respect to a high precision micro-power shunt voltage reference chip LM4041 (Texas Instruments). The circuit is capable of reaching near unity power factor, operating in critical conduction mode (CrCM) and delivering an output voltage of 250 Vdc, when is supplied at 90-120 Vac (Japan and USA), being designed for high power LED panels using over 50 LEDs per one stripe, and it requires an additional operational amplifier for securing the constant current of each additional LED stripe.

The most significant data of the LED driver circuit described above collected from the ISL6445IAZ-TK chip presentation folders are summarized in Table 3 below.

TABLE 3

| | Boost Single Stage Off Line LED Driver-Intersil | | |
|---|---|---|---|
| 1 | Parts Count (expensive) | 42 | (11) |
| 2 | Integrated Circuits-(opto-couplers) | 3 | (0) |
| 3 | Transistors-(FETs) | 2 | (1) |
| 4 | Diodes-(bridge & fast recovery) | 13 | (6) |
| 5 | Capacitors-(electrolytic) | 11 | (3) |
| 6 | Inductors-(Transformers) | 2 | (0) |
| 7 | Resistors-(high power) | 19 | (1) |
| 8 | Efficiency (typ.) | 90% | |
| 9 | Power Factor (typ.) | >0.9 | |
| 10 | A. THD (typ.) | <20% | |
| 11 | LED Stripes CCS | 1 | |
| 12 | Board Size | M | |
| 13 | Cost (total) | L | |
| 14 | Lifetime (years) | 3 | |

The main advantage of this particular single stage boost converter circuit is the higher efficiency it provides over all the other topologies, very important feature in high power application.

The main shortcomings of this circuit are:
a) No I/O circuits isolation.
b) Too many parts for a single stage boost converter.
c) Three integrated circuits instead of one.
d) The ISL6445IAZ-TK chip supply circuit is too large and expensive, consisting in a high voltage series regulator, including a high voltage (350V) transistor, a zener diode, and four resistors.
e) Requires unreliable electrolytic capacitors.
f) CCS for only one LED stripe.
g) Minimum 50 LEDs per stripe, at 120 Vac supply.

Various embodiments according to the present specification provide several solutions to solve all the above mentioned inconveniences, including a novel boost single stage system embodiment capable to reach better performances (Eff>93%, PF>0.99%, A.THD<10%) while reducing the parts count, size and cost in a ratio of 15-20% with respect to this particularly LED driver solution.

9.4 Buck-Boost S. Stage LED Driver—Supertex Vs. UTC

A Buck-boost single stage low cost LED Driver circuit example, suitable to the context of the present specification, is shown in the Supertex, Inc. "HV9921" chip presentation folder regarding its minimum parts "3-Pin Switch-Mode LED Driver IC" capable of providing a constant output current of 20 mA to LED stripe despite an extremely large (85-264 Vrms) variation of the AC supply voltage. This was the most simple and low cost DC/DC LED driver, however, because it uses the COT (constant off time variable frequency) mode of operation, in AC/DC applications it has serious problems with the PF and A.THD parameters. For solving the PF and A.THD issues in the AC applications of the HV9921 chip, Supertex has recommended the use of a low cost passive PFC solution, consisting in a precisely calculated LC filter (one coil two capacitors) and eventually, Supertex has introduced its upgraded chip HV9931LG, described above, which was able to provide near unity power factor (PF=0.98) in a double stage topology.

The Chinese designers have followed up, shortly, this very low cost solution, advertising similar solution using the capabilities of a new generation of affordable eight pin COT driver chips, including the QX9910, provided by QXMD and the UCT4390, provided by UCT.

The variable frequency-constant off time single stage buck-boost LED driver circuit advertised by UCT in the UCT4390 chip's datasheets features reasonable performance in AC applications by using a conventional "valley fill filter" passive PFC circuit, consisting of two capacitors coupled in series across the output of the supply rectifier bridge, having a first rectifier diode coupled between them and two extra rectifier diodes, coupled from the anode and the cathode of the first rectifier diode to the positive and the negative outputs of the bridge rectifier, in such a manner for the capacitors to have a series charging circuit and a parallel discharging circuit. Since the equivalent capacitance of two equal valued capacitors coupled in series is half of each capacitor and in parallel circuit is double of each capacitor, the power factor is significantly improved (typically 0.85-0.9), especially if additional low pass (or EMI) filters, consisting of one double coil and two capacitors, are included into the AC supply circuit.

The most significant data of the LED driver circuit described above, collected from the UTC4390 chip presentation folders are summarized in Table 4 below.

TABLE 4

| | Buck-boost Single Stage Off-line Low Cost LED Driver-UTC | | |
|---|---|---|---|
| 1 | Parts Count | 32 | 10 |
| 2 | Integrated Circuits-(opto-couplers) | 1 | (0) |
| 3 | Transistors-(FETs) | 2 | (2) |
| 4 | Diodes-(bridge & fast recovery) | 11 | (1) |
| 5 | Capacitors-(electrolytic) | 10 | (5) |
| 6 | Inductors-(Transformers) | 2 | (1) |
| 7 | Resistors-(high power) | 6 | (2) |
| 8. | Efficiency (typ.) | 80% | |
| 9 | Power Factor (typ.) | 0.85 | |
| 10 | A. THD (typ.) | <30% | |
| 11 | LED Stripes CCS | 1 | |
| 12 | Board Size | M | |

TABLE 4-continued

Buck-boost Single Stage Off-line Low Cost LED Driver-UTC

| 13 | Cost (total) | L |
| 14 | Lifetime (years) | 2 |

The main advantages of this particular constant off time LED driver circuit are: low component count, medium size board and low total manufacturing cost, fact which made China the #1 provider of fluorescent LED lamps retrofits in the entire South Asia's market and a major competitor in the worldwide market.

The main shortcomings of this circuit are:
Short lifetime because of the electrolytic capacitors.
No Isolation between the input and the output circuits.
Too many bulky and unreliable electrolytic capacitors.
The need for 2-3 EMI filters for reaching PF=0.9.
No voltage control over the LED stripe.
Supplies the IC controller via a second FET transistor.
Bulky coils and capacitors increase the board size.
Relatively low performance versus other solutions.

The present specification provides several embodiments to overcome the above mentioned shortcomings, including novel and lower cost COT LED driver circuit embodiments used with valley fill filters and/or used as second stage DC/DC converters in low cost high power factor (PF=0.99) double stage LED lamp retrofit driver circuit embodiments.

9.6 Buck-Boost Single Stage LED Driver—PI

A buck-boost single stage LED driver circuit example, suitable to the context of the present specification, is shown in the Power Integrations (PI) "Constant Current <2% Regulation) Non-Isolated Buck-Boost, Power Factor Corrected 18 W LED Driver Using LinkSwitch—PH LNK419EG" design example report of Dec. 8, 2011.

This driver circuit is capable to provide a 200V voltage and 90 mA current+/−30% ripple DC output in an AC supply range of 90-265V.

The LNK419EG controller chip includes the MOSFET buffer and is capable of limiting converter output current maintaining a near unity power factor and does not use opto-couplers and operational amplifiers for sensing the output current, but a 11 parts feedback circuit including a voltage shunt regulator chip LMV431AIMF a high voltage transistor FMMT560, 2 diodes, 5 resistors and 2 capacitors The most significant data of the LED driver circuit described above, collected from the LNK419EG chip presentation folders are summarized in Table 5 below.

TABLE 5

Buck-boost Single Stage Off-line LED Driver-Power Integrations

| 1 | Parts Count (expensive) | 37 | (7) |
| 2 | Integrated Circuits-(opto-couplers) | 1 | (0) |
| 3 | Transistors-(FETs) | 1 | (0) |
| 4 | Diodes-(bridge & fast recovery) | 7 | (4) |
| 5 | Capacitors-(electrolytic) | 10 | (2) |
| 6 | Inductors-(Transformers) | 3 | (0) |
| 7 | Resistors-(high power) | 15 | (1) |
| 8. | Efficiency (typ.) | 89% | |
| 9 | Power Factor (typ.) | >0.92 | |
| 10 | A. THD (typ.) | <30% | |
| 11 | LED Stripes CCS | 1 | |
| 12 | Board Size | S | |
| 13 | Cost (total) | L | |
| 14 | Lifetime (years) | 3 | |

The main advantages of this particular buck-boost converter circuit are: the controller chip LNK419EG includes the large and expensive MOSFET buffer, is capable to control the output current while keeping the power factor near unity and does not use expensive opto-couplers and operational amplifiers for current feedback but lower cost passive parts and a bipolar transistor.

The main shortcomings of this circuit are:
No Isolation between the input and the output circuits.
The current feedback requires too many parts (11).
Transistors are instable with variation of temperature.
High current ripples of the output current (30%).
Too many and expensive UIF diodes.
Relatively high cost for small range power retrofits.

The present specification provides several embodiments to overcome the above mentioned shortcomings, including a single stage single ground buck-boost system embodiment capable of reaching better performances (Eff>88%, PF>0.99%, A.THD<10%) while reducing the parts count, size and cost in a ratio of 20-35% with respect to this particularly LED driver solution.

9.3 Flyback S. Stage Non-Isolated LED Driver—Intersil

A flyback single stage LED Driver circuit example, suitable to the context of the present specification, is illustrated and described in the Intersil application note AN1387.0 entitled "*White LED Driver Circuits for Off-Line Applications using Standard PWM Controllers*", published on Feb. 12, 2009 for the use of its proprietary ISL6445IAZ-TK integrated circuit (IC), which is a capable to operate in three different topologies, such as Single Stage Boost, Single Stage (SEPIC) Buck-boost and Single Stage Flyback LED driver circuits. This single stage non-isolated flyback LED driver application illustrated in FIG. 14 of the above-referenced Intersil publication. "*Detailed Flyback Converter Schematic*" (page 13) is a very conventional one, using the same components as the Intersil boost converter described above, respectively the ISL6445IAZ-TK chip as a PWM/PFC controller and a dual operational amplifier LM358 chip for controlling, differentially, the voltage and current across the LEDs, with respect to a high precision micro-power shunt voltage reference chip LM4041. The main differences with respect to the boost circuit consists of the fact that the flyback inductor is a two coils transformer and therefore, a three parts conventional snubber circuit, consisting of one diode, one resistor and one capacitor, has been added in the drain circuit of the MOSFET buffer (Q1), for high voltage limitation.

The circuit is capable of reaching near unity power factor, operating in critical conduction mode (CrCM) and delivering an output voltage, usually, lower than the input AC voltage (90-260 Vac) having the capably to supply one stripe of one or more LEDs connected in series and requiring an additional operational amplifier for securing the constant current of each additional LED stripe.

The most significant data of the flyback LED driver circuit described above, collected from the ISL6445IAZ-TK chip presentation folders is summarized in Table 6 below.

TABLE 6

Flyback Single Stage Off-line Non-Isolated LED Driver-Intersil

| 1 | Parts Count (expensive) | 53 | (13) |
| 2 | Integrated Circuits-(opto-couplers) | 3 | (0) |
| 3 | Transistors-(FETs) | 2 | (1) |
| 4 | Diodes-(bridge & fast recovery) | 14 | (7) |
| 5 | Capacitors-(electrolytic) | 12 | (3) |
| 6 | Inductors-(Transformers) | 2 | (1) |

TABLE 6-continued

Flyback Single Stage Off-line Non-Isolated LED Driver-Intersil

| | | | |
|---|---|---|---|
| 7 | Resistors-(high power) | 20 | (1) |
| 8. | Efficiency (typ.) | 80% | |
| 9 | Power Factor (typ.) | >0.9 | |
| 10 | A. THD (typ.) | <20% | |
| 11 | LED Stripes CCS | 1 | |
| 12 | Board Size | M | |
| 13 | Cost (total) | M | |
| 14 | Lifetime (years) | 3 | |

The main advantage of this particular single stage non-isolated flyback converter circuit consists of its very safe and accurate control of the LED current and voltage, via the two operational amplifiers included in the LM358 and the precise reference provided by the LM4041 voltage shunt regulator, despite large variations of the ambient temperature.

The main shortcomings of this circuit are:
a) No I/O circuits isolation.
b) Too many parts for a single stage boost converter.
b) Three integrated circuits instead of one.
c) Too many parts (6) used for the controller chip supply.
d) Requires bulky and unreliable electrolytic capacitors.
e) CCS for only one LED stripe.
f) Higher cost than other similar topology solutions.

The present specification provides several embodiments to overcome the above mentioned shortcomings, including a novel non-isolated and isolated single stage LED driver system embodiment, capable of reaching better performances (Eff>88%, PF>0.99%, A.THD<10%) while reducing component count, size and cost in a ratio of 30-50% with respect to this particularly LM4041 LED driver solution.

9.7 Flyback Single Stage Isolated LED Driver—Fairchild

A flyback single stage isolated LED driver circuit example, suitable to the context of the present specification, is shown in the Fairchild application note AN-9737 entitled "*Design Guide for Single-Stage Flyback AC-DC Converter Using FL6961 for LED Lighting*" presenting a 16.8 W power factor corrected LED driver, delivering an output of 24V/0.7 A and featuring soft-starting and CVCC feedback for a very accurate (cycle-by-cycle) and reliable control of the LED stripe's V/I parameters.

The FL6961 controller chip operates in constant on-time (variable off time) and CrCM (critical conduction mode, at the boundary between the discontinuous and continuous mode of operation) for securing a good power factor while controlling also the LEDs maximum voltage and current. The FL6961 chip supply voltage is obtained via an additional winding added to the flyback transformer and the output voltage/current feedback is conventional, using the KA358 dual error amplifier, the KA431 voltage shunt regulator as reference and the FOD817 opto-coupler, for securing the input/output circuits isolation.

The most significant data of the LED driver circuit described above, collected from the LNK419EG chip presentation folders is summarized in Table 7 below.

TABLE 7

Flyback Single Stage Off-line Isolated LED Driver-Fairchild

| | | | |
|---|---|---|---|
| 1 | Parts Count (expensive) | 47 | (17) |
| 2 | Integrated Circuits-(opto-couplers) | 4 | (1) |
| 3 | Transistors-(FETs) | 1 | (1) |

TABLE 7-continued

Flyback Single Stage Off-line Isolated LED Driver-Fairchild

| | | | |
|---|---|---|---|
| 4 | Diodes-(bridge & fast recovery) | 9 | (4) |
| 5 | Capacitors-(electrolytic) | 13 | (3) |
| 6 | Inductors-(Transformers) | 4 | (1) |
| 7 | Resistors-(high power) | 16 | (7) |
| 8. | Efficiency (typ.) | 82% | |
| 9 | Power Factor (typ.) | >0.9 | |
| 10 | A. THD (typ.) | <20% | |
| 11 | LED Stripes CCS | 1 | |
| 12 | Board Size | S | |
| 13 | Cost (total) | M | |
| 14 | Lifetime (years) | 3 | |

The main advantages of this particular flyback converter circuit are: uses only one chip to control the output current and voltage while keeping the power factor near unity, uses precise and reliable voltage shunt regulator and operational amplifiers for voltage and current feedback and uses opto-coupler for securing the input/output circuits isolation.

The main shortcomings of this circuit are:
Many parts count.
Expensive V/I feedback circuit.
Higher cost than other isolated flyback solutions.
CCS for only one LED stripe.
Larger Vout ripples than double stage solutions.

The present specification provides several embodiments to solve the above mentioned shortcomings including single stage isolated flyback and double stage multi-columns LED driver system embodiments capable of reaching better performance (Eff>85%, PF>0.99%, A.THD<10%) while reducing component count, size and cost in a ratio of 20-35% with respect to this particularly LED driver solution.

9.8 Flyback Single Stage Isolated LED Driver—PI

A flyback single stage isolated LED driver circuit example, suitable to the context of the present specification, is shown in the Power Integrations (PI) RDR-193 application entitled "*Reference Design Reports for s High Efficiency (>81%), High Power Factor (>0.9) TRIAC Dimmable 7W LED Driver Using LinkSwitch—PH LNK403EG*" presenting a 7 W power factor corrected LED driver, delivering an output of 21V/0.33 A in a supply range of 90-265 VAC.

The LNK403EG controller chip operates in CCM (continuous conduction mode of operations) and the output current regulation is sensed entirely from the primary side of the flyback transformer eliminating the need of the expensive opto-coupler, operational amplifier and voltage shunt regulator connected, usually, in the flyback secondary side.

The most significant data of the LED driver circuit described above collected from the LNK403EG chip presentation folders is summarized in Table 8 below.

TABLE 8

Flyback Single Stage Off-line Isolated LED Driver-Power Integrations

| | | | |
|---|---|---|---|
| 1 | Parts Count (expensive) | 50 | (13) |
| 2 | Integrated Circuits-(opto-couplers) | 1 | (0) |
| 3 | Transistors-(FETs) | 3 | (1) |
| 4 | Diodes-(bridge & fast recovery) | 12 | (5) |
| 5 | Capacitors-(electrolytic) | 12 | (5) |
| 6 | Inductors-(Transformers) | 3 | (1) |
| 7 | Resistors-(high power) | 19 | (1) |
| 8. | Efficiency (typ.) | 81% | |

TABLE 8-continued

Flyback Single Stage Off-line Isolated LED Driver-Power Integrations

| | | |
|---|---|---|
| 9 | Power Factor (typ.) | >0.9 |
| 10 | A. THD (typ.) | <20% |
| 11 | LED Stripes CCS | 1 |
| 12 | Board Size | S |
| 13 | Cost (total) | M |
| 14 | Lifetime (years) | 3 |

The main advantages of this particular flyback converter circuit are: uses only one chip to control the output current and voltage while keeping the power factor near unity, the MOSFET buffer is included in the controller chip and senses the LEDs current from the primary section of the flyback transformer for securing the input/output circuits isolation and eliminating the need for the expensive conventional current feedback circuit.

The main shortcomings of this circuit are:
Many parts count.
Too many (5) electrolytic capacitors.
Requires an ultra fast diode in the buffer circuit.
Higher cost than other isolated flyback solutions.
Relatively low Eff and PF for high cost.
CCS for only one LED stripe.
Larger Vout ripples than double stage solutions.

The present specification provides several embodiments to solve the above mentioned shortcomings, including a single stage isolated flyback and a double stage multi-columns LED driver system embodiments capable to reach better performances (Eff>88%, PF>0.99%, A.THD<10%) while reducing the parts count, size and cost in a ratio of 20-25% with respect to this particularly LED driver solution.

9.9 Flyback Single Stage Isolated LED Driver—LT

A flyback single stage isolated LED driver circuit example, suitable to the context of the present specification, is shown in the Linear Technology (LT) demo manual DC1744A entitled "*LT3799 Offline Isolate Flyback LED Driver with PFC*" presenting a power factor corrected LED driver capable to deliver 4-100 W to an LED display in a supply range of 90-265 VAC.

The LT3799 controller chip operates in critical conduction mode (CrCM, at the boundary between the discontinuous and continuous mode of operation, similar to the Fairchild's FL6961, presented above) for securing a good power factor while controlling also the output current regulation (similar to the PI's LNK403EG) entirely from the primary side of the flyback transformer eliminating the need of the expensive opto-coupler, operational amplifier and voltage shunt regulator connected, usually, in the flyback secondary side.

The most significant data of the LED driver circuit described above, collected from the LT3799 chip presentation folders is summarized in Table 9 below.

TABLE 9

Flyback Single Stage Off-line Isolated LED Driver-Linear Technology

| | | | |
|---|---|---|---|
| 1 | Parts Count (expensive) | 41 | (9) |
| 2 | Integrated Circuits-(opto-couplers) | 1 | (0) |
| 3 | Transistors-(FETs) | 1 | (1) |
| 4 | Diodes-(bridge & fast recovery) | 6 | (5) |
| 5 | Capacitors-(electrolytic) | 11 | (1) |
| 6 | Inductors-(Transformers) | 4 | (1) |
| 7 | Resistors-(high power) | 18 | (1) |

TABLE 9-continued

Flyback Single Stage Off-line Isolated LED Driver-Linear Technology

| | | |
|---|---|---|
| 8. | Efficiency (typ.) | >80% |
| 9 | Power Factor (typ.) | >0.9 |
| 10 | A. THD (typ.) | <20% |
| 11 | LED Stripes CCS | 1 |
| 12 | Board Size | S |
| 13 | Cost (total) | VH |
| 14 | Lifetime (years) | 3 |

The main advantages of this particular flyback converter circuit are: uses only one chip to control the output current and voltage while keeping the power factor near unity and senses the LEDs current from the primary section of the flyback transformer, eliminating the need for the expensive conventional error amplifier feedback circuit and opto-coupler for securing the I/O circuits isolation, using only one electrolytic capacitor.

The main shortcomings of this circuit are:
LT's driver solutions and parts are very expensive.
Relatively low Eff and PF for very high cost.
CCS for only one LED stripe.
Larger Vout ripples than double stage solutions.

The present specification provides several embodiments to solve the above mentioned shortcomings, including a single stage isolated flyback and a double stage multi-columns LED driver system embodiments capable to reach better performances (Eff>88%, PF>0.99%, A.THD<10%) while reducing component count, size and cost in a ratio of 20-25% with respect to this particularly LED driver solution.

10. Related Art—Monolithic LED Drivers 10.1 Low Dissipation Controllable Electron Valve A patent entitled "Low Dissipation Electron Valve For Controlling Energy Delivered To A Load And Method Therefore" was issued on Jan. 28, 1997, as U.S. Pat. No. 5,598,093, where the inventor, Beniamin Acatrinei (author of the present specification) has revealed a new and original way of controlling the transfer of the electrical energy from an AC generator to a load by using the capabilities of a novel and extremely versatile "electron valve" called the "Benistor", name coming from its "Blockade of Electrical Network" capability leading to an original "SSCVCC" (self-switching constant voltage constant current) mode of operation.

Unlike the previously invented solid state electron valves, such as the "transistor" and "thyristor" (SCR—Silicon Control Rectifier), the Benistor is able to control a high power rectified AC sine wave and deliver a suitable electrical supply to any kind of loads (including LEDs) in linear, switching and/or SSCVCC operations manner, without requiring an external driver circuit (similar to the transistor) and also, without dissipating significant energy internally (similar to the thyristor).

By using this original SSCVCC mode of operation, the Benistor eliminates the needs for coils and capacitors used in most conventional AC/DC or DC/DC converters and, in circuits where it is coupled, directly, between a bridge rectifier ("BR") and a load, the Benistor delivers to its load a continuous (by switching ON) or interrupted (by switching OFF) DC supply, in such a manner as to always keep the voltage across the load within pre-established limits, despite large variations of its input supply (BR's output) voltage.

The Benistor can operate in a linear manner, as well, for keeping the load current within pre-established limits, although this mode of operation is not as efficient as the self-switching one.

For being able to perform this complex SSCVCC mode of operations, the "conventional" Benistor relies on seven in/out terminals, such as:

a "Vin" (voltage input) input power terminal coupled to the BR's positive output, a "CE" (common electrode) terminal coupled to the BR's negative output (or ground, "GND"), a "Vout" (voltage output) output power terminal coupled across the load, jointly with the CE terminal, an "ON-OFF" voltage control input terminal which turns ON an internal switch between Vin and Vout when Vin<Von-off and turns OFF the internal switch between Vin and Vout when Vin>Von-off an "OFF-ON" voltage control input terminal which does the same self-switching job but in opposite phase with respect to the ON-OFF input terminal.

a "CC+" voltage control input terminal operating "in positive phase" with the output, respectively the current delivered by Vout increases when the amount of the voltage applied a the CC+ terminal increases, and a "CC−" terminal which operates opposite than CC+.

This extremely versatile device has its own electrical symbol, similar to a vacuum tube and multi-terminal transistor devices, and does not require external components but only fixed or variable DC voltage applied to its terminals, for operating like a transistor, thyristor, operational amplifier, window comparator, CCS (constant current sink), VCS (voltage controlled switch), and of course, similar to the conventional complex transistors circuits, "Benistors complex circuits" could be achieved, where two or more Benistors could be connected in very many configurations, such as: series, parallel, mirror, totem pole, push-pull, etc.

Despite the fact that the Benistor's internal block schematic circuit appears sophisticated, especially because of its seven terminals, minimum parts Benistors may have as few as three terminals (like a transistor) and internally, only a two transistors circuit, looking similar to the conventional thyristor's equivalent circuit (i.e., NPN and PNP transistors coupled mutually, base-collector) with one difference being the base of the NPN transistor is "in air" (not connected) for allowing many other ways to connect the two transistors with the external circuit and of course, to make available many additional applications.

Because of its amazing simplicity and versatility, on Jul. 6, 1998 the Benistor achieved the "Cover Feature Story" award of Electronic Design Magazine, a very good reputation technical publication, where the Benistor was called "The Fourth Element", which appeared in the worldwide electronic industry after the only three other "electron valves" created over the last one hundred years, such as the vacuum tube, the transistor, and the thyristor.

Unfortunately, at that time there were no "Ultra Bright White LED" and no "LED Lamp Retrofits" applications where the Benistor could confirm its special capabilities.

Therefore, in accordance with the present specification, several embodiments are provided that employ the Benistor's concept for achieving low cost, small size, no coils or capacitors and, eventually, no external parts monolithic LED driver, the "chip" which could be the main component of future "ideal" LED lamp retrofit devices.

10.2 System for Providing AC Line Power to Lighting Devices—Exclara

A patent application entitled "Apparatus, Method And System For Providing AC Line Power To Lighting Devices" has been published on Dec. 9, 2010, as the US Patent Application Publication No. 2010/0308739 A1 (Inventors: Shteynberg et. al., Assignee: Exclara, Inc.) revealing several LED driver converter circuits comprising no reactive components, but only solid state components such as transistors and resistors, parts which can be integrated into a "driver chip", eventually.

Exclara, Inc. is one of the active "pioneers" in the LED lighting industry which devoted a significant part of its product development course for eliminating completely the unreliable, bulky and expensive reactive components, such as coils and capacitors, targeting a "monolithic LED driver" device which could be executed fast and cost effectively in a silicon foundry, for reducing the size and cost of the LED lamp retrofits and, more importantly, to increase the maximum lifetime of these efficient devices, since the solid state devices feature a "virtually unlimited lifetime", while the electrolytic capacitors "get dry", and compromise the lifespan of the entire LED lamp in just about 2 years of use, at 24 hours per day.

The embodiments presented in the above mentioned patent application publication, show a solid state "Controller" circuit features a relatively complex block schematic diagram, comprising a "Digital Logic Circuit" which activates or deactivates several "Switch Driver" devices which, external to the main Controller circuit, connect or disconnect several LED stripes included in a rectified AC supply circuit, in specific sequences determined by several other sub-circuits, such as: A/D Converters, Sync Signal Generator, Vcc Generator, Over Voltage Detector, Under voltage detector, Power On Reset, Memory and a Clock sub-circuit which establish the sequences timing, respectively the precise time when each Switch Driver connects or disconnects its designated LED stripe.

Each Switch Driver is equipped with a power MOSFET transistor, controlled in the gate by a fast driver including a comparator followed by a push-pull buffer, in order to increase the commutation speed and, implicitly, to decrease the On-Off transit time dissipation of each Switch Driver's power MOSFET transistor.

Eventually, by means of several voltage and current sensors input compared with internal voltage references and/or the logic data existing in the Memory sub-circuit, following a set of instructions shown in FIG. 22 of the above mentioned patent application publication, the Controller circuit connects, progressively, the LED stripes in such a manner, that when the amount of the voltage delivered by the bridge rectifies reaches its peak value (i.e., 170V for 120 Vrms line used in USA), all LED stripes are to be connected in series, when the AC supply voltage reaches its half value, only half of the LED stripes are to be connected and, finally, when the AC supply voltage decays down to 20-30V, then only one LED stripe is to be connected to the power line.

In this way, the controller is able to limit the LED current in 4 or more steps, so the current shape of the LED lamp retrofit device will appear like a "pyramid", of 4 or more "square waves" positioned one on top of the other, based on how many Switch Drivers have a specific controller chip, and because the LEDs current increases proportionally with the AC supply voltage amount, the driver can reach a power factor parameter of over 0.9, in accordance to the Department of Energy and Energy Star's latest directives.

The first LED driver chip, "EXC100" introduced in the market by Exclara is presented by a LED lamp retrofit manufacturer, Everlight (www.everlight.com) under the title "Everlight HV LEDs Driving Note" which provides the schematic diagram, electrical specs and the device's current versus voltage shape, showing that only three LED stripes are used, for retrofits operating in the 4-10 W power range.

The most significant data collected from Everlight's web site regarding Exclara's monolithic LED driver chip, the EXC100, is summarized in Table 10 below.

TABLE 10

System For Providing AC Line Power To Lighting Devices-Exclara

| 1 | Parts Count (expensive) | 10 | (0) |
|---|---|---|---|
| 2 | Integrated Circuits-(opto-couplers) | 1 | (0) |
| 3 | Transistors-(FETs) | 0 | (0) |
| 4 | Diodes-(bridge & fast recovery) | 0 | (0) |
| 5 | Capacitors-(electrolytic) | 0 | (0) |
| 6 | Inductors-(Transformers) | 0 | (0) |
| 7 | Resistors-(high power) | 9 | (0) |
| 8. | Efficiency (typ.) | 85% | |
| 9 | Power Factor (typ.) | 0.95 | |
| 10 | A. THD (typ.) | <20% | |
| 11 | LED Stripes CCS | 4 | |
| 12 | Board Size | VS | |
| 13 | Cost (total) | VL | |
| 14 | Lifetime (years) | 5+ | |

The main advantages of this particular monolithic LED driver circuit are: high performance, less parts count (10), very low size, very low cost and over 5 years lifetime.

As a brief comparison with the conventional SMPS driver solutions, the EXC100 chip's cost is $1.39/unit and the LT3799 cost is $2.70/unit, a chip which requires 40 additional parts and labor for its driver board and eventually, the LED lamp retrofit using the EXC100 has good chances to operate 2-3 years longer than the other.

The main shortcomings of this circuit are:
Very sophisticated internal architecture of the chip.
Up to 40 pin package, because of many A/D grounds.
Nine external resistors.
Square wave instead of sine wave current shape.
Very sophisticated design implementation calculations.
Visible flicker at low power and when dimmer are used.

The present specification provides several embodiments to solve the above mentioned shortcomings, including several monolithic LED driver system embodiments capable to reach higher performances (Eff=93%, PF=0.996%, A.THD=6%) while reducing the parts count down to only "one part", respectively a lower size chip featuring only 8 pin package, extremely simple internal architecture and lower manufacturing cost in comparison to this particularly monolithic LED driver solution.

10.2 Linear LED Driver for Fluorescent Lighting Retrofits

A News Release presentation document entitled "*New Sequential, Linear LED Drivers From Supertex Ideal For Fluorescent Tube Lighting Retrofits*" has been published on Apr. 3, 2012 by Supertex, Inc., which is a recognized leader in high voltage analog and mixed integrated circuits (ICs), for introducing CL8800 and CL8801, sequential, linear LED drivers designed to drive long strings of low cost, low current LEDs in solid-state replacements for fluorescent tubes, incandescent bulbs and CFL bulbs. Both ICs minimize driver circuit component counts, requiring just four or six resistors and a diode bridge in addition to the IC.

The CL8800 has been designed for 230 VAC input and the CL8801 for 120 VAC input, and none of them requires coils or capacitors in the external circuit and, except for four additional components for transient protection, there is no need even for the typically used EMI filter since the two ICs do not use high frequency switching current techniques but only multi-stage linear regulators.

Several schematic diagrams exposed in the CL800 datasheets folder show that the Supertex new monolithic LED driver chip's pin-out configuration, functionality and LED stripe design calculations are almost identical to the Exclara's EXC100 controller chip, described above.

The most significant data collected from the Supertex CL8800 chip's datasheets is summarized in Table 11 below:

TABLE 11

Linear LED Driver For Fluorescent Lighting Retrofits-Supertex

| 1 | Parts Count (expensive) | 7 | (0) |
|---|---|---|---|
| 2 | Integrated Circuits-(opto-couplers) | 1 | (0) |
| 3 | Transistors-(FETs) | 0 | (0) |
| 4 | Diodes-(bridge & fast recovery) | 0 | (0) |
| 5 | Capacitors-(electrolytic) | 0 | (0) |
| 6 | Inductors-(Transformers) | 0 | (0) |
| 7 | Resistors-(high power) | 6 | (0) |
| 8. | Efficiency (typ.) | 90% | |
| 9 | Power Factor (typ.) | >0.9 | |
| 10 | A. THD (typ.) | <10% | |
| 11 | LED Stripes CCS | 6 | |
| 12 | Board Size | VS | |
| 13 | Cost (total) | VL | |
| 14 | Lifetime (years) | 5+ | |

The performance shown in Table 11 looks a bit better than Exclara's shown in Table 10, and the cost/unit is higher ($2.38). However, since no patent application of Supertex Inc. has been published yet, and externally, the CL8800 circuit looks almost identical to the EXC100 circuit, the advantages and shortcomings related to this new monolithic LED driver solution are, more likely, very similar to ones presented above, for the Exclara EXC100 controller chip.

11. Conclusions

At this time, there are already hundreds of different LED Lamp retrofits available on the worldwide market for replacing all conventional incandescent, halogen, fluorescent, and sodium lamps. However, it will take some time until a few retrofit solutions will replace, rapidly the conventional lamps because of the cost versus quality and lifetime issues associated with these new devices.

Power management industry experts overwhelmingly agree that the LEDs are the "ideal light sources" of the future. However, similar to a "sodium lamp" which cannot provide "bright and efficient light" without "sodium", a LED lamp retrofit cannot provide "good quality light" without a LED driver, and, with respect to this device's quality versus cost matters, there are hundreds of different concepts, opinions, and solutions, provided by the worldwide power management industry experts.

On one hand, we have the US and European experts providing "high quality, high reliability, but high cost LED drivers" and, on the other hand, we have the South Asian experts providing "reasonable quality, less reliability, but very low cost LED drivers" and, therefore, the market does not have yet "the ideal device", which logically cannot be anything else but a "low cost, high performance, long lifetime LED lamp retrofit" apparatus which is, actually, the main subject of the present specification.

As presented above, the SMPS LED drivers and the Monolithic LED drivers have advantages but also many shortcomings, and, because of that, several embodiments referred to novel LED driver systems, whether or not they employ coils and capacitors, have been included in the present specification.

Therefore, an urgent need exists for low cost high quality LED lamp retrofits having fewer, smaller, or even no electrolytic capacitors, fewer, smaller, or even no coils, higher efficiency, higher power factor, low harmonic distortions, and lower total manufacturing cost, for replacing safely, shortly, and easily, all the existing obsolete conventional lamps, in such a manner for the end users to benefit of more light paying lower electricity bill, getting longer utilization time and lower total cost associated to each LED lamp retrofit, purchased.

SUMMARY

In one embodiment, a new LED Lamp Retrofit apparatus is provided, which via novel internal constant voltage constant current control and/or light display systems is capable of significantly increasing its operation time, featuring near unity power factor, low harmonic distortions, high efficiency, less parts, low size weigh and cost.

In another embodiment, a new LED Lamp Retrofit apparatus is provided, which is capable of replacing any conventional Incandescent Lamp, without any modifications to its standard electro-mechanical fixture, while providing longer operation lifetime and better light quality with respect to the Efficiency, Power Factor and Total Harmonic Distortions parameters.

In another embodiment, a new LED Lamp Retrofit apparatus is provided, which is capable of replacing any conventional Halogen Lamp, without any modifications to its standard electro-mechanical fixture, while providing longer operation lifetime and better light quality with respect to the Efficiency, Power Factor and Total Harmonic Distortions parameters.

In another embodiment, a new LED Lamp Retrofit apparatus is provided, which is capable of replacing any conventional Fluorescent Lamp, without any modifications of its standard electro-mechanical fixture, while providing longer operation lifetime and better light quality with respect to the Efficiency, Power Factor and Total Harmonic Distortions parameters.

In another embodiment, a new LED Lamp Retrofit apparatus is provided, which is capable of replacing any conventional Sodium Lamp, without any modifications to its standard electro-mechanical fixture, while providing longer operation lifetime and better light quality with respect to the Efficiency, Power Factor and Total Harmonic Distortions parameters.

In another embodiment, a new LED Lamp Retrofit apparatus is provided, which is capable of replacing any_conventional electrical lamp, without any modifications to its standard electro-mechanical fixture, while providing longer operation lifetime and better light quality with respect to the Efficiency, Power Factor and Total Harmonic Distortions parameters by using a novel Double Stage LED Driver circuit system, in order to reach the best performances in the medium and high power range.

In another embodiment, a new LED Lamp Retrofit apparatus is provide, which is capable of replacing any_conventional electrical lamp, without any modifications to its standard electro-mechanical fixture, while providing longer operation lifetime and better light quality with respect to the Efficiency, Power Factor and Total Harmonic Distortions parameters by using a novel Double Stage Boost-Flyback LED Driver circuit system, in order to reach the best performances in the medium and high power range, as well as the "Isolation" required by some end users.

In another embodiment, a new LED Lamp Retrofit device is provided, which is capable of replacing any conventional electrical lamp, without any modifications to its standard electro-mechanical fixture, while providing longer operation lifetime and better light quality with respect to the Efficiency, Power Factor and Total Harmonic Distortions parameters by using a novel Single Stage Boost LED Driver circuit system, in order to reach the best performances in the medium and high power range and reduce the parts count, size and cost/unit by not providing the "Isolation", if it is not required by some end users.

In another embodiment, a new LED Lamp Retrofit apparatus is provided, which is capable of replacing any_conventional electrical lamp, without any modifications to its standard electro-mechanical fixture, while providing longer operation lifetime and better light quality with respect to the Efficiency, Power Factor and Total Harmonic Distortions parameters by using a novel No Opto-Coupler Isolated Flyback LED Driver circuit system, in order to reduce the parts count, size and cost/unit and also to provide the "Isolation" required by some end users.

In another embodiment, a new LED Lamp Retrofit apparatus is provide, which is capable of replacing any_conventional electrical lamp, without any modifications of its standard electro-mechanical fixture, while providing longer operation lifetime and better light quality with respect to the Efficiency, Power Factor and Total Harmonic Distortions parameters by using a novel Single Stage Single Ground Flyback LED Driver circuit system, in order to reduce the LEDs supply voltage, the parts count, size and cost/unit by not providing the "Isolation" if it is nor required by some end users.

In another embodiment, a new LED Lamp Retrofit apparatus is provide, which is capable of replacing any conventional electrical lamp, without any modifications of its standard electro-mechanical fixture, while providing longer operation lifetime and better light quality with respect to the Efficiency, Power Factor and Total Harmonic Distortions parameters by using a novel Single Stage Non Isolated Buck-Boost LED Driver circuit system, in order to reduce the LEDs supply voltage, the parts count, size and cost/unit.

In another embodiment, a new LED Lamp Retrofit apparatus is provided, which is capable of replacing any conventional electrical lamp, without any modifications of its standard electro-mechanical fixture, while providing longer operation lifetime and better light quality with respect to the Efficiency, Power Factor and Total Harmonic Distortions parameters by using a novel Pseudo Double Stage LED Driver circuit system, in order to reduce the LEDs supply voltage, the parts count, size and cost/unit.

In another embodiment, a new LED Lamp Retrofit apparatus is provided, which is capable of replacing any conventional electrical lamp, without any modifications to its standard electro-mechanical fixture, while providing longer operation lifetime and better light quality with respect to the Efficiency, Power Factor and Total Harmonic Distortions parameters by using a novel Monolithic LED Driver circuit system, in order to reduce, down to minimum the parts count (just one chip), the size and cost/unit, by eliminating the need for reactive components such as coils and capacitors, while the lamp's Power Factor and the Efficiency parameters are maintained at the "state of the art" level.

In accordance with the disclosed embodiments broadly described herein, a Near Unity Power Factor Long Life Low Cost LED Lamp Retrofit System And Method are provided, which generically include LED lamp retrofit components plus several other novel controlling systems that confer to the novel device the necessary capabilities to perform at the "state of the art" level, while featuring low component count, lower weight, size and cost.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to affect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

The disclosed embodiments provide the novel parts, constructions, arrangements, combinations and improvements herein shown and described. Novel features of the disclosed embodiments will become apparent from the following description when taken in combination with the accompanying drawings. It will be understood, however, that the drawings are for purposes of illustration and are not to be construed as defining the scope or limits of the claimed subject matter appended hereto.

Additional features of the disclosed embodiments will be set forth in the description that follows, and in part will be apparent from the description, or may be learned by practice or computer simulations of the circuits presented herein.

It is to be understood that both the foregoing general description and the following detailed description are exemplary and explanatory only and are not restrictive of the claimed subject matter.

The accompanying drawings are included to provide a further understanding of the various embodiments of near unity power factor long life low cost led lamp retrofit system and method and are incorporated in and constitute a part of this specification. In addition, the accompanying drawings and illustrative embodiments together with the description, serve to explain the principles of the claimed subject matter.

BRIEF DESCRIPTION OF THE FIGURES

FIG. 1 is a dimmable LED lamp retrofit for conventional incandescent lamps, according to one embodiment.

FIG. 2 is a dimmable LED lamp retrofit for conventional flood/halogen lamps, according to one embodiment.

FIG. 3 is a dimmable LED lamp retrofit for conventional fluorescent lamps, according to one embodiment.

FIG. 4 is a dimmable monolithic LED lamp retrofit, according to one embodiment.

FIG. 5 is a dimmable LED circuit system for rectangular LED panel showing six different LED connection configurations, according to various embodiments.

FIG. 6 is a dimmable LED circuit system for round (disc) LED panel showing twelve different LED connection configurations, according to various embodiments.

FIG. 7 is a dimmable LED array display showing nine different LED connection configurations, according to various embodiments.

FIG. 8 is a double stage boost—isolated flyback multi-columns LED driver, according to one embodiment.

FIG. 9 is a single stage boost multi-columns LED driver, according to one embodiment.

FIG. 10 is a no opto-coupler isolated flyback LED driver, according to one embodiment.

FIG. 11 is a single stage single ground flyback LED driver, according to one embodiment.

FIG. 12 is a single stage constant off time buck LED driver, according to one embodiment.

FIG. 13 is a single stage single ground self-supply buck-boost LED driver, according to one embodiment.

FIG. 14 is a pseudo double stage boost-isolated flyback LED driver, according to one embodiment.

FIG. 15 is a pseudo double stage boost—non isolated flyback LED driver, according to one embodiment.

FIG. 16 is a pseudo double stage boost—COT buck-boost LED driver, according to one embodiment.

FIG. 17 is a pseudo double stage boost—SG buck-boost LED driver, according to one embodiment.

FIG. 18a is a monolithic LED driver—the series circuit method, according to one embodiment.

FIG. 18b is a series of current/voltage graphs obtained from the series circuit monolithic LED driver shown in FIG. 18a.

FIG. 19a is a monolithic LED driver—the parallel circuit method, according to one embodiment.

FIG. 19b shows a series of current/voltage graphs obtained from the Benistor monolithic LED driver shown in FIG. 19a.

FIG. 20 is a single cell anode loaded voltage controlled limited current switch (VCLCsw) LED driver circuit, according to one embodiment.

FIG. 21 is a single cell cathode loaded voltage controlled limited current switch (VCLCsw) LED driver circuit, according to one embodiment.

FIG. 22a is a simplified schematic of a monolithic LED driver—overall feedback series circuit method, according to one embodiment.

FIG. 22b shows a series of current/voltage graphs obtained from the Benistor monolithic LED driver shown in FIG. 22a.

FIG. 23a is a simplified schematic of a monolithic LED driver—overall feedback parallel circuit method, according to one embodiment.

FIG. 23b shows a series of current/voltage graphs obtained from the monolithic LED driver shown in FIG. 23a.

FIG. 24 is a monolithic multi stripes LED driver—series circuit, according to one embodiment.

FIG. 25 is a monolithic LED driver—high reliability series circuit, according to one embodiment.

FIG. 26a is a simplified schematic of a monolithic LED driver—minimum parts series circuit, according to one embodiment.

FIG. 26b shows a series of current/voltage graphs obtained from the monolithic LED driver shown in FIG. 26a.

FIG. 27a is a simplified schematic of a monolithic LED driver—minimum parts parallel circuit, according to one embodiment.

FIG. 27b shows a series of current/voltage graphs obtained from the monolithic LED driver shown in FIG. 27a.

FIG. 28 is a 120 Vac series circuit monolithic LED driver, according to one embodiment.

FIG. 29 is a LED array and driver chip embedded system—simplified series circuit, according to one embodiment.

FIG. 30 is a LED array and driver chip embedded system—simplified parallel circuit, according to one embodiment.

FIG. 31 shows a monolithic LED driver—diodes source feedback parallel circuit, according to one embodiment.

FIG. 32 shows a monolithic LED driver—operational amplifier (OPAM) current feedback parallel circuit, according to one embodiment.

FIG. 33 shows a monolithic LED driver—diodes gate feedback parallel circuit, according to one embodiment.

FIG. 34 shows a monolithic LED driver—resistor gate feedback parallel circuit, according to one embodiment.

FIG. 35 shows a monolithic LED driver—totem pole feedback parallel circuit, according to one embodiment.

FIG. 36 shows a monolithic LED driver in an 8 Pin DC chip, according to one embodiment.

FIG. 37 shows a monolithic LED driver in an 8 Pin AC chip, according to one embodiment.

FIG. 39A is an electronic symbol design for the positive OFF/ON Benistor embodiment.

FIG. 39B is an electronic symbol design for the negative ON/OFF Benistor embodiment.

FIG. 39C is an electronic symbol design for the universal Linear Benistor embodiment.

FIG. 39D is an electronic symbol design for the Classic Benistor embodiment.

FIG. 39E is an electronic symbol design for the Double OFF/ON Benistor embodiment.

FIG. 39F is an electronic symbol design for the Three-Terminal Benistor embodiment.

FIG. 40A is a graphical illustration of the Linear Benistor's voltage versus time.

FIG. 40B is a graphical illustration of the OFF/ON Benistor's voltage versus time.

FIG. 40C is a graphical illustration of the ON/OFF Benistor's voltage versus time.

FIG. 40D is a graphical illustration of the OFF/ON/OFF combination Benistor's voltage versus time.

FIG. 40E is a graphical illustration of the ON/OFF/ON combination Benistor's voltage versus time.

FIG. 40F is a graphical illustration of the OFF/ON/LINEAR combination Benistor's voltage versus time.

DESCRIPTION

Figure 38:
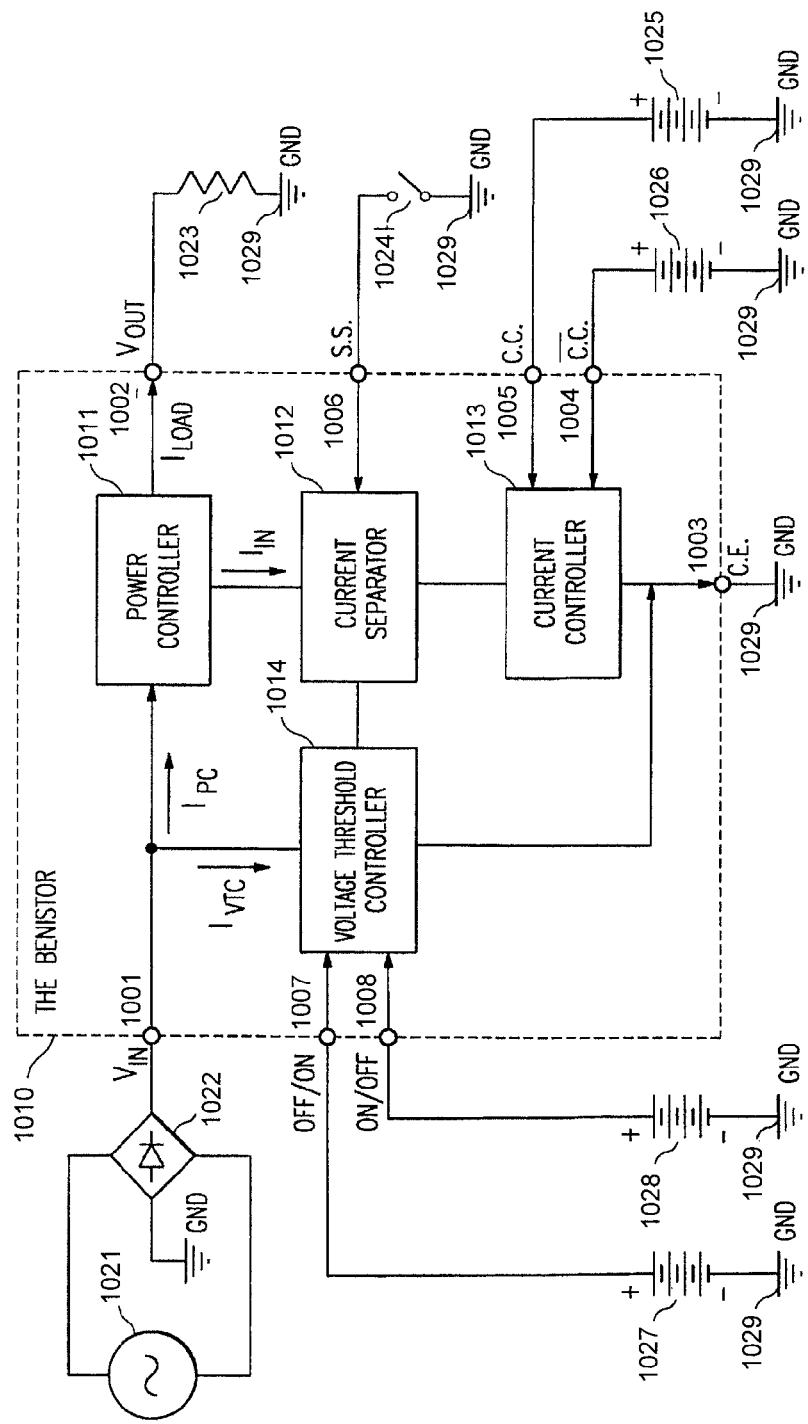
FIG. 38 is a block schematic diagram of a Classic Benistor embodiment.
Figure 40G:
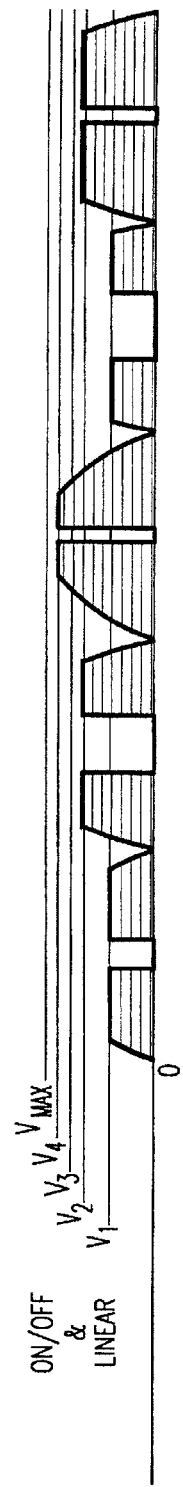
FIG. 40G is a graphical illustration of the ON/OFF/LINEAR combination Benistor's voltage versus time.
Figure 40H:
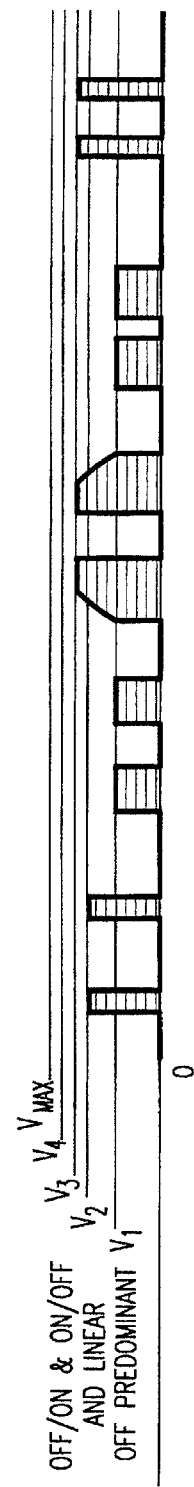
FIG. 40H is a graphical illustration of the OFF/ON/OFF/LINEAR combination Benistor's voltage versus time.
Figure 40I:
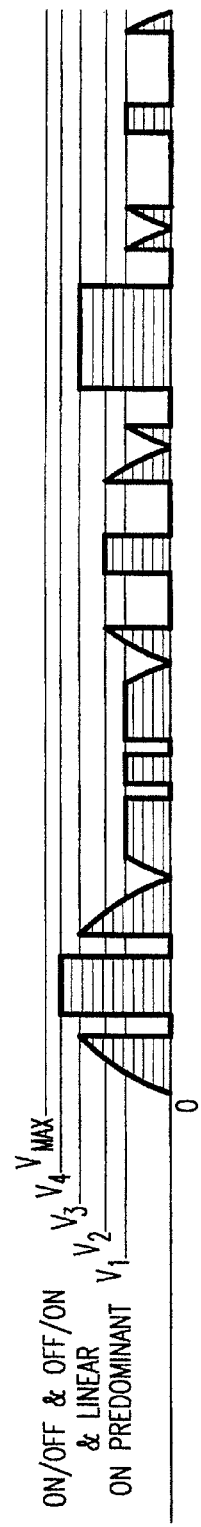
FIG. 40I is a graphical illustration of the ON/OFF/ON/LINEAR combination Benistor's voltage versus time.
Figure 40J:
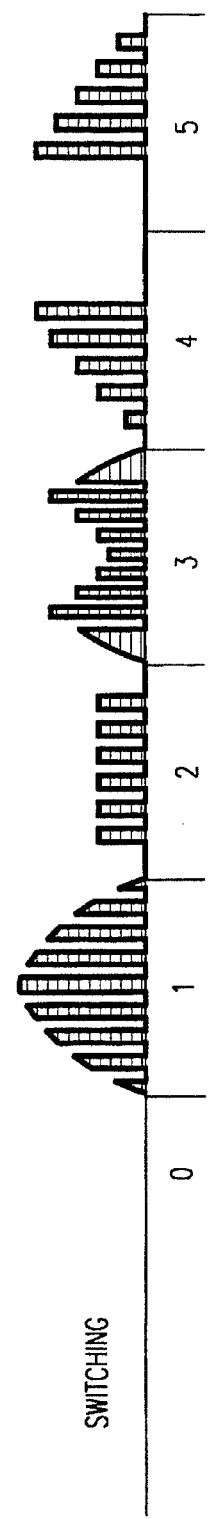
FIG. 40J is a graphical illustration of the Switching Benistor's voltage versus time.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry". Consequently, as used herein "electrical circuitry" includes, but is not limited to, electrical circuitry having at least one discrete electrical circuit, electrical circuitry having at least one integrated circuit, electrical circuitry having at least one application specific integrated circuit. Those having skill in the art will recognize that the subject matter described herein may be implemented in an analog or digital fashion or some combination thereof.

12. Description of the LED Lamp Retrofit Apparatus Embodiments

Dimmable LED Lamp Retrofit for Conventional Incandescent Lamps

Embodiment 1

FIG. 1 shows an embodiment of a dimmable LED lamp retrofit apparatus for incandescent lamps.

As embodied herein, a LED lamp retrofit (1) comprises a housing (2), a standard Edison screw AC supply adaptor (3), a lens/diffuser shield (4), a LED panel board (5), one or more LEDs (6), a LED driver board (7), a driver supply wires circuitry (8) and a LED supply wires circuitry (9).

As further embodied herein, the housing (2) of the LED lamp retrofit (1) is mechanically attached to the AC supply adaptor (3) having two electrical terminals connected to the LED driver board (7) via the AC supply wires (8). The LED Driver Board (7) is electrically connected, via two or more LED supply wires (9), to the LEDs (6), which are mechanically attached to the LED panel board (5).

The incandescent LED lamp retrofit (1) may comprise other electrical wires for remote control or intelligent feedback control applications and therefore, for the reminder of this wiring circuitries the LED driver supply wires circuitry (8), together with the LED supply wire circuitry (9) and together with any other electrical control wires circuitry may be called, collectively, the In/Out ("I/O") electrical wiring system.

As still embodied herein, the LED lamp retrofit (1) comprises also a lens/diffuser shield (4), which can be built in "one piece" with the housing (i.e. a glass or plastic balloon) or it could be built as a separate piece mechanically attached to the lamp retrofit (1) housing (2).

Because this particular embodiment, illustrated in FIG. 1, is designated to replace conventional incandescent lamps, the LED panel board (5) has a three dimensional configuration following an octagonal, hexagonal, cylindrical or triangular base shape, in order to allow the LEDs (6) to provide light, nearly uniform, in all directions around (360 degrees, or omni-directional), despite the fact that the LEDs existing in market have only 120 degrees light angle, typically.

Alternatively, the LEDs (6) 360° light angle could be obtained even if the LED panel board is flat (a two dimensions disc, rectangular or square LED array, already available in the market) if the lens/diffuser shield (4) is tridimensional, respectively a transparent or milky optical prism capable of splitting, omni-directional, the light generated by the LEDs (6), in a 120° angle.

The mechanical support for the AC supply adaptor (3), lens/diffuser shield (4) and all the internal parts of the lamp retrofit (1) is the housing (2) which is typically made from glass, plastic or aluminum. If the material used for the housing (2) is metallic, then it can be used also as a heat sink for the LEDs (6) and the large power parts included in the driver board (7), under the precaution for a high voltage isolator material to be used in between, for eliminating potential electrical shock for the end users. If the material used for the housing (2) is glass or plastic, then the lens/diffuser shield (4) component could be eliminated, in some specific mechanical designs.

The LED panel (5) provides mechanical support, isolation for the electrical connections and heat absorption (sink) and for the LEDs (6).

The AC supply adaptor (3) is, typically, a conventional "Edison Screw" connector, which allows for full compatibility and easy replacement of the conventional incandescent (Edison) bulbs. From case to case, as a function of the size or specific mechanical design of the lamp retrofit (1), the supply adaptor (3) may have more than two connections and/or different configurations for easy replacement of any bulb.

The lens/diffuser shield (4) is the protection screen which allows the LEDs (6) light to get out but does not allow water or other objects to get in and, eventually, to damage the lamp retrofit (1) internal circuit. As a function of the lamp retrofit (1) configuration and/or electrical performances, the lens/diffuser shield (4) could be made from a transparent or translucent glass or plastic material. In some special case, the lens/diffuser shield (4) could be made from a transparent material coated with a substrate containing phosphor or other substances used in conventional fluorescent lamps or kinescope tubes' coating, in order to "store the light" for a short period of time and thus reducing the flickering phenomenon which may occur in situations when the LED driver board (7) is designed to supply the LEDs (6) with unfiltered (pulse) or high ripples DC voltage.

The LED driver board (7) is an AC/DC converter and power supply adaptor, providing constant voltage and/or constant current to the LEDs (6). The LED driver board (7) schematic diagram topology, complexity and size could be very different, from case to case, as a function of the targeted performances, size and cost per unit of each specific lamp retrofit unit.

Several LED driver circuits having different topologies and mode of operation will be fully described below, in other sections of this specification.

Embodiment 2

Dimmable LED Lamp Retrofit for Conventional Halogen Lamps

FIG. 2 shows an embodiment of a dimmable LED lamp retrofit apparatus for conventional flood/halogen lamps.

As embodied herein, a LED lamp retrofit (11) comprises a housing (12), a standard AC supply adaptor (13), a lens/diffuser shield (14), a LED panel board (15), one or more LEDs (16), a LED driver board (17), a driver supply wires circuitry (18) and a LED supply wires circuitry (19).

As further embodied herein, the housing (12) of the LED lamp retrofit (11) is mechanically attached to the AC supply adaptor (13) having two electrical terminals connected to the LED driver board (17) via the AC supply wires (18). The LED Driver Board (17) is electrically connected, via two or more LED supply wires (19), to the LEDs (16), which are mechanically attached to the LED panel board (15).

As still embodied herein, the LED lamp retrofit (11) comprises also a lens/diffuser shield (14), which is mechanically attached to the lamp retrofit (11) housing (12).

Because this particular embodiment, illustrated in FIG. 2, is designated to replace conventional flood/halogen lamps which via an internal mirror focus their light in a single direction, in a 120 degrees angle, similar to most of the LEDs existing in market, the LED panel board (15) of the flood/halogen LED lamp retrofit (11) has a two dimensional configuration, following a disc, octagon, hexagon, rectangle, or triangle shape.

Except the two dimensional shape of the LED driver board (17), versus the three-dimensional shape of the LED panel board (15), the description of all the other components included in the flood/halogen LED lamp retrofit (11) shown in FIG. 2, such as housing (12), AC supply adaptor (13), lens/diffuser shield (14), LED driver board (17), driver supply wires (18) and LED supply wires (19), is similar to the description made above, for the incandescent LED lamp retrofit (1) shown in FIG. 1.

Embodiment 3

Dimmable LED Lamp Retrofit for Conventional Fluorescent Lamps

FIG. 3 shows an embodiment of a dimmable LED lamp retrofit apparatus for conventional fluorescent lamps.

As embodied herein, a fluorescent LED lamp retrofit (21) comprises a housing (22), a first standard AC supply adaptor (23) including a not connected terminal (31) and a connected terminal (32), a lens/diffuser shield (24), a LED panel board (25), several LEDs (26), a LED driver board (27), a driver supply wires circuitry (28), a LED supply wires circuitry (29) and a second standard AC supply adaptor (30) including a not connected terminal (33) and a connected terminal (34).

As further embodied herein, in this specific embodiment, the housing (22) and the lens/diffuser shield (24) could appear, together, as a single glass or plastic tube, following as closed as possible, the shape and dimensions of a conventional fluorescent lamp tube for allowing easy replacement in standard fixtures. In some situations, the housing (22) could be a separate piece of metal used as mechanical support for the fluorescent lamp retrofit (21) and, simultaneously, as heat sink attached to the back side of the LEDs (26), replacing also the LED panel board (25), while the lens/diffuser shield (24) could be a separate piece of transparent or translucent plastic positioned in the front (lighting) side of the LEDs (26), being mechanically attached to the housing (22).

As still embodied herein, the housing (22), or the housing (22) and the lens diffuser shield (24), tube assembly of the fluorescent LED lamp retrofit (21) is mechanically attached, at one end to the first AC supply adaptor (23) and second AC supply adaptor (30).

As yet embodied herein, only one of the two terminals attached to the two standard AC adaptors are connected to the LED driver board (27) via the AC supply wires (28), respectively the terminal (32) on one end of the housing and the terminal (34) attached to the other end of the tube housing (22). For a faster and easier replacement of the fluorescent bulbs in their conventional (Philips) fixtures, without necessarily disconnecting and reworking the existing ballast and starter wiring sub-circuit (i.e., it takes significant time and money for authorized electricians to do this job, for millions of fluorescent bulbs replacement, at the country scale), the connected terminals must be either the two terminals (32, 34) mentioned above, located (both) on the lower side of the LED panel board (25), or the other two terminals (31, 33) located (both) on the higher side of the LED panel board (25). In this way, by "flipping" the LED lamp retrofit (21) in such a manner for the two connected terminals to be included in the ballast's circuit, the starter is automatically eliminated from the lamp's circuit (i.e., LED lamps have no filaments) and the ballast could remain in the circuit (as a wire or filter), since it could not damage the LED driver without receiving the periodically ON-OFF pulses generated by the "starter" device. If the lamp retrofit (21) is flipped the opposite way, the two connected terminals are coupled in the starter's circuit and the ballast remains "in air" (not connected) so, again, no damage can happen to the LED lamp retrofit (21) or its related circuit. The not connected terminals (31 and 33) are attached to the standard AC adaptor (23) only for guaranteeing a full mechanical compatibility with the standard fluorescent lamps' fixtures. The LED Driver Board (27) is connected, via two or more LED supply wires (29), to the LEDs (26), which are mechanically attached (or bonded) to the LED panel board (25) in such a manner to allow for a good thermal contact and high voltage electrical isolation.

Because this particular embodiment, illustrated in FIG. 3, is designated to replace conventional fluorescent lamps, the LED panel board (25) has a long rectangular configuration in order to provide equally distributed light in the entire space of the lamp retrofit (21), similar to the conventional fluorescent lamp.

A very important aspect regarding each of the LEDs (26) specific position and electrical connections with the driver board (27) via the LED supply wires (29), concerning dimmers control versus the light equal distribution inside of the fluorescent LED lamp retrofit (21) is presented below, in a separate section of this specification.

Except the long tube housing (22) and lens diffuser shield (24) assembly shape, the long rectangular shape of the LED panel board (25) and the standard AC adaptor (23) mechanical/electrical fixture compatibility issues mentioned above, the description of all the other parts included in the fluorescent LED lamp retrofit (21) shown in FIG. 3 is similar to the description made above, for the incandescent LED lamp retrofit (1).

The LED driver board (27) and its related LED supply wires (29) may appear in many and very different configurations, as presented below, in separate sections of this patent application.

Embodiment 4

Dimmable Monolithic LED Lamp Retrofit

FIG. 4 shows an embodiment of a dimmable monolithic LED lamp retrofit apparatus for conventional lamps and/or a dimmable "light engine" in which a monolithic LED driver chip is embodied in a monolithic LED array system.

As embodied herein, the monolithic dimmable LED lamp retrofit (41) comprises a housing (42), a LED panel board including a lens/diffuser shield (43), an assembly of LEDs (44), a LED driver chip (45), and an AC or DC supply adaptor (46).

As farther embodied herein, in this specific embodiment, the housing (42) is a monolithic unit or a "molded brick" made from a specific alloy, used in the semiconductor chips packaging manufacturing process, which provides electrical isolation and allows for heat dissipation internally and externally, in such a manner that all the hot components located inside of the brick can be cooled down by an external heat sink, bonded or mechanically attached to any part of the external surface of the brick.

As still embodied herein, inside of the molded brick housing (42) the LED driver chip (45) is embodied in (or pin by pin connected to) an array of LEDs (44) and externally, the LED driver chip (45) is coupled to the AC or DC supply adaptor (46).

As yet embodied herein, the external AC or DC supply adaptor (46) may appear in many different physical configurations in order to facilitate the replacement of any existing conventional bulb and the LED panel board lens diffuser shield (43) may also have many different physical configurations and it could be a piece of wafer (LEDs Array), together with the LEDs (44).

The LED driver chip (45) internal circuit configuration is presented below, in separate sections of this specification.

The main purpose of this specific embodiment is to provide an efficient, small size, low cost and compact (one piece) lighting device which, similar to the conventional incandescent bulbs, allows for parallel or series connections to the AC grid and because its fully integrated driver chip (45) improvement, the LED lamp retrofit (41) allows for a fully automatic manufacturing process, offering all the necessary means for a fast, very large volume and low cost production.

Therefore, the LED lamp retrofit (41) presented in FIG. 4 may be addressed as "The Ultimate Lighting Device" ("ULD"), or "The Ultimate Light Engine" ("ULE"), in further sections of this specification.

13. Description of the LED Panel Embodiments

Embodiment 5

Dimmable LED Circuit System for Rectangular LED Panel

FIG. 5 shows an embodiment of a dimmable LED circuit system for a rectangular LED panel, targeting applications in lighting displays of the fluorescent lamp retrofits.

As embodied herein, the rectangular LED display circuit subject of this particular embodiment comprises 48 LEDs symbolized by 48 small squares. The color filled squares symbolize "the lighting LEDs" and the blank squares symbolize "the not lighting LEDs".

As further embodied herein, the 48 LEDs panel has been divided in six panel displays, starting with panel "I" and finishing with panel "VI", in which the lighting LEDs number increases with an increment of 8 LEDs per panel.

As still embodied herein, the 6 different panel display configurations show that no matter if 8, 16, 24, 32, 40 or all 48 LEDs are lighting at one time, there is always a "Symmetrical LEDs Connections Arrangement" ("SLCA") in which the light is equally distributed on the entire space of the display panel.

This SLCA is imperative necessarily in situations when a dimmer introduced in the LEDs circuit reduces not only the LEDs current, but also the LEDs AC or DC supply voltage down to a level lower than the minimum threshold voltage required by two or more LEDs connected in series, per one stripe.

Several configurations of LED drivers capable to manage SLCA are presented below, in separate sections of this patent application.

Embodiment 6

Dimmable LED Circuit System for Round LED Panel

FIG. 6 shows an embodiment of a dimmable LED circuit system for round (disc) LED panel, targeting applications in lighting displays of the flood halogen lamp retrofits.

As embodied herein, the round (disk) LED display circuit subject of this particular embodiment comprises 48 LEDs symbolized by 48 small circles. The color filled circles symbolize "the lighting LEDs" and the blank circles symbolize "the not lighting LEDs".

As further embodied herein, the 48 LEDs panel has been divided into twelve panel displays, starting with panel "a)" and finishing with panel "I)", in which the lighting LEDs number increases with an increment of 4 LEDs per panel.

As still embodied herein, the 12 different panel display configurations show that no matter if 4, 8, 12, 16, 20, 24, 28, 32, 36, 40, 44 or all 48 LEDs are lighting at one time, there is always a "Symmetrical LEDs Connections Arrangement" ("SLCA") in which the light is equally distributed on the entire space of the display panel.

The details about the SLCA and its compatible LED driver have been presented above, at the description of the rectangular LED panel display shown in FIG. 5.

Embodiment 7

Dimmable LED Array Display System

FIG. 7 shows an embodiment of a dimmable LED array display system for a square LED panel, targeting applications in lighting displays for street or parking lot lamp retrofits, comprising one or more LED Array devices.

As embodied herein, the square LED display circuit subject of this particular embodiment comprises 36 LEDs symbolized by 36 small squares. The color filled squares symbolize "the lighting LEDs" and the blank squares symbolize "the not lighting LEDs".

As further embodied herein, the 36 LEDs panel has been divided in nine panel displays, starting with panel "a)" and finishing with panel "i)", in which the lighting LEDs number increases with an increment of 4 LEDs per panel.

As still embodied herein, the nine different panel display configurations shows that no matter if 4, 8, 12, 16, 20, 24, 28, 32, or all 36 LEDs are lighting at one time, there is always a "Symmetrical LEDs Connections Arrangement" ("SLCA") in which the light is equally distributed on the entire space of the display panel.

The details about the SLCA and its compatible LED driver have been presented above, at the description of the rectangular LED panel display shown in FIG. 5.

14. Description of the SMPS Driver Embodiments
Introduction

This embodiments description section, of the present specification, comprises ten (10) SMPS converter circuit solution embodiments. These embodiments are capable of superseding all the other similar topology SMPS LED driver solutions depicted above, at the related art section. Such may be accomplished by the means of several novel control methods and/or novel sub-circuit systems used in each of these particular LED driver embodiments, for securing the high quality electrical parameter as well as the long life operations of suitable LED lamp retrofit apparatuses by matching. Accordingly, each particular LED driver system with its suitable additional components and or mechanical-optical-electrical systems included in a particular LED lamp retrofit, such as: housing, supply adaptor, LEDs, LED panel, lens/diffuser shield and I/O electrical wiring system.

Since the "low total manufacturing cost" (including the components cost) is also a very important subject of this specification and, as it was presented above, the most expensive component included in SMPS LED driver circuits are the coils, electrolytic capacitors, MOSFET or high power transistors, fast recovery diodes and the IC controller chips. Each of the SMPS circuit embodiments presented herein comprises a minimum parts set allowed by the specific topology adopted, and for providing "high performance low parts count" LED driver solution, several novel methods, techniques and/or original sub-circuit systems, such as "Self-supply buck-boost" or "Pseudo double stage" design approaches have been used.

Additionally, since the most important part in a SMPS converter is its main PWM/PFC Controller IC which costs $0.55 to $2.60 per unit typically, the design of all and each SMPS circuit embodiments presented in this specification has been done, in such a manner to can use efficiently and safely, the most popular, reliable and cost effective PWM controller chip used in the worldwide SMPS industry, such as the UC3842, introduced by Unitrode, Inc. (now Texas Instruments) over twenty years ago and sold now in over half a billion units a year, by all power management semiconductor companies, at a reasonable cost between $0.12 (South Asia) and $0.17 (ON Semiconductor, USA) per unit. This affordable price allows for millions of dollars yearly savings for each large volume, worldwide, LED lamp retrofits manufacture's budget and, implicitly, a lower cost per retrofit unit paid by the end users.

Embodiment 8

Double Stacie Isolated Boost-Flyback
Multi-Columns LED Driver

FIG. 8 shows an embodiment of a double stage isolated boost-flyback multi-column LED driver circuit.

Description of the Components Connections

As embodied herein, a double stage boost-isolated flyback multi-columns LED driver circuit comprises an AC-to-DC converter sub-circuit including an alternative current generator Vac (51), a low pass filter EMI (52) having its input coupled to Vac (51) and the output coupled to the AC input of a bridge rectifier BR (53). The bridge rectifier BR (53) has its negative output coupled to an input ground (55) terminal and its positive output coupled to ground (55) via a first filtering capacitor Cf1 (54) and coupled directly to a positive voltage input VPin (101) which is the first terminal of a five terminals boost power factor correction sub-circuit PFC-b (100).

The PFC-b (100) sub-circuit has a pre regulated DC voltage output VDCpr (102) second terminal, followed by a boost feedback input FBb (103) third terminal coupled to VDCpr (102), followed by a zero voltage fourth terminal coupled to (55) followed by an integrated circuit voltage supply fifth terminal Vic (117).

A two coils boost inductor Lb (110) has its first coil coupled at one end to VPin (101) and the other end to the anode of an output boost diode Dob (111). The second coil of Lb (110) having one end coupled to ground (55) and the other end to the anode of a supply diode Dvcc (115). The Dob (111) has its anode coupled also to the drain of a boost MOSFET transistor Mb (112) and its cathode to the VDCpr (102) output terminal. The Mb (112) has its source coupled to (55) and its gate coupled to a driving output terminal "DRV", of a four terminals power factor corrector integrated circuit PFCic (113).

The PFCic (113) other three terminals are "GND" coupled to (55), followed by "FB" coupled to the FBb (103) terminal and "Vcc" coupled to the cathode of Dvcc (115). The other terminal of Rst (114) is also coupled to the cathode of Dvcc (115) and to (55) via a voltage supply capacitor Cvcc (116). The VDCpr (102) output terminal is coupled to the input ground (55) via a second filtering capacitor Cf2 (190) and directly to a DC voltage input VDCin (201) which is the first terminal of a six terminals flyback pulse width modulation sub-circuit PWM-f (200). The PWM-f (200) sub-circuit has a DC voltage output VDCo (202) second terminal, followed by a feedback input FBf (203) third terminal, followed by a zero-voltage fourth terminal coupled to the input ground (55), followed by a fifth terminal coupled to an output ground (65), which is isolated to the input ground (55), and followed by a voltage supply Vic (117) sixth terminal.

The PWM-f (200) sub-circuit comprises a two coils flyback transformer TRf (210) having its first coil coupled at one end to the VDCin (201) and the other end coupled to the drain of a flyback MOSFET transistor Mf (212). The TRf (210) second coil having one end coupled to (65) and the other end to the anode of a flyback output diode Dof (211). The Mf (212) has its source coupled to (55) and its gate coupled to a second driving output terminal "DRV", of a second four terminals pulse width modulator integrated circuit PWMic (213). The PWMic (213) second terminal is "GND" coupled to (55), followed by a third terminal "FB" coupled to the FBf (203) and followed by a fourth terminal "Vcc" coupled to the cathode of Dvcc (115) via the Vic (117). The cathode of Dof (211) is coupled to (65) via a third filtering capacitor Cf3 (290) and directly, via VDCo (202) to a voltage supply input Vsi (301), which is the first terminal of a five terminal LED Panel (300) sub-circuit.

The LED Panel (300) sub-circuit has also a Vd+ (302) second terminal, followed by a Vd− (303) third terminal, followed by a LED current Iled (304) fourth terminal and followed by a reference voltage (406) fifth terminal. The LED Panel (300) sub-circuit comprises three identical LED column sub-circuits, such as: a first LED column LEDc1 (310) including several LEDs coupled in a series circuit where the anode of the first LED is coupled to the Vsi (301) terminal and the cathode of the last LED is coupled to the anode of a first diode DI1+ (321) having its cathode coupled to Vd+ (302), and to the cathode of a second diode DI1− (322) having its anode coupled to Vd− (303) and its cathode to the Iled (304) terminal via a constant current sink device CCS1 (331) having a third control terminal coupled to Vref (406). A second LED column LEDc2 (311) including several LEDs coupled in a series circuit where the anode of the first LED is coupled to the Vsi (301) terminal and the cathode of the last LED is coupled to the anode of a first diode DI2+ (323) having its cathode coupled to Vd+ (302), and to the cathode of a second diode DI2− (324) having its anode coupled to Vd− (303) and to the Iled (304) terminal via a constant current sink device CCS2 (332) having a third control terminal coupled to Vref (406). A third or last ("z") LED column LEDcz (312) including several LEDs coupled in a series circuit where the anode of the first LED is coupled to the Vsi (301) terminal and the cathode of the last LED is coupled to the anode of a first diode DIz+ (325) having its cathode coupled to Vd+ (302), and to the cathode of a second diode DIz− (326) having its anode coupled to Vd− (303) and to the Iled (304) terminal via a constant current sink device CCSz (333) having a third control terminal coupled to Vref (406). The first terminal Vsi (301) of the LED Panel (300) is also coupled to a first terminal Vmax (401) of a seven terminals constant voltage constant current control sub-circuit CVCC (400).

The CVCC (400) sub-circuit has also a second terminal Vdif+ (402) coupled to Vd+ (302). A third terminal Vdif− (403) is coupled to Vd− (303). A fourth terminal Imax (404) is coupled directly to Iled (304) and via a LED current sense resistor Rsled (360) to the output ground (65). A fifth terminal Ctrl (405) followed by a sixth terminal Vref (406) are coupled to Vref (406) terminal of the LED Panel (300) sub-circuit. A seventh terminal is coupled to the output ground (65). The CVCC (400) sub-circuit comprises a first open collector operational amplifier A1 (410) having one input coupled to Vmax (401). A threshold reference voltage Vref1 is coupled at the other input and its output coupled to Ctrl (405). A second open collector operational amplifier A2 (411) has one input coupled to Vdif+ (402) and the other input coupled to Vdif− (403). Its output is coupled to Ctrl (405). A third open collector operational amplifier A3 (412) has one input coupled to Imax (404), a threshold reference voltage Vref2 coupled at the other input and its output coupled to Ctrl (405). The Vmax (401) terminal is also coupled to the cathode of a voltage reference (Zener) diode VR (421), via a current limitation resistor Rvref (422). One terminal of a first voltage reference resistor Rr1 (423) is coupled, to the cathode of VR (421) and the other one is coupled to Vref (406) and to one terminal of a second voltage reference resistor Rr2 (424). The other terminal of Rr2 (424) and the anode of VR (421) are coupled together to the output ground (65).

Externally to the CVCC (400) sub-circuit, a four terminals opto-coupler OC (450) device comprising a two terminals LED having an anode and a cathode and a two terminals NPN transistor having an emitter and a collector. The anode of the LED is coupled to Vref (406) and the cathode is coupled to Ctrl (405). The emitter is coupled to the input ground (55) and the collector coupled to FBf (203).

Description of the Block Schematic

As still embodied herein, a double stage isolated boost-flyback multi-column LED driver system embodiment comprises, besides a conventional AC-to-DC converter circuit including the AC generator Vac (51), the low-pass filter EMI (52), the bridge rectifier BR (53) and the capacitor Cf1 (54), a power factor correction boost PFC-b (100) first sub-circuit representing the first stage of the entire driver system, followed by a pulse width modulation flyback PWM-f (200) second sub-circuit, a LED Panel (300) third sub-circuit and constant voltage constant current CVCC (400) fourth sub-circuit, representing, together, the second stage of the entire driver system.

Description of the "Conventional" Input AC-DC Converter

As yet embodied herein, the conventional AC-to-DC converter circuit provides an unregulated DC voltage across the capacitor Cf1 (54) via the bridge rectifier BR (53) which has its negative output terminal coupled to the input ground (55) and its positive output terminal coupled to the VPin (101) input terminal of the PFC-b (100) sub-circuit. The EMI (52) filter is configured to allow (low impedance for) the low frequency (typically, 50 Hz-60 Hz) currents to easily pass from the Vac generator to the PFC-b (100) sub-circuit and to stop (high impedance for) the high frequency (typically, 20 kHz-200 kHz) currents, generated inside of the LED driver circuit, to come back to the Vac (51) generator (i.e. the AC Electrical Grid). The first filtering capacitor Cf1 (54) has a relatively low value (10 nF-200 nF) for filtering high frequency currents but, on the other hand, to not create significant distortions of the low frequency current and, implicitly, to decrease the entire system's power factor coefficient.

Description of the 1$^{st}$ Stage—PFC Boost Converter

As further embodied herein, the PFC-b (100) sub-circuit representing "the first stage" of the entire LED driver embodiment is the initial functional block designated to deliver a pre-regulated DC supply voltage to the other sub-circuits, in a near unity power factor manner. This allows for an optimal transfer of electrical energy between the alternating current generator Vac (51) and the LED Panel (300), which is the "load" of the entire driver circuit. Since the LEDs require DC voltage stored, usually, in large value (bulk) capacitors (10 uF to 1000 uF), the main function performed by the PFC-b (100)

sub-circuit is to deliver a pre-regulated voltage across a relatively large value capacitor for the entire LED driver circuit current's shape to follow, as close as possible, the phase and shape of the AC generator (51), respectively a rectified sine-wave shape, regardless of each of the other sub-circuits' current shape. For this purpose, the PFC-b (100) is a boost converter sub-circuit having a rectified sine-wave pulse voltage inputted at its VPin (101), and delivering a DC pre-regulated voltage via its VDCpr (102) output terminal, which is higher in amount than the peak input voltage, with respect to a zero volts input ground (55) terminal.

The boost inductor Lb (110) is coupled from VPin (101) to the input ground (55) via a MOSFET switch Mb (112). The boost inductor Lb (110) generates a higher output voltage across a second filtering capacitor Cf2 (190) via a fast recovery diode Dob (111). This is a result of high frequency ON-OFF switching pulses enforced by the Mb (112) buffer and generated by the power factor correction integrated circuit PFCic (113), which generates driving square wave pulses to the gate of Mb (112) via its DRV terminal.

The output voltage amount is sensed by the PFCic (113) controller via its FB terminal, which is coupled to VDCpr (102) via the FBb (103) terminal. The maximum voltage at VDCpr is limited by PFCic (113) by decreasing, accordingly, the ON time of its driving pulses, implicitly, by lowering the average current of the boost inductor Lb (110). The PFCic (113) start-up supply is secured by a large value starting resistor Rst (114) which delivers a fraction VPin (101) voltage to its supply terminal Vcc, with respect to its zero voltage terminal GND, coupled to the input ground (55). A larger current supply is delivered by the secondary coil of Lb (110) via Dvcc (115) and Cvcc (116), as soon as the Mb (112) switch forces Lb (110) to oscillate.

The PFC-b (100) sub-circuit's simplicity allows for very low cost controller circuits, which could be conventional power factor correction circuits or even very low cost pulse width modulation integrated circuits, such as the controllers included in the most commonly used UC364x series.

Description of the 2$^{nd}$ Stage—the Flyback (200)

As yet embodied herein, the PWM-f (200) sub-circuit represents "the second stage" of the LED driver circuit subject of this specification. The PWM-f (200) is the second functional block designated to deliver DC supply to the LED Panel (300) sub-circuit in a constant voltage constant current ("CVCC") manner, which offers maximum safety and lifetime to the LED devices. The LED Panel (300) represents the main load of the entire system. For this purpose, the PWM-f (200) is a flyback converter sub-circuit having a pre-regulated DC voltage inputted at its VDCin (201). The PWM-f (200) delivers a regulated DC voltage via its VDCo (202) output terminal, which is, typically, much lower in amount than the input voltage with respect to a zero volts output ground (65) terminal.

The flyback transformer TRf (210) has its primary coil coupled from VDCin (201) to the input ground (55) via a MOSFET switch Mf (212). The flyback transformer TRf (210) generates the lower amount regulated DC voltage across a third filtering capacitor Cf3 (290) via a secondary coil and a fast recovery diode Dof (211). This is a result of high frequency ON-OFF switching pulses enforced by the Mf (212) buffer and generated by the pulse width modulation integrated circuit PWMic (213), which generates driving square wave pulses to the gate of Mf (212), via its DRV terminal.

The output voltage amount is sensed by the PWMic (213) controller via its FB terminal, which is coupled to the hot output terminal of the opto-coupler device OC (450) via the FBf (203) terminal of PWM-f (200) sub-circuit. The output voltage at VDCo (202) is limited and/or regulated by PWMic (213) by decreasing or increasing, accordingly, the ON time of its driving pulses, and implicitly, by controlling, cycle by cycle the average current of the flyback transformer TRf (210) primary coil. The PWMic (213) supply at its Vcc terminal is taken, via the Vic (117) terminal, from the previous controller PFCic (113) Vcc supply terminal, with respect to its zero voltage terminal GND, coupled also to the input ground (55). The PFC-b (100) sub-circuit's simplicity allows for very low cost controller circuits, such as the controllers included in the most commonly used UC384x series.

Description of the LED Panel (300) & CVCC (400) Blocks

As further embodied herein, the LED Panel (300) sub-circuit comprises three LED columns and protection circuitry, which provide fast correction feedback to the PWMic (213) controller via the CVCC (400) sub-circuit. The CVCC (400) sub-circuit comprises three operational amplifiers having their output coupled together to the input of an opto-coupler (450) device which has its output coupled to the feedback input FBf (203) of the PWM-f (200) flyback sub-circuit.

Accordingly, the supply voltage delivered by the PWM-f (200) flyback sub-circuit via its VDCo (202) is inputted, simultaneously at the Vsi (301) terminal of the LED Panel (300) and at the Vmax (401) input of the CVCC (400) controlling sub-circuit, then regulated in feedback, via the operational amplifier A1 (410) which has a stable reference voltage Vref1 for comparison.

The current of LED Panel (300) is corrected by the A3 (412) operational amplifier feedback, by sensing the voltage collected across the sense resistor Rsled (360) via the Imax (404) terminal and comparing it to a second reference voltage Vref2. The operational amplifier A2 (411) performs a special feedback function, strongly related to the LED Panel (300) internal protection circuit.

As still embodied herein, internally the LED Panel (300) sub-circuit comprises three LED columns and a protection circuit comprising three constant current sinks and six diodes which secure the constant current for each LED column. Additionally, it offers a very simple and cost effective protection for "un-balanced LED columns". The protection circuit provides a special protection for cases when one or more LEDs are damaged or not consistent in voltage versus current specifications, with the others. Since the protection circuit is identical for all columns, to simplify the description of this sub-circuit, only the first two columns LEDc1 (310) and LEDc2 (311) protection circuit will be fully described. Considering that the same control method could be applied to many ("z") LED columns.

The LEDc1 column includes several LEDs coupled in series. The anode of the first LED is coupled to the positive supply terminal Vsi (301). The cathode of the last LED is coupled to the Iied (304) terminal via a constant current sink device CCS1 (331). The constant current sink device CCS1 (331) is biased with a constant voltage received from the CVCC (400) sub-circuit. The constant voltage is created from VDCo (202) via Rvref (422) and VR (421) and delivered via Rr1 (423), Rr2 (424) and the Vref (406) terminal.

The Iied (304) terminal delivers the entire LED Panel (300) current to the output ground (65) terminal via the Rsled (360) sense resistor. Connected to the cathode of LEDc1 (310) last LED, there is a first diode DI1+ (321) coupled with its cathode to the Vd+ (302) terminal. A second diode DI1− (322) is coupled to the Vd− (303) terminal. Similarly for the LEDc2 (311) column, the anode of the first LED also is coupled to the positive supply terminal VsI (301) and the cathode of the last LED also is coupled to the Iled (304) terminal, via a constant current sink device CCS1 (331) biased with a constant voltage received via the Vref (406) terminal. Connected to the cathode of LEDc2 (311) last LED, there is a first diode DI1+ (321) coupled with its cathode to the Vd+ (302) terminal. A second diode DI1− (322) is coupled to the Vd− (303) terminal. The Vd+ (302) and Vd− (303) terminals are coupled to the two inputs of A2 (411). This symbolizes a differential error amplifier that is able to shut down the driving pulse delivered by PWMic (213) to the gate of Mf (212) buffer, via the opto-coupler OC (450) and the feedback terminal FBf (203), at any time when the difference of the voltage between Vd+ (302) and Vd− (303) is larger than a pre-established limit.

Under normal operating conditions, if all LEDs in the LEDc1 (310) column and also all LEDs in the LEDc2 (311) column have identical voltage versus current specifications, and/or none of them are damaged, the voltage between Vd+ (302) and Vd− (303) terminals should be zero. However, as soon as something is wrong with only one LED in any of the two columns, a difference of voltage will appear at the input of the differential input error amplifier A2 (411). This error voltage will cause the PWMic (213) output driving pulse to be shut down to prevent malfunctions or further damages in the LED lamp circuit.

Alternatively, the error amplifier A2 (411) feedback could be used not to shut down the entire PWM-f (200) flyback sub-circuit, but only the damaged LED column. This may be accomplished by shutting down the bias supply of the CCS circuit which connects that column to the Iled (304) terminal. In this way, the damaged LED column cannot create further damages since it is practically completely disconnected from the LED panel (300) circuit.

This damage or inconsistency sensing technique offers the advantage of achieving a very accurate control of as many LED columns as needed. This is particularly advantageous in a large lighting system because the sensing technique does not employ expensive operational amplifiers. Rather, the sensing technique employs only two very low cost silicon diodes, per each LED column, inserted on the LED panel circuit and a four-wire buss feedback circuit connected with the LED driver CVCC section, for securing the LEDs protection and long lifetime.

Additionally, two extra wires could be included in series with one of the LED driver AC supply to allow remotely control via external relays or switches.

This double stage isolated boost-flyback multi-columns LED driver system embodiment provides a superior double stage LED driver solution, with respect to the related art, providing higher quality, lower parts count and implicitly board size and much lower cost, as summarized in Table 12 below:

TABLE 12

Double Stage Off-line LED Driver Comparison Chart

| # | Parts & Performance | Texas Instruments | | Supertex | | Embodiment | |
|---|---|---|---|---|---|---|---|
| 1 | Parts Count (expensive) | 136 | (32) | 63 | 9 | <50 | 9 |
| 2 | ICs (opto couplers) | 5 | (2) | 1 | (0) | 5 | (2) |
| 3 | Transistors-(FETs) | 8 | (5) | 5 | (1) | 2 | (2) |
| 4 | Diodes-(bridge & fast rec.) | 14 | (9) | 13 | (10) | 3 | (3) |
| 5 | Capacitors-(electrolytic) | 50 | (11) | 15 | (0) | 5 | (2) |
| 6 | Inductors-(Transformers) | 3 | (3) | 4 | (0) | 3 | (2) |

TABLE 12-continued

Double Stage Off-line LED Driver Comparison Chart

| # | Parts & Performance | Texas Instruments | | Supertex | | Embodiment | |
|---|---|---|---|---|---|---|---|
| 7 | Resistors-(high power) | 56 | (2) | 25 | (2) | 18 | (2) |
| 8 | Efficiency (typ.) | 87% | | 87% | | 87% | |
| 9 | Power Factor (typ.) | 0.95 | | 0.95 | | 0.99 | |
| 10 | A. THD (typ.) | <10% | | <10% | | <10% | |
| 11 | LED Stripes CCS | 1 | | 1 | | 3 | |
| 12 | Board Size | VL | | ML | | M | |
| 13 | Cost (total) | VH | | M | | L | |
| 14 | Lifetime (years) | 3 | | 3 | | 5 | |

The main advantages of the double stage SMPS embodiment circuit system consist in the fact that provides I/O circuits isolation and the first stage (boost) converts the unregulated AC input voltage into a regulated (390V) DC voltage. Therefore, the second stage (flyback) will always have sufficiently high supply voltage amount for delivering to its load a precisely regulated DC voltage having much smaller ripples, and less flicker, than can be obtained in a single stage converter.

Additionally, this double stage LED driver embodiment, subject of this specification, provides low component count, lower size, lower manufacturing cost, equal or higher electrical performance for a similar double stage driver solutions. Most importantly, this double stage LED driver embodiment provides a very safe and reliable CVCC control solution by including a CCS per each LED stripe. This increases significantly operation lifetime (up to 5 years) of the LED lamp retrofits by protecting the LEDs against any un-predicted and/or fast variations of the supply voltage and/or ambient temperature.

As an important note, the Supertex solution has significant lower parts count amount than the TI's solution because it does not provide I/O circuit isolation (for avoiding to use opto coupler and error amplifiers), feature which is a mandatory requirement in some market segments.

Embodiment 9

Single Stage Boost Multi-Columns LED Driver

FIG. 9 shows an embodiment of a single stage boost multi-column LED driver circuit.

Description of the Connections

As embodied herein, a single stage boost multi-columns LED driver circuit comprises an AC-to-DC converter sub-circuit including an alternating current generator Vac (51), a low pass filter EMI (52) having its input coupled to Vac (51) and the output coupled to the AC input of a bridge rectifier BR (53) which has its negative output coupled to ground (55) and its positive output coupled to ground (55) via a first filtering capacitor Cf1 (54).

A two coils boost inductor Lb (110) has its primary coil coupled on one end to the positive output of bridge rectifier BR (53) and the other end coupled simultaneously to the anode of a boost output diode Dob (111) and to the drain of a MOSFET transistor Mb (112). The Lb (110) secondary coil having one end coupled to ground (55) and the other end to the anode of a supply diode Dvcc (115). The supply diode Dvcc (115) has its cathode coupled to the positive output of BR (53) via a starting resistor Rst (114) and to ground (55) via a supply capacitor Cvcc (116).

An eight terminal pulse width modulation integrated circuit PWMic (120) has a first terminal "Vcc" coupled to the cathode of Dvcc (115). A second terminal "DRV" is coupled via a gate resistor Rg (121) to the gate of Mb (112) which has its source electrode coupled to ground (55). A third terminal "Is" is coupled to the emitter of a voltage ramp NPN transistor Qvr (125) via a first voltage ramp resistor Rvr1 (126). A fourth terminal "GND" is coupled to ground (55). A fifth terminal "Osc" is coupled directly to the base of Qvr (125) and to ground (55) via a timing capacitor Ct (124). A sixth terminal "Vref" (406) is coupled simultaneously via a capacitor Cr (122) to ground (55), via a timing resistor Rt (123) to the Osc terminal, and directly to the collector of Qvr (125). A seventh terminal "Comp" is coupled to one terminal of a compensating capacitor Cc (130). An eighth terminal "FB" is coupled to the other terminal of Cc (130).

A soft start over voltage control sub-circuit (SSOVC) (140) comprises a first soft start diode Dss1 (142) having its anode coupled to the Comp terminal of PWMic (120) together with the cathode of a second soft start diode Dss2 (143). The cathode of Dss1 (142) together with the anode of Dss2 (143) are coupled to the FB terminal of PWMic (120) via a soft start capacitor Css (141). The FB terminal of PWMic (120) is also coupled via a first feedback resistor Rfb1 (128) to the cathode of the boost output diode Dob (111) and to ground (55) via a second feedback resistor Rfb2 (129). The cathode of Dob (111) is also coupled via a second filtering capacitor Cf2 (190) to ground (55) and directly to a voltage supply input Vsi (301).

A first terminal of a five terminal LED Panel (300) sub-circuit also is coupled to the cathode of Dob (111). The LED Panel (300) sub-circuit has also a second terminal Vd+ (302) coupled to the cathode of a controlling Zener diode Dzctrl (434) and to the emitter of a PNP controlling transistor Qctrl (431) which has its collector together with the anode of Dzctrl (434) coupled to the Is terminal of PWMic (120) via a resistor (433). A third terminal Vd− (303) is coupled to the base of Qctrl (431) via a resistor (432). A fourth terminal (304) coupled to ground via a current sense resistor Rsled (360) and to the Is terminal of the PWMic (120) via a resistor Rvr2 (127). A fifth terminal (406) coupled to the Vref terminal of the PWMic (120).

The LED Panel (300) sub-circuit comprises three identical LED column sub-circuits. This includes a first LED column LEDc1 (310) including several LEDs coupled in a series circuit where the anode of the first LED is coupled to the Vsi (301) terminal and the cathode of the last LED is coupled to the anode of a first diode DI1+ (321). The cathode of the first diode DI1+ (321) is coupled to Vd+ (302) and to the cathode of a second diode DI1− (322). The anode of diode DI1− (322) is coupled to Vd− (303) and to the collector of a first NPN transistor (343). The first NPN transistor (343) has its emitter coupled to Iled (304) via a first resistor (344) and its base coupled directly to the collector of a second NPN transistor (342) and via a second resistor (341) to Vref (406). The second NPN transistor (342) has its emitter coupled to lied (304) and its base coupled to the emitter of the first NPN transistor (343).

A second LED column LEDc2 (311) including several LEDs is coupled in a series circuit where the anode of the first LED is coupled to the Vsi (301) terminal and the cathode of the last LED is coupled to the anode of a first diode DI2+ (323). The first diode DI2+ (323) has its cathode coupled to Vd+ (302) and its anode coupled to the cathode of a second diode DI2− (324). The second diode DI2− (324) has its anode coupled to Vd− (303) and its cathode coupled to the collector of a first NPN transistor (347). The first NPN transistor (347) has its emitter coupled to lied (304) via a first resistor (348) and its base coupled directly to the collector of a second NPN transistor (346) and via a second resistor CCS2 (345) to Vref (406). The second NPN transistor (346) has its emitter coupled to lied (304) and its base coupled to the emitter of the first NPN transistor (347).

A third or last ("z") LED column LEDcz (312) includes several LEDs coupled in a series circuit where the anode of the first LED is coupled to the Vsi (301) terminal and the cathode of the last LED is coupled to the anode of a first diode DIz+ (325). The first diode DIz+ (325) has its cathode coupled to Vd+ (302) and its anode coupled to the cathode of a second diode DIz− (326). The second diode DIz− (326) has its anode coupled to Vd− (303) and its cathode coupled to the collector of a first NPN transistor (351). The first NPN transistor (351) has its emitter coupled to Iled (304) via a first resistor (352) and its base coupled directly to the collector of a second NPN transistor (350) and via a second resistor (349) to Vref (406). The second NPN transistor (350) has its emitter coupled to Iled (304) and its base coupled to the emitter of the first NPN transistor (351).

Description of the Block Schematic

As further embodied herein, a single stage boost multi-column LED driver system comprises a conventional AC-to-DC converter sub-circuit, a power factor correction ("PFC") sub-circuit and a LED Panel (300) sub-circuit.

Description of the PFC Boost

The conventional AC-to-DC converter circuit, including the AC generator Vac (51), the low-pass filter EMI (52), the bridge rectifier BR (53) and the capacitor Cf1 (54) provides an unregulated DC voltage across the capacitor Cf1 (54) via the bridge rectifier BR (53). The bridge rectifier BR (53) has its negative output terminal coupled to ground (55) and its positive output terminal coupled to one terminal of the boost inductor Lb (110) primary coil of the PFC sub-circuit. The EMI (52) filter is configured to allow (low impedance for) the low frequency (typically, 50 Hz-60 Hz) currents to easily pass from the Vac generator to the PFC-b (100) sub-circuit and to stop (high impedance for) the high frequency (typically, 20 kHz-200 kHz) currents, generated inside of the LED driver circuit, to come back to the Vac (51) generator (i.e., the AC Electrical Grid). The first filtering capacitor Cf1 (54) has a relatively sufficiently low value (10 nF-200 nF) for filtering high frequency currents but, on the other hand, to do not create significant distortions of the low frequency current and, implicitly, to decrease the entire system's power factor coefficient.

As still embodied herein, the PFC sub-circuit is configured to deliver a regulated DC supply voltage to the LED Panel (300) sub-circuit, in a manner which allows for an optimal transfer of electrical energy between the alternative current generator Vac (51) and the LED Panel (300). The LED Panel (300) is the "load" of the entire system. Since the LEDs require DC voltage stored, usually, in large value (bulk) capacitors (10 uF to 1000 uF), the main function performed by the PFC sub-circuit is to deliver a regulated voltage across a relatively large value capacitor, in such a manner for the entire LED driver circuit current's shape to follow, as closed as possible, the phase and shape of the AC generator (51), respectively a rectified sine-wave shape, regardless of each of the other sub-circuits' current shape.

For this purpose, the PFC sub-circuit is a boost converter having a rectified sine-wave pulse voltage as input supply voltage and delivering a regulated DC voltage to the LED Panel (300) supply input VsI (301) terminal and an output voltage which is higher in amount than the peak input voltage, with respect to a zero volts input ground (55) terminal. The primary coil of the boost inductor Lb (110) is coupled from the positive output of BR (53) to ground (55) via a MOSFET switch Mb (112). The boost inductor Lb (110) generates the higher output voltage across a second filtering capacitor Cf2 (190) via a fast recovery diode Dob (111), as a result of high frequency ON-OFF switching pulses enforced by the Mb (112) buffer, and generated by the pulse width modulation integrated circuit PWMic (120). The PWMic (120) generates driving square wave pulses to the gate of Mb (112), via its DRV terminal and the gate resistor Rg (121). The output voltage amount is sensed by the PWMic (120) controller's FB terminal, which is coupled to the PFC sub-circuit output FBb (103) via Rfb1 (128) and to ground (55) via Rfb2 (129).

Description of the SSOVC Sub-Circuit

The PWMic (120) feedback voltage compensation is done by the compensation capacitor Cc (130) coupled between the FB and Comp terminals, which has coupled in parallel the soft start over voltage control SSOVC (140) sub-circuit comprising the two diodes Dss1 (142) and Dss2 (143) and the capacitor Css (141). This simple circuit offers a much faster and stable compensation by allowing the use of a higher value capacitor without decreasing the sensitivity of the FB input, because of the voltage threshold and current nonlinearity of the diodes. The maximum voltage at FBb (103) output is limited by PWMic (120) by decreasing, accordingly, the ON time of its driving pulses, and implicitly, by lowering the average current of the boost inductor Lb (110).

Description of Conventional Operations of the UC3842

The PWMic (120) start-up supply is secured by a large value starting resistor Rst (114) which delivers a fraction VPin (101) voltage to its supply terminal Vcc, with respect to its zero voltage terminal GND, coupled to ground (55). A larger current supply is delivered by the secondary coil of Lb (110) via Dvcc (115) and Cvcc (116), as soon as the Mb (112) switch forces Lb (110) to oscillate. The Rt (123) resistor and the Ct (124) capacitor establish the PWMic (120) operating frequency and the capacitor Cr (122) improves the Vref terminal stability. The transistor Qvr (125) together with the resistors divider Rvr1 (126) and Rvr2 (127) create a voltage ramp signal at the Is terminal of the PWMic (120) for limiting the output signal duty cycle down to a pre-established limit and allowing the controller to operate in voltage mode.

The PFC sub-circuit's simplicity allows for very low cost controller circuits, such as the controllers included in the most commonly used UC384x series.

Description of the LED Panel (300)

As yet embodied herein, the LED Panel (300) sub-circuit comprises three LED columns and a protection circuitry which provide fast correction feedback to the PWMic (120) controller. The supply voltage inputted at VsI (301) terminal is controlled by the FB terminal of PWMic (120) in a ratio determined by the Rfb1 (128), Rfb2 (129) divider. The current of LED Panel (300) is corrected by the PWMic (120) by receiving in its current sense Is terminal a fraction of the voltage collected across the sense resistor Rsled (360) via the Rvr2 (127). The sub-circuit including Qctrl (431), Dzctrl (434) and the two resistors (432) and (433) performs a special feedback function, strongly related to the LED Panel (300) internal protection circuit.

As still embodied herein, internally the LED Panel (300) sub-circuit comprises three LED columns and a protection circuit comprising three constant current sinks and six diodes which secure the constant current for each LED column. Additionally, it offers a very simple and cost effective protection for "un-balanced LED columns", respectively a special protection for cases when one or more LEDs are damaged or not consistent in voltage versus current specs, with the others.

Since the protection circuit is identical for all columns, for simplifying the description of this sub-circuit, only the first two columns LEDc1 (310) and LEDc2 (311) protection circuit will be fully described, considering that the same control method could be apply to many ("z") LED columns.

The LEDc1 column includes several LEDs coupled in series, having the anode of the first LED coupled to the positive supply terminal VsI (301) and the cathode of the last LED coupled to the Iled (304) terminal, via a constant current sink device CCS1 (331), as shown in FIG. 8, biased with a constant voltage received from the Vref terminal of the PWMic (120) controller chip. The Iled (304) terminal delivers the entire LED Panel (300) current to ground (55) terminal via the Rsled (360) sense resistor. Connected to the cathode of LEDc1 (310) last LED, there is a first diode DI1+ (321) coupled with its cathode to the Vd+ (302) terminal and a second diode DI1− (322) coupled to the Vd− (303) terminal.

Similarly for the LEDc2 (311) column, the anode of the first LED coupled also to the positive supply terminal VsI (301) and the cathode of the last LED coupled also to the Iled (304) terminal, via a constant current sink device CCS2 (332) biased with a constant voltage received from the Vref (406) terminal. Connected to the cathode of LEDc2 (311) last LED, there is a first diode DI2+ (323) coupled with its cathode to the Vd+ (302) terminal and a second diode DI2− (324) coupled to the Vd− (303) terminal. The Vd+ (302) is coupled to the current sense Is terminal of the PWMic (120) via the Dzctrl (434) and the resistor (433) for decreasing the controller's driving signal duty cycle, and the output voltage at FBb (103), at any time when the Vd+ voltage amount exceeds the Dzctrl (434) zener diode nominal voltage.

The transistor Qctrl (431) acts as a differential error amplifier by having its emitter coupled to Vd+ (302), its base coupled to Vd− (303) via the resistor (432) and its collector coupled to the current sense Is terminal of the PWMic (120). Under normal operating conditions, if all LEDs included in the LEDc1 (310) column and also, all LEDs included in the LEDc2 (311) column have identical voltage versus current specifications and/or none of them is damaged, the voltage between Vd+ (302) and Vd− (303) terminals is supposed to be zero. However, as soon as something is wrong with only one LED included in any of the two columns, a difference of voltage will appear between the base and emitter of the Qctrl (432) and, if that voltage is higher than a pre-established amount, then the Qctrl (431) transistor's collector terminal will increase the voltage at the Is terminal of the PWMic (120) and eventually, the controller chip's driving signal will be shut down for preventing malfunctions or further damages in the LED lamp circuit.

Alternatively, the Qctrl (431) transistor's feedback could be used not to shut down the PWMic (120) controller chip, but only the damaged LED column, by shutting down the bias supply of the CCS circuit which connects that column to the Iled (304) terminal and in this way the damaged LED column cannot create further damages since it is practically completely disconnected from the LED panel (300) circuit.

This damages or inconsistency sensing method offers the advantage of achieving a very accurate control of as many LED columns as needed, in a large lighting system, without using expensive operational amplifiers, but only two very low cost silicon diodes, per each LED column, inserted on the LED panel circuit and, a four wire buss feedback circuit connected with the LED driver CVCC section, for securing the LEDs protection and long lifetime.

Additionally, two extra wires could be included in series with one of the LED driver AC supply to allow remotely control via external relays or switches.

This embodiment provides a superior double stage LED driver solution with respect to the related art, providing higher quality, lower parts count, lower board size longer lifetime and much lower cost, as summarized in Table 13 below:

TABLE 13

Single Stage Off-Line Boost LED Driver Comparison Chart

| # | Parts & Performance | Intersil | | Embodiment | |
|---|---|---|---|---|---|
| 1 | Parts Count (expensive) | 42 | (11) | 36 | (6) |
| 2 | ICs (opto couplers) | 3 | (0) | 1 | (0) |
| 3 | Transistors - (FETs) | 2 | (1) | 1 | (1) |
| 4 | Diodes- (bridge & fast rec.) | 13 | (6) | 12 | (1) |
| 5 | Capacitors - (electrolytic) | 11 | (3) | 5 | (2) |
| 6 | Inductors - (Transformers) | 2 | (0) | 2 | (1) |
| 7 | Resistors - (high power) | 19 | (1) | 15 | (1) |
| 8 | Efficiency (typ.) | 90% | | 93% | |
| 9 | Power Factor (typ.) | >0.9 | | 0.995 | |
| 10 | A. THD (typ.) | <20% | | 8% | |
| 11 | LED Stripes CCS | 1 | | 3 | |
| 12 | Board Size | Medium | | Small | |
| 13 | Cost (total) | Large | | Very Large | |
| 14 | Lifetime (years) | 3 | | 5 | |

The main advantages versus the related art of this single stage off-line boost converter circuit embodiment consists in lower parts count and size, higher performance and lower cost. Additionally, the three LED stripes CCS allows for more output power and longer lifetime of the LED lamp retrofit which uses this more reliable LED driver circuit system solution.

Embodiment 10

No Opto-Coupler Isolated Flyback LED Driver

FIG. 10 shows an embodiment of a no opto-coupler isolated flyback LED driver circuit.

Description of the Connections

As embodied herein, a no opto-coupler isolated flyback LED driver circuit (200) comprises a direct current voltage source VDCin (201), which supplies the drain of a MOSFET transistor Mf (212) via a primary coil of a three coils flyback transformer TRf (210). The transformer TRf (210) has, besides one primary coil, one low current secondary coil and one large current secondary coil.

A snubber circuit SnC (220) including a Zener diode Dzsn (221) coupled in series with a rectifier diode Dsn (222), in such a manner that the cathode of Dzsn (221) is coupled to VDCin (201) and the anode of Dsn (222) is coupled to the drain of Mf (212). The drain of Mf (212) is attached across the TRf (210) primary coil. The low current coil of TRf (210) having one end coupled to an input ground terminal (55) and the other end coupled to the anode of a feedback diode Dvfb (251) which has its cathode coupled to (55) via a feedback capacitor Cvfb (252). The large current secondary coil of TRf (210) having one end coupled to an output ground terminal (65) and the other end coupled to the anode of a flyback diode Df (211), which has its cathode coupled to the output ground (65) via a filtering capacitor Cf3 (290) and in parallel, via a column of several LEDs coupled in series LEDc1 (310).

The Mf (212) has its source coupled to the input ground (55) via a sense resistor (232) and its gate coupled to a driving terminal of an eight terminal pulse width modulation integrated circuit PWMic (120) via a gate resistor (231). The PWMic (120) has a second terminal Vcc coupled to a DC supply terminal Vic (117). A third terminal Is is coupled to the Mf (212) drain via a resistor IsF (241) and to the input ground (55) via a capacitor (242). A fourth terminal GND is coupled to the input ground (55). A fifth terminal Osc is coupled to (55) via a capacitor Ct (124). A sixth terminal Vref is coupled to Osc via a resistor Rt (123) and to (55) via a capacitor Cr (122). A seventh terminal Comp is coupled to one terminal of a compensation capacitor Cc (130). An eighth terminal FB is coupled to the other terminal of the Cc (130).

A two terminals soft start over voltage control sub-circuit SSOVC (140) is coupled across the FB and the Comp terminals. The FB terminal is also coupled to the cathode of the Dvfb (251) via a first feedback resistor Rfb1 (128) and to (55) via a second feedback resistor Rfb2 (129). A four terminal VFCFB sub-circuit (260) has a first terminal V sin coupled to the cathode of Dvfb (251). A second terminal Ctrl is coupled to the Comp terminal of PWMic 120. A third terminal Vrin is coupled to the Vref terminal of PWMic 120. A fourth terminal is coupled to the input ground (55).

Description of Flyback Converter

As further embodied herein, the PWM-f (200) main circuit is a conventional low cost high performance isolated DC flyback converter using a UC3842 controller, which can operate as a "second stage" sub-circuit, after a PFC boost converter, in off-line AC circuits, as well.

Two novel sub-circuits included in this flyback converter system, such as the SSOVC (140) (soft start and over-voltage control) and the VFCFB (voltage follower current feedback) increase, substantially, the performances and control capabilities of the UC3842 (120) chip, while reducing the parts count, size and cost of the entire system.

As still embodied herein, the UC3842 controller chip operates in its very conventional CCM (continuous conduction mode) of operations by delivering a PWM driving signal to the MOSFET buffer transistor Mf (212), which via the flyback transformer TRf (210), creates two output supply voltages. The two output supply voltages are: a) a high current supply voltage rectified by the diode Df (211) and filtered by the capacitor Cf3 (290) for supplying the LED stripe (310), and b) a low current feedback supply voltage signal rectified by the diode Dvfb (251) and integrated by the capacitor Cvfb (252), to the controller chip (120) FB input via the two resistors divider Rfb1 (128), Rfb2 (129) and the compensation capacitor Cc (130).

The converter operating frequency is set by the resistor Rt (123) and the capacitor Ct (124) at the Osc terminal of the controller IC (120). The capacitor Cr (122) filters the 5V precise reference delivered by the controller (120) via its Vref output and the spikes of the current feedback signal collected by the Is input of the controller (120), from the sense resistor (232) coupled between the Mf (212) source terminal and the input ground (55) are filtered by a simple current spikes filter sub-circuit IsF (240), consisting of a resistor (241) and a capacitor (242).

The sense resistor (232) is calculated, in such a manner, to limit the MOSFET buffer (212) and implicitly the TRf (210) primary coil peak current to an amount lower than a dangerous limit at which the TRf (210) secondary maxim current may damage the LEDs.

The two diodes and one low value capacitor SSOVC (140) sub-circuit, which has been introduced at the boost converter section of the previous embodiment's description, performs the same soft-start and overvoltage control job, improving the PWM chip (120) feedback control capability.

The VFCFB (260) sub-circuit comprises a zener diode Dzvf (264) which has its cathode coupled to the hot (not grounded) terminal of the capacitor Cvfb (252) and its anode coupled, simultaneously, to the base of a PNP transistor (261), to the input ground (55) via a first resistor Rvf− (263) and to the Vref output of the controller chip (120) via a second resistor Rvf+ (262). The PNP transistor (261) has its collector coupled to the input circuit ground (55) and its emitter coupled to the Comp terminal of the controller chip (120).

This simple and very low cost VFCFB (260) circuit eliminates the need for the complex and expensive circuit used, typically, in the load current feedback of the isolated flyback converter circuits, such as opto-coupler, error amplifier, voltage shunt reference, resistors and capacitors.

The method of using this circuit is based on the following considerations:

a) the flyback output voltage, over the LED stripe, is sensed and kept constant via the voltage feedback signal collected via the low current secondary of the flyback transformer;

b) the maximum current of TRf (210) is limited by the sense resistor (232);

c) the voltage and current range variation, within the ambient temperature are anticipated in the converter design's calculations; and d) in conclusion, the only unpredictable event which could happen is that one or more LEDs included in the load stripe could fail in short-circuit (i.e., near zero resistance and near voltage across), a fact which will cause a drop of the output voltage, followed by a proportional drop in the voltage feedback sense circuit, a fact which will force the controller IC (120) to increase the pulse duty cycle in order to "compensate" and to increase the output voltage, a fact which will lead, finally, to irreversible damage of the remaining working LEDs (310), the flyback transformer (210), and the MOSFET buffer (212).

Only in this unpredictable situation, the VFCFB sub-circuit operates as follows:

a) the zener diode (264) threshold voltage and the voltage in concert with the voltage created by the Rvf+ (262) and the Rvf− (263) resistors divider is calculated, in such a manner, for during the time the feedback voltage is in a pre-established range, the amount of voltage in the Qvf (261) base to be higher than the amount of voltage in the Comp terminal of the controller chip (120), so the Qvf (261) transistor to be blocked, having near zero emitter-collector current; and b) when the voltage reference amount drops, significantly, confirming the failure of one or more LEDs in the load stripe, than the voltage at the base of Qvf (262) will drop accordingly, its emitter-collector current will increase and the controller chip's (120) Comp terminal voltage amount will decrease, keeping the controller (120) output driving signal at a low duty-cycle and, implicitly, limiting the output current al a lower level for protecting all the parts included in the high current section of the circuit.

This VFCFB (260) circuit is basically a "primary side current sensing circuit" following a different sensing method than all the other used in the related art.

This embodiment is not compared with the related art solutions because it represents only a low cost DC isolated flyback driver which requires a "first stage PFC boost", in order to operate in the off-line AC LED drivers' section.

Embodiment 11

Single Stage Single Ground Flyback LED Driver

FIG. 11 shows an embodiment of a single stage single ground flyback LED driver circuit. This driver circuit includes many elements similar to the other embodiments presented above. Therefore, the description of this embodiment will be shorter, focused only to the new elements provided by this system embodiment.

Description of Connections

As embodied herein, a single stage single ground flyback LED driver circuit comprises an AC-to-DC converter sub-circuit including an alternating current generator Vac (51), a low pass filter EMI (52) having its input coupled to Vac (51) and the output coupled to the AC input of a bridge rectifier BR (53). The negative output of the bridge rectifier BR (53) is coupled to ground (55) and its positive output is coupled to a first filtering capacitor Cf1 (54).

From the output of the bridge rectifier BR (53) is supplied the drain of a MOSFET transistor Mf (212) via a primary coil of a three coils flyback transformer TRf (210) having, besides one primary coil, one low current secondary coil and one large current secondary coil.

A snubber circuit SnC (140) is coupled in parallel to the flyback transformer (210) primary coil.

The low current coil of TRf (210) having one end coupled to ground (55) and the other end coupled to the anode of a supply diode (115) which has its cathode coupled to (55) via a filtering capacitor (116).

The large current secondary coil of TRf (210) having one end coupled to ground (55) and the other end coupled to the anode of a flyback output diode Df (211) which has its cathode coupled to ground (55) via a filtering capacitor Cf3 (290) and in parallel, it supplies a column (stripe) of several LEDs, LEDc1 (310) coupled in series, via a current sense resistor Rsled (360), to ground (55).

The Mf (212) has its source coupled to ground (55) and its gate coupled to a driving terminal of an eight terminal pulse width modulation integrated circuit PWMic (120) via a gate resistor (231).

The PWMic (120) has a second terminal Vcc coupled to the cathode of the supply diode (115). A third terminal Is is coupled to ground (55) via a resistor Rvr2 (127) and to the emitter of a voltage ramp NPN transistor Qvr (125) via another resistor Rvr1 (126). A fourth terminal GND is coupled to the system ground (55). A fifth terminal Osc is coupled to ground (55) via a capacitor Ct (124). A sixth terminal Vref is coupled to Osc via a resistor Rt (123) and to (55) via a capacitor Cr (122). A seventh terminal Comp is coupled to one terminal of a compensation capacitor Cc (130). An eighth terminal FB is coupled to the other terminal of the capacitor Cc (130).

A two terminal soft start over voltage control sub-circuit SSOVC (140) is coupled across the FB and the Comp terminals.

The FB terminal is also coupled to the cathode of the supply diode (115) via a first feedback resistor Rfb1 (128) and to (55) via a second feedback resistor Rfb2 (129).

The voltage ramp NPN transistor Qvr (125) has its collector coupled to the Vref terminal and its base is coupled to the OSC terminal of the PWMic (120).

An operational amplifier A3 (412) has one input coupled to ground (55) via the Rsled (360), the other input coupled via a first divider resistor (142) to ground (55) and via a second divider resistor (141) to the Vref terminal of the PWMic (120) and the output of A3 (412) is coupled to the Comp terminal of the PWMic (120).

Description of the Conventional Passive AC/DC Converter

The conventional AC-to-DC converter circuit, including the AC generator Vac (51), the low-pass filter EMI (52), the bridge rectifier BR (53) and the capacitor CF1 (54) provides an unregulated DC voltage across the capacitor CF1 (54) via the bridge rectifier BR (53) which has its negative output terminal coupled to ground (55) and its positive output terminal coupled to ground (55) via the first filtering capacitor Cf1 (54).

The EMI (52) filter is designed in such a manner to allow (low impedance for) the low frequency (typically, 50 Hz-60 Hz) currents to easily pass from the Vac generator to the PFC-b (100) sub-circuit and to stop (high impedance for) the high frequency (typically, 20 kHz-200 kHz) currents, generated inside of the LED driver circuit, to come back to the Vac (51) generator (i.e. back into the AC Electrical Power Grid).

The first filtering capacitor Cf1 (54) has a relatively low value (10 nF-200 nF) for filtering high frequency currents but, on the other hand, to do not create significant distortions of the low frequency current and, implicitly, to decrease the entire system's power factor coefficient.

Description of Flyback Converter

As further embodied herein, the main circuit is a conventional low cost high performance non-isolated flyback converter using at maximum the low cost UC3842 IC's capabilities to work, simultaneously, as a PFC controller, as well as a PWM controller, allowing the system to operate as a single stage single ground off-line AC LED driver.

The SnC (140) conventional snubber circuit functionality and importance have been also described above.

The NPN transistor Qvr (125) operates in a conventional mode, providing a fraction of the voltage ramp signal collected from the Osc terminal to the Is terminal of the PWMic (120) via the Rvr1 (126) and Rvr2 (127) resistors, for limiting the controller's driving signal's duty cycle down to a pre-established limit.

The output voltage control is executed also in a conventional manner, in which the voltage provided by the low current secondary coil of the flyback transformer TRf (210) is used, simultaneously, as a supply voltage for the PWMic (120) and as voltage feedback signal, collected by the FB terminal of the PWMic (120), via the very precise voltage divider resistors Rfb1 (128) and Rfb2 (129).

A two terminal soft start and over-voltage control compensation sub-circuit SSOVC (140), which has been described above, secures a very fast and reliable compensation function, in such a manner that a very low cost PWM chip, such as UC3842 can work also as a very good quality PFC controller, if all the other sub-circuits of the system, as well as the mode of operation selected (for example, Critical Conduction Mode (CrCM)) by the designer, concur for this accomplishment.

The operational amplifier A3 (412) is also performing a conventional function, by sensing the LEDc1 (310) stripe current with one of its inputs via Rsled, comparing it with a precise and constant, over temperature, reference voltage provided by the Vref terminal of PWMic (120). When the LEDc1 (310) current is higher than a pre-established limit, the A3 (412) output lowers the amount of voltage at the Comp terminal of PWMic (120), which decreases the duty-cycle of its driving pulses, accordingly, until the LED current decreases within the pre-established limits.

For lower cost and size applications, the operational amplifier A3 (412) could be replaced with a low cost NPN transistor or by coupling Rvr2 to ground (55) via Rsled (232), in such a manner for that the Is input of the PWMic (120) can control the output current. However, the accuracy of control will not reach the same quality.

As still embodied herein, in this off-line AC flyback configuration the UC3842 controller chip works in a constant frequency critical conduction mode (CrCM) mode of operation. This ideal topology allows the system to control very accurately, in a CVCC manner, the voltage and current across the LEDc1 (310) load, while the power factor of the converter remains over 0.99 for the time the controller chip (120) feedback and compensation sub-circuits provide a constant signal.

The UC3842 is one of the most used and reliable PWM controller IC. In this particular circuit, the UC3842 PWM controller IC has the benefit of receiving a very stable load voltage feedback, secured by the SSOVC (140) sub-circuit, and a very stable load current feedback, secured by a low cost good quality operational amplifier. Accordingly, this single stage single ground flyback LED driver circuit can compete in quality and reliability with any similar LED driver solution provided by reputable companies in the worldwide power management industry.

This embodiment provides a superior single stage single ground off-line AC flyback LED driver solution with respect to the related art, providing higher quality, lower parts count, lower board size longer lifetime and much lower cost, as summarized in Table 14 below:

TABLE 14

Simple Stage Single Ground Flyback LED Driver Comparison Chart

| # | Parts & Performance | Intersil | | Embodiment | |
|---|---|---|---|---|---|
| 1 | Parts Count (expensive) | 53 | (11) | 27 | (9) |
| 2 | ICs (opto couplers) | 3 | (0) | 2 | (0) |
| 3 | Transistors - (FETs) | 2 | (1) | 2 | (1) |
| 4 | Diodes- (bridge & fast rec.) | 14 | (6) | 5 | (3) |
| 5 | Capacitors - (electrolytic) | 12 | (3) | 6 | (3) |
| 6 | Inductors - (Transformers) | 2 | (0) | 2 | (1) |
| 7 | Resistors - (high power) | 20 | (1) | 10 | (1) |
| 8 | Efficiency (typ.) | >82% | | >82% | |
| 9 | Power Factor (typ.) | >0.9 | | 0.995 | |
| 10 | A. THD (typ.) | <20% | | 8% | |
| 11 | LED Stripes CCS | 1 | | 1 | |
| 12 | Board Size | Med. | | Small | |
| 13 | Cost (total) | Med. | | Very Small | |
| 14 | Lifetime (years) | 3 | | 3 | |

The main advantage over the related art of this single stage off-line non-isolated converter circuit embodiment consists in lower parts count, size, higher performance and lower cost. Additionally, the controller chip used, the UC 3842 is the most cost effective good quality PWM chip, in the worldwide industry.

Embodiment 12

Single Stage Constant Off Time Buck LED Driver

FIG. 12 shows an embodiment of a single stage constant off time buck LED driver circuit.

Description of Connections

As embodied herein, a single stage constant off time buck LED driver circuit comprises an AC-to-DC converter sub-circuit including an alternating current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to ground (55) via a first filtering capacitor Cf1 (54).

The output of the bridge rectifier BR (53) supplies the drain of a MOSFET transistor Mbb (512) via an LED column load LEDc1 (310) coupled in parallel to a primary coil of a two coils buck-boost transformer Lbb (510) having a primary high current coil and a low current secondary coil.

The low current secondary coil of Lbb (510) having one end coupled to ground (55) and the other end coupled to the anode of a supply diode (116) which has its cathode coupled to (55) via a filtering capacitor Cvcc (115).

The Mbb (512) has its source coupled to ground (55) via a sense resistor (532) and its gate coupled to a driving terminal of an eight terminal pulse width modulation integrated circuit PWMic (120) via a gate resistor (531).

The PWMic (120) has a second terminal Vcc coupled to the cathode of the supply diode (116). A third terminal Is is coupled to ground (55) via a current spikes filter sub-circuit IsF (240) operatively coupled with the sense resistor (532). A fourth terminal GND is coupled to the system ground (55). A fifth terminal Osc is coupled to ground (55) via a capacitor Ct (124). A sixth terminal Vref is coupled to Osc via a resistor Rt (123) and to (55) via a capacitor Cr (122). A seventh terminal Comp is coupled to one terminal of a compensation capacitor Cc (130). An eighth terminal FB is coupled to the other terminal of the capacitor Cc (130).

A two terminal soft start over voltage control sub-circuit SSOVC (140) is coupled across the FB and the Comp terminals.

The FB terminal is also coupled to the collector of a voltage sense transistor Qvs (521) via a first feedback resistor Rfb1 (128) and to ground (55) via a second feedback resistor Rfb2 (129).

The voltage sense PNP transistor Qvs (521) together with a voltage sense resistor Rvs (523) coupled across its base-emitter junction and a zener diode coupled with the anode to the base of Qvs (521) and the cathode to the drain of Mbb (512) structure a differential voltage sense sub-circuit DVs (520).

A buck diode Dbb (511) is coupled with the anode to the drain of Mbb (512) and with the cathode is coupled to the positive output of the bridge rectifier BR (53).

A buck capacitor Cbb (514) is coupled across LEDc1 (310).

A starting resistor Rst (114) is coupled from the positive output of BR (53) to the Vcc terminal of the PWMic controller (120).

A conventional two capacitors, three diodes and one resistor valley-fill filter sub-circuit VF-PFC (20) is couple operatively across the output terminals of BR (53).

A constant off time NPN transistor Qcot (541) has the emitter coupled to ground (55) the base coupled via a resistor Rcot (542) to the DRV terminal and the collector coupled to the Osc terminal of PWMic (120). The Qcot (541) and the Rcot (542) together form a constant off time switch COTsw (540).

Description of the Conventional Passive AC/DC Converter

The conventional AC-to-DC converter circuit, including the AC generator Vac (51), the low-pass filter EMI (52), the bridge rectifier BR (53) and the capacitor CF1 (54) provides an unregulated DC voltage across the capacitor Cf1 (54) via the bridge rectifier BR (53). The bridge rectifier BR (53) has its negative output terminal coupled to ground (55) and its positive output terminal coupled to ground (55) via the first filtering capacitor Cf1 (54).

The EMI (52) filter is designed in such a manner to allow (low impedance for) the low frequency (typically, 50 Hz-60 Hz) currents to easily pass from the Vac generator to the PFC-b (100) sub-circuit and to stop (high impedance for) the high frequency (typically, 20 kHz-200 kHz) currents, generated inside of the LED driver circuit, to come back to the Vac (51) generator (i.e. back into the AC Electrical Power Grid).

The first filtering capacitor Cf1 (54) has a relatively low value (10 nF-200 nF) for filtering high frequency currents but, on the other hand, to do not create significant distortions of the low frequency current and, implicitly, to decrease the entire system's power factor coefficient.

Description of the Constant Off Time (COT) Buck Converter

As further embodied herein, this LED driver circuit operates as a high quality constant off time (COT) buck converter not by using an expensive conventional COT integrated circuit, but rather, by using a cost effective PWM chip such as the UC3842, which was not designed for such mode of operations, as a result of two significant improvements:

The first significant improvement consists in connecting a low cost NPN transistor, as a switch between ground (55) and the Osc terminal, controlled by the DRV output of PWMic (120) in such a manner, that at each time when the output of PWMic (120) is in its High state, the Qcot (541) transistor discharges the oscillator timing capacitor Ct (124), forcing the output driving pulse signal to have a constant OFF time, regardless of its momentarily ON time, controlled in a conventional PWM manner, in accordance to the voltage or current sensors signals.

The second significant improvement consists of the faster and more reliable SSOVC (140) compensation sub-circuit which allows the UC3842 chip to operate as well and reliable as an expensive chip designed specifically for the COT mode of operations.

Other additional low cost sub-circuits, such as the valley fill filter (20), replacing a sophisticated and expensive PFC converter and the DVs (520) replacing another expensive voltage feedback circuit including an opto-coupler, an operational amplifier and a voltage shunt regulator make this solution ideal for the low cost market, especially for low power (1 W-9 W) LED lamp retrofits, where a cost effective valley fill filter can reach over 0.9 power factor and meet the Energy Star's requirements.

This embodiment provides a cost effective single stage constant off time buck LED driver solution able to reach a lower cost even in competition with the South Asian LED driver providers, while offering superior performance and longer lifetime, as the summarized in Table 15 below:

TABLE 15

Single Stage COT Buck LED Drivers Comparison Chart

| # | Parts & Performance | UTC (China) | | Embodiment | |
|---|---|---|---|---|---|
| 1 | Parts Count (expensive) | 32 | (12) | 31 | (10) |
| 2 | ICs (opto couplers) | 1 | (0) | 1 | (0) |
| 3 | Transistors - (FETs) | 2 | (2) | 3 | (1) |
| 4 | Diodes- (bridge & fast rec.) | 11 | (2) | 9 | (2) |
| 5 | Capacitors - (electrolytic) | 10 | (5) | 8 | (5) |
| 6 | Inductors - (Transformers) | 2 | (1) | 2 | (1) |
| 7 | Resistors - (high power) | 6 | (2) | 8 | (1) |
| 8 | Efficiency (typ.) | <80% | | <83% | |
| 9 | Power Factor (typ.) | 0.85 | | 0.9 | |
| 10 | A. THD (typ.) | <30% | | <20% | |
| 11 | LED Stripes CCS | 1 | | 1 | |
| 12 | Board Size | Med. | | Med. | |
| 13 | Cost (total) | Large | | Large | |
| 14 | Lifetime (years) | 2 | | 3 | |

The main advantage over the related art of this single stage COT buck LED Driver circuit embodiment are: provides CVCC which increases the lifetime and efficiency, by not supplying the chip directly from the high DC voltage, and lower cost, by using a cost effective controller IC and only one MOSFET transistor.

Embodiment 13

Single Stage Single Ground Self Supply Buck-Boost LED Driver

FIG. 13 shows an embodiment of a single stage single ground self supply buck-boost LED driver circuit.

Description of Connections

As embodied herein, a single stage single ground self supply buck-boost LED driver circuit comprises an AC-to-DC converter sub-circuit including an alternating current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to ground (55) via a first filtering capacitor Cf1 (54).

The positive output of the bridge rectifier BR (53) supplies the drain of a MOSFET transistor Mbb (512) via a buck-boost coil Lbb (510).

The Mbb (512) source is coupled to the negative output of the bridge rectifier BR (53).

A first buck-boost diode Dbb1 (511) has the anode coupled to Mbb (512) drain and the cathode coupled to the positive output of the bridge rectifier BR (53) via a first buck-boost capacitor Cbb1 (514) and to ground (55) via a second buck-boost capacitor Cbb2 (515).

A second buck-boost diode Dbb2 (516) is coupled with its cathode to the bridge rectifier BR (53) positive output and with the anode to ground (55).

A start resistor Rst (114) is coupled from the negative terminal of the bridge rectifier BR (53) to ground (55).

The Mbb (512) receives driving signal across its gate source terminals via a secondary coil of ground separator transformer GS (520) which has the primary coil coupled with one terminal to GND (55) and the other terminal coupled to the driving terminal of an eight terminal controller chip PWMic (120) via a driving capacitor Cdrv (522).

The PWMic (120) has a second terminal Vcc coupled to the cathode of Dbb1 (511). A third terminal Is is coupled to ground (55) via a resistor Rvr2 (127) and to the emitter of a voltage ramp NPN transistor Qvr (125) via another resistor Rvr1 (126). A fourth terminal GND is coupled to the system ground (55). A fifth terminal Osc is coupled to ground (55) via a capacitor Ct (124). A sixth terminal Vref is coupled to Osc via a resistor Rt (123) and to (55) via a capacitor Cr (122). A seventh terminal Comp is coupled to one terminal of a compensation capacitor Cc (130). An eighth terminal FB is coupled to the other terminal of the capacitor Cc (130).

A two terminal soft start over voltage control sub-circuit SSOVC (140) is coupled across the FB and the Comp terminals.

The FB terminal is also coupled to the cathode of the Dbb1 (511) via a first feedback resistor Rfb1 (128) and to (55) via a second feedback resistor Rfb2 (129).

The voltage ramp NPN transistor Qvr (125) has its collector coupled to the Vref terminal and its base is coupled to the OSC terminal of the PWMic (120).

A several LED column LEDc1 (310) is coupled directly to the cathode of Cbb1 and via a current sense resistor Rsled (360) to ground (360)

An operational amplifier A3 (412) has one input coupled to ground (55) via the Rsled (360), the other input coupled to a voltage reference Vref 2 and the output of A3 (412) is coupled to the Comp terminal of the PWMic (120).

Description of the "Single Ground-Self Supply" Issues

As further embodied herein, historically the possibility to design a conventional buck-boost circuit which allows only one chip (i.e., a single stage topology) to convert from a higher voltage to a lower one and then to supply itself from that lower voltage, having access to the same zero voltage reference (or ground) with the load, did not look possible. Therefore, the worldwide designers came up with less efficient and/or more sophisticated topologies, such as Buck or SEPIC topologies, which allow the controller IC for direct (i.e., no opto-coupler) voltage feedback with respect to the load's momentary voltage or current amount.

The main issue for accomplishing such a single ground self supply in a conventional buck-boost topology consisted in the fact that such system would need an extra DC voltage, such as a battery, to provide start-up power supply to the controller chip, in parallel with a bulk capacitor and a high current resistive load, which would require a too large power, inefficient, "starting resistor", coupled to the main supply voltage.

As a simple example, for a 6 W power buck-boost having a resistive load calculated for 1 A at 6V, to create this voltage across the load and "start-up" a PWM chip capable of maintaining its own supply after "ignition", at a standard supply of 120V, the power dissipated by a start-up resistor would be 120V-6 v×1 A=114 W. In addition, a 200 uF bulk capacitor across the load will require a minimum 20-50 A of start-up current, a situation which further discourages this approach. This is true even if, eventually, after "ignition" the starting resistor is disconnected from the circuit via a high voltage programmable switch. This is because at that power range, the starting resistor would be larger in size than the entire converter circuit board.

Description of the Start-Up Method and Procedure

Therefore, the approach used in this embodiment includes a "two steps start up" method, in which, besides the PWMic (120) controller and the buck-boost inductor (Lbb), six additional parts such as: the starting resistor Rst (114), the first buck-boost diode Dbb1 (511), the second buck-boost diode Dbb2 (516), the first buck-boost capacitor Cbb1 (514), the second buck-boost capacitor Cbb2 (515) and the load LEDc1 (310) are utilized for accomplishing the "single ground-self supply" goal, in a conventional buck-boost topology circuit.

As still embodied herein, when the single stage single ground self supply buck-boost LED driver circuit, subject of this specification, is connected to the AC line, a small power (0.25 W) starting resistor Rst (114) coupled between the negative terminal of the bridge rectifier BR (53) and ground (55) will close a current outputted by the positive terminal of the high voltage bridge rectifier (53) in a circuit including several parts, such as: the buck-boost inductor Lbb (510), the first buck-boost diode Dbb1 (511), the Vcc and GND supply terminals of PWMic (120) and ground (55).

Until a start up voltage of about 9V start-up required by the PWMic (120) arises across the low value (1 uF-10 uf) second buck-boost capacitor Cbb2 (515) and the PWMic (120) supply terminals, except the start-up current of less than 1 mA, required by the chip, there is no other significant current in parallel, since the feedback resistor Rfb1 has a very large value (over 100 k), the bulk capacitor Cbb1 (514) is not included in this circuit, the second buck-boost diode Dbb2 (516) is opposite polarized, the MOSFET buffer Mbb (512) is Off and the load, LEDc1 (310) is not a resistor, but a stripe of four or more LEDs which absorbs almost no current until the voltage across the stripe raises over twelve volts.

Description of the Main Operation

As soon as the PWMic (120) receives its required nine volts supply and then starts oscillating, the MOSFET buffer Mbb receives a PWM signal at its gate via the ground separating transformer GS (520) and activates the buck-boost inductor Lbb (510) which supplies with a DC voltage, via the first buck-boost diode Dbb1, the bulk capacitor Cbb1 and via the second buck-boost diode Dbb2 (516) the second buck-boost capacitor Cbb2 (515) and the PWMic (120) controller chip.

Only after the voltage across the Cbb1 (514) rises above twelve volts, the LEDc1 (310) load start absorbing current and from this moment, the PWMic (120) maintains its supply and controls, directly its own supply voltage, and the LEDc1 (310) maxim voltage.

The operational amplifier A3 (412) provides a very accurate current feedback, however, it could be eliminated from the system, without losing much quality, in the manner described in the previous embodiment.

For a near unity power factor, the PWMic (120) circuit is set for a CrCM (critical conduction mode) of operation and the rest of the system operations are conventional and reliable.

Description of the "Single Ground" Advantage

As still embodied herein, this LED driver circuit introduces a revolutionary step up with respect to the conventional buck-boost topology's main issue, respectively the ground of the system is no longer the negative terminal of the bridge rectifier BR (53). In contrast, the disclosed embodiment separates the MOSFET buffer transistor Mbb (512) and the BR (53) negative terminal via the GS (520) ground separator transformer. The ground of the system now becomes the same 0V reference of the LEDc1 (310) load and the GND terminal of the controller chip PWMic (120). This fact improves, dramatically, the control capability of the PWMic (120) chip over the LEDc1 (310) voltage and current parameters, by allowing direct and very reliable CVCC control and by eliminating the need for expensive, bulky and slower feedback opto-coupler, operational amplifier, voltage shunt regulator and several additional components, such as resistors, capacitors and diodes involved, typically, in feedback circuits having different grounds and/or zero voltage references.

Description of the "Self Supply" Additional Advantages

Additional advantages of this "single ground, self supply" novel topology arise from the fact that the PWMic (120) chip is no longer supplied in the conventional way, by using a secondary coil added to the buck-boost inductor and a simple rectifying supply circuit, but directly from the LEDc1 (310) load's supply DC voltage, in parallel to the buck-boost inductor Lbb (510) and main buck-boost capacitor Cbb 2 (515). This fact offers, simultaneously, three other advantages:

eliminates the need for an additional supply circuit, comprising a secondary coil, a rectifier diode and an electrolytic capacitor;

receives robust and reliable supply directly from the output bulk capacitor; and eliminates the risk of flicker which occurs, more often, when external dimmer control is used and the controller chip may stop and re-start its operations because of having insufficient supply voltage during a long OFF time of the dimmer, first, because the bulk capacitor has sufficient storing resources to remain charged for a longer period of time and, second, because the LEDc1 (310) stripe threshold (i.e. about 3V per LED) cannot discharge, completely, the output bulk capacitor, even when there is no AC supply voltage for a few minutes.

For this embodiment there is no need for a comparison chart with the related art, since the advantages of this solution are too obvious.

Embodiment 14

Pseudo Double Stage Boost-Isolated Flyback LED Driver

FIG. 14 shows an embodiment of a pseudo double stage boost-isolated flyback LED Driver circuit.

Description of the AC/DC Converter Connections

As embodied herein, a pseudo double stage boost-isolated flyback LED driver circuit comprises an AC to-DC converter sub-circuit including an alternative current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to ground (55) via a first filtering capacitor Cf1 (54).

Description of Boost Converter Connections

A boost coil Lb (110) is coupled from the positive output of the bridge rectifier BR to the drain of a boost MOSFET transistor Mb (112) and to the anode of a boost diode Db (111) which has its cathode coupled to ground (55) via a second filtering capacitor Cf2 (190).

The boost MOSFET transistor Mb (112) source is coupled to ground (55) and its gate is coupled to a driving terminal (DRV) of an 8 terminals controller chip PWMic (120), via a gate resistor Rg (121).

Description of the Flyback Converter Connections

As embodied herein, an isolated flyback LED driver circuit PWM-f (200) comprises a direct current voltage source VDCin (201) which supplies the drain of a MOSFET transistor Mf (212) via a primary coil of a three coils flyback transformer TRf (210) having, besides one primary coil, one low current secondary coil and one large current secondary coil.

A snubber circuit (220) including a Zener diode Dzsn (221) coupled in series with a rectifier diode Dsn (222), in such a manner that the cathode of Dzsn (221) is coupled to VDCin (201) and the anode of Dsn (222) is coupled to the drain of Mf (212), which is attached across the TRf (210) primary coil.

The low current coil of TRf (210) having one end coupled to an input ground terminal (55) and the other end coupled to the anode of a feedback diode Dvfb (251) which has its cathode coupled to (55) via a feedback capacitor Cvfb (252).

The large current secondary coil of TRf (210) having one end coupled to an output ground terminal (65) and the other end coupled to the anode of a flyback diode Df (211) which has its cathode coupled to the output ground (65) via a filtering capacitor Cf3 (290) and in parallel, via a column of several LEDs coupled in series LEDc1 (310).

The Mf (212) has its source coupled to the input ground (55) via a sense resistor (232) and its gate coupled to a driving terminal of an eight terminal pulse width modulation integrated circuit PWMic (120) via a gate resistor (231). The PWMic (120) has a second terminal Vcc coupled to a DC supply terminal Vic (117). A third terminal Is is coupled to the Mf (212) drain via a resistor IsF (240) and to the input ground (55) via a capacitor (242). A fourth terminal GND is coupled to the input ground (55). A fifth terminal Osc is coupled to (55) via a capacitor Ct (124). A sixth terminal Vref is coupled to Osc via a resistor Rt (123) and to (55) via a capacitor Cr (122). A seventh terminal Comp is coupled to one terminal of a compensation capacitor Cc (130) and an eighth terminal FB coupled to the other terminal of the Cc (130).

A two terminal soft start over voltage control sub-circuit SSOVC (140) is coupled across the FB and the Comp terminals. The FB terminal is also coupled to the cathode of the Dvfb (251) via a first feedback resistor Rfb1 (128) and to (55) via a second feedback resistor Rfb2 (129).

A four terminal VFCFB sub-circuit (260) has a first terminal V sin coupled to the cathode of Dvfb (251). A second terminal Ctrl is coupled to the Comp terminal of PWMic 120. A third terminal Vrin is coupled to the Vref terminal of PWMic 120. A fourth terminal is coupled to the input ground (55).

The Pseudo Double Stage Boost Flyback System Description

The boost coil Lb (110), boost diode Db (111), boost transistor Mb (112) and the second filtering capacitor Cf2 (190) perform the same function as the boost coil Lb (110), boost diode Dob (111), boost transistor Mb (112) and the second filtering capacitor Cf2 (190) components previously described in connection with the embodiment section shown in FIG. 8 entitled "Double Stage Boost-Isolated Flyback Multi Columns LED Driver Embodiment", as fully described above.

Also the schematic diagram of the PWM-f (200) flyback converter circuit of this embodiment has been executed, in functionality, identical to the embodiment previously discussed in connection with FIG. 10 entitled "No Opto-Coupler Isolated Flyback LED Driver Embodiment". The embodiment of FIG. 10 is an illustration of the advantages provided by a revolutionary method of controlling double stage converter circuits using only one controller chip and two MOSFET buffer transistors.

As further embedded herein, a pseudo double stage boost-isolated flyback LED driver circuit, using one controller chip and two buffer switching transistors is capable of reaching similar performances regarding the power factor, efficiency, and low ripple output voltage as a conventional double stage converter circuit. Such advantages can be obtained when the boost inductor (or coil) and the flyback inductor are configured to boost outputted DC voltage across the second filtering capacitor Cf2 to be always higher than the peak voltage of the AC input, and also, sufficiently low so as not to exceed the maximum voltage of the high voltage switching transistor and diodes used in both converter circuits.

A "master-slave" control method is applied between the two stages in which the "master" is the flyback converter, compensating in feedback, at any time, the load momentary current amount requirements and the "slave" is the boost converter, compensating its output voltage, accordingly.

Since both converters are in phase regarding the output power, respectively when the LEDc1 (310) load requires higher current, for the same input power, the voltage across Cf2 (190) is supposed to decrease. However, the PWMic (120) controller chip increases immediately its driving pulse duty cycle to increase the flyback output current in the LEDc1 (310) load and, a larger duty cycle will increase, proportionally, the voltage across Cf2 (190), via Mb (112) and Lb (110). This procedure will provide an almost constant voltage across the second filtering capacitor Cf2.

By designing the coils for the CrCM (critical conduction mode) of operation, the system will feature near unity power factor, regardless of large variations of the load's current.

This revolutionary improvement reduces the component count, size, and cost of a LED driver by about 35-40%, without losing the main advantage of the bulky and expensive double stage topology, specifically a "low ripple output voltage" and implicitly, lower flickering of the LED lamp retrofit using such drivers.

For this embodiment there is no need for a comparison chart with the related art, since the advantages of this solution self evident.

Embodiment 15

Pseudo Double Stage Boost Non-Isolated Flyback LED Driver

FIG. 15 shows an embodiment of a pseudo double stage boost non-isolated flyback LED Driver circuit.

Description of the AC/DC Converter Connections

As embodied herein, the pseudo double stage boost non-isolated flyback LED driver circuit comprises an AC-to-DC converter sub-circuit including an alternative current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to ground (55) via a first filtering capacitor Cf1 (54).

Description of Boost Converter Connections

A boost coil Lb (110) is coupled from the positive output of the bridge rectifier BR (54) to the anode of a first boost diode Db (111) which has its cathode coupled to ground (55) via a second filtering capacitor Cf2 (190) and to a second boost diode Db2 (601) which has its cathode coupled to the drain of a flyback MOSFET buffer transistor Mf (212) which drives a non isolated flyback converter.

Description of the Flyback Converter Connections

The cathode of the first boost diode Db (111) supplies the drain of a MOSFET transistor Mf (212) via a primary coil of a three coils flyback transformer TRf (210) having, besides one primary coil, one low current secondary coil and one large current secondary coil.

A snubber circuit SnC (140) is coupled in parallel to the flyback transformer (210) primary coil.

The low current coil of TRf (210) having one end coupled to ground (55) and the other end coupled to the anode of a supply diode (115) which has its cathode coupled to (55) via a filtering capacitor (116).

The large current secondary coil of TRf (210) having one end coupled to ground (55) and the other end coupled to the anode of a flyback output diode Df (211) which has its cathode coupled to ground (55) via a filtering capacitor Cf3 (290) and in parallel, it supplies a column (stripe) of several LEDs, LEDc1 (310) coupled in series, via a current sense resistor Rsled (360), to ground (55).

The Mf (212) has its source coupled to ground (55) and its gate coupled to a driving terminal of an eight terminal pulse width modulation integrated circuit PWMic (120) via a gate resistor (231).

The PWMic (120) has a second terminal Vcc coupled to the cathode of the supply diode (115). A third terminal Is is coupled to ground (55) via a resistor Rvr2 (127) and to the emitter of a voltage ramp NPN transistor Qvr (125) via another resistor Rvr1 (126). A fourth terminal GND is coupled to the system ground (55). A fifth terminal Osc is coupled to ground (55) via a capacitor Ct (124). A sixth terminal Vref is coupled to Osc via a resistor Rt (123) and to ground (55) via a capacitor Cr (122). A seventh terminal Comp is coupled to one terminal of a compensation capacitor Cc (130). An eighth terminal FB is coupled to the other terminal of the capacitor Cc (130).

A two terminals soft start over voltage control sub-circuit SSOVC (140) is coupled across the FB and the Comp terminals.

The FB terminal is also coupled to the cathode of the supply diode (115) via a first feedback resistor Rfb1 (128) and to (55) via a second feedback resistor Rfb2 (129).

The voltage ramp NPN transistor Qvr (125) has its collector coupled to the Vref terminal and its base is coupled to the OSC terminal of the PWMic (120)

An operational amplifier A3 (412) has one input coupled to ground (55) via the Rsled (360), the other input coupled via a first divider resistor (142) to ground (55) and via a second divider resistor (141) to the Vref terminal of the PWMic (120) and the output of A3 (412) is coupled to the Comp terminal of the PWMic (120).

The Pseudo Double Stage Boost Non Isolated Flyback System Description

The boost coil Lb (110), boost diode Db (111), and the second filtering capacitor Cf2 (190) perform the same function as the boost coil Lb (110), boost diode Db (111) and the second filtering capacitor Cf2 (190) parts previously described in connection with the embodiment shown in FIG. 8 entitled "Double Stage Boost-Isolated Flyback Multi Columns LED Driver Embodiment", as fully described above.

Also the schematic diagram of the non isolated flyback converter circuit of this embodiment has been executed, in functionality, identically to the embodiment previously discussed in connection with in FIG. 11 entitled "Single Stage Single Ground Flyback LED Driver Embodiment", which provides a better illustration of the advantages provided by a revolutionary method of controlling double stage converter circuits using only one controller chip and two MOSFET buffer transistors.

As further embedded herein, a pseudo double stage boost-isolated flyback LED driver circuit, using one controller chip and one buffer switching transistor, which via the second boost diode Db2 (601) is capable to reach similar performances regarding the power factor, efficiency, and low ripple output voltage as a conventional double stage converter circuit if the boost inductor (or coil) and the flyback inductor are designed in such a manner for the boost outputted DC voltage across the second filtering capacitor Cf2 to be always higher than the peak voltage of the AC input, but also, sufficiently low to not exceed the maximum voltage of the high voltage switching transistor and diodes used in both converter circuits.

The functionality of this pseudo double stage converter has been fully described at the previous embodiment section.

The only difference consists in the fact that the MOSFET buffer transistor has been replaced with a much less expensive, smaller size, and lower dissipation diode.

Similar to the previous embodiment, there is no need for a comparison chart with the related art here, since the advantages of this solution are obvious.

Embodiment 16

Pseudo Double Stage Boost-COT Buck-Boost LED Driver

FIG. 16 shows an embodiment of a pseudo double stage boost constant off time buck-boost LED Driver circuit.

Description of the AC/DC Converter Connections

As embodied herein, a pseudo double stage boost constant off time buck-boost LED driver circuit comprises an AC to DC converter sub-circuit including an alternative current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to ground (55) via a first filtering capacitor Cf1 (54).

Description of Connections

As further embodied herein, a pseudo double stage boost constant off time buck-boost LED driver circuit comprises an AC to DC converter sub-circuit including an alternative current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to (55) via a first filtering capacitor Cf1 (54).

The drain of a MOSFET boost buffer transistor Mb (112) is supplied from the positive output of the bridge rectifier BR (53) via a primary coil of a boost inductor Lb (110), which is also coupled with the anode of a boost diode Db (111) which has the cathode coupled to ground via second filtering capacitor Cf2 (190).

The Mb (112) source is coupled to ground (55) and the gate is coupled to the driving output of a controller chip PWMic (120) via a gate resistor (121).

The secondary coil of the boost inductor Lb (110) has one terminal coupled to ground (55) and the other terminal coupled to the anode of a supply diode Dvcc (115) which has the cathode coupled to ground via a supply capacitor Cvcc (116) and to the positive output of the bridge rectifier via a start resistor Rst (114) and to the Vcc terminal of the eight terminals controller chip PWMic (120).

The drain of a buck-boost MOSFET transistor Mbb (512) is supplied from the cathode of the boost diode Db (111) via a buck-boost coil Lbb (510) coupled in series with a LEDs column load LEDc1 (310).

The Mbb (512) has its source coupled to ground (55) via a sense resistor (532) and its gate coupled to a driving terminal of an eight terminal pulse width modulation integrated circuit PWMic (120) via a gate resistor (531).

The PWMic (120) has a second terminal Vcc coupled to the cathode of the supply diode (115). A third terminal Is is coupled to ground (55) via a one resistor one capacitor current spikes filter sub-circuit IsF (240) operatively coupled with the sense resistor (532). A fourth terminal GND is coupled to the system ground (55). A fifth terminal Osc is coupled to ground (55) via a capacitor Ct (124). A sixth terminal Vref is coupled to Osc via a resistor Rt (123) and to (55) via a capacitor Cr (122). A seventh terminal Comp is coupled to one terminal of a compensation capacitor Cc (130). An eighth terminal FB is coupled to the other terminal of the capacitor Cc (130).

A two terminal soft start over voltage control sub-circuit SSOVC (140) is coupled across the FB and the Comp terminals.

The FB terminal is also coupled to the collector of a voltage sense transistor Qvs (521) via a first feedback resistor Rfb1 (128) and to ground (55) via a second feedback resistor Rfb2 (129).

The voltage sense PNP transistor Qvs (521) together with a voltage sense resistor Rvs (523) coupled across its base-emitter junction and a zener diode coupled with the anode to the base of Qvs (521) and the cathode to the drain of Mbb (512) structure a differential voltage sense sub-circuit DVs (520).

A buck-boost diode Dbb (511) is coupled with the anode to Mbb (512) drain and with the cathode to the positive output of the cathode of the boost diode (111)

A buck-boost capacitor Cbb (514) is coupled across LEDc1 (310).

The COTsw (540) has an input terminal coupled to the DRV output terminal of the controller, an output terminal coupled to the oscillator terminal of the PWMic (120), and a zero voltage terminal coupled to ground (55). One of the applicable internal configurations has been described in FIG. 12. A constant off time NPN transistor Qcot (540) has the emitter coupled to ground (55) the base coupled via a resistor Rcot (542) to the DRV terminal and the collector coupled to the Osc terminal of PWMic (120).

The Pseudo Double Stage Boost Non Isolated Flyback System Description

The boost coil Lb (110), boost diode Db (111), boost transistor Mb (112) and the second filtering capacitor Cf2 (190) are performing the same function as the boost coil Lb (110), boost transistor (112), boost diode Db (111) and the second filtering capacitor Cf2 (190) parts previously described in connection with the embodiment shown in FIG. 8 entitled "Double Stage Boost-Isolated Flyback Multi Columns LED Driver Embodiment", as fully described above.

Also the schematic diagram of the COT buck-boost converter circuit of this embodiment has been executed, in purpose, identically to the one shown previously, in FIG. 12 entitled "Single Stage Single Constant Off Time Buck LED Driver Embodiment", for a better illustration of the advantages provided by a revolutionary method of controlling double stage converter circuits using only one controller chip and two MOSFET buffer transistors.

The method and functionality of a pseudo double stage converter has been fully described at the previous embodiment section.

The only difference consists in replacing the passive valley-fill filter sub-circuit VF-PCf (20) with a higher performance active PFC circuit including the boost coil Lb (110), boost diode Db (111), boost transistor Mb (112) and the second filtering capacitor Cf2 (190).

Similar to the previous embodiment, there is no need for a comparison chart with the related art here, since the advantages of this solution are self-evident.

Embodiment 17

Pseudo Double Stage Boost Single Ground Self Supply Buck-Boost LED Driver

FIG. 17 shows an embodiment of a pseudo double stage boost single ground self supply buck-boost LED Driver circuit.

Description of Connections

As embodied herein, a pseudo double stage boost single ground self supply buck-boost LED Driver circuit comprises an AC-to-DC converter sub-circuit including an alternative current generator Vac (51), a low pass filter EMI (52) having its input coupled to Vac (51) and the output coupled to the AC input of a bridge rectifier BR (53). The bridge rectifier BR (53) has its negative output coupled to ground (55) and its positive output coupled to (55) via a first filtering capacitor Cf1 (54).

A boost coil Lb (110) is coupled with one terminal to the positive output of the bridge rectifier BR (53) and the other one to the anode of a first boost diode Db (111) and to the anode of a second boost diode Db2 (119).

The cathode of Db (111) is coupled with a first terminal of a buck-boost coil Lbb (510) and to the cathode of a second buck-boost diode Dbb2 (516) and to a first terminal of a first buck-boost capacitor Cbb1 (514).

The anode of Dbb2 is coupled to ground (55).

The other terminal of Cbb1 (514) is coupled to the cathode of a first buck-boost diode Db (111) which has its anode coupled with the second terminal of Lbb (510) and to the drain of the Mbb (512) transistor.

A second buck-boost capacitor Cbb2 is coupled between the cathode of Dbb1 (511) and ground (55).

A second boost diode Db2 (119) is coupled with its cathode to the drain of Mbb (512) and with its anode to the anode of Db (111) and to the second terminal of Lb (110). A starting resistor Rst (114) is coupled between the negative terminal of BR (53) and ground (55).

The second terminal of Lbb (510) is coupled to the anode of a first buck-boost diode Dbb1 (511) and to the drain of a MOSFET transistor Mbb (512).

The MOSFET transistor Mbb (512) has its source coupled to the negative terminal of BR (53) and receives driving signal across its gate source terminals via a secondary coil of a ground separator transformer GS (520).

The primary coil of Gs (520) has one terminal coupled to ground (55) and the other terminal coupled, via a driving capacitor Cdry (522) to a driving terminal of a eight terminals controller chip PWMic (120).

The PWMic (120) has a second terminal Vcc coupled to the cathode of Dbb1 (511). A third terminal Is is coupled to ground (55) via a resistor Rvr2 (127) and to the emitter of a voltage ramp NPN transistor Qvr (125) via another resistor Rvr1 (126). A fourth terminal GND coupled to the system ground (55). A fifth terminal Osc coupled to ground (55) via a capacitor Ct (124). A sixth terminal Vref coupled to Osc via a resistor Rt (123) and to (55) via a capacitor Cr (122). A seventh terminal Comp coupled to one terminal of a compensation capacitor Cc (130). An eighth terminal FB coupled to the other terminal of the capacitor Cc (130).

The FB terminal is also coupled to the cathode of the Dbb1 (511) via a first feedback resistor Rfb1 (128) and to ground (55) via a second feedback resistor Rfb2 (129).

The voltage ramp NPN transistor Qvr has its collector coupled to the Vref terminal and its base is coupled to the OSC terminal of the PWMic (120).

A several LEDs column LEDc1 (310) is coupled directly to the cathode of Cbb1 and via a current sense resistor Rsled (360) to ground (55).

Description of the "Single Ground-Self Supply" Issues

As further embodied herein, historically the possibility to design a conventional buck-boost circuit which allows only one chip (i.e., a single stage topology) to do the conversion from a higher voltage to a lower one and than to supply itself from that lower voltage, having access to the same zero voltage reference (or ground) with the load, did not look possible. Therefore, the worldwide designers came with less efficient and/or more sophisticated topologies, such as Buck, or SEPIC, which allow the controller IC for direct (i.e., no opto-coupler) voltage feedback with respect to the load's momentary voltage or current amount.

The main issue for accomplishing such a single ground self supply in a conventional buck-boost topology consisted in the fact that such system would need an extra DC voltage, such as a battery, to provide start-up power supply to the controller chip, in parallel with a bulk capacitor and a high current resistive load, which would require a too large power, and inefficient, "starting resistor", coupled to the main supply voltage.

As a simple example, for a 6 W power buck-boost having a resistive load calculated for 1 A at 6V, to create this voltage across the load and "start-up" a PWM chip capable of maintaining its own supply after "ignition", at a standard supply of 120V, the power dissipated by a start-up resistor would be 120V-6 v×1 A=114 W. In addition, a 200 uF bulk capacitor across the load will require a minimum 20-50 A of start-up current, a situation which further discourages this approach. This is true even if, eventually, after "ignition" the starting resistor is disconnected from the circuit via a high voltage programmable switch. This is because at that power range, the starting resistor would be larger in size than the entire converter circuit board.

Description of the Start-Up Method and Procedure

Therefore, the approach used in this embodiment includes a "two step start up" method, in which, besides the PWMic (120) controller and the buck-boost inductor (Lbb), six additional parts such as: the starting resistor Rst (114), the first buck-boost diode Dbb1 (511), the second buck-boost diode Dbb2 (516), the first buck-boost capacitor Cbb1 (514), the second buck-boost capacitor Cbb2 (514) and the load LEDc1 (310) are concurring for accomplishing the "single ground-self supply" goal, in a conventional buck-boost topology circuit.

As still embodied herein, when the single stage single ground self supply buck-boost LED driver circuit, subject of this invention, is connected to the AC line, a small power (0.25 W) starting resistor Rst (114) coupled between the negative terminal of the bridge rectifier BR (53) and ground (55) will close a current outputted by the positive terminal of the high voltage bridge rectifier (53) in a circuit including several parts, such as: the buck-boost inductor Lbb (510), the first buck-boost diode Dbb1 (511), the Vcc and GND supply terminals of PWMic (120) and ground (55).

The Pseudo Double Stage Boost Single Ground Buck-Boost System Description

The boost converter mode of operations have been fully described in connection with the embodiment shown in FIG. 8 entitled "Double Stage Boost-Isolated Flyback Multi Columns LED Driver Embodiment", and in this embodiment circuit the Db2 (119) replaces the MOSFET boost buffer transistor Mb (112).

Also the schematic diagram of the single ground buck-boost converter circuit of this embodiment has been executed on purpose, identically to the embodiment previously shown in connection with FIG. 13 entitled "Single Stage Single Ground Self supply Buck-boost LED Driver Embodiment", for a better illustration of the advantages provided by a revolutionary method of controlling double stage converter circuits using only one controller chip and one MOSFET buffer transistor.

The method and functionality of a pseudo double stage converter and single ground self supply novel techniques have been fully described in the previous embodiments presentation.

For this embodiment there is also no need for a comparison chart with the related art, since the parts count, size, performance and cost advantages of these solutions self evident.

15. Description of the Monolithic LED Driver Embodiments

Introduction

This embodiments description section, of the present specification, comprises twenty (20) solid state ("monolithic") LED driver circuit solution embodiments capable to supersede all the other similar topology LED driver solutions depicted above, at the related art section, by the means of several novel control methods and/or novel sub-circuit systems used in each of these particular LED driver embodiments.

None of the worldwide top manufacturers in the power management semiconductor industry are yet, visibly, involved in this very new and promising LED drivers technology except Samsung, Seoul Semiconductor, Exclara, Supertex, and a few other "pioneers" which advertise their products under different presentation names, such as AC LED Lamps, Solid State LED Lamps, Single Chip LED Lamps, or Sequential LED Drivers, all names which are not sufficiently clear. For example, the SMPS LED lamps could be called AC LED Lamps or Single Chip LED Lamps or Solid State LED Lamps and/or do not depict, exhaustively, the purpose and final goal of this new device, respectively, a compact or one-piece LED lamp.

Therefore, in accordance with the present specification, the term "monolithic" is used because it is more generic and representative for a device, which eventually, could become a tiny, low cost lighting device, having only two supply terminals and a conventional screw AC adaptor, similar to the existing Edison bulbs today, about which nobody cares what kind of technology is used inside, as long as good quality light is achieved.

The LED devices cannot be connected, directly, to the 120-240 Vac standard electrical power line, nor to a 12 Vdc automobile battery, like all the conventional bulbs, because they are semiconductor (solid state) devices requiring a precise limited current which establishes a voltage of 2.8V-3.5V, per each typical Galium Nitride (GaN) LED unit. Because of this issue, a LED lamps retrofit may comprise one or more LED units, connected in series or parallel circuits, in such a manner to be compatible with their supply source, and being also "diodes", they require a rectifier circuit for operating in AC systems.

By considering the LED devices requirement for precise current/voltage control, there is needed a "supply adaptor" for being connected, safely, to an unregulated DC or AC electrical supply line and, as presented in the introduction herein, these adaptors could be ballast, SMPS or monolithic driver devices, each of them having particular advantages and shortcomings.

With respect to the monolithic drivers objectives and design issues, which represent the main subject of this patent application's chapter, conventional devices such as the bulky coils and capacitors are obviously out of discussion, because, by definition, monolithic means "one piece", a term which is used currently for "full custom designed" chips, versus "hybrid" chips, which are not called monolithic, but "multi-chips modules" (MCM).

Coils and capacitors are the only known reactive components capable of storing and converting an unregulated voltage line in a constant voltage and/or constant current supply line. There are no monolithic devices, designed specifically for reducing a 120-240 Vac supply line down to a 4-20 Vdc supply, suitable for one or several LED devices coupled in series, other than either the thyristor (the SCR, silicon controlled rectifier), invented over 30 years ago, and the Benistor, introduced in 1997-1999 in two US patents and technical magazines (see related art).

Nevertheless, many other complex sequential switching systems using "capacitive pump charge" circuits and/or other sophisticated digital voltage controlled switching systems, can also perform this voltage conversion, efficiently, however in many situations, very complex systems are less reliable and more expensive.

Therefore, in this section of the specification, some of the embodiments presented herein will be based on the Benistor's concept of controlling, efficiently, the transfer of electrical energy from an AC or DC source to a load, and some of them will go beyond that, revealing novel methods and/or original systems for controlling, specifically, these very efficient but also very fragile and non-linear LED devices.

All the theoretical or practical embodiments presented below have one final goal: "the ultimate lighting device" built as a very low cost monolithic chip able to be embedded in a LED array wafer lamp retrofit, coupled directly, via two wires only, to the standards 50-60 Hz, 120V-240V AC line and featuring efficiency over 90%, power factor over 0.99 and A.THD lower than 10%.

Embodiment 18

Monolithic LED Driver—the Series Circuit Method

FIG. 18a shows an embodiment of a four Benistor series monolithic LED driver block schematic circuit. FIG. 18b shows a series of current/voltage graphs obtained from the Benistor monolithic LED driver shown in FIG. 18a.

Prior to describing the remaining embodiments comprising a Benistor component, the present specification now turns briefly to FIGS. 38-40, hereinbelow, for a discussion of the internal structure and functionality of one embodiment of a Benistor device.

Description of the Components Connections

As embodied herein, this monolithic LED driver circuit comprises a minimum parts AC-to-DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55), and a Benistor LED driver sub-circuit comprising:

(a) A first eight terminal Benistor Sw1 (601) comprising:
a first anode "A" terminal coupled to Vin;
a second cathode "K" terminal coupled to the anode of a first LEDs column LEDc1 (721);
a third voltage sense "Vs" terminal coupled to the anode A terminal of SW1 (601);
a fourth voltage set terminal "Von" coupled to the positive terminal of a DC voltage source (613) having its negative terminal coupled to a "ZVR" terminal of Sw1;
a fifth voltage set terminal "Voff" coupled to the positive terminal of a DC voltage source (614) having its negative terminal coupled to a "ZVR" terminal of Sw1;
a sixth current set terminal "Cc" coupled to the cathode of LEDc1 (721) and a first terminal of a first current sense resistor Rc1 (722);
a seventh feedback terminal "FB" coupled to a feedback terminal of a second eight terminal Benistor Sw2 (602); and
an eighth zero voltage reference terminal "ZVR" coupled with the second terminal of Rc1 (722).

(b) A second eight terminal Benistor Sw2 (602) comprising:
a first anode "A" terminal coupled to Vin;
a second cathode "K" terminal coupled to the second terminal of Rc1 (722) and the anode of a second LEDs column LEDc2 (722);
a third voltage sense "Vs" terminal coupled to the anode A terminal of SW2 (602);
a fourth voltage set terminal "Von" coupled to the positive terminal of a DC voltage source (623) having its negative terminal coupled to a "ZVR" terminal of Sw2;
a fifth voltage set terminal "Voff" coupled to the positive terminal of a DC voltage source (624) having its negative terminal coupled to a "ZVR" terminal of Sw2;
a sixth current set terminal "Cc" coupled to the cathode of LEDc2 (731) and a first terminal of a second current sense resistor Rc2 (732);
a seventh feedback terminal "FB" coupled to a feedback terminal of a third eight terminal Benistor Sw3 (603); and
an eighth zero voltage reference terminal "ZVR" coupled with the second terminal of Rc2 (732), (c) A third eight terminal Benistor Sw3 (603) comprising:
a first anode "A" terminal coupled to Vin;
a second cathode "K" terminal coupled to the anode of a third LEDs column LEDc3 (741);
a third voltage sense "Vs" terminal coupled to the anode A terminal of SW3 (603);
a fourth voltage set terminal "Von" coupled to the positive terminal of a DC voltage source (633) having its negative terminal coupled to a "ZVR" terminal of Sw3;
a fifth voltage set terminal "Voff" coupled to the positive terminal of a DC voltage source (634) having its negative terminal coupled to a "ZVR" terminal of Sw3;
a sixth current set terminal "Cc" coupled to the cathode of LEDc3 (741) and a first terminal of a first current sense resistor Rc3 (742);
a seventh feedback terminal "FB" coupled to a feedback terminal of a fourth eight terminal Benistor Sw4 (604); and
an eighth zero voltage reference terminal "ZVR" coupled with the second terminal of Rc3 (742).

(d) A fourth eight terminal Benistor Sw4 (604) comprising:
a first anode "A" terminal coupled to Vin;
a second cathode "K" terminal coupled to the anode of a fourth LEDs column LEDc4 (751);
a third voltage sense "Vs" terminal coupled to the anode A terminal of SW4 (604);
a fourth voltage set terminal "Von" coupled to the positive terminal of a DC voltage source (643) having its negative terminal coupled to a "ZVR" terminal of Sw4;
a fifth voltage set terminal "Voff" coupled to the positive terminal of a DC voltage source (644) having its negative terminal coupled to a "ZVR" terminal of Sw4;
a sixth current set terminal "Cc" coupled to the cathode of LEDc4 (751) and a first terminal of a fourth current sense resistor Rc4 (752);
a seventh feedback terminal "FB" coupled to the feedback terminal of the third eight terminal Benistor Sw3 (603); and
an eighth zero voltage reference terminal "ZVR" coupled with the fourth terminal of Rc4 (752) and system ground (55).

Description of the Benistor Functionality

As still embodied herein, a Benistor is a multi-terminals controllable electron valve (an upgraded monolithic solid state version of old vacuum tubes such as pentodes or hexodes) which, in this particular configuration has eight terminals, such as:

An A (Anode or Vin) power input terminal which is, typically, connected to the supply source's output;

A K (Cathode or Vout) power output terminal, which is, typically, connected to the load;

A Vs terminal sensing the voltage of the Anode, Cathode or any other node of the system;

A Von low power input terminal which activates (switch ON) an internal switch between the Anode and Cathode only during the time when the Vs voltage amount is higher than the voltage amount applied at the Von terminal;

A Voff low power input terminal which deactivates (switches OFF) the internal switch between the Anode and Cathode during the time when the Vs voltage amount is higher than the voltage amount applied at the Voff terminal;

A Cc low power input terminal which forces the Anode-Cathode ("AK") junction of the Benistor to operate linearly and decrease the external circuit current, in a ratio proportional to the increasing voltage applied at the Cc terminal, in such a manner that, gradually, when the voltage applied to Cc is 0V, the AK junction has no resistance (0 ohms) allowing the maximum current required by the load and when the voltage applied to Cc is 1V or higher, the AK junction has infinite resistance (10 Mohms) limiting the load's current near zero;

A FB low power feedback terminal which, typically, is connected to other Benistors feedback terminal with the purpose to "smoothly synchronize" the ON-OFF switching operations, in order to avoid gaps in the circuit main current and prevent an unnecessary increase of noise and, implicitly, of the A.THD parameter, a fact that creates a decrease of the entire system power factor parameter; and A "ZVR" low current zero voltage reference terminal which is, typically, coupled to the ground of the system but, in some situation it can be used for forcing the Benistor to become a constant current sink ("CCS") by inserting a resistor in its circuit.

Description of the LED Driver Functionality

As yet embodied herein, a four Benistors series LED driver circuit shown in FIG. 18a can control, in a CVCC (constant voltage constant current) manner, a 120-240 Vac LED lamp retrofit lighting panel, comprising four stripes of LEDs, under very high efficiency and near unity power factor, in a self-switching mode of operations (i.e., Benistors do not require external components such as coils or capacitors to generate periodical ON-OFF oscillations), by forcing the LED lamp retrofit's main current to follow a sine wave graph shape, in phase with the supply voltage's graph shape (for achieving PF>0.99), as it is illustrated in FIG. 18b, Current/Voltage Graphs, section E.

This performance is accomplished, on the one hand, by setting properly the voltage amount of each DC voltage source applied to the Von and Voff voltage control inputs of each Benistor (613 to 643), for delivering the right voltage to each of the four LED stripes and, on the other hand, by selecting the right value of the current sense resistors (Rd to Rc4) for the current control inputs of each Benistor to limit each LED stripe current in accordance to pre-established limits.

As the graph presented at section D of FIG. 18b shows, during the time when the supply input AC voltage (120 Vrms means 170 Vpeak) increases, from zero to about 33V, only the fourth Benistor Sw4 (604) is switched ON, allowing an increasing current to cross the fourth LEDs column LEDc4 (751), comprising 11 LEDs having 3V/LED threshold, until the current reaches a pre-established limit, then the LEDc4 (751) stripe current is limited by the Cc terminal of the fourth Benistor Sw4 (604) until the supply voltage increases to about 66V, reaching the next 10 LEDs stripe, LEDc3 (741) threshold voltage, moment when the feedback FB terminals of Sw4 (604) and Sw3 (603) allows, smoothly, the transfer of control from the fourth Benistor to the third one, respectively the Sw4 (604) switches OFF and the Sw3 (603) switches ON and from this moment until the supply voltage reaches 99V, the Cc current control terminal limits the current of both LED stripes LEDc4 (751) and LEDc3 (741) to a higher amount established by the value of the third current sense resistor Rc3 (742).

In this manner, when the AC supply voltage reaches its 170V peak value, only the first Benistor Sw1 (601) is switched ON and its Cc terminal limits the current of all four stripes down to a pre-established amount calculated for 5 W, 10 W or 100 W LED lamp retrofits.

When the voltage starts decreasing, back to zero, the process is reversed in such a manner that, with the exception of short transit time periods, when the Benistors transfer the control, smoothly, to each-other only one Benistor is ON and all the others are OFF.

When the calculation of the number of LEDs per stripe is done correctly, the efficiency of this system can exceed 96%, superseding absolutely all the SMPS LED driver topologies existing in the industry.

By considering the top performance, low component count down to "one chip driver", miniature size, virtually unlimited life, the possibility to be embedded in an LED array module and very low manufacturing cost of this kind of drivers, evidently these devices have good chances to become the future "Ultimate LED Lamp Retrofits".

Embodiment 19

Monolithic LED Driver—the Parallel Circuit Method

FIG. 19a shows an embodiment of a four Benistor parallel monolithic LED driver block schematic circuit. FIG. 19b shows a series of current/voltage graphs obtained from the Benistor monolithic LED driver shown in FIG. 19a.

Description of the Components Connections

As embodied herein, a monolithic LED driver circuit comprises a minimum parts AC-to-DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55), and a four Benistors LED driver sub-circuit.

The four Benistors LED drive sub-circuit comprises:
(a) A first eight terminal Benistor Sw1 (601) comprising:
   a first anode "A" terminal coupled to the cathode of a first LEDs column LEDc1 (721), which has the anode coupled to Vin;
   a second cathode "K" terminal coupled to a first current sense resistor Rc1 (722) which has the other terminal coupled to ground (55);
   a third voltage sense "Vs" terminal coupled to Vin;
   a fourth voltage set terminal "Von" coupled to the positive terminal of a DC voltage source (613) having its negative terminal coupled to ground (55);
   a fifth voltage set terminal "Voff" coupled to the positive terminal of a DC voltage source (614) having its negative terminal coupled to ground (55);
   a sixth current set terminal "Cc" coupled also to the first terminal of Rc1 (722);
   a seventh feedback terminal "FB" coupled to a feedback terminal of a second eight terminal Benistor Sw2 (602); and
   an eighth zero voltage reference terminal "ZVR" coupled to ground (55).
(b) A second eight terminal Benistor Sw2 (602) comprising:
   a first anode "A" terminal coupled to the cathode of a second LEDs column LEDc2 (731), which has the anode coupled to the cathode of LEDc1 (721);
   a second cathode "K" terminal coupled to a second current sense resistor Rc2 (722) which has the other terminal coupled to ground (55);
   a third voltage sense "Vs" terminal coupled to Vin;
   a fourth voltage set terminal "Von" coupled to the positive terminal of a DC voltage source (623) having its negative terminal coupled to ground (55);
   a fifth voltage set terminal "Voff" coupled to the positive terminal of a DC voltage source (624) having its negative terminal coupled to ground (55);
   a sixth current set terminal "Cc" coupled also to the first terminal of Rc2 (732);
   a seventh feedback terminal "FB" coupled to the FB terminal of Sw1 (601); and
   an eighth zero voltage reference terminal "ZVR" coupled to ground (55).
(c) A third eight terminal Benistor Sw3 (603) comprising:
   a first anode "A" terminal coupled to the cathode of a third LEDs column LEDc3 (741), which have the anode coupled to the cathode of LEDc2 (731);

a second cathode "K" terminal coupled to a third current sense resistor Rc3 (742) which has the other terminal coupled to ground (55);
a third voltage sense "Vs" terminal coupled to Vin;
a fourth voltage set terminal "Von" coupled to the positive terminal of a DC voltage source (633) having its negative terminal coupled to ground (55);
a fifth voltage set terminal "Voff" coupled to the positive terminal of a DC voltage source (634) having its negative terminal coupled to ground (55);
a sixth current set terminal "Cc" coupled also to the first terminal of Rc3 (742);
a seventh feedback terminal "FB" coupled to the FB terminal of Sw2 (602); and
an eighth zero voltage reference terminal "ZVR" coupled to ground (55).
(d) A fourth eight terminal Benistor Sw4 (604) comprising:
a first anode "A" terminal coupled to the cathode of a fourth LEDs column LEDc4 (751), which have the anode coupled to the cathode of LEDc3 (741);
a second cathode "K" terminal coupled to a fourth current sense resistor Rc4 (752) which has the other terminal coupled to ground (55);
a third voltage sense "Vs" terminal coupled to Vin;
a fourth voltage set terminal "Von" coupled to the positive terminal of a DC voltage source (643) having its negative terminal coupled to ground (55);
a fifth voltage set terminal "Voff" coupled to the positive terminal of a DC voltage source (644) having its negative terminal coupled to ground (55);
a sixth current set terminal "Cc" coupled also to the first terminal of Rc4 (752);
a seventh feedback terminal "FB" coupled to the FB terminal of Sw3 (603); and
an eighth zero voltage reference terminal "ZVR" coupled to ground (55).
The functionality of the Benistor was described above in connection with FIG. 18a.
Description of the LED Driver Functionality
As yet embodied herein, the four Benistors parallel LED driver circuit shown in FIG. 19a in accordance with the present specification is capable of controlling, in a CVCC (constant voltage constant current) manner, a 120-240 Vac LED lamp retrofit lighting panel, comprising four stripes of LEDs, under very high efficiency and near unity power factor, in a self-switching mode of operations (i.e., Benistors do not require external components such as coils or capacitors to generate periodical ON-OFF oscillations), by forcing the LED lamp retrofit's main current to follow a sine wave graph shape, in phase with the supply voltage's graph shape (for achieving PF>0.99), as illustrated in FIG. 18b, Current/Voltage Graphs, section E.
This performance is accomplished, on the one hand, by setting properly the voltage amount of each DC voltage source applied to the Von and Voff voltage control inputs of each Benistor (613 to 644), for delivering the right voltage to each of the four LED stripes and, on the other hand, by selecting the right value of the current sense resistors (Rc1 to Rc4) for the current control inputs of each Benistor to limit each LED stripe current in accordance to pre-established limits.
As the graph presented at section D of FIG. 19b shows, the parallel circuit works very similarly, but in opposite phase, with respect to the series circuit presented above in FIG. 18, respectively, as the supply voltage increases, the Sw1 (601) is the first one switching ON and the Sw4 (604) is the last one, controlling the voltage and current of all the four LED stripes.

Embodiment 20

Single Cell Anode Loaded Voltage Controlled Limited Current Switch (VCLCsw) LED Driver FIG. 20 shows an embodiment of a single cell anode loaded VCLC switch LED Driver circuit.
Description of the Components Connections
As embodied herein, this single cell anode loaded VCLC switch LED Driver circuit comprises a minimum component AC-to-DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55), and an eight terminal voltage controlled limited current switch VCLCsw (601) sub-circuit.
In one embodiment, the eight terminal voltage controlled limited current switch VCLCsw (601) sub-circuit comprises:
a first anode "A" (651) terminal coupled, operatively, to Vin via a LED column LEDc 1 (721);
a second cathode "K" (658) terminal coupled to a first terminal of a resistor Rd (722) having the other terminal coupled to ground (55);
a third voltage sense "Vs" (562) terminal coupled directly to Vin;
a fourth voltage set terminal "Von" coupled to the positive terminal of a DC voltage source (613) having its negative terminal coupled to ground (55);
a fifth voltage set terminal "Voff" coupled to the positive terminal of a DC voltage source (614) having its negative terminal coupled to ground (55);
a sixth current set terminal "Cc" coupled also to the first terminal of Rc1 (722);
a seventh feedback terminal "FB" unconnected; and
an eighth zero voltage reference terminal "ZVR" coupled to ground (55).
Internally, the VCLCsw (601) comprises:
a MOSFET buffer BUF (661) having its drain coupled to A (651) its source coupled to K (658) and its gate coupled to a micro-controller uC (666);
a first comparator V1 (662) having one input coupled to Von (653), the other input coupled to Vs (652) and the output coupled to uC (666);
a second comparator V2 (663) having one input coupled to Voff (654), the other input coupled to Vs (652) and the output coupled to uC (666);
an operational amplifier C (665) having one input coupled to Cc (657), the other input coupled to uC (666) and the output coupled also to the uC (666);
a voltage shunt voltage reference BGVR coupled with the anode to "ZVR" (655) and with it is cathode to the uC (666); and
a temperature sensor Ts (667) coupled to uC (666).
Description of the Circuit's Functionality
As further embedded herein, this system embodiment represents a particular circuit topology, revealed down to components level, of the block schematic using the Benistor symbol, presented in FIG. 19a Monolithic LED Driver—Parallel Circuit Method Embodiment, which is capable to control, precisely, the voltage and current of a LED stripe.
In this particular circuit, the VCLCsw (601) operations are controlled by the uC (666) micro-controller, which drives the MOSFET buffer BUF (661)
in accordance to a suitable procedure determined, from time to time, by the complex signal received from its analog sensors, such as the momentary voltage amount at Vin, sensed by the V1 (662) and V2 (663), the LEDs momentary current, sensed by the operational amplifier C (665), the ambient temperature sensed by Ts (667).

The BGVR (664) provides voltage references to the entire system for securing the operation's precision and reliability.

The VCLCsw (601) represents only one cell, capable to control only one LED stripe.

Complex lighting systems may use 4, 8, 16 or 64 similar cells, controlling the LEDs not just at the stripe level but also at the "LED by LED" level, for increasing the efficiency to over 97% (the more cells used, the more efficient is the entire system) and the uC (666) to perform additional jobs, such as I/O digital data feedback, allowing remote control and fast adjustments of the light in large buildings, studios or theaters.

Embodiment 21

Single Cell Cathode Loaded Voltage Controlled Limited Current Switch (VCLCsw) LED Driver FIG. 21 shows an embodiment of a single cell cathode loaded VCLC switch LED Driver circuit.

Description of the Components Connections

As embodied herein, this single cell cathode loaded VCLC switch LED Driver circuit comprises a minimum parts AC-to-DC converter sub-circuit comprising a bridge rectifier BR (53) operatively coupled to an AC voltage generator Vac (51) for providing an unfiltered DC pulse voltage at its positive output terminal Vin, with respect to its negative output terminal coupled to ground (55), and a six terminal voltage controlled limited current switch VCLCsw (601) sub-circuit.

The six terminal voltage controlled limited current switch VCLCsw (601) sub-circuit comprises:
a first anode "A" (651) terminal coupled to Vin;
a second cathode "K" (658) terminal coupled, via a LED column LEDc 1 (721) to a first terminal of a resistor Rc1 (722) having the other terminal coupled to ground (55);
a third voltage set terminal "Von" (653) coupled to Vin;
a fourth voltage set terminal "Voff" (654) coupled to the anode of a zener diode Dv1 (686) having the cathode coupled to Vin via a resistor RNA (687);
a fifth current set terminal "Cc" coupled also to the first terminal of Rc1 (722); and
a sixth zero voltage reference terminal "ZVR" coupled to ground (55).

Internally, the VCLCsw (601) comprises:
a MOSFET buffer BUF1 (681) having its drain coupled to A (651) its source coupled to K (658) and its gate coupled to the cathode a second zener diode Vlim1 (683) having the anode coupled to "ZVR" (655) terminal;
a ON resistor Ron1 (682) is coupled between the BUF (661) gate and Von (653) terminal;
a voltage transistor Qv1 (685) having its base coupled to Voff (654) terminal, the collector coupled to BUF1 (681) gate and emitter coupled to "ZVR" (655); and
a current transistor (684) having its base coupled to Cc (657) terminal, the collector coupled to BUF (681) gate and emitter coupled to "ZVR" (655) terminal.

Description of the Circuit's Functionality

As further embedded herein, this system embodiment represents a particular circuit topology, revealed down to components level, of the block schematic using Benistor symbol, presented in FIG. 18*a* Monolithic Led Driver—Series Circuit Method Embodiment, which is capable to control, simultaneously, the voltage and current of a LED stripe.

In this particular circuit, Ron1 (682) supplies the BUF1 (681) gate for keeping the buffer ON until Qv1 (685) switch it OFF as soon as Vin reaches a higher amount than the Dv1 (686) threshold.

Vlim 1 (683) keeps the gate voltage of BUF1 (681) constant, despite large variations of the Vin voltage amount and Ron1 (682) current.

Qc1 (684) controls, linearly BUF1 (681) output current, by decreasing its gate voltage when the voltage across Rd (722) exceeds 0.6V.

This different topology of the VCLCsw (601) controller represents another particular version of a very low cost Benistor cell.

Five or more cells, like this one, connected in series or parallel, are sufficient to drive LED lamp retrofits up to 20 W.

Embodiment 22

Monolithic LED Driver—Overall Feedback Series Circuit

FIG. 22*a* shows an embodiment of a monolithic LED driver-overall feedback series circuit. FIG. 22*b* shows a series of current/voltage graphs obtained from the monolithic LED driver shown in FIG. 22*a*.

Description of the Components Connections

As embodied herein, this low component count low cost monolithic LED driver circuit comprises a minimum parts AC-to-DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55), and a sub-circuit including four VCLCsw cells having current control only, wherein (a) The first VCLCsw cell comprises:
a first MOSFET buffer BUF1 (681) having its drain coupled to Vin, source coupled to the anode of a LED stripe LEDc1 (721) and gate coupled to the cathode of a zener diode Vlim1 (683);
a NPN transistor Qc1 (684) having its base coupled to the cathode of LEDc1 (721) and a first terminal of a current resistor Rc1 (722), emitter coupled to the other terminal of Rc1 (722) and the anode of Vlim1 (683) and collector coupled to the gate of BUF1 (681); and
a ON resistor Ron1 (682) coupled from Vin to the gate of BUF1 (681).

(b) The second VCLCsw cell comprises:
a second MOSFET buffer BUF2 (691) having its drain coupled to Vin, source coupled to the anode of a second LED stripe LEDc2 (731) and the second terminal of Rc1 (722) and the gate coupled to the cathode of a second zener diode Vlim2 (693);
a second NPN transistor Qc2 (694) having its base coupled to the cathode of LEDc2 (731) and a first terminal of a second current resistor Rc2 (732), emitter coupled to the other terminal of Rc2 (732) and the anode of Vlim2 (693) and the collector coupled to the gate of BUF2 (691); and
a second ON resistor Ron2 (692) coupled from Vin to the gate of BUF2 (691).

(c) The third VCLCsw cell comprises:
a third MOSFET buffer BUF3 (701) having its drain coupled to Vin, source coupled to the anode of a third LED stripe LEDc3 (704) and the second terminal of Rc2 (732) and the gate coupled to the cathode of a third zener diode Vlim3 (703);

a third NPN transistor Qc3 (704) having its base coupled to the cathode of LEDc3 (741) and a first terminal of a third current resistor Rc3 (742), emitter to the other terminal of Rc3 (742) and the anode of Vlim3 (703) and the collector coupled to the gate of BUF3 (701); and a third ON resistor Ron3 (702) coupled from Vin to the gate of BUF3 (701).

(d) The fourth VCLCsw cell comprises:

a fourth MOSFET buffer BUF4 (711) having its drain coupled to Vin, source to the anode of a fourth LED stripe LEDc4 (751) and the second terminal of Rc3 (742) and the gate coupled to the cathode of a third zener diode Vlim4 (713);

a fourth NPN transistor Qc4 (714) having its base coupled to the cathode of LEDc4 (751) and a first terminal of a fourth current resistor Rc4 (752), emitter to the other terminal of Rc4 (752) and the anode of Vlim4 (713) and the collector coupled to the gate of BUF4 (711); and a fourth ON resistor Ron4 (712) coupled from Vin to the gate of BUF4 (711).

Description of the Circuit's Functionality

As further embedded herein, this system embodiment shows the circuit of a four stripes LED driver where have been used four identical VCLCsw cells similar to the circuit shown in FIG. 21, in this circuit having only current control, so the Voff transistor Qv1 (685) and its attached zener diode Dv1 (686) have been removed.

These embodiments reveal the advantage of the feedback created by the fact that the VCLCsw cells are connected in a "totem pole" configuration, which allows each higher level buffer transistor to smoothly switch OFF the lower level one.

In this embodiment the voltage control is obtained automatically, from the current control transistor, which decreases the buffer's voltage in the gate when the current in LEDs increases.

A 12 W LED lamp retrofit bench prototype has been executed, following exactly this particular topology having six identical cells. The driver's main current shape is illustrated in FIG. 22b.

The bench test results have shown a good power factor over 0.96, even with this very low parts count, low cost circuit.

Embodiment 23

Monolithic LED Driver-Overall Feedback Parallel Circuit

FIG. 23a shows an embodiment of a monolithic LED driver-overall feedback parallel circuit comprising four VCLCsw cells using the same simple transistor-zener diode voltage control shown in FIG. 21 and removing the current control transistor, for using feedback current control, only. FIG. 23b shows a series of current/voltage graphs obtained from the Benistor monolithic LED driver shown in FIG. 23a.

As embodied herein, this less parts low cost monolithic LED driver circuit comprises a minimum parts AC-to-DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55) and a sub-circuit including four VCLCsw cells connected in parallel, wherein (a) The first VCLCsw cell comprises:

a first MOSFET buffer BUF1 (681) having its drain coupled the cathode of a LED stripe LEDc1 (721) having its anode coupled to Vin, its source coupled to a first terminal of a current resistor Rc1 (722) and its gate coupled to the cathode of a zener diode Vlim1 (683) having its anode coupled to ground (55);

a voltage control NPN transistor Qv1 (685) having its base coupled to the anode of a first zener diode Dv1 (686) which has its cathode coupled to the cathode of LEDc1 (721) via a resistor Rv1 (687), its emitter is coupled to ground (55) and its collector is coupled to the gate of BUF1 (681); and a ON resistor Ron1 (682) coupled from the cathode of LEDc1 (721) to the gate of BUF1 (681).

(b) The second VCLCsw cell comprises:

a second MOSFET buffer BUF2 (691) having its drain coupled the cathode of a LED stripe LEDc2 (731) having its anode coupled to the cathode of LEDc1 (721), its source coupled to the second terminal of Rc1 (722) and a first terminal of a second current resistor Rc2 (732) and the BUF2 (691) gate is coupled to the cathode of a second zener diode Vlim2 (693) having its anode coupled to ground (55);

a second voltage control NPN transistor Qv2 (695) having its base coupled to the anode of a second zener diode Dv2 (696) which has its cathode coupled to the cathode of LEDc2 (731) via a resistor Rv2 (697), its emitter is coupled to ground (55) and its collector is coupled to the gate of BUF2 (691); and a second ON resistor Ron2 (692) coupled from the cathode of LEDc2 (731) to the gate of BUF2 (691).

(c) The third VCLCsw cell comprises:

a third MOSFET buffer BUF3 (701) having its drain coupled the cathode of a LED stripe LEDc3 (741) having its anode coupled to the cathode of LEDc2 (731), its source coupled to the second terminal of Rc2 (732) and a first terminal of a third current resistor Rc3 (742) and the BUF3 (701) gate is coupled to the cathode of a third zener diode Vlim3 (703) having its anode coupled to ground (55);

a third voltage control NPN transistor Qv3 (705) having its base coupled to the anode of a third zener diode Dv3 (706) which has its cathode coupled to the cathode of LEDc3 (741) via a resistor Rv3 (707), its emitter is coupled to ground (55) and its collector is coupled to the gate of BUF3 (701); and a third ON resistor Ron3 (702) coupled from the cathode of LEDc3 (741) to the gate of BUF3 (701).

(d) The fourth VCLCsw cell comprises:

a fourth MOSFET buffer BUF4 (711) having its drain coupled the cathode of a LED stripe LEDc4 (751) having its anode coupled to the cathode of LEDc3 (741), its source coupled to the second terminal of Rc3 (742) and a first terminal of a fourth current resistor Rc4 (752), and its gate coupled to the cathode of a fourth zener diode Vlim4 (713) having its anode coupled to ground (55);

a fourth voltage control NPN transistor Qv4 (715) having its base coupled to the anode of a fourth zener diode Dv4 (716) which has its cathode coupled to the cathode of LEDc4 (751) via a resistor Rv4 (717), its emitter is coupled to ground (55) and its collector is coupled to the gate of BUF4 (711); and a fourth ON resistor Ron4 (712) coupled from the cathode of LEDc4 (751) to the gate of BUF4 (711).

Description of the Circuit's Functionality

As further embedded herein, this system embodiment shows the circuit of a four stripes LED driver using four identical VCLCsw cells similar to the circuit shown in FIG. 21. This circuit provides only voltage control, so the current control transistor Qc1 (684) has been removed. The current control function being done, directly, by the feedback resistors inserted in each of the four buffer MOSFET transistors source, in a series circuit starting from the cell driving the first LED stripe next to the bridge rectifier BR (53) and finishing with the cell driving the last LED stripe, near ground (55).

It will be appreciated that, as used throughout the present specification, the term "series" with respect to this embodiment circuit's schematic diagram topology, does not refer to the position of the buffer transistor with respect to each other, since in all circuits, regardless of the method used, the buffers appear "in parallel" to each other, and only the "anode loaded" versus "cathode loaded" versions appears to be the only difference between them.

Rather, the term "series" refers to the fact that in this group of embodiments the "Vlim(n)" zener diodes are connected in series, or "totem pole", for setting an incremental increase of the voltage, at each buffer's gate, for securing the "constant voltage" in each gate, proportional to the increasing number of LED stripes each buffer has to drive, in a CVCC mode of operations.

This aspect will become more evident at the description of the Embodiment 26: "Monolithic LED Driver—Minimum Parts Series Circuit Embodiment", hereinbelow, where the voltage control zener diodes Vlim1 to Vlim4 appear in a clear "series connection" configuration, where BUF4 has only 30V in gate, while BUF1 has about 140V in the gate, with respect to ground, because it drives 4 LED stripes having a threshold of about 33V per stripe.

On the other hand, in the circuits following the "Parallel Method" all buffers have the same voltage in the gate, so all gates can be coupled in "parallel" and their voltage could be even secured with only one zener diode.

These embodiments reveal the advantage of the current feedback created by the anode loaded VCLCsw cells having a current feedback applied directly to the buffer MOSFET transistors source level. This eliminates, in a simple way, the need for an additional current control transistor and simplifying the classic Benistor topology configuration.

The "totem pole" configuration of the sense resistors, starting from the Benistor cell closer to the bridge rectifier and ending with the Benistor cell next to ground allow for a very good current feedback, directly at the buffers level, allowing the buffer transistors to, smoothly, switch OFF the lower level one, in such a manner, that power factor over 0.99 is achievable, is the number of LEDs per each stripe and the value of each sense resistor are properly calculated.

Since the LEDs are more sensitive to current than voltage, and the MOSFET transistors are stable with the variation of temperature, especially when a good feedback current is accomplished, for "indoor LED lamp retrofits" applications (i.e., a reasonable temperature range of 15-40° Celsius), the three voltage control components included in each cell circuit, such as Qv(n), Dv(n) and Rv(n) could be eliminated, for reducing component count, size and cost of the entire circuit (which may include 3 to 60 Benistor cells, in some applications) without exposing the driver system to a high risk of losing control over the LED stripes.

A 14 W LED lamp retrofit bench prototype has been implemented, following this particular topology, having five identical cells from which the three voltage control/protection parts have been removed.

As a function of the value of each sense or feedback resistor current versus voltage shape of this particular "anode loaded multi-cell buffer resistor source feedback five Benistor cells LED driver" the current versus voltage graphs may follow three different shapes, such as:

a) the "flat sine wave" as illustrated in FIG. 27*b* "Monolithic LED Driver Minimum Parts Parallel Circuit Embodiment" which features a very low peak current, power factor 0.95 and A.THD 18%, b) the "stairs sine wave" as illustrated in FIG. 23*b* of this embodiment which features power factor 0.97 and A.THD 10% and, c) the "clean sine wave" as illustrated in FIG. 19*b* entitled: "Monolithic LED Driver—The Parallel Method Circuit Embodiment" which features, power factor 0.996 and A.THD 4.7%, More details about efficiency and other parameters and features are provided below, in the description of other embodiments.

As an important note, from this point forward, in order to save space in this, already, very complex patent application, the description of the connections between the parts of an embodiment will be executed only if absolutely necessary. Otherwise, the description will be simplified using references to similar embodiments already fully described above.

Embodiment 24

Monolithic Multi Stripes LED Driver—Series Circuit

FIG. 24 shows an embodiment of a monolithic multi stripes LED Driver—series circuit embodiment. The illustrated embodiment comprises four Benistor cells using the same simple topology described in connection with FIG. 22: "Monolithic LED Driver—Overall Feedback Series Circuit Method Embodiment and removing the current control transistor, for using feedback current control, only.

As embodied herein, this circuit embodied in FIG. 24 follows the same topology shown in FIG. 22: "Monolithic LED Driver—Overall Feedback Series Circuit Method Embodiment" with one difference being instead of having just one current control NPN transistor, such as Qc1 (684), in this circuit there are 2, 3, or 4 NPN transistors, such as Q1A (684), Q1B (688), Q1C (689) and Q1D (690) all of them coupled emitter-collector across the zener diode Vlim1 (683) for decreasing the BUF1 (681) gate voltage when the LED current increases.

In one embodiment, more than one current controller transistor may be used in that all LED manufacturer strongly recommend to do not connect LED stripes, in parallel, without connecting at least a ballast resistor, per each stripe, for balancing the small voltage difference which always exits, from unit to unit.

However, since in high quality LED drivers, some providers (see Related Art) prefer to include very expensive parts, such as one voltage shunt regulator and an operational amplifier plus a MOSFET buffer used as "constant current sink" (CCS) per each LED stripe just to increase, indefinitely, "the potential lifetime" of a specific LED lamp retrofit, in this particular embodiment it was revealed a "low cost solution" for doing a similar job by using several low cost NPN transistors (a "2N2222" classic NPN transistor cost less than 1 c/unit, in large volume) having the output coupled in parallel and just each transistor base to be coupled, via a separate sense resistor, in series to as many LED columns as required by a specific application, offering "a longer potential lifetime" to the LED lamp retrofits by using this low cost "multi-current control inputs Benistor" system, rather than using a "complete Benistor cell" per each LED stripe.

Embodiment 25

Monolithic LED Driver—High Reliability Series Circuit

FIG. 25 shows an embodiment of a monolithic LED driver—high reliability series circuit embodiment.

As embodied herein, this circuit embodied in FIG. 25 follows the same four Benistor cells, series method topology described in connection with FIG. 21: "Monolithic LED Driver—Overall Feedback Series Circuit Method Embodiment" with one difference being instead of having just one current control NPN transistor, such as Qc1 (684) a more sophisticated and expensive CVCC system, including two operational amplifiers per each Benistor cell been used, for increasing the feedback precision and reliability of "Outdoor LED lamp retrofits", which may need to face large variations of temperature that always happens, from the winter to the summer time seasons.

This more reliable but also more expensive CVCC system includes a classic current feedback operational amplifier (OPAM) circuit sensing the LED stripe current via a sense resistor and a classic voltage OPAM circuit sensing the voltage across the LED stripe having both, the output coupled to the buffer transistor's gate, per each of the four Benistor cells.

This particular embodiment represents a very reliable series method Benistor circuit version, in which the operational amplifiers do not need a separate power supply, being supply, together with the LED stripe, by the MOSFET buffer transistor which runs each cell.

Embodiment 26

Monolithic LED Driver—Minimum Parts Series Circuit

FIG. 26 shows an embodiment of a monolithic LED driver-overall feedback parallel circuit. The illustrated embodiment comprises four Benistor cells.

Description of the Components Connections

As embodied herein, a minimum parts LED driver circuit comprises: a minimum parts AC to DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55), and a minimum component count monolithic converter sub-circuit including four Benistor cells, comprising:

(a) The first Benistor cell comprising:
a first MOSFET buffer BUF1 (681) having its drain coupled to Vin, source to the anode of a LED stripe LEDc1 (721) and gate to the cathode of a zener diode Vlim1 (683); and
a ON resistor Ron1 (682) is coupled from Vin to the gate of BUF1 (681).

(b) The second Benistor cell comprising:
a second MOSFET buffer BUF2 (691) having its drain coupled to Vin, source to the cathode of LEDc1 (721) and the anode of a second LED stripe LEDc2 (731) and the gate coupled to the anode of Vlim1 (683) and the cathode of a second zener diode Vlim2 (693); and
a second ON resistor Ron2 (692) is coupled from Vin to the gate of BUF2 (691).

(c) The third Benistor cell comprising:
a third MOSFET buffer BUF3 (701) having its drain coupled to Vin, source to the cathode of LEDc2 (731) and the anode of a third LED stripe LEDc3 (741) and the gate coupled to the anode of Vlim2 (693) and the cathode of a third zener diode Vlim3 (703); and
a third ON resistor Ron3 (702) is coupled from Vin to the gate of BUF3 (701).

(d) The fourth Benistor cell comprising:
a fourth MOSFET buffer BUF4 (711) having its drain coupled to Vin, source to the cathode of Ledc3 (741) and the anode of a fourth LED stripe LEDc4 (751) which has its cathode coupled to ground via a sense resistor Rc4 (752) and the gate coupled to the anode of Vlim3 (703) and the cathode of a second zener diode Vlim4 (713) which has its anode coupled to ground (55) via a voltage control resistor Rvc (753); and
a fourth ON resistor Ron4 (712) is coupled from Vin to the gate of BUF4 (711).

Description of the Circuit's Functionality

As further embodied herein, this system embodiment shows a circuit of a four stripes LED driver where have been used four minimum parts Benistor cells.

The name of the "series method" comes from the fact that, in order to secure the constant voltage feature of the system, several zener diodes (or voltage shunt regulators) have to be connected, from the ground (55) up to each buffer transistor gate, in series, in such a manner for each MOSFET buffer to operate as a constant current sink (CCS) with respect to the LED columns control and the sense resistor Rc4 (752).

As the schematic shows, BUF4 operates as a CCS limiting the current of LEDc4 (751) in accordance to its gate voltage, limited by Vlim4 (713) and the current resistor Rc4 (752) in a classic negative feedback way, in which, when the current in the LEDc4 (751) increases, the voltage across Rc4 (752) is supposed to increase, however, when the voltage across Rc4 (752) increases too much, the buffer BUF4 (711) gate-source voltage will decrease, fact which will result in lowering its output current, fact will lower the voltage across Rc4 (752), so in conclusion the zener diode Vlim4 (713) secures both, the output voltage and the output current, across the LEDc4 (751) stripe.

Following the same procedure, BUF1 (681) acts as CVCC controller for all four LED stripes, since if the LEDs current increases, for any reasons, (changes of the ambient temperature and/or higher input supply voltage) the voltage across Rc4 will increase and the four zener diodes, connected in series, will not allow that.

Besides this simple and cost effective CVCC converter behavior, this totem pole configuration allows for an extra negative feedback between the Benistors cells, respectively, when Vin increases, sufficiently, for BUF3 (701) to start having an increasing output current, and the voltage in its gate is calculated for BUF3 (701) to allow a higher current than BUF4 (711) in order for the lamp current to increase progressively and follow a sine wave shape, for a maximum power factor, the BUF3 will create across Rc4 (752) a sufficiently higher voltage for switching OFF BUF4 (711) and because of that, in this particular circuit, there is no more need for the Voff transistor or comparator. In other words, this apparently very simple schematic is actually a very complex and reliable "four Benistors series method LED driver" system.

Embodiment 27

Monolithic LED Driver—Minimum Parts Parallel Circuit

FIG. 27a shows an embodiment of a monolithic LED driver-overall feedback parallel circuit. FIG. 27b shows a series of current/voltage graphs obtained from the Benistor monolithic LED driver shown in FIG. 27a.

Description of the Components Connections

As embodied herein, a minimum component count LED driver circuit comprises a minimum component count AC-to-DC converter sub-circuit including a bridge rectifier BR (53) operatively coupled to an AC voltage generator Vac (51) for providing an unfiltered DC pulse voltage at its positive output terminal Vin, with respect to its negative output terminal coupled to ground (55), and a minimum component count monolithic converter sub-circuit including four Benistor cells comprising:

(a) The first Benistor cell comprises:
a first MOSFET buffer BUF1 (681) having its drain coupled to the cathode of a first LED stripe LEDc1 (721) which has the anode coupled to Vin, its source coupled to the first terminal of a first sense resistor Rc1 (722) and gate to the cathode of a zener diode Vlim4 (713) which has the anode coupled to ground (55); and
a ON resistor Ron1 (682) is coupled from Vin to the gate of BUF1 (681) and the cathode of Vlim4 (713).

(b) The second Benistor cell comprises:
a second MOSFET buffer BUF2 (691) having its drain coupled to the cathode of a second LED stripe LEDc2 (731) which has the anode coupled to the cathode of LEDc1 (721), its source coupled to the second terminal of Rc1 (722) and to the first terminal of a second sense resistor Rc2 (732) and the gate of BUF2 (691) is coupled to the cathode of Vlim4 (713).

(c) The third Benistor cell comprises:
a third MOSFET buffer BUF3 (701) having its drain coupled to the cathode of a third LED stripe LEDc3 (741) which has the anode coupled to the cathode of LEDc2 (731), its source coupled to the second terminal of the second sense resistor Rc2 (732) and to the first terminal of a third sense resistor (742) and the gate of BUF3 (701) is coupled to the cathode of Vlim4 (713).

(d) the fourth Benistor cell comprises
a fourth MOSFET buffer BUF4 (711) having its drain coupled to the cathode of a fourth LED stripe LEDc4 (751) which has the anode coupled to the cathode of LEDc3 (741), its source coupled to the second terminal of the third sense resistor Rc3 (742) and to the first terminal of a fourth sense resistor Rc4 (752) having the other terminal coupled to ground (55) and the gate of BUF4 (711) is coupled to the cathode of Vlim4 (713).

Description of the Circuit's Functionality

As further embedded herein, this system embodiment shows the circuit of a four stripes LED driver where have been used the parallel method of four minimum parts benistor cells.

The name of the "parallel method" comes from the fact that the gates of all MOSFET buffers can be supplied in parallel, from the voltage source, having about the same voltage amount with respect to the ground of the system and, in some applications, all gates can be connected together to the output of only one voltage source, secured by only one zener diode or voltage shunt regulator.

This particular circuit embodiment is very similar to the one presented in FIG. 23: "Monolithic LED Driver—Overall Feedback Parallel Circuit Method Embodiment" which has been reduced to the minimum parts version by removing, from each benistor cell, the three voltage control parts, such as Qv(n), Dv(n) and Rv(n) since, in this circuit, the Voff function is performed in the same manner done at the previously presented series circuit embodiment, by an "overall feedback" based on which each buffer automatically shuts down the previous operating buffer so, at any time, when one buffer is ON all the other buffers are OFF, except for a short transit time during which in purpose, it is managed for the transit time to be done, smoothly, for avoiding gaps in the LED lamp retrofit's main current, a fact which will increase the A.THD and decrease the power factor.

As the schematic shows, all buffers operate as constant current sinks, the sense resistors of all buffers are coupled in series and, since larger sense resistor means lower current, when the gates are supplied from the same voltage source, obviously BUF4 (711) having only one sense resistor to ground (55) will deliver the largest current, and BUF1 (681) four series sense resistors to ground (55) will deliver the lowest current to the LED stripes included in each of the circuits.

As FIG. 23: "Monolithic LED Driver—Overall Feedback Parallel Circuit Method Embodiment—b) Current/Voltage Graphs" illustrates, as Vin increases there are four steps until the LED lamp reaches its maxim illumination, such as:

1. BUF1 (681) is the first one starting to have a drain-source current, producing light in the first stripe LEDc1 (721) because it has less number of LEDs in drain and its current is the lowest one, because it has four resistor in its source.

2. BUF2 (691) is the second one having a drain-source current, as soon as Vin reach an amount equal with two LED stripe threshold, producing light in both, LEDc1 (721) and LEDc2 (731) stripes and, because it has three resistors in the source, BUF2 (691) will have a higher drain-source current and, as its current and source voltage increases, as lower becomes BUF1 (681) gate-source voltage and current and by the time BUF2 reaches its maxim current BUF1 is completely switched OFF.

As a very important part of the procedure, as FIG. 23b shows, the angle "v" in which the current of BUF1 (681) decays has to match, perfectly, with the angle "z" in which the BUF2 (691) arises, in such a manner for the retrofit lamp's current "Ivac" to do not decrease at all, but to increase, smoothly, to the next level, following the shape of the voltage shape, for a near unity power factor performance.

3. BUF3 (701) is the third one arising and has higher current then the previous buffers for the same reasons presented above, shutting OFF both, BUF1 (681) and BUF2 (691) producing light in three LED stripes, increasing its current to a maximum value preestablished by the value of the two current resistors included in its source circuit.

4. BUF4 (711) is the last one lighting all four stripes and following the same procedure as the other buffers, increasing the LED stripes' current and brightness up to the maximum specs of the lamp retrofit.

In conclusion, this apparently very simple circuit is actually a very complex and reliable "four Benistors parallel method LED driver" system.

Embodiment 28

120 Vac Series Circuit Monolithic LED Driver

FIG. 28 shows an embodiment of a 120 Vac series circuit monolithic LED driver circuit.

As embodied herein, this circuit follows the same topology described in connection with FIG. 22: "Monolithic LED Driver—Overall Feedback Series Circuit Method Embodiment" with the differences being that it comprises six Benistor cells. The illustrated embodiment shows that a six Benistor cell series circuit can be easily built, in a monolithic configuration, as a "eight parts LED driver", including a standard 14 Pin chip, a bridge rectifier and six low cost resistors.

Embodiment 29

LED Array and Driver Chip Embedded System Simplified Series Circuit Embodiment FIG. 29 shows an embodiment of an LED array and driver chip embedded system simplified series circuit.

As embodied herein, a two terminals Anode and Cathode monolithic lighting series circuit LADES (900) having a positive supply terminal A (901) and a negative supply terminal K (902) comprises:

A first LED (903) having its anode coupled to the positive supply terminal A (901) of the monolithic lighting series circuit (900) and its cathode coupled to the anode of a second LED (904) having its cathode coupled to the anode of a third LED (905) having its cathode coupled the anode of a fourth LED (906) having its cathode coupled to the negative terminal K (902) via a current sense resistor Rc1 (914);

A four sources-one drain MOSFET buffer BUF1 (911) having its drain coupled to the positive terminal A (901), its first source coupled to the cathode of the first LED (903), its second source coupled to the cathode of the second LED (904), its third source coupled to the cathode of the third LED (905), its fourth source coupled to the cathode of the fourth LED (906) and its gate coupled to the positive terminal A (901) via an ON resistor Ron1 (912) and to the collector of a current control NPN transistor Qc1 (913); and Qc1 has its base coupled to the cathode of the fourth LED (906) and its emitter coupled to the negative terminal K (902).

As embodied herein, this circuit follows the same topology described in connection with FIG. 22: "Monolithic LED Driver—Overall Feedback Series Circuit Method Embodiment" with one difference being that it uses a single MOSFET transistor having one drain and four sources rather than four MOSFET transistors.

The embodiment drawing shows that a four Benistor cell series circuit can be easily built, in a monolithic configuration, as a "Four LEDs Lighting Unit", included in a just two terminals packaging, exactly like one LED.

Embodiment 30

LED Array and Driver Chip Embedded System Simplified Parallel Embodiment

FIG. 30 shows an embodiment of a LED array and driver chip embedded system simplified parallel circuit.

As embodied herein, a two terminals Anode and Cathode monolithic lighting series circuit (900) having a positive supply terminal A (901) and a negative supply terminal K (902) comprises:

A first LED (903) having its anode coupled to the positive supply terminal A (901) of the monolithic lighting series circuit (900) and its cathode coupled to the anode of a second LED (904) having its cathode coupled to the anode of a third LED (905) having its cathode coupled the anode of a fourth LED (906) having its cathode coupled to a fourth drain of a four drains-one source MOSFET buffer (921); and The four drains-one source MOSFET buffer BUF1 (921) has its source coupled to the negative terminal K (902), via a current sense resistor Rc1 (924), its first drain coupled to the cathode of the first LED (903), its second drain coupled to the cathode of the second LED (904), its third drain coupled to the cathode of the third LED (905), its fourth drain coupled to the cathode of the fourth LED (906) and its gate coupled to the positive terminal A (901) via an ON resistor Ron1 (922) and to the cathode of a zener diode Vlim1 (923) which has its anode coupled to the negative terminal K (902);

As embodied herein, this circuit follows the same topology described in connection with FIG. 27: "Monolithic LED Driver—Minimum Parts Parallel Circuit Embodiment" with one difference being that it uses a single MOSFET transistor having one drain and four sources rather than four MOSFET transistors.

The embodiment drawing shows that a four Benistor cells series circuit can be easily built, in a monolithic configuration, as a "Four LEDs Lighting Unit", included in a just two terminals packaging, exactly like one LED.

Embodiment 31

Monolithic LED Driver—Diodes Source Feedback Parallel Circuit Embodiment

FIG. 31 shows an embodiment of a monolithic LED driver—diodes source feedback parallel circuit.

As embodied herein, this circuit follows the same topology described in connection with FIG. 27: "Monolithic LED Driver—Minimum Parts Parallel circuit embodiment" with one difference being it uses only one current resistor coupled between the source of the fourth buffer and ground (55) and the three resistors coupled between the other buffers sources have been replaced with rectifier diodes positioned with the anode to the first buffer and the cathode to the fourth buffer. The advantage of this system consists in a faster switching time between the buffers, a fact which increases the system efficiency.

Embodiment 32

Monolithic LED Driver—Operational Amplifier (OPAM) Current Feedback Parallel Circuit Embodiment FIG. 32 shows an embodiment of a monolithic LED driver—operational amplifier (OPAM) current feedback parallel circuit. This illustrated embodiment of the circuit follows the same topology described in connection with FIG. 27: "Monolithic LED Driver—Minimum Parts Parallel circuit embodiment" with the differences that it uses classic OPAM feedback for current control and an extra MOSFET transistor as a constant current source for supplying the OPAM. The advantage of this system consists in a more accurate control of the buffers current.

Embodiment 33

Monolithic LED Driver—Diodes Gate Feedback Parallel Circuit Embodiment

FIG. 33 shows an embodiment of a monolithic LED driver—diodes gate feedback parallel circuit. This illustrated embodiment of the circuit follows the same topology described in connection with FIG. 27: "Monolithic LED Driver—Minimum Parts Parallel circuit embodiment" with one difference being that the gates of the buffers are not coupled together but rather the gate of the fourth buffer is supplied from Vin via a resistor and the supply of the other gates is done via three diodes in such a manner that the voltage at the gate of the fourth buffer is higher than the voltage at the gate of the first buffer.

Embodiment 34

Monolithic LED Driver—Resistor Gate Feedback Parallel Circuit Embodiment

FIG. 34 shows an embodiment of a monolithic LED driver—resistor gate feedback parallel circuit. The illustrated embodiment of the circuit follows the same topology described in connection with FIG. 27: "Monolithic LED Driver—Minimum Parts Parallel circuit embodiment" with one difference being that the gates of the buffers are not coupled together but rather the gate of the fourth buffer is supplied from Vin via a resistor and the supply of the other gates is done via three resistors such that the voltage in at the gate of the fourth buffer is higher than the voltage at the gate of the first buffer.

Embodiment 35

Monolithic LED Driver—Totem Pole Feedback Parallel Circuit Embodiment

FIG. 35 shows an embodiment of a monolithic LED driver—totem pole feedback parallel circuit. The illustrated embodiment of the circuit follows the same topology as described in connection with FIG. 27: "Monolithic LED Driver—Minimum Parts Parallel circuit embodiment" with one difference being that two MOSFET transistors, coupled in a totem pole configuration, are used instead of one, for increasing the buffers control power per each cell.

Embodiment 36

Monolithic LED Driver—8 Pin DC Chip Embodiment

FIG. 36 shows an embodiment of a monolithic LED driver in an 8 Pin DC chip. The illustrated embodiment of the circuit follows the same topology as described in connection with FIG. 27: "Monolithic LED Driver—Minimum Parts Parallel circuit embodiment" with one difference being that the gates of the buffers are not coupled together but rather the gate of the fourth buffer is supplied from Vin via a resistor and the supply of the other gates is done via three resistors such that the voltage in at the gate of the fourth buffer is higher than the voltage at the gate of the first buffer. The embodiment drawing shows that a five Benistor cells parallel circuit can be easily built, in a monolithic configuration, as a "three parts LED driver", including a standard 8 Pin chip, a bridge rectifier and one low cost resistor.

Embodiment 37

Monolithic LED Driver—8 Pin AC Chip Embodiment

FIG. 37 shows an embodiment of a monolithic LED driver in an 8 Pin AC chip. The illustrated embodiment of the circuit follows the same topology described in connection with FIG. 27: "Monolithic LED Driver—Minimum Parts Parallel circuit embodiment" with one difference being that the gates of the buffers are not coupled together but rather the gate of the fourth buffer is supplied from Vin via a resistor and the supply of the other gates is done via three resistors such that the voltage at the gate of the fourth buffer is higher than the voltage at the gate of the first buffer.

Additionally, the current resistors between the buffers sources have been replaced with diodes, for increasing the commutation speed and efficiency.

The embodiment drawing shows that a five benistors cells parallel circuit can be easily built, in a monolithic configuration, reaching the ultimate goal: the "ONE PART LED DRIVER" as a standard 8 Pin chip connected, on one side to the LED panel and on the other side, directly to the AC line.

Description of the Benistor Device

FIGS. 38-40 describe one embodiment of a Benistor device, which may be employed in the various embodiments of monolithic LED driver circuits described herein. For a full description of a Benistor device, reference is given to U.S. Pat. No. 5,598,093 to Beniamin Acatrinei, inventor of the subject application. The entire disclosure of U.S. Pat. No. 5,598,093 is herein incorporated by reference.

A Benistor is a controllable electron valve. More particularly, the Benistor is a multi-electrode electron valve that is able to control, separately or simultaneously, the amount of current, the maximum voltage and/or the effective value of a pulse wave voltage incoming from a power source and outputting to a load. This controllable electron valve combines the large number and impedance of the vacuum tube's command electrodes, the transistor's flexibility, and the thyristor's (SCR's) self-switching mode of operation.

Turning now to FIG. 38, which is a block schematic diagram of a Classic Benistor embodiment. The block schematic diagram of the Benistor is illustrated in FIG. 38 and is designated generally by reference numeral 1010. The Benistor 1010 comprises a Power Controller 1011, a Current Separator 1012, a Current Controller 1013, and a Voltage Threshold Controller 1014.

As embodied herein, the Power Controller 1011 is connected to the VIN electrode 1001, which is in turn connected to a positive pole of a rectified bridge 1022. The negative pole of the rectified bridge 1022 is connected to ground 1029. The other two terminals of the rectified bridge 1022 are connected to an AC power source 1021. The Power Controller 1011 is also connected to the VOUT electrode 1002, which is connected to a resistive load 1023, and the load 1023 is connected to ground 1029. The Power Controller 1011 is internally connected to the Current Separator 1012.

The Current Separator 1012 is externally connected to a switch 1024 via the switch selector (SS) electrode 1006. The other connection of the external switch 1024 is connected to ground 1029. The Current Separator 1012 is internally connected to the Current Controller 1013 and the Voltage Controller 1014.

The Current Controller 1013 is externally connected to the positive pole of a first voltage reference source 1026 via the non-inverting cc electrode 1005, to the positive pole of a second voltage reference source 1026 via the inverting cc electrode 1004, and to ground 1029 via the common electrode (CE) 1003. The negative pole of both voltage reference sources 1025 and 1026 are connected to ground 1029.

The Voltage Threshold Controller 1014 is internally connected to the VIN electrode 1001 and to the common electrode (CE) 1003, which is connected to ground 1029. The Voltage Threshold Controller 1014 is externally connected to the positive pole of a third voltage reference source 1027 via the effective voltage control OFF/ON electrode 1007 and to a fourth voltage reference source 1028 via the maximum voltage control ON/OFF electrode 1008. The negative pole of each voltage reference source 1027, 1028 is connected to ground 1029.

As further embodied herein, a power pulse wave inputted at VIN electrode 1001 creates two currents, "Ivtc" (voltage threshold controller), and "Ipc" (power controller). The value of Ivtc is small, nearly constant over time, and acts to create an internal reference voltage. The Ipc in turn divides to become two currents: a larger current, ILOAD (or load current), and a smaller current MN (or internal current). ILOAD is the largest current inside the component and is externally limited by the load's resistive value (Ohm's Law) and internally limited by the Current Controller 1013. The amount of the internal current IIN is dependent upon the internal structure of the Power Controller 1011 and the Current Separator 1012. The IIN is variable between a few micro amperes, if the Power Controller 1011 employs FET technology, and several milli amperes, if the Power Controller employs bipolar technology.

As embodied herein, the Power Controller 1011 acts as a buffer for the entire component and is comprised of one or more transistors (bipolar, Darlington, MOS, FET, or hybrids) or SCRs. The Power Controller 1011 acts as a switch with zero resistance when in the "ON" condition and with infinite resistance when in the "OFF" condition. The Power Controller 1011 also accepts, as a dynamic resistor, linear variations from zero to infinity. The speed of commutation, the thermal coefficient, and the maximum internal power dissipation of this block are also important parameters.

The Current Separator 1012 provides a means for the Voltage Controller 1014 and Current Controller 1013 to control, simultaneously or separately, the Power Controller 1011 and prevents reverse current from entering the Power Controller 1011, the Current Controller 1013, and the Voltage Threshold Controller 1014. The Current Separator 1012 also controls the work time/cycle of the Power Controller 1011 via the switch selector SS electrode 1006. These functions may be performed by electronic switches, bipolar, FET, or MOS transistors, commutation diodes, zener diodes, etc.

The Current Controller 1013 functions to provide to the Power Controller 1011 a linear variation of current from zero to the limits accepted by the components of the Power Controller 1011. The Current Controller 1013 acts as a voltage/current converter for the Power Controller 1011. The voltage inputted at the inverting current control electrode 1004 with respect to the common electrode 1003 as a zero voltage reference, is indirectly proportional to the current outputted to the load via VOUT electrode 1002. The voltage inputted at the non-inverting current control electrode 1005, with respect to the common electrode 1003 as a zero voltage reference, is directly proportional to the current outputted to the load via Vout electrode 1002.

The components comprising the Current Controller 1013 may be bipolar, FET, or hybrid transistors, constant current sources, operational amplifiers, commutation diodes, zener diodes, etc.; must keep the internal current constant for large variations of voltage; and must provide a linear threshold, before which the Power Controller 1011 will operate in a linear mode and after which it will maintain the output current at zero despite further increases of the voltage input at the current control electrode 1006. This linear threshold is dependent upon the comportment of the components used in the current controller 1013. It is desirable, however, to have this linear threshold less than one volt, and ideally this linear threshold will be as close to zero as possible, thereby increasing the precision of the output voltage when the current control electrode 1006 is acting as a reference for another electrode. The Current Controller 1013 provides a means for the Power Controller 1011 to function in a switching mode of operation once the aforementioned linear threshold is passed, and a square wave generator is the input source at the current control electrode 1006. In this situation, as the amplitude of the square wave increases in relation to the linear threshold; the slew rate of the output of the Power Controller 1011 will also increase.

As further embodied herein, the Voltage Threshold Controller 1014 functions as a window comparator, having as reference voltage inputs the OFF/ON electrode 1007 and the ON/OFF electrode 1008, and having as a comparison voltage input the VIN electrode 1001. The output load 1023 may be an electronic switch or a current separator circuit. The Voltage Threshold Controller 1014 may comprise either transistors, bipolar, MOS, FET, or hybrids, for a monoblock structure (component), or two or more comparators, operational amplifiers, etc., for a polyblock structure (apparatus). The comparison occurring between the OFF/ON electrode 1007 or the ON/OFF electrode 1008, and the VIN electrode 1001 provides a means (via the Current Separator 1012) for the Power Controller 1011 to be either switched "OFF" or switched "ON". When the Power Controller 1011 is in a switched "OFF" condition, the output at the VOUT electrode 1002 is zero; when it is in a switched "ON" condition, the output current at the VOUT electrode 1002 will be limited by the resistive value of the load or by the Current Controller 1011 via the Current Separator 1012. 1007, which inputs a DC reference voltage (with the common electrode 1003 as a zero reference), the Power Controller 1011 is in a switch "OFF" condition when the momentary voltage value at the VIN electrode 1001 is less than the reference voltage at the OFF/ON electrode 1007. Conversely, the Power Controller 1011 is in a switched "ON" condition when the momentary voltage value at the VIN electrode 1001 is greater than the reference voltage input at the OFF/ON electrode 1007. In other words, during one complete cycle of the power wave and with the value of the reference voltage input at the OFF/ON electrode 1007 as 0<V(off-on)<VIN (max), the Power Controller 1011 will be first "OFF", then "ON", and then "OFF" again.

Based on this comparison, the Benistor acts as a self-switching controllable electron valve in an "OFF/ON" mode of operation. The output voltage waveform at the VOUT electrode 1002 to a resistive load is shown in FIG. 40B and reflects a variety of reference voltages, between zero and VIN (max), at the OFF/ON electrode 1007. When the electrode used for comparison with the VIN electrode is the ON/OFF electrode, which inputs a DC reference voltage (with the common electrode 1003 as a zero reference), the Power Controller 1011 is in a switched "ON" condition when the momentary voltage value at the VIN electrode 1001 is less than the reference voltage at the ON/OFF electrode 1008. Conversely, the Power Controller is in a switched "OFF" condition when the momentary voltage value at the VIN electrode 1001 is greater than the reference voltage at the ON/OFF electrode 1008. In other words, during one complete cycle of the power wave and with the value of the reference voltage input at the ON/OFF electrode 1008 as 0<V(on-off)<VIN (max), the Power Controller 1011 will be first "ON", then "OFF", and then "ON" again. Based on this comparison, the Benistor acts as a self-switching, controllable electron valve in an "ON/OFF" mode of operation. The output voltage waveform at the VOUT electrode 1002 to a resistive load is shown in FIG. 40C and reflects a variety of reference voltages, between zero and VIN (max), at the ON/OFF electrode 1008.

In order to explain the self-switching mode of operation of the Benistor when both voltage control electrodes are simultaneously inputting two different reference voltages, a review of the window comparator mode of operation is provided. A window comparator, also referred to as a "double ended comparator," is a circuit that detects whether or not an input voltage is between two specified voltage limits, called a window. This may be normally accomplished by logically combining the outputs from both an inverting and a non-inverting comparator. When the input level is greater than the upper reference voltage (VUL) the window, or less than the lower reference voltage (VLL) of the window, the output of the circuit is at VMAX. If the level of the input voltage is in the window between VLL and VUL, the output voltage is zero. In summary: Rule 1:VOUT=0, when VLL<VIN<VUL. Rule 2:VOUT=VMAX, when VIN<VLL or VIN>VUL.

Based on Rules 1 and 2 above, the state of the window comparator's output can be anticipated for any combination of the momentary voltage at VIN with respect to the reference voltages input as VUL and VLL, or for any combination of the reference sources VUL and VLL with respect to ground (zero voltage) or to the maximum voltage in the circuit (VMAX).

In a first particular condition (A), during which the VIN trip from a rectified bridge is a cyclic pulse, from zero to a maximum voltage and back to zero, and the parameters are defined as follows—0<VIN<VMAX, VLL<VUL<VMAX, and 0<VLL<VUL (the upper level voltage being less than VMAX but larger than the lower level voltage, and the lower level voltage being larger than zero)—five situations are possible:

Situation 1: 0<VIN<VLL. In this situation, VIN is outside of the window. Therefore, based on Rule 2 above, the window comparator's output will be at VMAX, and the logic state will be "HI".

Situation 2: VLL<VIN<VUL. In this situation, VIN is inside of the window. Therefore, based on Rule 1 above, the window comparator's output will be zero voltage, and the logic state will be "LO".

Situation 3: VUL<VIN<VMAX. In this situation, IN V is outside of the window. Therefore, based on Rule 2 above, the window comparator's output will be at VMAX, and the logic state will be "HI".

Situation 4: VLL<VIN<VUL. In this situation, VIN is again inside of the window. Therefore, based on Rule 1 above, the window comparator's output will be at zero, and the logic state will be "LO".

Situation 5: 0<VIN<VLL. In this situation, VIN is outside of the window. Therefore, based on Rule 2 above, the window comparator's output will be at VMAX, and the logic state will be "HI".

In summary, VOUT has five alternating logic states for each cycle of the input wave. These logic states are: HI to LO to HI to LO to HI.

Besides condition (A) described above, four more particular conditions are possible: (B) VLL=0. In condition (B), when the lower level is zero (VLL electrode is grounded), situations 1 and 5 above are not possible. Therefore, VOUT has only three alternating logic states per cycle, namely, LO to HI to LO. (C) VUL=VMAX. In condition (C), when the upper level voltage equals the maximum voltage, situation 3 above cannot occur. Therefore, VOUT has three alternating logic states per cycle, namely, HI to LO to LO to HI, which equals HI to LO to HI. (D) VLL>VUL (including VLL=VMAX and VUL=0). In condition (D), when the lower level electrode voltage value is greater than the upper level electrode voltage value, no window is possible and situations 2 and 4 are not possible. Therefore, VOUT has only one output state for the entire logic cycle: namely, HI. (E) VLL=VUL (or VLL=0 and VUL=VMAX). In condition (E), when the lower level voltage is equal to the upper level voltage, the window encompasses zero to VMAX. Therefore, situations 1, 3, and 5 above are not possible, and VOUT has only one output state for the entire logic cycle: namely, LO.

Based on these principles of operation of a window comparator and outputting to the Current Separator 1012 (as an electronic switch or a current separator circuit), the two logic states, HI and LO, will be converted to a switched "ON" or switched "OFF" command to the Power Controller 1011. The structure of the Power Controller 1011 determines the way in which the Current Separator 1012 converts the logic state (HI or LO) from the Voltage Threshold Controller 1014, to a form of voltage and/or current required by the components of the Power Controller 1011 to act as an electronic switch. The condition of this switch may be ON when the logic state is HI, and OFF when the logic state is LO, or vice versa based on the switch's internal structure.

If the voltage threshold controller 1014 contains a window comparator, Condition a as stated above can be summarized as follows: VOUT will have five alternating logic states for each cycle of the input wave, these being LO to HI to LO to HI to LO. Also, all the other particular situations will be in the opposite phase with respect to the parallel window comparators voltage against time output graphs.

As embodied herein, the Benistor, as a controllable electron valve, is able to control separately or simultaneously the output voltage (OFF/ON mode), the output maximum voltage (ON/OFF mode), and the output current (linear mode). Considering the OFF/ON electrode 1007, the upper level input, the ON/OFF electrode 1008, and the lower level input of a window comparator, nine variations of these operational modes are possible:

1. LINEAR mode (see FIG. 40A);
2. OFF/ON mode (see FIG. 40B);
3. ON/OFF mode (see FIG. 40C);
4. OFF/ON and ON/OFF operating simultaneously, with OFF being predominant (see FIG. 40D);
5. ON/OFF and OFF/ON operating simultaneously, with ON being predominant (see FIG. 40E);
6. OFF/ON and Linear (see FIG. 40F);
7. ON/OFF and Linear (see FIG. 40G);
8. OFF/ON and ON/OFF and Linear, with OFF being predominant (see FIG. 40H);
9. ON/OFF and OFF/ON and Linear, with ON being predominant (see FIG. 40I).

Using two or more window comparators connected in parallel or in series, it is possible to cut a power pulse wave into the same number of distinct parts as the number of the window comparators used. The number of distinct parts created inside of a power pulse wave can also be increased by using variable, rather than fixed reference voltages, input at the control electrodes of the Benistor 1010.

Based on the four functional blocks 1011, 1012, 1013, 1014 of the schematic diagram of FIG. 38 and combining the basic eight electrodes, infinite embodiments of the Benistor exist. Sometimes, two of the four functional blocks may be overlapped, by including in the schematic diagram of a particular embodiment a part that is able to provide the function of more than one block. While an exhaustive view of the controllable electron valve of the present invention is not possible, for a better view of the controllable electron valve described above, a number of embodiments will be described below in order to illustrate, only generically, the possibilities of the Benistor 1010 of the present invention.

FIGS. 39A to 39F illustrate electronic symbols for six variations of the Benistor. FIG. 39A shows the "Classic"

Benistor having eight electrodes: a voltage input "VIN" electrode 1001, a voltage output "VOUT" electrode 1002, a common "CE" electrode 1003, an inverting current control, "cc" 1004, a non-inverting current control electrode, "cc" 1005, a switch selector control electrode "SS" 1006, an effective voltage self-switching control electrode "OFF/ON" 1007, and a maximum voltage self-switching control electrode "ON/OFF" 1008. The figures suggest that the Benistor controls simultaneously and/or separately the output current or voltage, and the position of the various electrodes denominate the function of each of them. In other words, in a schematic diagram, the Benistor's symbol and the position of the electrodes will illustrate, alone, the particular function of each electrode.

FIG. 39B illustrates an "Inverting Classic" Benistor, which does not have the non-inverting current control input electrode, "cc" 1005.

FIG. 39C shows a "Double OFF/ON" Benistor's symbol, having one more "OFF/ON" (1009) electrode that replaces the "SS" electrode 1006.

FIG. 39D illustrates a "Positive OFF/ON" Benistor. This embodiment may comprise only the "OFF/ON" electrode 1007 for voltage control. An arrow placed on the "VIN" electrode 1001 symbolizes that only a positive current is accepted as a power input.

FIG. 39E illustrates a "Negative ON/OFF" Benistor. This embodiment comprises only the "ON/OFF" electrode 1008 for voltage control. An arrow placed on the "VIN" electrode 1001 symbolizes that only a negative current is accepted as a power input.

FIG. 39F illustrates a "Linear" Benistor. This embodiment comprises only the "cc" electrode 1004. The fact that no arrow is placed on the "VIN" electrode 1001 symbolizes that any current, positive or negative, is accepted as a power input. The voltage-in electrode 1001, "VIN", inputs the entire power (voltage and current) from a variable (pulse) power source. Also the voltage and current input at VIN electrode 1001 provides momentary values used for internal comparisons and/or switching operations. This electrode is exposed to the largest variation of voltage and current, up to the limits of the component, and must be internally protected from a reverse current.

In the Classic Benistor configuration of FIG. 39A, the voltage out electrode 1002, "VOUT", delivers to a load a percent or the entire power input at the VIN electrode 1001. The output current of VOUT 1002 is indirectly proportional to the voltage value input at the current control "cc" electrode 1004; the output effective voltage value of VOUT 1002 is indirectly proportional to the voltage value input at the "OFF/ON" electrode 1007; and the maximum voltage value of VOUT 1002 is the same as the voltage value input at the "ON/OFF" electrode 1008. The VOUT electrode 1002 is exposed to almost the same variations of voltage and current as the "VIN" electrode 1001 and must be protected from a reverse current.

The common electrode 1003, "CE", delivers to ground the cumulative value of all small internal control currents and represents the "zero reference" for the voltage value of the reference sources inputting to the three control electrodes. When CE 1003 is not connected to ground it can become a control electrode itself, used as a non-zero reference. In that situation CE 1003 is exposed to large variations of voltage and must be externally protected from a reverse current.

The effective voltage control electrode 1007, "OFF/ON", by inputting a fixed or variable voltage, controls the effective voltage value output at the VOUT electrode 1002 without affecting the maximum voltage value of the power wave input at the VIN electrode 1001. The impedance of the voltage control electrode 1007 must be large enough to create a negligible input current; it must admit internally at least the same variations of voltage admitted by the VIN 1001 electrode; and it must be internally protected from a reverse current. When the momentary voltage value at the VIN electrode 1001 is less than the reference voltage at the OFF/ON electrode 1007, there will be no voltage output at the VOUT electrode 1002, and when the momentary voltage value at the VIN electrode 1001 is greater than the reference voltage at the OFF/ON electrode 1007, a predetermined effective voltage will be output at the VOUT electrode 1002.

The "ON/OFF" electrode 1008, by inputting a voltage value, limits the maximum voltage value at the VOUT electrode 1002 to the same reference voltage input at the ON/OFF electrode 1008. The impedance of the ON/OFF electrode 1008 must be large enough to provide for negligible input current; it must admit internally at least the same variations of voltage admitted by the VIN electrode 1001; and it must be internally protected from a reverse current. When the momentary voltage at the VIN electrode 1001 is less than the reference voltage at the ON/OFF electrode 1008, a predetermined voltage will be output at the VOUT electrode 1002, and when the momentary voltage value at the VIN electrode 1001 is greater than the reference voltage at the ON/OFF electrode 1005, there will be no voltage output at the VOUT electrode 1002.

The inverting current control electrode 1004, "cc", by inputting a fixed or variable voltage, controls the output (load) current. Inputting a linearly increasing voltage at the cc electrode 1004 between zero and a pre-established voltage (less than 1 volt) will linearly decrease the output current from a pre-established maximum value to zero, and the output current will remain at zero, despite further increases of voltage at the cc electrode 1004. The cc electrode 1004 has a large impedance and internally admits at least the same variations as the VIN electrode 1001. (The current is negligible.) The cc electrode 1004 must be internally protected from a reverse current.

The non-inverting current control electrode 1005, "cc", by inputting a fixed or variable voltage, controls the output (load) current. Inputting a linearly increasing voltage at the cc electrode 1005 between zero and a pre-established voltage (less than 1 volt) will linearly increase the output current from zero to a pre-established maximum value, and the output current will remain at maximum value despite further increases of voltage at the cc electrode 1005. The cc electrode 1005 has a large impedance and internally admits at least the same variation of voltage as the VIN electrode 1001. (The current is negligible.) The cc electrode 1005 must also be protected from a reverse current.

The switch selector electrode 1006, "SS", determines the work time/cycle of the Benistor—respectively, the number of "ON" times against the number of "OFF" times when the Benistor is acting in the self-switching mode of operation—during a power pulse cycle. The SS electrode 1006 has only two positions: (1) "in air" (not connected to ground) or (2) grounded (connected to ground). Depending on which position is chosen, the work time/cycle will be predominantly "ON" or predominantly "OFF."

As previously discussed, additional details regarding the Benistor device may be obtained from U.S. Pat. No. 5,598,093, which is herein incorporated by reference. The description now reverts to the discussion of Embodiments 18-37 above.

17. Seven Interactive System Dimmable LED Retrofit Apparatus

One embodiment of an LED retrofit apparatus comprises a seven interactive systems (SIS) dimmable light emitting diode (LED) lamp retrofit (1), (11), (21), (41) apparatus supplied from an electrical power source according to FIGS. 1-7. The SIS dimmable LED lamp retrofit apparatus comprises a housing (2), (12), (22), (42) system, an LED (6), (16), (26), (44) lighting system, a dimmable LED panel (5), (15), (25) system, a lens/diffuser shield (4), (14), (24), (43) system, an LED driver (7), (17), (27), (45) system, a supply adaptor (3), (13), (23), (46), and in/out electrical wiring circuitry system.

The housing (2), (12), (22), (42) system is adapted to receive a fitting with a shape that corresponds to at least one a balloon as according to FIG. 1, a tube as according to FIG. 3, a cone as according to FIG. 4, or a prism, wherein the housing (2), (12), (22), (42) provides operative mechanical support and protection to the internal interactive systems of the apparatus.

The LED (6), (16), (26), (44) lighting system comprises a plurality of LEDs (6), (16), (26), (44) that convert electrical energy absorbed by the apparatus from the electrical power source. In some embodiments, the LEDs (6), (16), (26), (44) emit light of at least one spectrum of a warm white, cold white, infra-red, red, green, blue, violet, ultraviolet or yellow light spectrum, the light spectrum and allow for the use of protection filters.

The dimmable LED panel (5), (15), (25) system comprises one or more printed circuit boards operatively connected in at least one of a two dimensional arrangement as according to FIG. 1 or 2, or a three dimensional arrangement as according to FIG. 1. In some embodiments, the dimmable LED panel (5), (15), (25) system is adapted to provide mechanical support to the plurality of LEDs (6), (16), (26), (44), allow the plurality of LEDs (6), (16), (26), (44) to generate light monodirectionally at an angle not to exceed 180 degrees, allow the plurality of LEDs to generate light omni-directionally, and operatively connect the plurality of LEDs in an optimized arrangement. The optimized arrangement can be at least one of a series stripe configuration or a parallel stripe configuration as according to FIG. 5, wherein the stripes are positioned at an equal distance between themselves and equal distance on horizontal and vertical axes with respect to the edges of the dimmable LED panel's (5), (15), (25) surface, such that the light generated by the LED stripes are equally distributed on the dimmable LED panel's (5), (15), (25) surface even when one or more of the plurality of LEDs (6), (16), (26), (44) generate less or no light as the electrical power source's voltage is lowered via a dimmer.

The lens/diffuser shield (4), (14), (24), (43) system comprises at least one of a transparent lens system arrangement or a translucent lens system arrangement according to FIG. 1 or 3, the lens/diffuser shield (4), (14), (24), (43) following a similar shape as the dimmable LED panel system. The lens/diffuser shield (4), (14), (24), (43) distributes uniformly light from the plurality of LEDs (6), (16), (26), (44) to the outside of the apparatus in at least one of an omni-directional or a focused direction of 120 degrees lighting spot.

The LED driver (7), (17), (27), (45) system comprises at least one of an optimized size/cost boost, buck, buck-boost, isolated or non-isolated flyback, Direct AC, sequential, monolithic, single stage, double stage or pseudo double stage converter circuits, for driving the plurality of LEDs (6), (16), (26), (44).

The supply adaptor (3), (13), (23), (46), system comprises at least one of a small Edison screw, a medium Edison screw, a large Edison screw, a standard four terminals (Philips) supply adaptor, or a standard supply adaptor such that the LED retrofit (1), (11), (21), (41) is capable of operatively replacing at least one of a conventional incandescent, fluorescent, halogen and sodium lamp.

The in/out electrical wiring circuitry system comprises driver supply wires circuitry (8), (18), (28) and LED supply wires circuitry (9), (19), (29) for operatively connecting the LED driver (7), (17), (27), (45) system to the dimmable LED panel (5), (15), (25) system and to the supply adaptor (3), (13), (23), (46) system.

In some embodiments, the one or more printed circuit boards of the dimmable LED panel (5), (15), (25) system are made of at least one of aluminum, copper or silver metallic material covered with an isolating oxide layer to allow and enhance heat transfer from the plurality of LEDs (6), (16), (26), (44).

In some embodiments, the in-out wiring circuitry system includes at least one sensing sub-circuit, wherein the sensing sub-circuit senses temperature, carbon dioxide, X ray, motion surveillance, proximity, day light and/or environmental light. The sensing sub-circuit can thereby optimize the efficiency, efficacy, versatility and safety features of the LED lamp (1), (11), (21), (41) retrofit apparatus.

In some embodiments, the in-out wiring circuitry system comprises a smart two wires in/out wiring system operatively connected to only two wires of a standard fluorescent conventional lamp AC supply fixture, as in FIG. 3. The two wires in/out wiring system eliminates the hazardous starter device existing in the standard fluorescent from the apparatus' supply circuit.

In some embodiments, the LED driver system is a small size single stage near unity power factor boost converter as in FIG. 9. The LED driver system of this embodiment includes an AC-to-DC converter sub-circuit; a load; a load current sense resistor (360); a boost converter sub-circuit; a low cost eight terminal pulse width modulation controller integrated circuit (PWMic) (120); a low voltage supply circuit; a gate resistor (121); a two resistors (128), (129) divider feedback sub-circuit; a soft start over voltage control (SSOVC) sub-circuit (140); a second compensation capacitor (130); a timing resistor (Rt) (123) timing capacitor (Ct) (124) oscillating sub-circuit; a reference voltage filtering capacitor (122); and a voltage ramp buffer (VRB) sub-circuit.

The AC-to-DC converter sub-circuit comprises an electromagnetic interference EMI filter (52), a bridge rectifier (53) and a low value filtering capacitor (54) operatively connected to an alternating current (AC) power source. The bridge rectifier (53) comprises a negative output terminal connected to a ground (GND) (55) terminal and a positive output terminal coupled to a V+ terminal for providing an unfiltered and unregulated direct current (DC) supply voltage.

The load comprises the plurality of LEDs (310), (311), (312) and converts into light electrical energy absorbed from the power source. The load further comprises a positive end and a negative end/fourth terminal Iled (304).

The load current sense resistor (360) is operatively connected between the load's negative end/fourth terminal Iled (304) and the GND (55).

The boost converter sub-circuit includes boost coil (110), a boost diode (111), a boost MOSFET switch (112), and a boost capacitor, operatively coupled in a boost topology configuration for converting the unregulated DC supply voltage into a regulated DC supply voltage outputted across the boost capacitor;

The low cost eight terminal pulse width modulation controller integrated circuit (PWMic) (120) includes a feedback (FB) terminal, a compensation (Comp) terminal, a voltage reference (Vref) terminal, an oscillator (Osc) terminal, a current sense (Is) terminal, a voltage supply (Vcc) terminal, a ground (GND) terminal that is also connected to the ground (55) of the bridge rectifier, and a driving (Drv) terminal operatively coupled to the boost MOSFET's (112) gate-source circuit. The PWMic (120) secures a near unity power factor correction (PFC) for the PWMic circuit by the means of a constant frequency constant duty (CFCD) pulse width modulation (PWM) driving signal.

The low voltage supply circuit comprises a starting resistor (114), a rectifier/supply diode (115), and a supply capacitor (116) inductively coupled with the boost coil (110) via a low power secondary coil, wherein the supply circuit supplies the PWMic across its Vcc and GND terminals.

The gate resistor (121) is coupled between the gate of the MOSFET (112) switch and the Drv output of the controller IC (120) for keeping the PWMic (120) output current in a pre-established range.

The two resistors (128), (129) divider feedback sub-circuit is operatively coupled between the boost output and the FB terminal of the PWMic (120) for allowing voltage feedback sensing control.

The soft start over voltage control (SSOVC) (140) sub-circuit is operatively coupled between the FB and Comp terminals of the PWMic (120). The SSOVC (140) comprises a first compensation capacitor (141) having one terminal coupled to the FB terminal of the PWMic (120), a first SSOVC diode (142) having its anode coupled to the Comp terminal of the PWMic (120) and its cathode coupled to the other terminal of the first compensation capacitor (141), a second SSOVC diode (143) having its cathode coupled to the Comp terminal of the PWMic (120) and its anode coupled to the cathode of the first SSOVC diode (142). The SSOVC (140) secures a soft start, low over-shooting and smooth feedback into the output voltage control circuit's operation.

The second compensation capacitor (130) is coupled between the FB and Comp terminals of the PWMic (120) for compensating small ripples of the output voltage.

The timing resistor (Rt) (123) timing capacitor (Rc) (124) oscillating sub-circuit is operatively connected between the Vref terminal, the GND terminal and the Osc terminal of the PWMic (120) for setting the operation frequency.

The reference voltage filtering capacitor (122) stabilizes the voltage of the PWMic (120) Vref terminal.

The voltage ramp buffer (VRB) sub-circuit comprises a NPN transistor (125), a first divider resistor (126) and a second divider resistor (127). The NPN transistor's (125) collector terminal is coupled to the Vref terminal of the PWMic 120. The NPN transistor's (125) base terminal is coupled to the Osc terminal of the PWMic (120). The NPN transistor's (125) emitter terminal is coupled to the Is terminal of the PWMic 120 via the first divider resistor (126). the second divider resistor (127) is coupled to GND (55) via the load current sense resistor (360) and is for sensing the load's current and decreasing the boost converter regulated DC output voltage when the load's current is higher than a pre-established amount.

In some embodiments the LED driver system is a high reliability multi-column boost converter as in FIG. 9. The LED driver system of this embodiment comprises a multi-column LED circuit failure monitoring and feedback corrections system; a protection PNP transistor (431); a failure sensing LED panel (300); an LED column (312); a first silicon diode (325); and a second silicon diode (326).

The multi-column LED circuit's failures monitoring and feedback corrections system further comprises a protection zener diode (434), wherein the protection zener diode includes a cathode coupled to a Vd+ (302) terminal and an anode coupled to the Is terminal of the boost's PWMic 120 via a first protection resistor 433 for forcing the PWMic (120) to decrease the boost's output voltage when the voltage amount at the Vd+ (302) terminal is higher than the nominal voltage of the protection zener diode (434).

The protection PNP transistor (431) includes an emitter terminal coupled to the Vd+ (302) terminal and a base terminal coupled to a Vd– (303) terminal via a second protection resistor (432) for detecting the differential voltage between the Vd+ (302) and the Vd– (303) terminals caused by a damaged LED. The protection PNP transistor (431) further includes a collector terminal coupled to the anode of the protection zener diode (434) and the Is terminal of the PWMic (120) for decreasing the boost converter output voltage when the sensed differential voltage is higher than a pre-established amount.

The failure sensing LED panel (300) comprises at least two substantially identical LED lighting sub-circuits for converting electrical energy in light. Each LED lighting sub-circuit comprises an LED column (310), (311) having a positive end coupled to the boost's V+ output terminal and a negative end coupled to the boost's GND (55) terminal via a constant current sink sub-circuit and via the boost converter's load current sense resistor (360) for forcing the controller IC to decrease the boost converter's output voltage when the LEDs current is higher than a pre-established amount.

The first silicon diode (325) has its anode coupled to the negative end of the LED column (312) and its cathode coupled to the Vd+ (302) terminal for increasing the Vd+ voltage amount when at least one LED included in the LED column (312) suffers a "short circuit" kind of damage.

The second silicon diode (326) has its cathode coupled to the negative end of the LED column (312) and its anode coupled to the Vd– (303) terminal for decreasing the Vd– voltage amount when at least one LED included in the LED column (312) suffers an interrupted circuit damage.

In some embodiments the LED driver system comprises a double stage boost—primary sensing isolated flyback converter according to FIGS. 8, 9, and 10. This embodiment further comprises an isolated flyback sub-circuit; a flyback MOSFET (212) switch; a flyback output diode (212); a flyback output/filtering capacitor (290); a load; a snubber sub-circuit (220); low cost eight terminals pulse width modulation controller integrated circuit (PWMic) (120); a low voltage supply circuit; a gate resistor (121); a soft start over voltage control (SSOVC) sub-circuit (140); a second compensation capacitor; a timing resistor (Rt) (123) timing capacitor (Ct) (124) oscillating sub-circuit; a reference voltage filtering capacitor (122); a feedback voltage rectifier sub-circuit; a two feedback resistors divider sub-circuit; a current sense resistor (360; a current sense spike filter circuit (IsF) (240); and a voltage follower current feedback (VFCFB) sub-circuit (260).

The isolated flyback sub-circuit is operatively connected to the boost converter for providing load isolation and second stage conversion, outputting low voltage and high current suitable to nonlinear loads such as high power LEDs. The isolated flyback sub-circuit comprises an isolated flyback transformer (210) sub-circuit for providing isolated supply to the controller sub-circuit versus the LED sub-circuit. The isolated transformer (210) sub-circuit comprises a primary coil, a voltage sensing secondary coil, and an output power secondary coil.

The flyback MOSFET (212) switch serves to charge periodically the primary coil with electrical energy outputted by the boost converter.

The flyback output diode (211) protects the flyback MOSFET (212) against reverse current.

The a flyback output/filtering capacitor (290) is operatively coupled across the flyback output power secondary coil via the flyback output diode (211) for storing the electrical energy provided by the power secondary coil.

The load consists of the plurality LEDs, where the LEDs are coupled in series and/or parallel stripe configurations. The load is operatively coupled across the flyback output/filtering capacitor (290) including a circuit that is isolated from the rest of the circuit.

The snubber sub-circuit (220) comprises a high voltage zener diode (221) coupled in series with a reverse voltage protection/rectifier diode (222) operatively connected across the flyback primary coil for protecting the MOSFET (212) switch by clamping the coil's auto-induction high voltage.

The low cost eight terminals pulse width modulation controller integrated circuit (PWMic) (120) comprises a feedback (FB) terminal, a compensation (Comp) terminal, a voltage reference (Vref) terminal, an oscillator (Osc) terminal, a current sense (Is) terminal, a voltage supply (Vcc) terminal, a ground (GND) terminal and a driving (Drv) terminal coupled operatively to the boost MOSFET's (212) gate-source circuit, for controlling the MOSFET (212) gate by the means of a constant frequency constant duty (CFCD) square wave signal and for securing a near unity power factor for the entire circuit.

The low voltage supply circuit comprises a starting resistor (114), a rectifier/supply diode (115) and a supply capacitor (116) operatively coupled with the boost coil (110) via a low power secondary coil for supplying the PWMic (120) across its Vcc and GND terminals.

The gate resistor (321) is coupled between the gate of the MOSFET (212) switch and the Drv output of the controller IC (120) for keeping the PWMic (120) output current in a safe range.

The soft start over voltage control (SSOVC) sub-circuit (140) is operatively coupled between the FB and Comp terminals of the PWMic (102). The SSOVC (140) comprises a first compensation capacitor (141) connected in series with two silicon diodes (142), (143) coupled anti-parallel for securing a soft start, low over-shooting and smooth feedback in the output voltage control operation.

The second compensation capacitor (130) is coupled between the FB and Comp terminals of the PWMic (120) for compensating small ripples of the output voltage.

The timing resistor (Rt) (123) timing capacitor (Ct) (124) oscillating sub-circuit is operatively connected between the Vref, GND and Osc terminals of the PWMic (120) for setting the operation frequency.

The reference voltage filtering capacitor (122) stabilizes the voltage outputted by the Vref terminal of the PWMic (120).

The feedback voltage rectifier sub-circuit comprises a rectifier/flyback diode (211) and a feedback voltage filtering capacitor (290) operatively coupled to the voltage sensing secondary coil of the flyback transformer (210). The feedback voltage rectifier sub-circuit provides a pre-established feedback voltage across the feedback voltage filtering capacitor (210), directly proportional with the output DC voltage (VDCo) delivered to the plurality of LEDs.

The two feedback resistors (128), (129) divider sub-circuit is operatively coupled across the voltage feedback filtering capacitor (290) for delivering a fraction of the voltage to the FB terminal of the controller IC (120) and for controlling, in feedback, the driver's output DC voltage (VDCo).

The current sense resistor (232) is operatively coupled to the MOSFET's (212) source circuit for providing a voltage signal proportional to the momentary value of the MOSFET (212) switch drain source current.

The current sense spike filter circuit (IsF) (240) comprises a resistor (241) and a capacitor (242) operatively connected between the current sense resistor (231) and the Is terminal of the controller IC (120) for limiting the MOSFET (212) switch maximum current.

The voltage follower current feedback (VFCFB) (260) sub-circuit comprises a two resistors (262), (263) divider operatively coupled between the Vref and GND terminals of the controller IC (120) for providing a minimum safe voltage threshold The VFCFB (260) further comprises a feedback zener diode (264) operatively coupled between the middle connection of the two divider resistors (262), (263) and the hot terminal of the feedback voltage capacitor (252) for increasing the safe voltage threshold only if the feedback voltage increases. The VFCFB (260) further comprises a PNP transistor (261) coupled with the base to the middle connection of the two divider resistors (262), (263), the collector to the GND (55) terminal, and emitter to the Comp terminal of the controller IC (120) for keeping the Comp terminal voltage, and implicitly the driver's output voltage, at low level until the feedback zener diode (264) increases the safe voltage thresholds proportionally with the increasing amount of the of the feedback voltage confirming that no damage and no dangerous additional current occurred in the flyback's load (LEDs) circuit.

In some embodiments the LED driver system is a pseudo double stage LED driver system according to FIGS. 9 and 14-17. This embodiment comprises one of an isolated flyback (FIG. 14), a non-isolated flyback (FIG. 15), a buck, or a buck-boost second stage converter besides the boost first stage converter, wherein the first stage and the second stage converters are driven, simultaneously, by a single low cost pulse width modulation (PWM) controller IC (120) outputting a constant frequency constant duty (CFCD) square wave driving signal for securing a high power factor and for reducing the parts count size and cost of the apparatus.

In some embodiments the LED driver system comprises a single floating ground buck-boost converter according to FIG. 13. In this embodiment the LED driver system comprises an AC-to-DC converter sub-circuit, a floating (suspended) ground (GND) terminal (55), a buck-boost coil (510), a buck-boost MOSFET switch (512), a first buck-boost diode (511), a first buck-boost capacitor (514), a second buck-boost diode (516), a second buck-boost capacitor (515), an eight terminals low cost pulse width modulation controller integrated circuit (PWMic) (120), a two feedback resistors (128), (129) divider sub-circuit, a soft start over voltage control (SSOVC) sub-circuit (140), a second compensation capacitor (130), a timing resistor (Rt) (123) timing capacitor (Ct) (124) oscillating sub-circuit, a reference voltage filtering capacitor (122), a voltage ramp buffer sub-circuit, a load, and an operational amplifier.

The AC-to-DC converter sub-circuit comprises a bridge rectifier (53) having its input operatively connected to an alternating current (AC) power source (51) via an electromagnetic interference (EMI) filter (52) and its output operatively connected to a low value capacitor (54), for providing an unregulated direct voltage (DC) output.

The floating (suspended) ground (GND) (55) terminal is coupled to the negative output of the bridge rectifier (53) via a large value starting resistor (114) for creating a separate zero voltage reference terminal of the buck-boost driver system and for eliminating an opto-coupled sub-circuit from the feedback control circuit.

The buck-boost coil (510) is operatively coupled to the positive output of the bridge rectifier (53) for storing and delivering periodically electrical energy absorbed from the AC power source (51) via the AC/DC converter sub-circuit.

The buck-boost MOSFET switch (512) has its drain operatively coupled to the buck-boost coil (510), its source coupled to the negative output of the bridge rectifier (53) and its gate-source circuit is operatively coupled to an isolated driver transformer (Tdrv) (521) secondary coil, wherein Tdry (521) comprises a primary coil and a secondary coil, for charging periodically the buck-boost coil without including the floating GND terminal in its charging circuit.

The first buck-boost diode (511) is operatively coupled to the buck-boost coil 510) for protecting the sub-circuit against reverse currents during the charging time period.

The first buck-boost capacitor (514) is connected between the cathode of the first buck-boost diode (511) and the positive output of the bridge rectifier (53) for absorbing and storing the electrical energy delivered by the buck-boost coil (510) via the first buck-boost diode (511).

The second buck-boost diode (516) is coupled with its cathode to the positive output of the bridge rectifier (53) and its anode to the floating GND (55) for allowing a discharge current of the first buck-boost capacitor (514) via the floating ground (GND) (55) terminal.

The second buck-boost capacitor (515) is connected between the cathode of the first buck-boost diode (511) and the floating GND (55) terminal for absorbing the electrical energy stored in the first buck-boost capacitor (514) via the second buck-boost diode (516) and for providing to the entire system a regulated DC supply voltage output with respect to the floating GND (55) terminal.

The eight terminals low cost pulse width modulation controller integrated circuit (PWMic) (120) comprises a feedback (FB) terminal, a compensation (Comp) terminal, a voltage reference (Vref) terminal, an oscillator (Osc) terminal, a current sense (Is) terminal, a voltage supply (Vcc) terminal together with a ground (GND) supply terminal coupled operatively across the second buck boost capacitor (515), and a driving (Drv) terminal coupled to MOSFET switch (512) gate via a driving capacitor (522) operatively connected to a secondary coil of the isolated driver transformer (Tdrv) (521), for controlling the MOSFET (512) gate by the means of a constant frequency constant duty (CFCD) square wave signal which secures a near unity power factor.

The two feedback resistors (128, 129) divider sub-circuit is operatively coupled across the second buck-boost capacitor (515) for providing a negative feedback voltage signal at the FB terminal of the PWMic (120) and for allowing operative control of the maximum output voltage across the second buck-boost capacitor (515).

The soft start over voltage control (SSOVC) sub-circuit (140) is operatively coupled between the FB and Comp terminals of the PWMic 120, and comprises a first compensation capacitor connected in series with two silicon diodes coupled anti-parallel for securing a soft start, low over-shooting and smooth feedback in the output voltage control operation;

The second compensation capacitor (130) is coupled between the FB and Comp terminals of the controller IC (120) for compensating ripples of the boost output voltage.

The timing resistor (Rt) (123) timing capacitor (Ct) (124) oscillating sub-circuit is operatively connected between the Vref, GND and Osc terminals of the PWMic (120) for setting the operation frequency.

The reference voltage filtering (122) capacitor for stabilizing the voltage outputted by the Vref terminal of the PWMic (120).

The voltage ramp buffer sub-circuit comprises a NPN transistor 125 and two resistors (126), (127) divider operatively coupled between the Vref, Is and GND terminals of the controller IC (120), for limiting the maximum duty cycle of the CFCD square wave control signal.

The load includes the plurality of LEDs coupled in series and/or parallel arrangements and operatively connected across the second buck-boost capacitor (515) via a current sense resistor (360) coupled to the negative end of the LEDs columns (310) for converting in light the electrical energy stored in the second buck-boost capacitor (515) under a direct controlled constant current constant voltage mode of operation.

The operational amplifier (412) is operatively coupled between the LEDs load sense resistor (360) and the Comp terminal of the PWM controller IC (120) for directly controlling the LEDs current.

In some embodiments the LED driver system comprises a power factor corrected single stage non isolated flyback converter according to FIG. 11. In this embodiment, the system LED driver system comprises an AC-to-DC converter sub-circuit, a non-isolated flyback transformer sub-circuit, a flyback output diode (211), a flyback output/filtering capacitor (290), a load, a snubber sub-circuit (140), a low cost eight terminals pulse width modulation controller integrated circuit (PWMic) (120), a low voltage supply circuit, a gate resistor (231), a soft start over voltage control (SSOVC) sub-circuit (140), a second compensation capacitor (130), a timing resistor (Rt) (123) timing capacitor (Ct) (124) oscillating sub-circuit, a reference voltage filtering capacitor (122), a voltage ramp buffer sub-circuit, a feedback voltage rectifier sub-circuit, a two feedback resistors divider sub-circuit, a load current sense resistor (360), and a current signal error amplifier sub-circuit.

The AC-to-DC converter sub-circuit comprising a bridge rectifier (53) having its input operatively connected to an alternating current (AC) power source (51) via an electromagnetic interference (EMI) filter (52) and its output operatively connected to a low value capacitor (54), for providing an unfiltered and unregulated direct current (DC) voltage output. The bridge rectifier (53) has its positive output terminal coupled to the DC voltage output and its negative output terminal coupled to a ground (55).

The non-isolated flyback transformer sub-circuit provides supply to a controller sub-circuit and to a LEDs sub-circuit. The non-isolated transformer sub-circuit comprises a primary coil, a voltage sensing secondary coil; an output power secondary coil, and a flyback MOSFET switch (212). the non-isolated flyback transformer sub-circuit charges periodically the primary coil with electrical energy absorbed from the unregulated DC voltage outputted by the AC-to-DC converter sub-circuit.

The flyback output diode (211) provides a regulated DC Voltage output.

The flyback output/filtering capacitor (290) is operatively coupled across the flyback output power secondary coil and the ground (55) of the bridge rectifier (53) via the flyback output diode (211) for storing the electrical energy provided by the secondary coil.

The load consists of the plurality of LEDs coupled in series and/or parallel stripes configuration operatively coupled across the flyback output/filtering capacitor (290). The load converts into light the electrical energy stored in the flyback output/filtering capacitor (290).

The snubber sub-circuit (140) is operatively connected across the flyback primary coil for protecting the MOSFET switch (212) by clamping the coil's auto-induction high voltage.

The low cost eight terminals pulse width modulation controller integrated circuit (PWMic) (120) comprises a feedback (FB) terminal, a compensation (Comp) terminal, a voltage reference (Vref) terminal, an oscillator (Osc) terminal, a current sense (Is) terminal, a voltage supply (Vcc) terminal, a ground (GND) terminal, and a driving (Drv) terminal coupled operatively to the boost MOSFET's (212) gate-source circuit. The PWMic controls the MOSFET (212) gate for securing the power factor correction (PFC) of entire circuit by the means of a constant frequency constant duty (CFCD) pulse width modulation (PWM) driving signal.

The low voltage supply circuit comprises a starting resistor (114), a rectifier diode (115) and a supply capacitor (116) operatively coupled with the voltage sensing secondary coil and the ground (55) of the bridge rectifier (53) for supplying the PWMic (120) across its Vcc and GND terminals.

The gate resistor (231) is coupled between the gate of the MOSFET switch (212) and the Dry output of the controller. IC (120) for keeping the PWMic (120) output current in a safe range.

The soft start over voltage control (SSOVC) sub-circuit (140) is operatively coupled between the FB and Comp terminals of the PWMic (120), and comprises a first compensation capacitor connected in series with two silicon diodes coupled anti-parallel for securing a soft start, low over-shooting and smooth feedback in the output voltage control operation.

The second compensation capacitor (130) is coupled between the FB and Comp terminals of the PWMic (120) for compensating small ripples of the output voltage.

The timing resistor (Rt) (123) timing capacitor (Ct) (124) oscillating sub-circuit operatively connected between the Vref, GND and Osc terminals of the PWMIC (120) for setting the operation frequency.

The reference voltage filtering capacitor (122) stabilizes the voltage outputted by the Vref terminal of the PWMic (120).

The voltage ramp buffer sub-circuit comprises a NPN transistor (125) and a two resistor (126), (127) divider operatively connected between the Osc and the Is terminals of the PWMic (120) for limiting the maximum duty cycle of the PWMic (120) driving signal.

The feedback voltage rectifier sub-circuit comprising a rectifier diode (115) and a feedback voltage filtering capacitor (116) operatively coupled to the voltage sensing secondary coil of the flyback transformer (210) for providing a pre-established feedback voltage across the feedback voltage capacitor, directly proportional with the output DC voltage (VDCo) delivered to LEDs.

The two feedback resistors (128), (129) divider sub-circuit is operatively coupled across the voltage feedback filtering capacitor (116) for delivering a fraction of the voltage to the FB terminal of the controller IC (120) and for controlling, in feedback, the driver's output DC voltage (VDCo).

The load current sense resistor (360) is operatively coupled between the load and the ground (55).

The current signal error amplifier sub-circuit comprises an operational amplifier (412) and two resistors (141), (142) sub-circuit operatively coupled between the load current sense resistor (360) and the Comp terminal of the PWMic (120) for closing the current feedback loop of the entire driver system.

In some embodiments, the LED driver system is a low cost constant off time buck converter according to FIG. 12. In this embodiment, the LED driver system comprises an AC-to-DC converter sub-circuit, a valley fill filter sub-circuit (20), a high voltage buck converter sub-circuit, a load, a low cost eight terminals pulse width modulation controller integrated circuit (PWMic) (120), a low voltage supply circuit, a gate resistor (531), a differential voltage sensing sub-circuit (520), a soft start over voltage control (SSOVC) sub-circuit (140), a second compensation capacitor (130), a timing resistor (Rt) (123) timing capacitor (Ct) (124) oscillating sub-circuit, a voltage reference filtering capacitor (122), a constant off time switch (COTsw) sub-circuit (540), and a current sense spike filter circuit (IsF) (240).

The AC-to-DC converter sub-circuit comprising a bridge rectifier (53) having its input operatively connected to an alternating current (AC) power source (51) via an electromagnetic interference (EMI) filter (52) and its output operatively connected to a low value capacitor (54), for providing an unregulated direct voltage (DC) output.

The valley fill filter sub-circuit (20) comprises three diodes (23), (24), (25) and two capacitors (21), (22) operatively connected across the output of the bridge rectifier (53) for filtering the unregulated DC output voltage without significantly decrease the driver circuit's power factor coefficient.

The high voltage buck converter sub-circuit comprises a buck coil (510), a buck diode (116), a buck MOSFET switch (512) and a buck filtering capacitor (514) coupled operatively in a buck topology configuration for converting the inputted unregulated DC voltage in a regulated DC voltage across the buck filtering capacitor (514).

The load comprises the plurality of LED stripes operatively coupled across the buck output filtering capacitor (514) for converting in light the electrical energy outputted by the buck driver.

The low cost eight terminals pulse width modulation controller integrated circuit (PWMic) (120) comprises a feedback (FB) terminal, a compensation (Comp) terminal, a voltage reference (Vref) terminal, an oscillator (Osc) terminal, a current sense (Is) terminal, a voltage supply (Vcc) terminal, a ground (GND) (55) terminal, which is also the ground of the entire circuit, and a driving (Drv) terminal coupled operatively to the boost MOSFET's (512) gate-source circuit, for controlling the MOSFET (512) gate by the means of a constant off time (COT) square wave signal and for securing a constant load current despite large variations of the AC supply (51) voltage.

The low voltage supply circuit comprises a starting resistor (114), a rectifier diode (116) and a supply capacitor (115) operatively coupled with the boost coil (510) via a low power secondary coil for supplying the PWMic (120) across its Vcc and GND terminals, The gate resistor (531) is coupled between the gate of the MOSFET switch (512) and the Dry output of the controller IC (120) for keeping the PWMic (120) output current in a safe range.

The differential voltage sensing sub-circuit (520) comprising a PNP transistor (521) having its emitter coupled directly to the positive end of the LEDs stripe, its collector operatively connected to the FB terminal of the PWMic (120) via a feedback resistors (128), (129) divider and its base operatively coupled via a resistor (523) to the positive end of the LEDs stripe and via a zener diode (522) to the negative end of the one or more LEDs stripes for sensing the voltage across the plurality of LEDs and for lowering or shutting down the buck driver's outputted voltage when it exceeds a pre-established limit amount.

The soft start over voltage control (SSOVC) sub-circuit (140) operatively coupled between the FB and Comp terminals of the PWMic (120), and comprises a first compensation capacitor connected in series with two silicon diodes coupled anti-parallel for securing a soft start, low over-shooting and smooth feedback in the output voltage control operation.

The second compensation capacitor (130) is coupled between the FB and Comp terminals of the PWMic (120) for compensating small ripples of the output voltage.

The timing resistor (Rt) (123) timing capacitor (Ct) (124) oscillating sub-circuit is operatively connected between the Vref, GND and Osc terminals of the PWMic (120) for setting the operation frequency.

The voltage reference filtering capacitor (122) stabilizes the voltage outputted by the Vref terminal of the PWM integrated circuit (120);

The constant off time switch (COTsw) sub-circuit (540) comprises a NPN (541) operatively connected to the PWM integrated circuit (120), having its emitter coupled to the GND terminal, its collector coupled to the Osc terminal and its base coupled to the Dry terminal via a resistor (542) for forcing the PWM controller IC (120) to operate in a constant off time mode by discharging the voltage stored in the timing capacitor at the beginning of each oscillating cycle.

The current sense spike filter circuit (IsF) (240) comprising a resistor and a capacitor operatively connected between the a current sense resistor coupled in the source circuit of the buck MOSFET switch and the Is terminal of the controller IC for limiting the MOSFET switch peak current.

In some embodiments the LED driver system comprises at least one of a Direct AC driver or a sequential LED driver, and includes a plurality of benistors connected in a series circuit configuration, as according to FIGS. 18a, 20, 22a, and 26. In this embodiment, the LED driver system comprises a plurality of LED stripes/columns (721), (731), (741), (751), a sine wave AC voltage source (51), a bridge rectifier (BR) (53), a plurality current sense resistors (CSR) (722), (732), (742), (752), a first LED stripe/column (721), a second LED stripe (731), a third LED stripe (741), a fourth LED stripe (751), a plurality of benistors (601), (602), (603), (604), and a current feedback.

The plurality of LED stripes/columns (721), (731), (741), (751) convert electrical energy in light. Each one of the plurality of LED strings/columns (721), (731), (741), (751) includes a positive end and a negative end and each LED includes a lighting voltage threshold of about three volts.

The sine wave AC voltage source (51) has peak voltage higher in amount than the total number of the LEDs electrically connected series multiplied by 3V per LED, for providing operatively electrical energy to the LED driver system.

The bridge rectifier (BR) (53) has two AC inputs electrically connected to the AC voltage source (51), a negative output terminal electrically connected to a ground (GND) (55) and a positive output (V+). The bridge rectifier (53) provides an unfiltered rectified sine wave voltage supply signal.

The plurality current sense resistors (CSR) (722), (732), (742), (752) sense the plurality of LEDs current.

The first LED stripe (721) has its negative end electrically connected to GND (55) via a first CSR (722). The first LED stripe (721) is included in the plurality of LED stripes and the first CSR (722) is included in the plurality of CSRs, for safely, generating light during the period of time when V+ amount is lower than a first pre-established limit.

The second LED stripe (731) has its negative end operatively connected to GND (55) in an electrical series circuit including a second CSR (732) and the first LED stripe (721) together with its first CSR (722). The first (721) and second (731) LED stripes are included in the plurality of LED stripes and the first (722) and second (732) CSR are included in the plurality of CSRs, for safely generating light during the period of time when V+ amount is lower than a second pre-established limit.

The third LED stripe (741) has its negative end operatively connected to GND (55) in an electrical series circuit including a third CSR (742), the second LED stripe (731) together with its second CSR (732) and the first LED stripe (721) together with its first CSR (722). The first (721), second (731) and third (741) LED stripes are included in the plurality of LED stripes and the first (722), second (732) and third (742) CSR are included in the plurality of CSRs, for safely generating light during the period of time when V+ amount is lower than a third pre-established limit.

The fourth LED stripe (751) has its negative end operatively connected to GND (55) in an electrical series circuit including the plurality of LED strings and the plurality of CSRs, for safely generating light when V+ reaches its maximum value and its the peak amount is lower than a fourth pre-established limit.

The plurality of benistors includes a first benistor (601), a second benistor (602), a third benistor (603), and a fourth benistor (604).

The first benistor (601) comprises an anode (A) terminal, a cathode (K) terminal, a current control (Cc) terminal, a zero voltage reference (ZVR) terminal, a voltage sensing (Vs) terminal, a VTCon terminal, and a VTCoff terminal.

The anode (A) terminal of the first benistor (601) is electrically connected to V+ for absorbing electrical energy from the sine wave AC voltage source via the BR.

The cathode (K) terminal of the first benistor (601) is electrically connected to the positive end of the first LED string (721) for supplying the first LED string (721) in a constant current—constant voltage (CCCV) mode of operation.

The current control (Cc) terminal of the first benistor (601) is electrically connected to the negative end of the first LED string (721) and one terminal of the first CSR (722) for limiting the first benistor's (601) output current. The first benistor (601) operates as a constant current sink with respect to the first LED string (721) during the entire period of time necessary for V+ to reach a sufficiently high voltage amount equal to the total number of the LEDs included in the first (721) and second (731) LED strings multiplied by 3V per LED for the light to be smoothly switched from one lighting LED stripe to two lighting LED stripes, generating equal light intensity and for avoiding current spikes, or flickering.

The zero voltage reference (ZVR) terminal of the first benistor (601) is electrically connected to the other terminal of the first current sense resistor (722) and GND (55), for securing the first benistor's (601) operation.

The voltage sensing (Vs) terminal of the first benistor (601) is electrically connected to V+ for enabling first benistor's (601) self-switching mode of operation.

The a VTCon terminal of the first benistor (601) is electrically connected operatively to ZVD terminal of the first benistor (601) via an external ON reference voltage in an amount of 0V for the first benistor (601) to switch on its A-K junction immediately when V+ amount is above 0V.

The VTCoff terminal of the first benistor (601) is electrically connected operatively to ZVD terminal of the first benistor (601) via an external OFF reference voltage in an amount equal to the total number of the LEDs included in the first (721) and second (731) LED strings multiplied by 3V per LED for the first benistor (601) to switch off its A-K junction when V+ is sufficiently high to allow the first (721) and second (731) LED strings to generate equal intensity light, for avoiding switching noise or flickering and for protecting the first benistor (601) against unnecessary increase of internal heat dissipation.

The second benistor (602) comprises an anode (A) terminal, a cathode (K) terminal, a current control (Cc) terminal, a zero voltage reference (ZVR) terminal, a voltage sensing (Vs) terminal, a VTCon terminal, and a VTCoff terminal.

The anode (A) terminal of the second benistor (602) is electrically connected to V+ for absorbing electrical energy from the sine wave AC voltage source (51) via the BR (53).

The cathode (K) terminal of the second benistor (602) is electrically connected to the positive end of the second LED string (731) for supplying the second LED string (731) in a CCCV mode of operation.

The current control (Cc) terminal of the second benistor (602) is electrically connected to the negative end of the second LED string (731) and one terminal of the second CSR (732) for limiting second benistor's (731) output current. The second benistor (731) operates as a constant current sink with respect to the first (721) and second (731) LED strings during the period of time necessary for V+ to reach a sufficiently high voltage amount equal to the total number of the LEDs included in the first (721), second (731) and third (741) LED strings multiplied by 3V per LED for the light to be smoothly switched from two lighting LED stripes to three LED lighting stripes, generating equal light intensity and for avoiding current spikes or flickering.

The zero voltage reference (ZVR) terminal of the second benistor (602) is electrically connected to the other terminal of the second CSR (732) for securing a 0V floating reference to the second benistor (731) independent to GND (55).

The voltage sensing (Vs) terminal of the second benistor (602) is electrically connected to V+ for enabling the second benistor's (602) self-switching mode of operation.

The VTCon terminal of the second benistor (602) is electrically connected operatively to ZVD terminal of the second benistor (602) via an external ON reference voltage in an amount equal to the total number of the LEDs included in the first (721) and second (731) LED strings multiplied by 3V per LED for second benistor (602) to switch on its A-K junction at the same time when the first benistor (610) switches off its A-K junction, for avoiding switching noise or flickering.

The a VTCoff terminal of the second benistor (602) is electrically connected operatively to ZVD terminal of the second benistor (602) via an external OFF reference voltage in an amount equal to the total number of the LEDs included in the first (721), second (731) and third (741) LED strings multiplied by 3V per LED for the second benistor (602) to switch off its A-K junction when V+ is sufficiently high for the first (721), second (731) and third (741) LED strings to generate equal intensity light, for avoiding switching noise or flickering and for protecting the second benistor (602) against unnecessary increase of internal heat dissipation.

The a third benistor (603) comprises an anode (A) terminal, a cathode (K) terminal, a current control (Cc) terminal, a zero voltage reference (ZVR) terminal, a voltage sensing (Vs) terminal, a VTCon terminal, and a VTCoff terminal.

The anode (A) terminal of the third benistor (603) is electrically connected to V+ for absorbing electrical energy from the sine wave AC voltage source (51) via the BR (53).

The cathode (K) terminal of the third benistor (603) is electrically connected to the positive end of the fourth LED string (751) for supplying the fourth LED string (751) in a CCCV mode of operation.

The current control (Cc) terminal of the third benistor (603) is electrically connected to the negative end of the fourth LED string (751) and one terminal of the second CSR (732) for limiting third benistor's (603) output current. The second benistor (602) operates as a constant current sink with respect to the plurality of LED strings when V+ reaches a sufficiently high voltage amount for all LEDs included in the plurality of LEDs to generate equal light intensity and for avoiding current spikes or flickering.

The zero voltage reference (ZVR) terminal of the third benistor (603) electrically connected to the other terminal of the second CSR (732) for securing a 0V floating reference to the third benistor (603) independent to GND (55).

The voltage sensing (Vs) terminal of the third benistor (603) is electrically connected to V+ for enabling the third benistor's (603) self-switching mode of operation.

The VTCon terminal of the third benistor (603) is electrically connected operatively to ZVD terminal of the third benistor (603) via an external ON reference voltage in an amount equal to the total number of the LEDs included in the plurality of LED stripes multiplied by 3V per LED for the third benistor (603) to switch on its A-K junction at the right time, without switching noise or flickering.

The VTCoff terminal of the third benistor (603) is electrically connected operatively to ZVD terminal of the second benistor (602) via an external OFF reference voltage in an amount equal to the total number of the LEDs included in the plurality of LED strings multiplied by 3V per LED, plus an additional amount of 10-15%, for the third benistor (603) to switch off its A-K junction only if the AC voltage source (51) peak voltage is higher in amount than a pre-established safe limit, for avoiding switching noise or flickering and for protecting the third benistor (603) against unnecessary increase of internal heat dissipation.

The current feedback is accomplished via the plurality of CSRs (722), (732), (742), (752) electrically connected in series circuit configuration, for avoiding switching noise and flickering.

In some embodiments the LED driver system is a monolithic integrated circuit according to FIGS. 19*a*, 21, 23*a*, and 27. In this embodiment, the LED driver system comprises a plurality of multi-terminals benistors (601), (602), (603), (604) sharing multi-base, multi-emitter, multi-collector, multi-gate, multi-drain and multi-source transistors, for decreasing the parts count, size and cost of the LED driver system.

In some embodiments the the LED driver system comprises a Direct AC or sequential LED driver comprising a plurality of benistors connected in a parallel circuit configuration, as according to FIGS. 28, 29, 30, 36, and 37. In this embodiment, the LED driver system comprises a plurality of LED strings/columns (721), (731), (741), (751), a sine wave AC voltage source (51), a bridge rectifier (BR) (53), a plurality of sense resistors (CSRs), and a plurality of benistors.

The plurality of LED strings/columns (721), (731), (741), (751) includes a first LED string (721), a second LED string (731) and a third LED string (741) electrically coupled in series for converting electrical energy in light. Each one of the plurality of LED strings (721), (731), (741), (751) includes a positive end and a negative end and each LED includes a lighting voltage threshold of about three volts.

The sine wave AC voltage source (51) has a peak voltage higher in amount than the total number of the LEDs electrically connected series multiplied by 3V per LED, for providing operatively electrical energy to the LED driver system.

The bridge rectifier (BR) (53) has two AC inputs electrically connected to the AC voltage source (51), a negative output terminal electrically connected to a ground (GND) (55) and a positive output (V+) for providing an unfiltered rectified sine wave voltage supply signal.

The plurality of sense resistors (CSRs) includes two ends and includes a first CSR, a second CSR and a third CSR operatively connected in a series circuit coupled at one end to the GND (55) in at least two feedback current amount increasing direction of a feedback current amount increasing direction from a first benistor to a third benistor and a current feedback amount increasing direction from the third benistor to the first benisto for the plurality of LED stripes (721), (731), (741), (751) current to either increase or decrease as the V+ increases from zero to its peak value.

The plurality of benistors includes at least the first benistor, a second benistor and the third benistor.

The first benistor comprises an anode (A) terminal, a cathode (K) terminal, a current control (Cc) terminal, a zero voltage reference (ZVR) terminal, a voltage sensing (Vs) terminal, a VTCon terminal, and a VTCoff terminal.

The anode (A) terminal of the first benistor is electrically connected to the first LED string's (721) negative end. The first LED string's (721) positive terminal is coupled to V+ for absorbing electrical energy from the sine wave AC voltage source (51) via the BR (53) and the first LED string (721).

The cathode (K) terminal of the first benistor is electrically connected to a terminal of the first CSR for securing the supply of the first LED string (721) in a constant current—constant voltage (CCCV) mode of operation.

The current control (Cc) terminal of the first benistor is electrically connected to the cathode (K) of the first benistor for limiting the first LED stripe (721) current. The first benistor operates as a constant current sink with respect to the first LED string (721) during the period of time necessary for V+ to reach a sufficiently high voltage amount equal to the total number of the LEDs included in the first (721) and second (731) LED strings multiplied by 3V per LED for the light to be smoothly switched from one lighting LED string to two lighting LED strings generating equal light intensity and for avoiding current spikes, or flickering.

The zero voltage reference (ZVR) terminal of the first benistor electrically connected to GND (55).

The voltage sensing (Vs) terminal of the first benistor is electrically connected to V+ for enabling first benistor's self-switching mode of operation.

The VTCon terminal of the first benistor is operatively connected to an external ON reference voltage in an amount of 0V for the first benistor to switch on its A-K junction immediately when V+ amount is above 0V.

The VTCoff terminal of the first benistor is operatively connected to an external OFF reference voltage in an amount equal to the total number of the LEDs included in the first (721) and second (731) LED strings multiplied by 3V per LED for the first benistor to switch off its A-K junction when V+ is sufficiently high to allow the first (721) and second (731) LED strings to generate equal intensity light, for avoiding switching noise or flickering and for protecting the first benistor against unnecessary increase of internal heat dissipation.

The second benistor comprises an anode (A) terminal, a cathode (K) terminal, a current control (Cc) terminal, a zero voltage reference (ZVR) terminal, a voltage sensing (Vs) terminal, a VTCon terminal, and a VTCoff terminal.

The anode (A) terminal of the second benistor is electrically connected to a second LED string's (731) negative end for absorbing electrical energy from the sine wave AC voltage source (51) via the BR (53) and the second LED string (731).

The cathode (K) terminal of the second benistor is operatively connected to a terminal of the second CSR for securing the supply of the second LED string (731) in a CCCV mode of operation.

The current control (Cc) terminal of the second benistor is electrically connected to the cathode of the second benistor for limiting the second LED string's (731) current. The second benistor operates as a constant current sink with respect to the first (721) and second (731) LED string during the entire period of time necessary for V+ to reach a sufficiently high voltage amount equal to the total number of the LEDs included in the first (721), second (731) and third (741) LED strings multiplied by 3V per LED for the light to be smoothly switched from two lighting LED stripe to three lighting LED stripes generating equal light intensity and for avoiding current spikes, or flickering.

The zero voltage reference (ZVR) terminal of the second benistor is electrically connected to GND (55).

The voltage sensing (Vs) terminal of the second benistor is electrically connected to V+ for enabling the second benistor's self-switching mode of operation.

The VTCon terminal of the second benistor is operatively connected to an external ON reference voltage in an amount equal to the total number of the LEDs included in the first (721) and second (731) LED strings multiplied by 3V per LED for second benistor to switch on its A-K junction at the same time when the first benistor switches off its A-K junction, for avoiding switching noise or flickering.

The VTCoff terminal of the second benistor is electrically connected operatively to an external OFF reference voltage in an amount equal to the total number of the LEDs included in the first (721), second (731) and third (741) LED strings multiplied by 3V per LED for the second benistor to switch off its A-K junction when V+ is sufficiently high for the first (721), second (731) and third (741) LED strings to generate equal intensity light, for avoiding switching noise or flickering and for protecting the second benistor against unnecessary increase of internal heat dissipation.

The third benistor comprises a cathode (K) terminal, a current control (Cc) terminal, a zero voltage reference (ZVR) terminal, a voltage sensing (Vs) terminal, a VTCon terminal, and a VTCoff terminal.

The anode (A) terminal of the third benistor is electrically connected to V+ for absorbing electrical energy from the sine wave AC voltage source (51) via the BR (53) and the last LED string.

The cathode (K) terminal of the third benistor is operatively connected to a terminal of the third CSR for supplying the last LED string in a CCCV mode of operation.

The current control (Cc) terminal of the third benistor is electrically connected to the cathode of the third benistor for limiting the last LED string's current. The third benistor operates as a constant current sink with respect to the plurality of LED strings when V+ reaches a sufficiently high voltage amount for all LEDs included in the plurality of LEDs to generate equal light intensity and for avoiding current spikes or flickering.

The zero voltage reference (ZVR) terminal of the third benistor is electrically connected to GND (55).

The voltage sensing (Vs) terminal of the third benistor is electrically connected to V+ for enabling the third benistor's self-switching mode of operation.

The VTCon terminal of the third benistor is electrically connected operatively to an external ON reference voltage in an amount equal to the total number of the LEDs included in the plurality of LED strings multiplied by 3V per LED for the third benistor to switch on its A-K junction at the right time when V+ amount is high enough for the last LED string to generate light, without switching noise or flickering.

The VTCoff terminal of the third benistor is electrically connected operatively to an external OFF reference voltage in an amount equal to the total number of the LEDs included in the plurality of LED strings multiplied by 3V per LED, plus an additional amount of 10-15%, for the third benistor to switch off its A-K junction only if the AC voltage source peak voltage is higher in amount than a pre-established safe limit, for avoiding switching noise or flickering and for protecting the third benistor against unnecessary increase of internal heat dissipation.

One embodiment of an LED retrofit system comprises a benistor (1010) controllable electron valve system for controlling simultaneously the voltage and current amount of nonlinear loads such as LEDs in a linear and self-switching mode of operations, as according to FIGS. 38-40. The system comprises at least one of a power controller (PC) (1011) and a buffer (BUF) sub-circuit; a currents separator (CS) (1012) or mixed signal processor/microcontroller (uC) (666) sub-circuit; a temperature sensor (Ts) (667) sub-circuit; a voltage reference sub-circuit; a two input, one output terminal ON voltage threshold control sub-circuit (VTCon); a two input, one output terminal OFF voltage threshold control sub-circuit (VTCoff); a two input, one output terminal current control sub-circuit (CC) (1013); and a feedback (FB) terminal.

The at least one of a power controller (PC) (1011) and a buffer (BUF) sub-circuit includes at least one of a voltage in (Vin) (1001) or an anode (A) (651) terminal, at least one of a voltage out (Vo) (1002) or a cathode (K) (658) terminal; and a gate control terminal (Gc). The A (651) and K (658) terminals are electrically connected via a semiconductor junction for controlling in a constant current—constant voltage (CCCV) mode of operation the electrical energy absorbed from an electrical power source via the Vin (1001) terminal and delivered to a load via the Vo (1002) terminal.

The current separator (CS) (1012) or mixed signal processor (uC) (666) sub-circuit is operatively connected to the PC (1011) gate control terminal, and includes at least one of a plurality of diodes or a plurality of open collector buffer transistors for allowing interconnections between outputs of two or more combinations of analog operational amplifiers and analog to digital converters for allowing mixed signal control of the PC (1011) sub-circuit output parameters in feedback with a plurality of signals received via its input terminals, processed versus internal reference voltages and/or data.

The temperature sensor (Ts) (667) sub-circuit is operatively coupled to the uC (666) sub-circuit for securing the PC (1011) sub-circuit's operations consistency despite large variations of the driver system internal and/or environmental temperature.

The voltage reference sub-circuit is operatively coupled to the uC (666) sub-circuit and to a zero voltage reference terminal (ZVR) (655) for securing reliable internal voltage references despite large variations of the operation temperature.

The two input, one output terminal ON voltage threshold control sub-circuit (VTCon) includes a voltage on (Von) input terminal coupled to a reference voltage. The VTCon further includes a sensing voltage input terminal (Vs) coupled to a variable voltage source and the output terminal operatively coupled to the uC (666) sub-circuit for switching ON the PC (1011) sub-circuit anode-cathode terminals (A-K) junction when the Vs terminal's voltage amount is lower than the Von terminal's voltage amount and for switching off the PC (1011) sub-circuit's A-K junction when the Vs terminal's voltage amount is higher than the Von terminal's voltage amount.

The a two input, one output terminal OFF voltage threshold control sub-circuit (VTCoff) includes a voltage off (Voff) input terminal coupled to a reference voltage, a sensing voltage input terminal coupled together with the Vs terminal of the VTCon sub-circuit and the output terminal operatively coupled to the uC (666) sub-circuit, for switching off the PC (1011) sub-circuit anode-cathode terminals (A-K) junction when the Vs terminal's voltage amount is lower than the Voff terminal's voltage amount and for switching on the PC (1011) sub-circuit's A-K junction when the Vs terminal's voltage amount is higher than the Voff terminal's voltage amount.

The two input, one output terminal current control (CC) sub-circuit (1013) includes a negative feedback control (Cc) input terminal coupled to a variable voltage source, a reference voltage input terminal coupled to a voltage reference source and the output terminal operatively coupled to the uC (666) sub-circuit for increasing the dynamical resistance of PC (1011) sub-circuit anode-cathode terminals (A-K) junction and implicitly decrease the A-K circuit's passing current when the Cc terminal's voltage amount is higher than the reference voltage terminal's voltage amount and for decreasing the dynamical resistance of PC (1011) sub-circuit anode-cathode terminals (A-K) junction and implicitly increase the A-K circuit's passing current when the Cc terminal's voltage amount is lower than the reference voltage terminal's voltage amount.

The feedback (FB) terminal allows operative access to the PC (1011) sub-circuit, via the uC (666) sub-circuit, for feedback, synchronization and shutting down operations. The FB terminal's function could be overtaken by the Cc terminal and/or by the VTCOff terminal and/or by the VTCon terminal.

In some embodiments, the benistor system comprises the following modifications, as in FIG. 20. The power controller PC (1011) sub-circuit comprises a MOSFET transistor (661). A current separator (CS) sub-circuit (1012) is a microcontroller (uC) (666). The temperature sensor (Ts) (667) comprises a diode. The voltage reference (VR) sub-circuit comprises a bandgap reference (BGVR) (664). The ON voltage threshold controller (VTCon) sub-circuit comprises a first comparator (662). The OFF voltage threshold controller (VTCoff) sub-circuit comprises a second comparator (663). The current controller (CC) (1013) sub-circuit comprises an operational amplifier.

In some embodiments, the benistor system comprises the following modifications, as in FIG. 21. The power controller PC (1011) sub-circuit comprises a MOSFET transistor (681). The temperature sensor (Ts) (667) comprises a diode. The voltage reference (VR) sub-circuit comprises a zener diode (683). The ON voltage threshold controller (VTCon) sub-circuit comprises a resistor (682). The OFF voltage threshold controller (VTCoff) sub-circuit comprises a first NPN transistor. The current controller (CC) (1013) sub-circuit comprises a second NPN transistor. The current separator (CS) (1012) sub-circuit comprises an open collector connection arrangement.

In some embodiments the benistor system comprises a plurality of CC sub-circuits as in FIGS. 24 and 25. The plurality of CC sub-circuits are operatively connected in an open collector parallel circuit configuration for controlling, independently, a plurality of LED strings in a constant current constant voltage mode of operation regardless of the LED driver's operation temperature.

In some embodiments the benistor system's power controller (1011) sub-circuit comprises an "elephant/rabbit" benistor as in FIG. 35. In this embodiment, a small ("rabbit") MOSFET transistor is operatively connected with a larger ("elephant") MOSFET transistor in a totem-pole buffering circuit arrangement for improving the self-switching and maximum power features via the elephant/rabbit benistor configuration.

In some embodiments the benistor system comprises a plurality of control (CC) sub-circuits as in FIGS. 29, and 31-34. The plurality of control sub-circuits are overlapped into a single MOSFET buffer transistor (681), (691), (701), (711), (911) VCLCsw sub-circuit. The CC current control operation is accomplished by the means of a precise reference voltage operatively connected into the MOSFET buffer transistor's (681), (691), (701), (711), (911) gate circuit. The OFF voltage threshold control operation is achieved by the means of silicon diodes (761), (762), (763) voltage threshold operatively connected into the MOSFET buffer transistor's (681), (691), (701), (711), (911) source circuit. The ON voltage threshold control operation is accomplished by the means of the 3V per LED voltage threshold of the plurality of LEDs operatively connected into the MOSFET buffer transistor's (681), (691), (701), (711), (911) drain circuit, for reducing the benistor's parts count, size and cost.

One embodiment of an LED retrofit method optimizes the adaptability, lighting performance, size and cost of a dimmable LED lamp retrofit powered by an electrical power source, as in FIGS. 1-7. The method comprises providing a dimmer, a housing (2), (12), (22), (42) system, an LED (6), (16), (26), (44) lighting source system, an LED panel (5), (15), (25) system, a lens/diffuser shield (4), (14), (24), (43) system, an LED driver (7), (17), (27), (45) system, a supply adaptor (3), (13), (23), (46) system, and in/out electrical wiring circuitry system. The dimmer is able to lower the power source's voltage down to a minimum supply voltage amount. The housing (2), (12), (22), (42) system includes at least one of a balloon, tube, cone or prism shaped recipient. The LED system includes one or more LEDs (6), (16), (26), (44). The LED panel (5), (15), (25) system includes at least one of a two dimensional and three dimensions arrangement of one or more printed circuit boards. The lens/diffuser shield (4), (14), (24), (43) system includes at least one of a transparent lens or a translucent lens arrangement following a similar two or three dimensions arrangement shape as the LED panel (5), (15), (25) system. The LED driver (7), (17), (27), (45) system includes at least one of an optimized size/cost boost, a buck, a buck-boost, an isolated flyback, a non-isolated flyback, a monolithic converter circuit, a single converter circuit, or a double stage converter circuit. The in/out electrical wiring circuitry system is suitable to the LED panel (5), (15), (25) system and to the supply adaptor (3), (13), (23) system.

The LED retrofit method further comprises operatively connecting the one or more LEDs (6), (16), (26), (44), via the LED panel (5), (15), (25) system, in at least one of a plurality of series LED strings or parallel LED string. Each of the plurality of LED strings includes a minimum lighting voltage threshold lower in amount than the minimum supply voltage amount.

The LED retrofit method further comprises operatively connecting the one or more LEDs (6), (16), (26), (44) of each the LED strings in a specific configuration such that the one or more LEDs (6), (16), (26), (44) are positioned at an equal distance between themselves and equal distance on horizontal and vertical axes with respect to the edges of the LED panel's (5), (15), (25) surface.

The LED retrofit method further comprises operatively connecting the LED driver (7), (17), (27), (45) system to the LED panel (5), (15), (25) system and the supply adaptor (3), (13), (23) system via the in/out electrical wiring circuitry system The LED retrofit method further comprises mechanically supporting the one or more LEDs (6), (16), (26), (44), the LED panel (5), (15), (25) system, the lens/diffuser shield (4), (14), (24), (43) system, the LED driver (7), (17), (27), (45) system, the supply adaptor (3), (13), (23), (46) system and the in/out wiring circuitry system via the housing (2), (12), (22), (42) system.

The LED retrofit method further comprises protecting the one or more LEDs (6), (16), (26), (44), the LED panel (5), (15), (25) system, the LED driver (7), (17), (27), (45) system, the supply adaptor (3), (13), (23), (46) system and the in/out wiring circuitry system via the lens/diffuser shield (4), (14), (24), (43) system.

The LED retrofit method further comprises electrically connecting the electrical power source via the dimmer, the supply adaptor (3), (13), (23), (46) and via the in/out electrical wiring circuitry system to the LED driver (7), (17), (27), (45) system.

The LED retrofit method further comprises driving the one or more LEDs (6), (16), (26), (44) in a safe constant current constant voltage mode of operations, via the LED driver (7), (17), (27), (45) system.

The LED retrofit method further comprises generating light via the LED lighting system.

The LED retrofit method further comprises dissipating the heat of the LED lighting system.

The LED retrofit method further comprises dispersing the light of the LED lighting system omni-directionally when the housing (2), (12), (22), (42) system follows a balloon shape and the LED panel system follows a three dimensional arrangement shape.

The LED retrofit method further comprises focusing the light of the LED lighting system in a 120 degree angle spot when the housing (2), (12), (22), (42) system follows a cone shape and the LED panel system follows a two dimensional arrangement shape.

The LED retrofit method further comprises dimming the voltage supply source voltage amount down to the minimum supply voltage amount via the dimmer.

The LED retrofit method further comprises generating an equally distributed light on the LED panel (5), (15), (25) system's surface when at least one of the plurality of LED strings reaches its minimum lighting voltage threshold.

One embodiment of an LED retrofit method achieves fewer parts, low cost monitoring and feedback corrections of multi-column LED circuit's failures in LED lamp retrofits, as in FIGS. 8 and 9. This method comprises providing a controllable DC supply voltage, controller integrated circuit, and a current sense resistor (360). The DC supply voltage includes a positive output terminal and a ground terminal. The controller integrating circuit includes an Is controlling terminal.

The LED retrofit method further comprises electrically connecting the sense resistor (360) between the Is terminal and the ground (55) terminal.

The LED retrofit method further comprises providing a plurality of LED columns (310), (311), (312), wherein each LED column of the plurality of LED columns (310), (311), (312) includes a positive end and a negative end.

The LED retrofit method further comprises electrically connecting the positive end of the each LED column to the positive output terminal of the DC supply voltage.

The LED retrofit method further comprises providing a plurality of constant current sink sub-circuits, wherein each of the current sink sub-circuits includes a positive terminal and a negative terminal.

The LED retrofit method further comprises electrically connecting the negative end of each LED column to the positive terminal of the each constant current sink sub-circuit, and connecting all the negative terminals of the constant current sink sub-circuits to the Is terminal of the controller integrated circuit.

The LED retrofit method further comprises introducing a first plurality of diodes (321), (323), (325) wherein each of the diodes of the first plurality of diodes (321), (323), (325) includes an anode and a cathode, and electrically connecting the anode of each the diode of the first plurality of diodes (321), (323), (325) to the each negative end of the each LED column.

The LED retrofit method further comprises providing a Vd+ (302) terminal, and electrically connecting the cathode of all the diodes of the first plurality of diodes (321), (323), (325) to the Vd+ (302) terminal.

The LED retrofit method further comprises introducing a second plurality of diodes (322), (324), (326), wherein each of the diodes of the second plurality of diodes (322), (324), (326) includes an anode and a cathode, and electrically connecting the cathode of each the diode of the second plurality of diodes (322), (324), (326) to the each negative end of the each LED column.

The LED retrofit method further comprises providing a Vd− (303) terminal, and electrically connecting the anode of all the diodes of the second plurality of diodes The LED retrofit method further comprises to the Vd− (303) terminal.

The LED retrofit method further comprises introducing a differential voltage amplifier (411), the differential voltage amplifier (411) including an inverting input, a non-inverting input and an output. The method further comprises electrically connecting the non-inverting input to the Vd+ (302) terminal, electrically connecting the inverting input to the Vd− (303) terminal, and electrically connecting the output of the differential voltage amplifier (411) to the Is terminal of the controller integrated circuit.

The LED retrofit method further comprises increasing the voltage amount at the operational amplifier's output when the differential voltage amount between the Vd+ (302) terminal and the Vd− (303) terminal is higher than a pre-established limit.

The LED retrofit method further comprises decreasing the amount of voltage of the DC supply voltage positive output when the voltage amount at the Is terminal of the controller integrated circuit is higher than a pre-established limit.

One embodiment of an LED retrofit method eliminates opto-isolator sub-circuits in isolated flyback converters driving LED loads, as in FIG. 13. The method comprises providing a DC power source, wherein the DC power source has a positive output and a negative output; a flyback transformer, wherein the flyback transformer comprises, a primary coil, a voltage sense secondary coil, and an output power isolated secondary coil; a flyback MOSFET switch (512), wherein the flyback MOSFET switch (512) comprises a gate, a drain, and a source; a gate resistor (531), a flyback output diode (211); a flyback output capacitor (290); a load, wherein the load comprises one or more LEDs coupled in series; a snubber sub-circuit (140); an eight terminals pulse width modulation integrated circuit (PWMic) (120), wherein the PWMic comprises a feedback (FB) terminal, a compensation (Comp) terminal, a voltage reference (Vref) terminal, an oscillator (Osc) terminal, a current sense (Is) terminal, a voltage supply (Vcc) terminal, a ground (GND) terminal, and a driving (Drv) terminal; a controller IC supply circuit; an oscillating circuit, wherein the oscillating circuit comprises a timing resistor (123) and a timing capacitor (124); a voltage reference filtering capacitor (122); a feedback voltage rectifier sub-circuit wherein the feedback voltage rectifier sub-circuit has a feedback voltage output; a compensation capacitor (130); a two feedback resistors divider sub-circuit; a current sense resistor (360); a current spike filter sub-circuit wherein the current spike filter sub-circuit (240) comprising a resistor (241) and a capacitor (242); a voltage follower current feedback (VFCFB) (260), wherein the VFCFB (260) sub-circuit comprise a zener diode (264), a first resistor (262), a second resistor (263) and a PNP transistor (261); an input ground terminal (55); and an output ground terminal (65).

The LED retrofit method further comprises electrically connecting the DC power source positive output to the drain of the flyback MOSFET transistor via the primary coil of the flyback transformer.

The LED retrofit method further comprises electrically connecting the negative output of the DC power source to the input ground (55).

The LED retrofit method further comprises electrically and operatively connecting the snubber circuit (140) across the primary coil.

The LED retrofit method further comprises electrically connecting the source of the flyback MOSFET switch (512) to the input ground (55) via the current sense resistor (360).

The LED retrofit method further comprises electrically connecting the Vcc terminal of the PWMic (120) to the DC power source's positive output via the controller supply circuit.

The LED retrofit method further comprises electrically connecting the gate of the flyback MOSFET switch (512) to the Dry terminal of the PWMic (120) via the gate resistor (531).

The LED retrofit method further comprises electrically and operatively connecting the current sense resistor to the Is terminal of the PWMic (120) via the current spike filter sub-circuit.

The LED retrofit method further comprises electrically connecting the GND terminal of the PWMic (120) to the input ground (55).

The LED retrofit method further comprises electrically connecting one terminal of the voltage sense secondary coil to the input ground (55).

The LED retrofit method further comprises electrically and operatively connecting the other terminal of the voltage sense secondary coil to ground (55) via the feedback voltage rectifier sub-circuit.

The LED retrofit method further comprises electrically and operatively connecting the feedback voltage output to the FB terminal of the PWMic (120) via the two feedback resistors divider sub-circuit, electrically connecting the compensation capacitor (130) across the FB and the Comp terminals of the PWMic (120), electrically connecting the voltage reference filtering capacitor across the Vref and GND terminals of the PWMic (120), and electrically and operatively connecting the oscillating circuit to the Osc, Vref and GND terminals of the PWMic (120)

The LED retrofit method further comprises electrically connecting the first resistor (262) of the VFCFB sub-circuit (260) between the base of the PNP transistor (261) and the input ground (55), electrically connecting the second resistor (263) of the VFCFB sub-circuit between the base of the PNP transistor (261) and the Vref terminal of the PWMic (120), electrically connecting the collector of the NPN transistor (261) to the input ground (55), electrically connecting the emitter of the NPN transistor (261) to the Comp terminal of the PWMic (120), and electrically connecting the zener diode (264) of the VCFB sub-circuit (260) with its anode at the base of the NPN transistor (261) and its cathode to the feedback voltage output.

The LED retrofit method further comprises electrically connecting one terminal of the output power isolated secondary coil of the flyback transformer to the output ground (65), electrically connecting the other terminal of the power isolated secondary coil of the flyback transformer via the flyback output diode (211) to one terminal of the flyback output capacitor (290), electrically connecting the other terminal of the flyback output capacitor to the output ground (65), and electrically and operatively connecting the load across the flyback output capacitor (290).

The LED retrofit method further comprises electrically supplying the flyback MOSFET's (512) drain via the primary coil of the flyback transformer from the DC power source positive output.

The LED retrofit method further comprises electrically supplying the Vcc terminal of the PWMic (120) via the controller IC supply circuit from the DC power source positive output, and generating oscillations at the Osc terminal of the PWMic (120) via the oscillating circuit, generating a PWM driving signal at the Dry terminal of the PWMic (120).

The LED retrofit method further comprises driving the gate of the flyback MOSFET switch (512), limiting the PWM driving signal's current via the gate resistor (531), clamping the self-inductance high voltage of the primary coil of the flyback transformer via the snubber circuit (140), filtering the current sense resistor's (360) current spikes, delivering a flyback output voltage across the load via the output power isolated secondary coil, the flyback diode (211) and the flyback output capacitor (290), and delivering a feedback voltage signal at the feedback voltage output equal in amount to the flyback output voltage across the load, via the feedback voltage secondary coil and the feedback voltage rectifier sub-circuit.

The LED retrofit method further comprises providing a fraction of the feedback voltage signal at the FB terminal of the PWMic (120) via the two feedback resistors divider sub-circuit, and compensating the fraction of the feedback voltage signal via the compensation capacitor.

The LED retrofit method further comprises providing a minimum safe voltage threshold signal at the Comp terminal of the PWMic (120) via the first resistor (262), the second resistor (263) and the PNP transistor (261) of the VFCFB sub-circuit (260), keeping the amount of voltage at the Comp terminal at low level via the PNP transistor (261) and implicitly the current of the load at lower level, if the feedback voltage signal does not increases up to a pre-established level determined by the number of LEDs the load includes.

The LED retrofit method further comprises increasing discreetly the load's current amount only when the feedback voltage signal reaches a sufficiently high amount to increase the voltage amount of the Comp terminal of the PWMic (120) via the zener diode (264) and the PNP transistor (261) of the VFCFB sub-circuit (260).

The LED retrofit method further comprises confirming there is no damage in the load's circuit when the feedback voltage signal reaches its designated maximum voltage, controlling in closed feedback the designated maximum voltage across the load via the two feedback resistors divider sub-circuit and the FB terminal of the PWMic (120), andshutting down the high current delivered to the load at any time when the zener diode (264) of the VFCFB sub-circuit (260) does not sense a sufficiently high voltage amount of the feedback voltage signal.

One embodiment of an LED retrofit method achieves simultaneous control of a PFC converter and a PWM converter in a near unity power factor double stage boost—buck boost converter LED lighting circuit, using a low cost PWM controller IC. This method comprises providing introducing an AC power source (51), and a bridge rectifier (53), the bridge rectifier including an AC input and a DC output.

The LED retrofit method further comprises electrically connecting the bridge rectifier's (53) AC input to the AC power source, rectifying the AC power source signal, and outputting an unfiltered and unregulated voltage across the DC output.

The LED retrofit method further comprises providing a boost converter sub-circuit, the boost converter sub-circuit including a boost input, a boost coil, a boost output and a boost driving input, and electrically connecting the bridge rectifier (53) output to the boost input.

The LED retrofit method further comprises providing a buck-boost converter sub-circuit, the buck-boost converter sub-circuit including a buck-boost input, a buck-boost coil (510), a buck-boost output and a buck-boost driving input, and a load.

The LED retrofit method further comprises electrically connecting the boost converter's output to the buck-boost converter's input, and electrically connecting the buck-boost converter's output to the load.

The LED retrofit method further comprises providing a low cost PWM controller IC (120) including a driving output, generating a high frequency square wave driving pulse at the IC controller's (120) driving output, the square wave driving pulse including constant frequency and constant duty cycle (CFCD), electrically connecting the IC controller's (120) driving output to the boost driving input and to the buck-boost driving input, sizing the buck-boost coil's parameters in accordance to the voltage and current parameters required by the load and sizing the boost coil's parameters for a discontinuous mode of operation.

One embodiment of an LED retrofit method controls simultaneously the voltage and current amount of nonlinear loads such as LEDs using a benistor linear and self-switching mode of operations capabilities. The method comprises providing an LED string comprising a plurality of LEDs, wherein the LED string includes a positive end and a negative end and each of the plurality of LEDs includes a lighting voltage threshold of about three volts; a sine wave AC voltage source (51), wherein the sine wave AC voltage source peak voltage is higher in amount than the total number of the plurality of LEDs included in the LED stripe multiplied by 3V per LED; a bridge rectifier (BR) (53), wherein the BR comprises two AC input terminals, a negative output terminal, and a positive output (V+); a ground (GND) (55) terminal, a current sense resistor (CSR) (360); an ON reference voltage, wherein the ON reference voltage amount is approximately equal to the number of LEDs included in the LED string multiplied by 3V per LED with respect to GND (55), an OFF reference voltage, wherein the OFF reference voltage amount is higher than the ON reference voltage amount with respect to GND (55); and a benistor, wherein the benistor includes an anode (A) terminal, a cathode (K) terminal, a current control (Cc) terminal, a zero voltage reference (ZVR) terminal, a voltage sensing (Vs) terminal, an ON voltage threshold control (VTCon) terminal, and an OFF voltage threshold control (VTCoff) terminal.

The LED retrofit method further comprises electrically connecting the bridge rectifier's (53) AC input terminals to the AC voltage source (51), and electrically connecting the bridge rectifier's (53) negative output terminal to a ground (GND) (55).

The LED retrofit method further comprises electrically connecting the positive end of the LED string to V+, electrically connecting the benistor's A terminal to the negative end of the LED string, electrically connecting the benistor's K terminal to GND (55) via the CSR (360), electrically connecting the benistor's Cc terminal to the benistor K terminal, electrically connecting the benistor's ZVR terminal to GND (55), electrically connecting the benistor Vs terminal to V+, electrically connecting the benistor's VTCon terminal to the ON reference voltage, and electrically connecting the benistor's VTCoff terminal to the OFF reference voltage The LED retrofit method further comprises delivering an unfiltered rectified voltage at V+ via the bridge rectifier (53), sensing the V+ voltage via the Vs terminal of the benistor, and switching ON the benistor's A-K junction when the benistor's Vs terminal voltage amount exceeds the benistor's VTCon voltage amount.

The LED retrofit method further comprises limiting the LED string current in a pre-establishes level via the benistor's Cc terminal and the CSR (360), and switching OFF the benistor's A-K junction when the benistor's Vs terminal voltage amount exceeds the benistor's VTCoff voltage amount;

The LED retrofit method further comprises generating light via the LED string during the period of time the V+ amount is higher than the VTCon amount and lower than the VTCoff amount, and generating light via the LED string during the entire time the V+ amount is higher than the VTCon amount if V+ does not exceed the benistor's VTCoff amount.

All of the above-mentioned U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation.

What is claimed is:

1. A benistor controllable electron valve system for controlling simultaneously the voltage and current amount of nonlinear loads such as LEDs in a linear and self-switching mode of operations, the system comprising:
    at least one of a power controller (PC) and a buffer (BUF) sub-circuit comprising:
        at least one of a voltage in (Vin) and an anode (A) terminal;
        at least one of a voltage out (Vo) and a cathode (K) terminal; and
        a gate control terminal (Gc),
        wherein said A and K terminals are electrically connected via a semiconductor junction to control in a constant current—constant voltage (CCCV) mode of operation the electrical energy absorbed from an electrical power source via the Vin terminal and delivered to a load via the Vo terminal;
    a current separator (CS) or mixed signal processor (uC) sub-circuit operatively connected to the PC gate control terminal including at least one of a plurality of diodes and a plurality of open collector buffer transistors to allow interconnections between outputs of two or more combinations of analog operational amplifiers and analog to digital converters to allow mixed signal control of the PC sub-circuit output parameters in feedback with a plurality of signals received via its input terminals, processed versus internal reference voltages and/or data;
    a temperature sensor (Ts) sub-circuit operatively coupled to the uC sub-circuit to secure the PC sub-circuit's operations consistency despite large variations of the driver system internal and/or environmental temperature;
    a voltage reference sub-circuit operatively coupled to the uC sub-circuit and to a zero voltage reference terminal (ZVR) to secure reliable internal voltage references despite large variations of the operation temperature;
    a two input, one output terminal ON voltage threshold control sub-circuit (VTCon) comprising:
    a voltage on (Von) input terminal coupled to a reference voltage;
    a sensing voltage input terminal (Vs) coupled to a variable voltage source and the output terminal operatively coupled to the uC sub-circuit to switch ON the PC sub-circuit anode-cathode terminals (A-K) junction when the Vs terminal's voltage amount is lower than the Von terminal's voltage amount and to switch off the PC sub-circuit's A-K junction when the Vs terminal's voltage amount is higher than the Von terminal's voltage amount;
    a two input, one output terminal OFF voltage threshold control sub-circuit (VTCoff) including a voltage off (Voff) input terminal coupled to a reference voltage, a sensing voltage input terminal coupled together with the Vs terminal of the VTCon sub-circuit and the output terminal operatively coupled to the uC sub-circuit for switching off the PC sub-circuit anode-cathode terminals (A-K) junction when the Vs terminal's voltage amount is lower than the Voff terminal's voltage amount and to switch on the PC sub-circuit's A-K junction when the Vs terminal's voltage amount is higher than the Voff terminal's voltage amount;
    a two input, one output terminal current control (CC) sub-circuit comprising a negative feedback control (Cc) input terminal coupled to a variable voltage source, a reference voltage input terminal coupled to a voltage reference source and the output terminal operatively coupled to the uC sub-circuit to increase the dynamical resistance of PC sub-circuit anode-cathode terminals (A-K) junction and implicitly decrease the A-K circuit's passing current when the Cc terminal's voltage amount is higher than the reference voltage terminal's voltage amount and to decrease the dynamical resistance of PC sub-circuit anode-cathode terminals (A-K) junction and implicitly increase the A-K circuit's passing current when the Cc terminal's voltage amount is lower than the reference voltage terminal's voltage amount; and
    a feedback (FB) terminal to allow operative access to the PC sub-circuit, via the uC sub-circuit for feedback, synchronization and shutting down operations, wherein said FB terminal's function could be overtaken by said Cc terminal and/or by said VTCOff terminal and/or by said VTCon terminal.

2. The benistor of claim 1, wherein:
    the power controller PC sub-circuit is a MOSFET transistor;
    the current separator (CS) sub-circuit is a microcontroller (uC);
    the temperature sensor (Ts) is a diode;
    the voltage reference (VR) sub-circuit is a bandgap reference (BGVR);
    the ON voltage threshold controller (VTCon) sub-circuit is a first comparator;
    the OFF voltage threshold controller (VTCoff) sub-circuit is a second comparator; and
    the current controller (CC) sub-circuit is an operational amplifier.

3. The benistor of claim 1, wherein:
the power controller PC sub-circuit is a MOSFET transistor;
the temperature sensor (Ts) is a diode;
the voltage reference (VR) sub-circuit is a zener diode;
the ON voltage threshold controller (VTCon) sub-circuit is a resistor;
the OFF voltage threshold controller (VTCoff) sub-circuit is a first NPN transistor;
the current controller (CC) sub-circuit is a second NPN transistor; and
the current separator (CS) sub-circuit comprises an open collector connection arrangement.

4. The benistor of claim 1, wherein a plurality of CC sub-circuits are operatively connected in an open collector parallel circuit configuration to control, independently, a plurality of LED strings in a constant current constant voltage mode of operation regardless of the LED driver's operation temperature.

5. The benistor of claim 1, wherein said power controller sub-circuit is a "elephant/rabbit" benistor comprising a small ("rabbit") MOSFET transistor operatively connected with a larger ("elephan") MOSFET transistor in a totem-pole buffering circuit arrangement for improving the self-switching and maximum power features via said ("elephant/rabbit") large-small benistor configuration.

6. The benistor of claim 5, wherein said low power MOSFET transistor is a rabbit and the large power transistor is an elephant.

7. The benistor of claim 1, wherein all benistors control sub-circuits are overlapped into a single MOSFET buffer transistor VCLCsw sub-circuit wherein:
said CC current control operation is accomplished by the means of a precise reference voltage operatively connected into said MOSFET buffer transistor's gate circuit;
said OFF voltage threshold control operation is achieved by the means of silicon diodes voltage threshold operatively connected into said MOSFET buffer transistor's source circuit; and
said ON voltage threshold control operation is accomplished by the means of said 3V per LED voltage threshold of said plurality of LEDs operatively connected into said MOSFET buffer transistor's drain circuit, to reduce said benistor's component count, size and cost.

8. A method for optimizing the adaptability, lighting performance, size and cost of a dimmable LED lamp retrofit powered by an electrical power source, the method comprising:
providing a dimmer, said dimmer being able to lower the power source's voltage down to a minimum supply voltage amount;
providing a housing system comprising at least one of a balloon, tube, cone or prism shaped recipient;
providing an LED lighting source system comprising one or more LEDs;
providing an LED panel system comprising at least one of a two dimensional and three dimensions arrangement of one or more printed circuit boards;
providing a lens/diffuser shield system comprising at least one of a transparent lens or a translucent lens arrangement following a similar two or three dimensions arrangement shape as said LED panel system;
providing an LED driver system, wherein said LED driver system includes at least one of:
an optimized size/cost boost;
a buck;
a buck-boost;
an isolated flyback;
a non-isolated flyback;
a monolithic converter circuit;
a single converter circuit; or
a double stage converter circuit;
providing a supply adaptor system;
providing an in/out electrical wiring circuitry system, wherein said in/out electrical wiring circuitry system is suitable to said LED panel system and to said supply adaptor system;
operatively connecting said one or more LEDs, via said LED panel system, in at least one of a plurality of series LED strings and parallel LED strings, wherein each of said plurality of LED strings includes a minimum lighting voltage threshold lower in amount than said minimum supply voltage amount;
operatively connecting said one or more LEDs of each said LED string in a specific configuration such that said one or more LEDs are positioned at an equal distance between themselves and equal distance on horizontal and vertical axes with respect to the edges of said LED panel's surface;
operatively connecting said LED driver system to said LED panel system and said supply adaptor system via said in/out electrical wiring circuitry system;
mechanically supporting said one or more LEDs, said LED panel system, said lens/diffuser shield system, said LED driver system, said supply adaptor system and said in/out wiring circuitry system via said housing system;
protecting said one or more LEDs, said LED panel system, said LED driver system, said supply adaptor system and said in/out wiring circuitry system via said lens/diffuser shield system;
electrically connecting said electrical power source via said dimmer, said supply adaptor and via said in/out electrical wiring circuitry system to said LED driver system;
driving the one or more LEDs in a safe constant current constant voltage mode of operations, via the LED driver system;
generating light via the LED lighting system;
dissipating the heat of said LED lighting system,
dispersing the light of said LED lighting system omni-directionally when said housing system follows a balloon shape and said LED panel system follows a three dimension arrangement shape;
focusing the light of said LED lighting system in a 120 degree angle spot when said housing system follows a cone shape and said LED panel system follows a two dimensions arrangement shape;
dimming said voltage supply source voltage amount down to the minimum supply voltage amount via said dimmer;
generating an equally distributed light on said LED panel system's surface when at least one of said plurality of LED strings reaches its minimum lighting voltage threshold.

9. A method for achieving less parts low cost monitoring and feedback corrections of multi-column LED circuit's failures in LED lamp retrofits, the method comprising:
providing a controllable DC supply voltage comprising a positive output terminal and a ground terminal;
providing a controller integrated circuit comprising an Is controlling terminal;
providing a current sense resistor;
electrically connecting said sense resistor between said Is terminal and said ground terminal;

providing a plurality of LED columns, wherein each LED column of said plurality of LED columns includes a positive end and a negative end;
electrically connecting said positive end of said each LED column to the positive output terminal of said DC supply voltage;
providing a plurality of constant current sink sub-circuits comprising a positive terminal and a negative terminal;
electrically connecting said negative end of each LED column to said positive terminal of said each constant current sink sub-circuit;
connecting all said negative terminals of said constant current sink sub-circuits to said Is terminal of said controller integrated circuit;
introducing a first plurality of diodes wherein each of said diodes of said first plurality of diodes includes an anode and a cathode;
electrically connecting the anode of each said diode of the first plurality of diodes to said each negative end of said each LED column;
providing a Vd+ terminal;
electrically connecting the cathode of all said diodes of said first plurality of diodes to said Vd+ terminal;
introducing a second plurality of diodes wherein each of said diodes of said second plurality of diodes includes an anode and a cathode;
electrically connecting the cathode of each said diode of the second plurality of diodes to said each negative end of said each LED column;
providing a Vd− terminal;
electrically connecting the anode of all said diodes of said second plurality of diodes to said Vd− terminal;
introducing a differential voltage amplifier, said differential voltage amplifier including an inverting input, a non-inverting input and an output;
electrically connecting said non-inverting input to said Vd+ terminal;
electrically connecting said inverting input to said Vd− terminal;
electrically connecting said output of said differential voltage amplifier to said Is terminal of said controller integrated circuit;
increasing the voltage amount at said operational amplifier's output when the differential voltage amount between said Vd+ terminal and said Vd− terminal is higher than a pre-established limit; and
decreasing the amount of voltage of said DC supply voltage positive output when the voltage amount at said Is terminal of said controller integrated circuit is higher than a pre-established limit.

10. A primary sensing control method for eliminating opto-isolator sub-circuits in isolated flyback converters driving LED loads, the method comprising:
introducing a DC power source comprising a positive output and a negative output;
introducing a flyback transformer comprising a primary coil, a voltage sense secondary coil, and an output power isolated secondary coil;
introducing a flyback MOSFET switch comprising a gate, a drain, and a source;
introducing a gate resistor;
introducing a flyback output diode;
introducing a flyback output capacitor;
introducing a load, wherein said load comprises one or more LEDs coupled in series;
introducing a snubber sub-circuit;
introducing an eight terminals pulse width modulation integrated circuit (PWMic), wherein said PWMic comprises a feedback (FB) terminal, a compensation (Comp) terminal, a voltage reference (Vref) terminal, an oscillator (Osc) terminal, a current sense (Is) terminal, a voltage supply (Vcc) terminal, a ground (GND) terminal, and a driving (Drv) terminal;
introducing a controller IC supply circuit;
introducing an oscillating circuit comprising a timing resistor and a timing capacitor;
introducing a voltage reference filtering capacitor;
introducing a feedback voltage rectifier sub-circuit comprising a feedback voltage output;
introducing a compensation capacitor;
introducing a two feedback resistors divider sub-circuit;
introducing a current sense resistor;
introducing a current spike filter sub-circuit comprising a resistor and a capacitor;
introducing a voltage follower current feedback (VFCFB) comprising: a zener diode, a first resistor, a second resistor and a PNP transistor;
introducing an input ground terminal;
introducing an output ground terminal;
electrically connecting said DC power source positive output to said drain of said flyback MOSFET transistor via said primary coil of said flyback transformer;
electrically connecting said negative output of said DC power source to said input ground;
electrically and operatively connecting said snubber circuit across said primary coil;
electrically connecting said source of said flyback MOSFET switch to said input ground via said current sense resistor;
electrically connecting said Vcc terminal of said PWMic to said DC power source's positive output via said controller supply circuit;
electrically connecting said gate of said flyback MOSFET switch to said Dry terminal of said PWMic via said gate resistor;
electrically and operatively connecting said current sense resistor to said Is terminal of said PWMic via said current spike filter sub-circuit;
electrically connecting said GND terminal of said PWMic to said input ground;
electrically connecting one terminal of said voltage sense secondary coil to said input ground;
electrically and operatively connecting the other terminal of said voltage sense secondary coil to ground via said feedback voltage rectifier sub-circuit;
electrically and operatively connecting said feedback voltage output to said FB terminal of said PWMic via said two feedback resistors divider sub-circuit;
electrically connecting said compensation capacitor across said FB and said Comp terminals of said PWMic;
electrically connecting said voltage reference filtrating capacitor across said Vref and GND terminals of said PWMic;
electrically and operatively connecting said oscillating circuit to said Osc, Vref and GND terminals of said PWMic;
electrically connecting said first resistor of said VFCFB sub-circuit between the base of said PNP transistor and said input ground;
electrically connecting said second resistor of said VFCFB sub-circuit between the base of said PNP transistor and said Vref terminal of said PWMic;

electrically connecting the collector of said NPN transistor to said input ground;

electrically connecting the emitter of said NPN transistor to said Comp terminal of said PWMic;

electrically connecting said zener diode of said VCFB sub-circuit with its anode at the base of said NPN transistor and its cathode to said feedback voltage output;

electrically connecting one terminal of said output power isolated secondary coil of said flyback transformer to said output ground;

electrically connecting the other terminal of said power isolated secondary coil of said flyback transformer via said flyback output diode to one terminal of said flyback output capacitor;

electrically connecting the other terminal of said flyback output capacitor to said output ground;

electrically and operatively connecting said load across said flyback output capacitor;

electrically supplying said flyback MOSFET's drain via said primary coil of said flyback transformer from said DC power source positive output;

electrically supplying said Vcc terminal of said PWMic via said controller IC supply circuit from said DC power source positive output;

generating oscillations at said Osc terminal of said PWMic via said oscillating circuit;

generating a PWM driving signal at said Dry terminal of said PWMic;

driving the gate of said flyback MOSFET switch;

limiting said PWM driving signal's current via said gate resistor;

clamping the self-inductance high voltage of the primary coil of said flyback transformer via said snubber circuit;

filtrating said current sense resistor's current spikes;

delivering a flyback output voltage across the load via said output power isolated secondary coil, said flyback diode and said flyback output capacitor;

delivering a feedback voltage signal at said feedback voltage output equal in amount to said flyback output voltage across said load, via said feedback voltage secondary coil and said feedback voltage rectifier sub-circuit;

providing a fraction of said feedback voltage signal at the FB terminal of said PWMic via said two feedback resistors divider sub-circuit;

compensating said fraction of said feedback voltage signal via said compensation capacitor;

providing a minimum safe voltage threshold signal at the Comp terminal of said PWMic via said first resistor, said second resistor and said PNP transistor of the VFCFB sub-circuit;

keeping the amount of voltage at the Comp terminal at low level via said PNP transistor and implicitly the current of said load at lower level, if said feedback voltage signal does not increases up to a pre-established level determined by the number of LEDs said load includes;

increasing discreetly said load's current amount only when said feedback voltage signal reaches a sufficiently high amount to increase the voltage amount of said Comp terminal of said PWMic via said zener diode and said PNP transistor of said VFCFB sub-circuit;

confirming there is no damage in said load's circuit when said feedback voltage signal reaches its designated maximum voltage;

controlling in closed feedback the designated maximum voltage across the load via said two feedback resistors divider sub-circuit and the FB terminal of said PWMic; and shutting down the high current delivered to said load at any time when said zener diode of said VFCFB sub-circuit does not sense a sufficiently high voltage amount of said feedback voltage signal.

11. A method for achieving simultaneously control of a PFC converter and a PWM converter in a near unity power factor double stage boost—buck boost converter LED lighting circuit, using a low cost PWM controller IC, the method comprising:

introducing an AC power source;

introducing a bridge rectifier comprising an AC input and a DC output;

electrically connecting said bridge rectifier's AC input to said AC power source;

rectifying said AC power source signal;

outputting an unfiltered and unregulated voltage across said DC output;

introducing a boost converter sub-circuit comprising a boost input, a boost coil, a boost output and a boost driving input;

electrically connecting said bridge rectifier output to said boost input;

introducing a buck-boost converter sub-circuit comprising a buck-boost input, a buck-boost coil, a buck-boost output and a buck-boost driving input;

introducing a load;

electrically connecting said boost converter's output to said buck-boost converter's input;

electrically connecting said buck-boost converter's output to said load;

introducing a low cost PWM controller IC including a driving output;

generating a high frequency square wave driving pulse at the IC controller's driving output, said square wave driving pulse including constant frequency and constant duty cycle (CFCD);

electrically connecting said IC controller's driving output to said boost driving input and to said buck-boost driving input;

sizing the buck-boost coil's parameters in accordance to the voltage and current parameters required by said load; and sizing said boost coil's parameters for a discontinuous mode of operation.

12. A method for controlling simultaneously the voltage and current amount of nonlinear loads such as LEDs using a benistor linear and self-switching mode of operations capabilities, the method comprising the steps of:

introducing an LED string comprising a plurality of LEDs comprising a positive end and a negative end and each of the plurality of LEDs includes a lighting voltage threshold of about three volts;

introducing a sine wave AC voltage source, wherein said sine wave AC voltage source peak voltage is higher in amount than the total number of said plurality of LEDs included in said LED stripe multiplied by 3V per LED;

introducing a bridge rectifier (BR) comprising:

two AC input terminals a negative output terminal a positive output (V+)

introducing a ground (GND) terminal;

introducing a current sense resistor (CSR);

introducing an ON reference voltage amount approximately equal to the number of LEDs included in said LED string multiplied by 3V per LED with respect to GND;

introducing an OFF reference voltage amount higher than said ON reference voltage amount with respect to GND;

introducing a benistor, said benistor comprises:
an anode (A) terminal;
a cathode (K) terminal;
a current control (Cc) terminal;
a zero voltage reference (ZVR) terminal;
a voltage sensing (Vs) terminal;
an ON voltage threshold control (VTCon) terminal; and
an OFF voltage threshold control (VTCoff) terminal;

electrically connecting said bridge rectifier's AC input terminals to said AC voltage source;

electrically connecting said bridge rectifier's negative output terminal to a ground (GND);

electrically connecting the positive end of said LED string to V+;

electrically connecting said benistor's A terminal to the negative end of said LED string;

electrically connecting said benistor's K terminal to GND via said CSR;

electrically connecting said benistor's Cc terminal to said benistor K terminal;

electrically connecting said benistor's ZVR terminal to GND;

electrically connecting said benistor Vs terminal to V+;

electrically connecting said benistor's VTCon terminal to said ON reference voltage;

electrically connecting said benistor's VTCoff terminal to said OFF reference voltage;

delivering an unfiltered rectified voltage at V+ via said bridge rectifier;

sensing said V+ voltage via said Vs terminal of said benistor;

switching ON the benistor's A-K junction when the benistor's Vs terminal voltage amount exceeds the benistor's VTCon voltage amount;

limiting said LED string current in a pre-establishes level via said benistor's Cc terminal and said CSR;

switching OFF the benistor's A-K junction when the benistor's Vs terminal voltage amount exceeds the benistor's VTCoff voltage amount;

generating light via said LED string during the period of time said V+ amount is higher than said VTCon amount and lower than said VTCoff amount; and generating light via said LED string during the entire time said V+ amount is higher than said VTCon amount if V+ does not exceed said benistor's VTCoff amount.

* * * * *